United States Patent [19]

Fan

[11] Patent Number: 5,371,673
[45] Date of Patent: Dec. 6, 1994

[54] INFORMATION PROCESSING ANALYSIS SYSTEM FOR SORTING AND SCORING TEXT

[76] Inventor: David P. Fan, 2115 Dudley, St. Paul, Minn. 55108

[21] Appl. No.: 45,317

[22] Filed: Apr. 7, 1993

Related U.S. Application Data

[63] Continuation of Ser. No. 529,101, May 25, 1990, abandoned, which is a continuation of Ser. No. 35,080, Apr. 6, 1987, Pat. No. 4,930,077.

[51] Int. Cl.$^5$ .............................................. G08F 15/38
[52] U.S. Cl. ............................ 364/419.01; 364/419.01
[58] Field of Search ................ 364/419, 419.1, 419.01, 364/419.13, 419.19

[56] References Cited

U.S. PATENT DOCUMENTS

| | | |
|---|---|---|
| 3,950,618 | 4/1976 | Bloisi . |
| 4,320,256 | 3/1982 | Freeman . |
| 4,603,232 | 7/1986 | Kurland et al. . |
| 4,745,468 | 5/1988 | Von Kohorn . |
| 4,745,549 | 5/1988 | Hashimoto . |
| 4,930,077 | 5/1990 | Fan ...................................... 364/419 |

OTHER PUBLICATIONS

Weber, "Basic Content Analysis", 1985.
Fan, "Ideodynamics: The Kinetics of the Evolution of Ideas", 11 J. Mathematical Sociology pp. 1-23 (1985).
Fan, "Mathematical Models for the Impact of Information on Society", 10 Political Methodology, pp. 479-493 (1984).
Fan, "Ideodynamic Predictions for the Evolution of Habits", 11 J. Mathematical Sociology pp. 265-281 (1985).

*Primary Examiner*—Gail O. Hayes
*Attorney, Agent, or Firm*—Schwegman, Lundberg & Woessner

[57] ABSTRACT

A method and system for text analysis provides that text messages perceived by a population can be scored to determine the extent to which the messages favor one or more specified positions on a specified issue. A method and system for predicting public opinion based on message scores provides that the extent to which messages favor one or more specified positions can be used to determine the effect on the opinions of a specified population and to determine changes in the percentages of the percent of subpopulations within said specified population which favor said one or more specified positions.

38 Claims, 52 Drawing Sheets

INFORMATION PROCESSING ANALYSIS SYSTEM FOR SORTING AND SCORING TEXT

This is a continuation-in-part division of application Ser. No. 07/529,101, filed May 25, 1990, now abandoned, which is a continuation division of application Ser. No. 07/35,080, filed Apr. 6, 1987, now U.S. Pat. No. 4,930,077.

TECHNICAL FIELD OF THE INVENTION

This invention generally concerns an expert system in artificial intelligence in which a computer performs scoring of information available to the public and uses such scores to predict expected public opinion.

BACKGROUND OF THE INVENTION

One of the major areas of this invention is the computer analysis of text. Here, "text" refers to a stream of data bits. Individual data bits will be referred to as "characters" and will typically be ASCII (American Standard Code for Information Exchange) characters. Small strings of such data bits are grouped into units called "words" with each word having a small number of defined meanings. Unless otherwise stated, words need not begin and end with special characters like spaces, carriage returns or line feeds.

In some expert systems for computer text analysis, words in text are assigned to defined categories and the number words in each category is counted. Final interpretations are based on the frequencies of words in different categories. Although this strategy is suitable for analyzing large quantities of text ranging to millions of characters or more, meanings due to relationships between words are lost.

Other expert systems include the spatial relationships between words in the text analysis. This strategy has the disadvantage that only limited amounts of text can be examined without the rules for assessing word relationships becoming exceedingly complex and very time consuming to compute.

In addition, no general and systematic method has been proposed in either of these areas of artificial intelligence to obtain directly numerical scores for the extent to which a "story" supports different "positions" for an "issue." Here, an issue is basically a question such as: should there be More, Same, or Less spending for military defense. A position, also called an "idea," is a possible answer such as: More, Same, Less or Don't know. A story is a continuous segment of text.

The other major area of this invention concerns the determination of expected public opinion, and, more generally, the determination of expected social traits. Previous attempts to develop an artificial intelligence system for predicting public opinion are described in two previous publications: "Mathematical models for the impact of information on society," by David P. Fan in *Political Methodology*, Vol. 10, pp. 479-493, 1984; and "Ideodynamics: The kinetics of the evolution of ideas," by David P. Fan in *Journal of Mathematical Sociology*, Vol. 11, pp. 1-23, 1985. This system was based on a model called ideodynamics.

In ideodynamics, expected opinion is computed from scores for the extent to which information supports different positions. Expected opinion is determined as a time trend with the time intervals of the determinations being of arbitrarily small size.

For the opinion computations in the prior system, each persuasive message able to change minds of people in a population was defined as an "infon" $I_{ijk}$ where $i=1,2$ was the index referring to whether the infon was available to all people ($i=1$) or only those already aware of the issue ($i=2$) supported a position, where $j=1,2$ was the index referring to the position (denoted by $Q_j$) the infon favored, and where k was the index identifying the individual message. Each infon was defined to have the characteristics of $t_{ijk}$=the time the infon first arrived at the population, $a_{ijk}$=the fraction of the audience reached immediately after the infon was sent, $v_{ijk}$=the credibility of the infon, $c_{ijk}$=the fraction of the infon favoring idea $Q_j$ and $d_{ijk}(t)$=function describing the fraction of the population accessing the infon at time t.

For opinion formation, equations describing the effects of infons from the mass media on the population were $$d_{ijk}(t) = e^{-p_{ijk}(t-t_{ijk})} \text{ for } t >= t_{ijk} \qquad (1)$$
$$= 0 \text{ for } t < t_{ijk}$$

where $p_{ijk}$ is constant, $$f_{ijk}(t) = a_{ijk} \cdot c_{ijk} \cdot d_{ijk}(t), \qquad (2)$$

$$F_j(t) = \sum_k f_{ijk}(t) \qquad (3)$$

for all k with $t_{ijk} < t$, $$g_{ijk}(t) = \int_{-\infty}^{t} f_{ijk}(t') \cdot A(t') \cdot e^{-m(t-t')} dt', \qquad (4)$$

where $A(t')$ is the fraction of the population aware of the issue at time $t'$, $$G_j(t) = \sum_k g_{ijk}(t) \qquad (5)$$

for all k with $t_{ijk} < t$, $$H_j = G_j/(G_{..} + w) \qquad (6)$$

where w is a weighting constant, and $$(dB/dt = k_2(1-B).H_1 - k_2 B.H_2 \qquad (7)$$

where B is the fraction of the population believing in position $Q_1$ given by subscript $j=1$ assuming that there was only one other possible position ($Q_2$) opposed to idea $Q_1$.

The previous ideodynamic system suffered from several drawbacks rendering it inoperable. First, an infon was defined as "a single packet of information transmitted in identical copies to a group of people" (the article by Fan in the Journal of Mathematical Sociology, 1985, described above). Since each infon is defined as $I_{ijk}$ with only one index j, the implication is that an infon can only support the single position $Q_j$. However, in defining content scores $c_{ijk}$, there is the implication that an infon can have contents supporting more than one position. Therefore, there is contradiction in the terms defined earlier.

In the system of this invention, "a single packet of information transmitted in identical copies to a group of people" is redefined as a "persuasive message" with an "infon" $I_{ijk}$ now referring to "a component of a message favoring position or idea $Q_j$." In fact, it is possible to divide a message into several infons all favoring the same position $Q_j$. All such infons would have the same subscript j but would have different subscripts i and/or k.

Second, all persuasive messages were assumed to have the same total content score since the content score $c_{ijk}$ for any one position was only the fraction of the message favored by infon $I_{ijk}$. This interpretation gives excessive weights to persuasive messages with very little information relevant to the issue. Therefore, the result will be highly inaccurate opinion determinations.

In this invention, $c_{ijk}$ is redefined as the total and not the fractional content of infon $I_{ijk}$ favoring position $Q_j$.

Third, the prior equation for opinion determination (equation 7) did not include the case of an issue having more than the two positions of pro and con.

In this invention, a new equation is used where any number of positions is possible. The extension to more positions could have resulted from a number of different assumptions so the formulation in this invention cannot be directly deduced from the prior system.

Fourth, the equations in the systems of this invention no longer include the term $d_{ijk}(t)$. Also, the constant $a_{ijk}$ is redefined as $a_{ijk}(t)$ = a function of time including features from both $a_{ijk}$ and $d_{ijk}(t)$ in the previous formations of equations 1-7.

Fifth, equation 6 is now replaced by a totally new equation in which constant w is eliminated and in which $G_{..}$ no longer appears. The replacement equation is not a natural extension of equation 6 since the new constants have no relation to constant w in equation 6. With this invention no longer using constant w, the entire sketch for the solution of equations 1-7 in the prior system is inoperative since that sketch required finding constant w.

Sixth, the prior system did not permit messages favoring different positions to have different abilities to cause opinion change. This possibility is now included by the introduction of constants $w_{jj'}$ (see equation A.29 of step III-4 of the Preferred Embodiment below).

Seventh, the prior system did not specify the method for solving differential equation 7 including the setting of the boundary conditions so that system did not give a complete description of the opinion determination.

SUMMARY OF THE INVENTION

Disclosed is a system for using an electronic computer to determine expected social traits, and in particular, public opinions for the specified positions of a specified issue based on information available to the public. The three basic stages of the system involve: the gathering of representative messages relevant to the issue over a period of time, the generation of numerical scores for the messages, and the use of the scores to determine time trends of public opinion throughout the time period for which the messages are available. The preferred messages are in the form of text which can be retrieved from electronic data bases. The system first provides a method to score text using an electronic computer. The system then determines expected opinion from changes in opinion due to the influence of the messages as represented by their numerical scores.

BRIEF DESCRIPTION OF THE DRAWINGS

FIG. 3.1 illustrates polled data for defense spending.

FIG. 4.2 illustrates a population conversion model for defense spending.

FIG. 4.3 illustrates the impact of persuasive infons favoring more defense spending.

FIG. 4.4 illustrates persuasive forces of AP infons scored for favoring more, same and less defense spending.

FIG. 4.5 illustrates persuasive forces of AP infons scored for favoring more and less defense spending.

FIG. 4.6 illustrates opinion on defense spending from dispatches scored to favor more, same and less spending.

FIG. 4.7 illustrates constant optimization curves for defense spending.

FIG. 4.8 illustrates opinion from a subset of AP dispatches scored to favor more, less or more, same and less defense spending.

FIG. 4.9 illustrates opinion from another subset of AP dispatches scored to favor more, same and less defense spending.

FIG. 4.10 illustrates opinion on defense spending assuming the entire population favored more spending of the same at the time of the first scored AP infons in January 1997.

FIG. 4.11 illustrates opinion on defense spending from dispatches scored to favor more and less defense spending only.

FIG. 4.12 illustrates persuasive forces of AP infons from 1977 to 1986 scored for favoring more, same and less defense spending.

FIG. 4.13 illustrates opinion on defense spending for 1977 and 1986.

FIG. 4.14 illustrates constant optimization curve for the contributions from paragraphs favoring less defense spending.

FIG. 4.15 illustrates effective stories on waste and fraud on public opinion on defense spending.

FIG. 4.16 illustrates persuasive forces for troops in Lebanon from AP infons only.

FIG. 4.17 illustrates persuasive forces for troops in Lebanon from AP infons without a truck bombing infons favoring more troops.

FIG. 4.18 illustrates population conversion model for actions of infons favoring more, same and less troops in Lebanon.

FIG. 4.19 illustrates optimization for the modified persuasability constant, a wait for paragraphs favoring less troops and the value of the truck bombing infons favoring more troops.

FIG. 4.2 illustrates optimization curves for the persistence half-life and the value of the truck bombing infons favoring less troops.

FIG. 4.21 illustrates opinion on troops in Lebanon assuming only AP infons.

FIG. 4.22 illustrates opinion on troops in Lebanon with a truck bombing infons favoring more troops.

FIG. 4.23 illustrates comparisons of opinion projections with (solid line) or without the truck bombing infons (dotted line) favoring more troops.

FIG. 4.24 illustrates persuasive forces AP infons with and without a truck bombing infons favoring less troops.

FIG. 4.25 illustrates opinion projections with and without a truck bombing infons favoring less troops.

FIG. 4.26 illustrates persuasive forces favorable to Democratic presidential candidates from AP paragraph scored using bandwagon words.

FIG. 4.27 illustrates persuasive forces unfavorable to Democratic presidential candidates from AP paragraph scored using bandwagon words.

FIG. 4.28 illustrates persuasive forces of AP infons scored by name, only.

FIG. 4.29 illustrates population conversion model for actions of infons scored using bandwagon words.

FIG. 4.30 illustrates population conversion model for actions of infons scored by name, only.

FIG. 4.31 illustrates optimization curves for constants for Democratic primary bandwagon analysis.

FIG. 4.32 illustrates opinion on Democratic candidates when infons were scored by the bandwagon analysis.

FIG. 4.33 illustrates opinion on Democratic candidates when infons were scored by name only.

FIG. 4.34 illustrates persuasive forces from AP paragraphs favoring better, same and worse economic conditions.

FIG. 4.35 illustrates population conversion model for actions of infons favoring better, same and worse economic conditions.

FIG. 4.36 illustrates optimization curves for constants for the economic climate.

FIG. 4.37 illustrates opinion on economic climate.

FIG. 4.38 illustrates persuasive forces of AP infons favoring unemployment more important, equal importance and inflation more important.

FIG. 4.39 illustrates a population conversion model for actions of infons favoring unemployment important, equal importance, and inflation more important.

FIG. 4.40 illustrates optimization curves for the modified persuasability constant and the infons waiting constants where the unemployment versus inflation paragraph.

FIG. 4.41 illustrates optimization curve for the persistence constant for unemployment versus inflation.

FIG. 4.42 illustrates opinion favoring unemployment more important, equal importance or inflation more important.

FIG. 4.43 illustrates persuasive forces of AP infons scored by the author as favoring an opposing contra aid.

FIG. 4.44 illustrates persuasive forces of AP infons scored by the Swim MIENE and French as favoring an opposing contra aid.

FIG. 4.45 illustrates a population conversion model for actions of infons favoring opposing contra aid.

FIG. 4.46 illustrates constant optimization curves for contra aid.

FIG. 4.47 illustrates opinion favoring and opposing contra aid using infons scores by the author.

FIG. 4.48 illustrates opinion favoring and opposing contra aid using infons scores by the Swim MIENE and French.

DESCRIPTION OF THE PREFERRED EMBODIMENT

Figure 1:
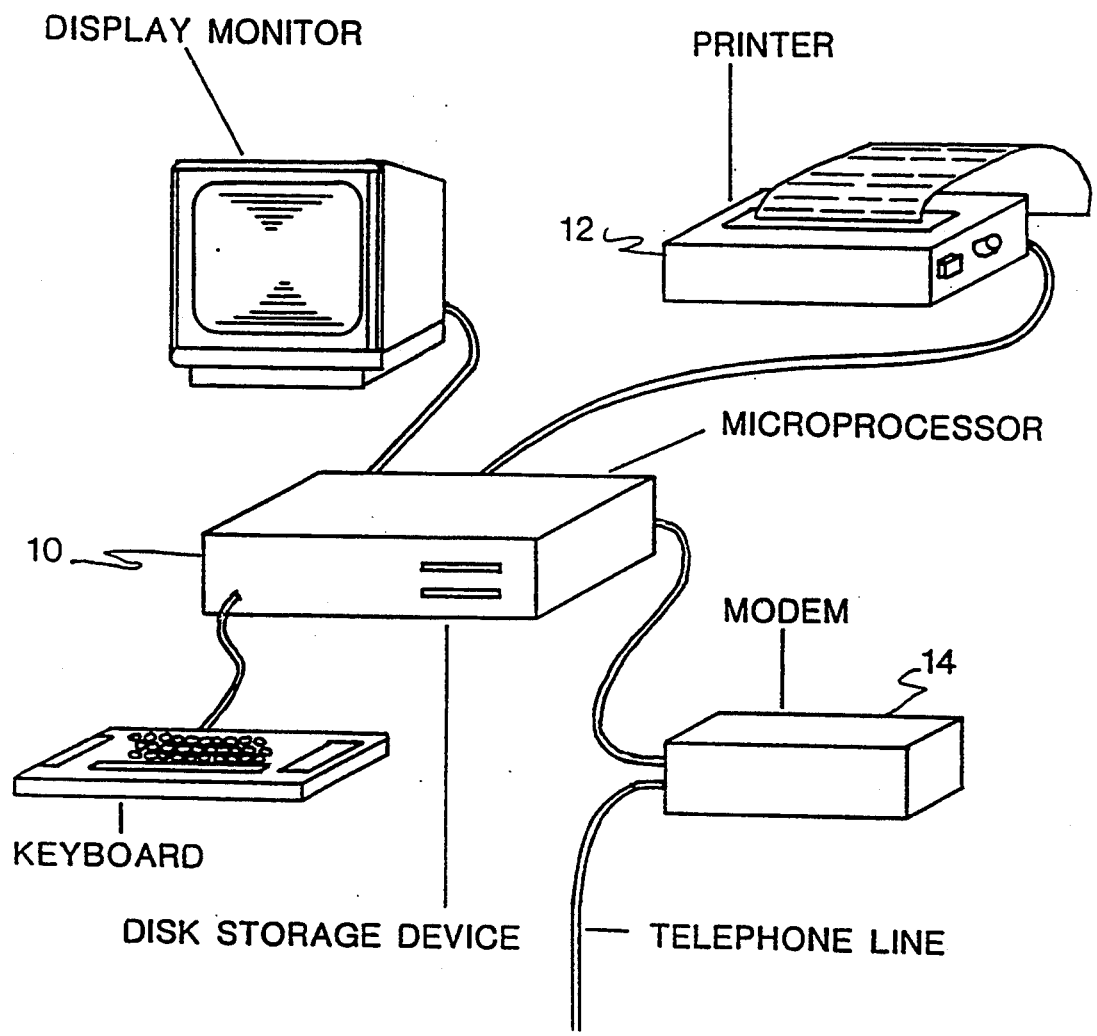
FIG. 1 is a perspective view of the electronic computer and peripheral devices used for this invention.

The invention will now be described as embodied in the computer system shown in FIG. 1 with a human operator at the controls. This system comprises a computer 10, preferably compatible with the IBM-PC microcomputer, a printer 12, preferably the Hewlett-Packard Thinkjet printer, and a modem 14. The printer 12 and modem 14 are attached to the computer 10 with the modem being further connected to remote devices by a telephone line. The computer comprises a keyboard by which the operator can enter data, a display monitor for displaying information, a disk storage device, and a microprocessor with a random access memory and a process execution unit. The microprocessor can store information by writing the information to disks using the disk storage device. The microprocessor can then read the stored information using the disk storage device. The computer can also send information to and receive information from the modem.

A typical complete task as the invention is applied to determine public opinion is now described with reference to FIG. 1. It will be understood, however, that the invention is also applicable to the more generalized task of determining social traits as will be discussed further below. In operation, the system operator passes commands and data to the computer using the keyboard. The computer accomplishes the task following commands given by the operator. Those commands include instructions for the computer to load and execute appropriate programs stored on disk. The data used by the computer come from the keyboard and from the modem. Usually, the computer will store the data on disk before subsequently reading that information from disk for the processing steps.

The goal of the typical task is to use information in the Associated Press (AP) wire service to determine expected public opinion for a number of specified positions all relating to a specified issue. The background theory for this embodiment and additional details of the techniques and results are presented in the book manuscript presented in the last section of this patent, and referred to herein as Fan (1987).

The task is divided into three main sections discussed below in steps I, II, and III: Step I is to gather AP dispatches. Step II is to score the dispatches numerically for the extent to which different components support different positions. Step III is to use these numerical scores to determine public opinion.

I. Gathering of AP Dispatches (I-1) In order to gather appropriate AP stories, it is first necessary to define the issue for which opinion is to be determined and the mutually exclusive positions within that issue. The positions are defined so that an individual member of the population can have an opinion favoring only one of the defined positions. The possible positions are denoted by $Q_j$ where j indexes the individual positions.

Consider, as example, the issue: "Should American defense spending be increased, kept the same, or decreased?" The three positions within this issue could be: should be increased, should be kept the same, should be decreased. With three positions, $j=1,2,3$ in the term $Q_j$. For brevity, it is convenient to refer to these three positions as $Q_1$ favoring More defense spending, $Q_2$ favoring Same defense spending, and $Q_3$ favoring Less defense spending. In actual polls, members of the public were assigned by polling organizations as holding one of these three positions (see Table B.1 of Fan, 1987).

In a addition to positions $Q_1$, $Q_2$, and $Q_3$, poll results also included the additional position of No Opinion typically comprising less than 10% of the population. With this small percentage, persons with No Opinion were ignored. This action was equivalent to assuming that most of these persons did not participate in decision making on the issue and continued to have No Opinion. However, it would be possible to repeat the analysis with No Opinion as yet another position.

(I-2) After the issue and its positions are defined, the system operator uses the computer and modem to communicate with a remote storage device, also called a data base, containing the full texts of stories in the AP wire service. One example is the Nexis data base sold by Mead Data Central of Dayton, Ohio. The computer passes a search command to the data base instructing the data base to identify all stories relevant to the issue under analysis.

For the issue of defense spending analyzed in Fan (1987), the search command was: (DEFENSE or MILITARY or ARMS) w/5 (BUDGET! or EXPENDITURE or SPEND! or FUND!) and date aft Jan. 1, 1977 and date bef Apr. 1, 1984. A full explanation of this command is given in Section B.1 of Fan (1987).

After receiving a search command, the Nexis data base responds with the total number of stories found. All stories are numbered in reverse chronological order. The computer then chooses a series of random numbers with the length of the series being less than or equal to the total number of stories identified by the data base. The computer passes appropriate commands to the data base to retrieve the texts of the stories with numbers corresponding to those in the random number series. The computer retrieves the text using the modem and stores the material on disk.

(I-3) The computer reads the retrieved text for a story from disk into memory and edits the text to remove extraneous characters and to convert the date into a "decimal date." For this conversion, it is useful to note that all stories retrieved from the Nexis data base begin with introductory material. This introductory text includes the date of story, preceded by a characteristic string of characters, usually the ASCII characters ESCAPE-A1. The computer scans the text until this string is reached. Then the computer reads the next continuous string of letters as the month (e.g. January), skips irrelevant characters, reads the next integer as the date (e.g. 1), skips irrelevant characters, and then reads the following integer as the year (e.g. 1987).

The computer checks the string of characters comprising the month against an array of 12 words corresponding to the 12 months of the year. Upon finding a match, the computer adds the integer corresponding to the date and the integer corresponding to the number of days in the year before the beginning of the matching month. The computer divides the resulting sum by the total number of days in the year to get a fractional year. The computer adds this fractional year to the last two digits of the year to get the decimal date representing the date in terms of the fraction of the year which had elapsed.

As an example, the decimal date for Jan. 1, 1987 would be 87.0027 where $0.0027=(1+0)/365$. Here, the date is 1 and the integer from the month is 0 since there are no months before January.

The computer then continues to remove extraneous characters from the text. These characters are not part of the text itself but are added by the data base. For instance, the Nexis data base also sends the ASCII character string ESCAPE-A1 just prior to any word in the text which corresponded to a word in the search command (e.g. ARMS in the example in step I-2).

Whenever three adjacent spaces are encountered, the computer replaces the three spaces by the symbol "!" to indicate the beginning of a paragraph. When the computer reaches the end of a story, the computer writes the edited story to disk. For this step, the computer writes in order: the symbol "*" to indicate the beginning of the story, the decimal date, and then the rest of the edited text.

The following is the edited text from a hypothetical AP story:
* 87.0027
!"Funding for the Marines and non-defense items should not be cut," he said.
!He did ask for a reduction in health care spending.

Optionally, the system operator examines the edited text and performs a final manual editing to assure that all stories begin with the "*" symbol and the decimal date and that the paragraphs all being with the "!" symbol.

The editing is performed for every retrieved story. The result is a new set of files on disk containing the edited texts of all stories retrieved from the data base.

II. Computer Assisted Content Analysis

Once relevant stories have been collected and edited in step I above, the task continues with computer text analysis to generate set of numerical scores. In outline, this analysis begins with a series of "text filtration" steps where the computer removes text irrelevant to the opinions being determined. Once the text is sufficiently homogeneous for scoring, the computer proceeds to the "text scoring" step. The filtration and scoring procedures are described in steps II-A and II-B below, respectively.

II-A. Text Filtrations (II-A1) Based on a random sample of edited stories, "filtration criteria" are developed. These criteria are used to formulate a "text analysis dictionary" and a set of customized "text filtration rules" for "filtering text," that is, for discarding text irrelevant to the issue being analyzed. The text filtration rules are comprised of two parts: a set of "text transformation rules" and a set of "text filtration rules." The text analysis dictionary and filtration rules are stored on disk.

Consider, for example, the defense spending issue of step I-1 above. For this topic, it is possible to decide that only one filtration criterion is needed. This condition could be the removal of all paragraphs except those relating directly to "American defense spending." This criterion could be implemented using the text analysis dictionary and text filtration rules those presented below. The rationales and compositions of the dictionary entries and the rules will be discussed below.

(II-A2) The computer loads the text analysis dictionary from disk into memory. The dictionary has two parts, a "concept array" and a "dictionary array."

The concept array lists all the essential concepts needed for the text text analysis. Each element of the concept array is comprised of:
  (a) a unique "concept symbol" made up of a single character in the ASCII set of characters, and (2) a unique "concept mnemonic" made up of a string of ASCII characters sufficiently long to suggest the meaning of the concept.

In the text filtration to select for paragraphs relevant to "American defense spending" (the criterion of step II-A1 above), the concept array could be Table 1.

TABLE 1

Concept array for text analysis dictionary

| Concept mnemonic | Concept symbol |
|---|---|
| AmericaWord | A |
| DefenseWord | d |
| SpendingWord | s |
| AmerDefense | b |
| AmerDefSpend | + |
| NonPrefix | n |

The dictionary array of the text analysis dictionary is comprised of a number of specified words. Each word is associated with one of the concepts in the concept array. Therefore, each word has a corresponding concept mnemonic and concept symbol.

Returning to the example of the text filtration for "American defense spending," the dictionary array might include the entries in Table 2. Here, only the concept symbol is given since the concept mnemonic can be read from Table 1.

TABLE 2

Dictionary array for text analysis dictionary

| Dictionary word | Concept symbol |
|---|---|
| America | A |
| U.S. | A |
| defense | d |
| funding | s |
| budget | s |
| Marine | b |
| non | n |

In this example, the concept of "American" would have concept symbol "A" and concept mnemonic "AmericaWord." The words "America" and "U.S." could both belong to this concept. However, not every concept need have corresponding words in the dictionary. For example, the concept of "American defense spending" could have concept symbol "+" together with concept mnemonic "AmerDefSpend" and yet not be represented by any single word.

(II-A3) Besides loading the dictionary, the computer loads the text transformation rules from disk into memory. These rules are comprised of:
(a) Initiation and termination signals for "blocks of text." These signals are strings of characters. The computer scans for the first occurrence of an initiation signal after the decimal date. The computer marks this as the beginning of a block of text. The computer marks the first following termination signal as the end of the that block of text. The block of text itself is the text between the two signals.

For the sample edited text of step I-3 above, it is possible to discard irrelevant paragraphs in which case the appropriate blocks of text would be paragraphs. Therefore, the "!" would be the only permissible initiation signal since all paragraphs in the edited text begin with this symbol.

However, there would be two possible termination signals, the character "!" marking the beginning of a following paragraph and the end of story marker described in step II-A5 below. Therefore, the "!" can mark both the end of one block of text and the beginning of the next.

It is also possible to use other initiation and termination signals. For example, the "!" signal marking the beginnings of paragraphs could still be used as the initiation signal for discarding entire stories. In this case, the end of story maker would be the only permissible termination signal. Intervening appearances of "!" would not cause the block of text to end.

(b) Specified carryover symbols. These symbols are a subset of all the concept symbols of step II-A2 above (see step II-A18 below for their use).
(c) Text equivalent transformation rules. These rules are a set of individual transformation rules (see step II-A15 below for their use).

(II-A4) Besides the text analysis dictionary and text transformation rules, the computer also loads the text filtration rules from disk into memory. These rules are comprised of:
(a) a set of "text discard symbols" with each element comprised of a concept symbol which would lead to discarding a block of text, and
(b) a set of "text retention symbols" with each element comprised of a concept symbol which would lead to retaining a block of text.

(II-A5) After loading the dictionary and corresponding text transformation rules, the computer loads the text of a specified story into memory, placing an end of story mark in the memory unit following the end of the story. In a disk file containing more than one story, the "*" symbol just before the decimal date of the next story (see example of step I-3) would delimit the end of the previous story. Alternatively, the end of the disk file would signal the end of a story.

(II-A6) The computer reads the "*" and decimal date at the beginning of a story and writes this information to two separate disk files, a "full text output file" and a "filtered text output file." The computer then scans the text until it encounters the first initiation signal and places a "current begin block of text" marker at the beginning of this signal.

(II-A7) The computer also places a "current position" marker at the next character.

In the example in step I-3 above, the mark is on the quote sign immediately after the first "!".

(II-A8) The computer marks the first word in the text analysis dictionary as the "current dictionary word."

(II-A9) The computer prepares a "candidate word" comprising of a string of characters in the text of the story beginning with the current position mark and extending into the text until the length current dictionary word is reached or until a termination signal is encountered. The computer compares the candidate word with the current dictionary word. In making the comparisons, all letters are reduced to the lower case. Carriage returns and line feeds are considered to be the equivalent of a space.

(II-A10) If there is no match in step II-A9 above, the computer moves the current dictionary word marker to the next word in the dictionary and repeats step II-A9. This repetition is continued until either a match is found or the end of the dictionary is reached.

(II-A11) If there is a match in either step II-A9 or step II-A10 above, the computer inserts into the text the following three characters just before the position of the match:
(a) the control character "<" indicating the arrival of a concept symbol, (b) the concept symbol of the matching dictionary word, and (c) the control character ">" indicating the end of the concept symbol.

(II-A12) After step II-A11, the computer advances the current position marker to the next character in the text and repeats steps II-A8 to II-A11. The computer continues this repetition until a termination signal is reached. The text between the current begin block of text marker and this termination signal, including the character additions of step II-A11, is considered to be the "current block of text." At this point, the current block of text from the example of step I-3 above is:

!"<s>Funding for the <b>Marines and <n>non-<d>defense items should not be cut," he said.

The computer writes the current block of text to the display monitor to permit the system operator to follow the progress of the text analysis.

(II-A13) The computer constructs a "text equivalent" for the current block of text comprised of an alternating series of elements: a "diagnostic symbol" and a "diagnostic distance:"

(a) The "diagnostic symbol" is comprised of either the symbol "*" denoting the beginning of the block of text or a concept symbol inserted in step II-A11 above.

(b) The "diagnostic distance" is an integer equivalent to the number of characters between two concept symbols in the block of text, between a concept symbol and the beginning or end of the block of text, or between the beginning and end of the block of text if no concept symbols were placed in the block of text.

The computer constructs the text equivalent, stores it memory and displays it on the monitor as follows:

(a) The computer writes to the monitor the diagnostic symbol "*" indicating the beginning of the block of text. The computer then writes a space. At this point, the computer starts at the beginning of the block of text, after the initiation signal, and counts characters up to but not including the first "<" character or the termination signal for the block of text, whichever is reached first. This number of characters is the first diagnostic distance. The computer writes the diagnostic distance followed by a space.

(b) If a "<" has been reached, the computer then writes the next character, the concept symbol of the following word, as next diagnostic symbol. The computer again writes a space and skips the following ">" and counts characters to the next "<" or termination signal. The computer then enters that number as the next diagnostic distance.

(c) Step b immediately above is then repeated until the termination signal is reached.

(d) The end of the text equivalent is delimited by a carriage return followed by a line feed.

The text equivalent for the block of text in step II-A12 is:

* 1 s 16 b 12 n 4 d 42

(II-A14) The computer transforms the text equivalent based on the text equivalent of the previous block of text in a story. If there is no prior block, this step is skipped.

If there is a previous block, the computer consults the list of matching carryover symbols generated in step II-A16 below. The computer adds any matching carryover symbols followed by the diagnostic distance of zero to the end of the current text equivalent.

This step permits the implied meaning in a previous block of text to be transferred to the current block.

(II-A15) After any additions to the text equivalent in step II-A14, the the computer makes transformations on the resulting text equivalent following the text equivalent transformation rules of step II-A3. Each rule is comprised of the following elements:

(a) a "specified operator symbol" which can be any one of the concept symbols in the text analysis dictionary, (b) a "specified target symbol" which can also be any one of the concept symbols in the text analysis dictionary or the reserved symbol "$,"

(c) a "specified direction" indicated by one of the three letters "A, B, E" (A for ahead, B for behind, and E for either), (d) a "specified distance" indicated by an integer, (e) a "specified decision symbol" which can be one of the concept symbols in the text analysis dictionary or the reserved symbol "%," and (f) a Boolean "specified operator retention" variable.

The computer applies individual rules in their order of entry into memory as follows:

(a) The computer scans the text equivalent until a diagnostic symbol matches the specified operator symbol. This matching diagnostic symbol is marked as the "matching operator symbol."

(b) If a matching operator symbol is found, the computer marks diagnostic symbols in the text equivalent as "matching target symbols" based on the specified target symbol, distance and direction as follows:

(i) If the specified target symbol is "$," the computer marks the matching operator symbol as a matching target symbol.

(ii) If the specified target symbol is not "$," the specified distance and specified direction are used as follows:

(1) If the specified distance is zero, then the computer compares the matching operator entry with the specified target symbol. If a match is found, the computer marks the matching operator symbol as a matching target symbol.

(2) If the specified distance is less than zero and the specified direction is "A," then the computer marks, as matching target symbol, all diagnostic symbols matching the specified target symbol if these symbols are ahead of the matching operator symbol in the text equivalent.

(3) If the specified distance is less than zero and the specified direction is "B," then the computer marks, as matching target symbol, all diagnostic symbols matching the specified target symbol if these symbols are behind the matching operator symbol in the text equivalent.

(4) If the specified distance is less than zero and the specified direction is "E," then the computer marks, as matching target symbols, all diagnostic symbols in the text equivalent matching the specified target symbol.

(5) If the specified distance is greater than zero and the specified direction is "A," then the computer marks, as the matching target symbol, the diagnostic symbol immediately ahead of the matching operator symbol in the text equivalent if the following symbol matches the specified target symbol and if the intervening diagnostic distance is less than the specified distance.

(6) if the specified distance is greater than zero and the specified direction is "B," then the computer marks, as the matching target symbol, the diagnostic symbol immediately behind the matching operator symbol in the text equivalent if the preceding symbol matches the specified target symbol and if the intervening diagnostic distance is less than the specified distance.

(7) If the specified distance is greater than zero and the specified direction is "E," then the computer marks, as the matching target symbol, the diagnostic symbol just ahead of the matching operator symbol in the text equivalent if the following symbol matches the specified target symbol and if the intervening diagnostic distance is less than the specified distance. If this following symbol is not marked, then the computer marks the diagnostic symbol in the text equivalent just behind the matching operator symbol as the matching target symbol if the prior symbol matches the specified target symbol and if the intervening diagnostic distance is less than the specified distance.

(c) Transformations are performed on the text equivalent based on matching target symbols as follows:

(i) If the matching target symbol is "$," then:

(1) If the specified direction is "B," the computer inserts the specified decision symbol and then the specified distance into the text equivalent just prior to the matching target symbol.

(2) If the specified direction is "A," the computer inserts the specified distance and then the specified decision symbol into the text equivalent just after to the matching target symbol.

(ii) If the matching target symbol is not "$," then:

(1) If the specified decision symbol is "%," then the specified target symbol and its following diagnostic distance are both deleted from the text equivalent, (2) If the specified decision symbol is not "%," then the matching target symbol is replaced by the specified decision symbol.

(iii) If the specified operator retention variable is FALSE, then the matching operator symbol and its following diagnostic distance are both deleted from the text equivalent.

These transformations are now illustrated using the text equivalent of step II-A13 and three sample text equivalent transformation rules.

(a) Rule 1:
Specified operator symbol = n
Specified target symbol = d
Specified direction = A
Specified distance = 10
Specified decision symbol = %
Specified operator retention variable = FALSE
This rule has the function of removing, from the text equivalent, references to non-defense matters. Application of this rule to the text equivalent of step II-A13, repeated here,

* 1 s 16 b 12 n 4 d 42 yields * 1 s 16 b 12.

In applying rule 1, the computer marks the "n" in the text equivalent as the matching operator symbol. Since the specified direction is "A," the computer examines the diagnostic symbol after the "n" and finds a match with the specified target symbol of "A." The intervening diagnostic distance of 4 is also less than the specified distance of 10. Since these two criteria are both met, the computer marks the diagnostic symbol "d" as the matching target symbol. Since the decision symbol is "%," the matching target symbol and its following diagnostic distance of 42 are both deleted. Then, because the specified operator retention variable is FALSE, the computer also deletes the matching operator symbol "n" and its following diagnostic distance of 4.

(b) Rule 2:
Specified operator symbol = b
Specified target symbol = s
Specified direction = B
Specified distance = −1
Specified decision symbol = +
Specified operator retention variable = TRUE
Application of this rule to the previously transformed text equivalent

* 1 s 16 b 12 yields * 1 + 16 b 12.

In this transformation, the computer finds and marks the matching operator symbol "b" in the text equivalent. Since the specified direction is "B" with the meaning of either ahead or behind and since the specified distance is less than zero, the computer searches for all occurrences of the target symbol anywhere in the text equivalent. The computer finds the matching target symbol "s." Since this was not the reserved symbol "%," the computer replaces the matching target symbol "s" with the specified decision symbol "+." Since the specified operator retention variable is TRUE, the matching operator symbol is retained in the text equivalent. In this way, it has been possible to combine the meanings of "American defense" represented by the "b" and "spending" represented by the "s" to give the meaning of "American defense spending" represented by the "+."

(c) Rule 3:
Specified operator symbol = +
Specified target symbol = $
Specified direction = B
Specified distance = 0
Specified decision symbol = A
Specified operator retention variable = TRUE
Application of this rule to the previously transformed text equivalent

* 1 + 16 b 12 yields * 1 A 0 + 16 b 12.

In this transformation, the computer finds the matching operator symbol "+." Since the target symbol is the reserved symbol "$" and since the specified direction is "B," the computer marks the matching operator symbol as the matching target symbol and inserts the specified decision symbol "A" and the specified diagnostic distance of 0 just before the target entry.

Rule 3 has permitted the extraction of individual meanings from concept symbols embodying several different concepts. In the example presented above, the concept of "America" denoted by the concept symbol "A" could be written explicitly in the text equivalent since "America" was already a part of the concept of "American defense spending" denoted by the concept symbol "+." In the dictionary of Table 2, the word "Marine" alone was interpreted to embody the meaning of "American defense." Therefore, the concept of "America" was always implied although not explicitly stated as a separate word.

Even though Marine can refer to other concepts besides a subset of the American military. It is possible to let Marine have this connotation, if the set of collected AP dispatches almost always uses this word in this context. Therefore, ambiguous words can have a precise meaning if text containing other meanings is eliminated.

As a general rule, the text transformation rules lead to a series of transformations resulting in a final text equivalent containing concept symbols representing directly the concepts used for the decisions for a block of text.

(II-A16) After performing all the transformations specified by the text equivalent transformation rules, the computer makes a list of matching carryover symbols comprising of all concept symbols which are in both the list of specified carryover symbols (entered at step II-A3) and in the final text equivalent.

As an example, consider symbol "A" being in the list of carryover symbols. In this case, the computer would enter this symbol in the list of matching carryover symbols if the text equivalent is the final one in the previous step, namely, \* 1 A 0+16 b 12.

The use of "A" as a specified carryover symbol permits the connotation of "American" to be transferred from one block of text to the next. This designation is desirable when it is not certain that the next block of text would refer to "America" unless the previous block of text had this implication.

(II-A17) The computer checks the text equivalent for any diagnostic symbols which match the list of retention symbols. If any are found, the computer sets the Boolean block retention variable as TRUE. Otherwise the block retention variable is set as FALSE. The computer then checks the text equivalent for any diagnostic symbols matching the list of discard symbols. If any matches are found, the block retention flag is set as FALSE.

The computer writes the block of text, including the < > marks and their included concept symbols to the full text output file on disk. Immediately following this text, the computer writes the text equivalent both before any transformations have been made and also after each transformation step. If the block retention flag is TRUE, the computer then writes the words "PREVIOUS TEXT IS RETAINED." If the block retention flag is FALSE, the computer writes "PREVIOUS TEXT IS DISCARDED" instead.

In addition, if the block retention flag is TRUE, the computer also writes to the filtered text output file the same items described above for the full text output file with the omission of the text equivalents after the transformations. Also, the phrases about the previous text being retained or discarded are also not written since only retained text is stored in the filtered text output file.

Continuing with the text of step I-3, it is possible to filter for the retention of only those paragraphs directly relevant to American defense spending. In this case, the "+" symbol could be used as the retention signal. It would be unnecessary to specify any concept symbols as discard symbols. In this case, the "+" in last text equivalent of step II-A15 would cause the block retention variable to be set to TRUE. The output to the full text output file for the block of text in step II-A15 would be:

!"\<s\>Funding for the \<b\>Marines and \<n\>non-\<d\>defense items should not be cut," he said.
  \* 1 s 16 b 12 n 4 d 42
  \* 1 s 16 b 12
  \* 1+16 b 12
  \* 1 A 0+16 b 12

PREVIOUS TEXT IS RETAINED (II-A18) The computer repeats steps II-A7 to II-A17 above after finding the next initiation signal in the text and moving the current begin block of text marker to this initiation signal. The repetition stops when the end of the story is reached.

The second block of text from the edited text of step I-3 would be:

!He did ask for a reduction in health care \<s\>spending.
  with text equivalent:
  \* 42 s 9

The text equivalent transformation of step II-A14 would yield

\* 42 s 9 A 0 after addition of the matching carryover symbol of "A" (identified in step II-A16) and the diagnostic distance of 0.

There is no change in this text equivalent following any of the Rules 1 to 3 of step II-A15. Since there is no "+" symbol in the final transformed text equivalent, the computer sets the block retention variable to FALSE and writes the block of text, the original text equivalent, the three text equivalents after application of the transformation rules, and the words "PREVIOUS TEXT IS DISCARDED" to the full text output file.

Nothing from this second block of text is written to the filtered text output file. The result is a more homogeneous text containing only those paragraphs directly relevant to "American defense spending."

After steps II-A1 through this step, the filtered story of step I-3 is:
\* 87.0027
!"\<s\>Funding for the \<b\>Marines and \<n\>non-\<d\>defense items should not be cut," he said.
  \* 1 s 16 b 12 n 4 d 42

(II-A19) The text filtration steps II-A5 to II-A18 for individual stories are repeated for all retrieved stories.

(II-A20) If the text after step II-A18 retains important amounts of irrelevant text, the computer loads a new dictionary and set of corresponding rules based on criteria different from those for steps II-A1 to II-A4 and repeats the text filtration steps II-A5 to II-A18. If necessary, this filtration to remove irrelevant text is repeated using a new alternative dictionary and corresponding set of rules each time until reasonably homogeneous text is obtained.

The text used for these further filtrations is the filtered text output file of an earlier filtration. In loading the text in step II-A5, the computer removes all old diagnostic symbols by eliminating all character strings beginning with "\<" and ending with "\>." The computer also removes the old text equivalent by removing the string of characters between the "\*" symbol marking the beginning of a text equivalent and the carriage return marking the end of a text equivalent as shown in step II-A17.

II-B. Text Scoring

The stories are each scored for the extent to which they support positions relevant to public opinion change for the issue under study.

Continuing with the example from step II-A20 above, the task proceeds using a text analysis dictionary, a set of transformation rules and a set of scoring rules all designed for the computation of numerical "message scores" favoring the three positions of More, Same and Less defense spending.

Every message is given an index number k. For this kth message, the scores are designated $s_{ij''k}$ where index i refers to the source of the information as deduced from the message itself, where index $j''$ denotes the position the score favors, and where k is the message index. Index i is odd if the scored information directly supports a position so that the message is accessible to all members of the population. Index i is even if the information indirectly supports the position so that only those already of the issue are able to make the connection. For example if the President of the United States is quoted in the kth message as saying that there should be More defense spending, then:

(a) i=an odd number (e.g. i=3) identifying the source as the President (the number is odd for defense spending because the message directly advocates a position on this issue; indirect Presidential assertions requiring interpretation by the audience would have another i characteristic of the President but the index, e.g. i=4, would be an even number), (b) $j''=1$ if the position of More defense spending had this index, and (c) k=the index number identifying the AP story from which the quote came.

This definition for $s_{ij''k}$ is the same as that in equation A.28 of Fan (1987). Because index i can have several values, reflecting different message sources, it is possible for a message to have several scores with different indices i favoring the same position indexed by $j''$.

In the simplest scoring for the defense spending example, no distinctions would be made between messages according to source. In this degenerate case of no source dependence, i=1 for all sources, both direct and indirect. This is assumption made for the defense spending scoring described below.

The actual scoring involves determining $s_{ij''k}$ values for each block of text and then summing the values for all blocks of text. Therefore, the additional term $s_{ij''kq}$ is introduced where q is the index for individual blocks of text. Thus $s_{ij''kq}$ is the score for the ith source, supporting the $j''$th position, of the qth block of text within the kth story. The final $s_{ij''k}$ for a story is the sum of the $s_{ij''kq}$ over all the q for that story.

The text scoring procedure itself is very similar to that for the text filtrations and is performed on text remaining after all the filtration steps described in step II-A.

(II-B1) The text scoring uses a text analysis dictionary and a set of text transformation rules with exactly the same formats as those in steps II-A. In addition, the task requires a set of "text scoring rules."

(II-B2) The computer reads and stores in memory the text analysis dictionary, the text transformation rules, and the text scoring rules.

Since the text scoring rules include concept symbols from the text analysis dictionary, it is necessary to discuss the dictionary before considering the text scoring rules. Therefore, consider the example of the text from step II-A20. For this example, the dictionary could include the fragments of the concept and dictionary arrays shown in Table 3 (the complete dictionary would have more entries):

TABLE 3

Concept and dictionary arrays of text analysis dictionary

| Fragment of concept array | |
|---|---|
| Concept mnemonic | Concept symbol |
| AheadNegation | / |
| LessWord | L |
| SameWord | s |
| MoreWord | M |

| Fragment of dictionary array | |
|---|---|
| Dictionary word | Concept symbol |
| not | / |
| cut | L |

In this dictionary, the words with the concept of AheadNegation would cause a reversal in the sense of words further into the text equivalent. A typical example would be the word "not." LessWord would be a word favoring less spending. The example in the dictionary is the word "cut." Since the text filtration illustrated in step II-A above had already required that the paragraph be about "American defense spending," the text scoring step might simply be based on word clusters implying support for More, Same or Less without regard to reference to America, defense or spending. In this case, the concepts of "less," "same," and "more" (LessWord, SameWord, MoreWord in the dictionary of Table 3) would be enough for the text scoring rules.

These rules are a two dimensional array with elements $S_{ij''}$ where i indexes the sources of thoughts in the collected AP stories and $j''$ indexes the positions favored by the message scores. Each element $S_{ij''}$ has two components:

(a) a "scoring mnemonic" comprised of a strings of characters, sufficiently long to suggest the source of a thought and the position that thought is scored to support, and (b) a corresponding "scoring symbol" comprised of a concept symbol. The appearance of a scoring symbol in the qth text equivalent of the kth story would lead to a positive numerical score $s_{ij''kq}$.

Consider the task where all messages are scored independently of source so that i=1 for all scores. Furthermore, consider that MoreWord in Table 3 implies support of More defense spending and corresponds to index $j''=1$. Similarly, SameWord might imply support for Same spending with index $j''=2$, and LessWord might imply support for Less spending with index $j''=3$. Then, the scoring rules would have the form of Table 4.

TABLE 4

Text scoring rules
The prefix letter "s" is frequently used to indicate a scoring mnemonic so that sMore, sSame, and sLess correspond to scores supporting More, Same and Less defense spending. The scoring symbols are from Table 3.

| $S_{ij''k}$ | Scoring mnemonic | Scoring symbol |
|---|---|---|
| $S_{11}$ | sMore | M |
| $S_{12}$ | sSame | S |
| $S_{13}$ | sLess | L |

(II-B3) The computer loads the filtered texts of the collected stories after the last filtration of step II-A20. As for the filtration of step II-A20, the computer removes from the text all strings beginning with "<" and ending with ">" and omits the text equivalents. The computer then performs steps II-A5 to II-A16 using the text analysis dictionary and the text transformation rules of step II-B2.

If the initiation and termination signals for blocks of text are paragraphs as in step II-A3, and if the dictionary is that in Table 4, then the computer would construct this text and text equivalent from the text of step II-A20:

!"Funding for the Marines and non-defense items should </>not be <L>cut," he said.
* 54/8 L 14

Since the decision in the example of step II-B2 was simply to score word combinations favoring More, Same and Less, the following text equivalent transformation rule could be used with "not less" being considered to be equivalent to "same:"

Rule 4:
Specified operator symbol=/
Specified target symbol=L
Specified direction=A
Specified distance=20
Specified decision symbol=S
Specified operator retention variable=FALSE Computer application of this rule to the previous text equivalent

* 54/8 L 14 yields * 54 S 14.

(II-B4) After constructing the summary text equivalents by performing the text equivalent transformations for the qth block of text of the kth message using the text transformation rules of step II-B4 above, the computer then uses the text scoring rules to calculate the $s_{ij''kq}$ values in the following manner.

The computer compares the scoring symbols in the $S_{ij''}$ of the text scoring rules with the concept symbols in the summary text equivalent of the qth block of text of the kth message. The computer calculates the $s_{ij''kq}$ for a particular i and j'' by dividing the number of matches for the concept symbols in the corresponding $S_{ij''}$ by the total number of all matches for all concept symbols in all the $S_{ij''}$ regardless of i and j''. By performing this division, the same total score is given for every AP paragraph. If matches are found for two concept symbols supporting different positions, the total paragraph score would be divided among the corresponding concepts.

Using the text scoring rules of Table 4 for the transformed text equivalent of step II-B3, the computer obtains:

$s_{11k1}$=0/1=0.0 AP paragraphs,
$s_{12k1}$=1/1=1.0 AP paragraphs, and
$s_{13k1}$=0/1=0.0 AP paragraphs.

Here, the corresponding block of text is the first in the story so q=1. The units for $s_{ij''kq}$ are the types of blocks of text scored. Since the scores above are for a typical AP paragraph, the units are AP paragraphs. For calculating these $s_{ij''kq}$ scores, scoring symbol "S" in Table 4 appears once while scoring symbols "L" and "M" appear zero times in the text equivalent. With only one appearance of a scoring symbol, the total number of matches is 1+0+0=1.

To permit the system operator to follow the progress of the analysis, the computer writes to the monitor a full text output file in a format very much like the full text output file of step II-A17. The only difference is that a line describing the block scores replaces the sentences announcing the retention or discarding of previous text. The block of text scores in the output (beginning with the word "SCORES:") includes the scoring mnemonic in the $S_{ij''}$ with the same i and j'' as in the $s_{ij''kq}$ (see Table 4):

!"Funding for the Marines and non-defense items should </>not be <L>cut," he said.
* 54/8 L 14
* 54 S 14
SCORES: sMore=0.0, sSame=1.0, sLess=0.0

(II-B5) The computer repeats steps II-B3 and II-B4, for all blocks of text q in the kth story. Upon scoring the last block of text, computer sums the individual $s_{ij''kq}$ over all q to obtain the final $s_{ij''k}$ score. For the kth story, the computer writes the decimal date, denoted $t_k$, and these final scores $s_{ij''k}$ to disk.

Since there was only one block of text left in the example of step II-A20, the final message scores $s_{ij''k}$ are the same as the $s_{ij''k1}$ scores in step II-B4 above.

(II-B6) The computer repeats steps II-B3 to II-B5 for the remaining text of all the stories after the filtration of step II-A20 and writes their $s_{ij''k}$ and their corresponding $t_k$ to disk.

The examples presented above were chosen to illustrate the major options in the text analysis dictionary, in the transformation rules, in the text filtration, and in the text scoring rules. The actual dictionaries, transformation rules, text filtration rules, and text scoring rules used for the analysis of American defense spending (Fan, 1987) were somewhat different. Fan (1987) also describes the application of the text analysis in this step II to five other topics. In all cases, the text analysis was found to give acceptable results (see Chapter 3 and of Fan, 1987).

III. Computations of Public Opinion (III-1) The computer reads from disk all the data calculated in step II-B6 and stores these data as a "scores array" with index k so that each array element contains the $t_k$ and all the corresponding $s_{ij''k}$ of the kth story. The computer then sorts the elements of the scores array by date with the data from earliest story being the first item in the array and the information from the latest message being the last. In all subsequent steps, index k refers to the array index after sorting.

For example, if the story retrieved in step I-3 and scored in step II-B6 had index k, then its entry in the scores array would be:

$t_k$=87.0027,
$s_{11k}$=0.0 AP paragraphs,
$s_{12k}$=1.0 AP paragraphs, and
$s_{13k}$=0.0 AP paragraphs.

(III-2) In order to compare predicted and measured public opinion, the system operator enters into the computer via the keyboard a series results from measured public opinion polls. This series will typically include data from published opinion polls in which the same question or close variants are asked at a number of different times. Since people are only allowed to hold one position for any single polled issue, opinion polls assume that the total population can be divided into subpopulations, $P_j$, each with members favoring the same polled position with index j. The fraction of the total population in subpopulation $P_j$ is defined as $B_j$. The percentage in the No Opinion or Don't Know category can be considered to be a separate subpopulation or the percentage for this group can be removed with the remaining percentages for defined positions being renormalized to 100%. This nomenclature follows that in Sections A.2 and A.4 of Fan (1987).

Since public opinion can change, $B_j$ will vary with time t so that $B_j=B_j(t)$. To indicate that opinion percentages are from poll data, the $B_j(t)$ from polls carry the extra subscript P and therefore have the form $B_{Pj}(t)$. Different polls in a series are identified by index numbers n so the nth poll result favoring position j is $B_{Pnj}(t)$. If $t_{Pn}$ is the time at which the nth poll was taken, with subscript P again indicating that time is for a poll, then $B_{Pnj}(t) = B_{Pnj}(t_{Pn})$. The time $t_{Pn}$ of a poll is computed by averaging the beginning and ending date of the poll.

A series of poll data appropriate for the example in step I, is given in Table B.1 of Fan (1987). For the calculations in Fan (1987), the percentage of Not sures and Don't knows were subtracted with the remaining 90% or so of the population favoring More, Same and Less defense spending being renormalized to 100%.

(III-3) Similar to the case with the message scores, the computer stores the poll data as an array indexed by poll number n with each "opinion array" element having the $t_{Pn}$ of the poll and the corresponding $B_{Pnj}(t_{Pn})$.

The computer sorts the array elements according to date $t_{Pn}$ with the poll at the earliest date being the first element in the array. In subsequent discussions, n will be the poll index after sorting.

For example, the first element of the poll array for the first line of the data of Table B.1 of Fan (1987) (after removal of the Not sure's and renormalization as mentioned above) would have $n=1$. The corresponding element in the poll array consists of:

$t_{P1} = (31+28+15)/365 = 77.2027$ (The date before conversion to a decimal date was March, 1977. When only the month is supplied in the published poll, the poll date is assigned to the middle of the month, hence March 15, in the present example. The 31 and 28 are the number of days in January and February respectively.), $B_{P11} = 25.7\%$,
$B_{P12} = 49.5\%$, and
$B_{P13} = 24.9\%$.

(III-4) To predict public opinion, the computer loads a set of "refining weight" constants $w_{ijj'}$ prescribing the method for generating "persuasive force functions" $G''_{j'}$ describing the ability of information favoring a position to change the minds of persons holding different opinions. Equation A.29 of Fan (1987) relating these items to each other is reproduced below $$G''_{j'}(t) = \sum_{i,j'',k} w_{ijj'} \cdot s_{ij''k} \cdot e^{-p(t-t_k)}. \quad (A.29)$$

where the summation is over all i and j'' and over all k with $t_k < t$. These indices are the ones entered for $s_{ij''k}$ and $t_k$ in step III-1 above. Constant p is the "persistence constant" characteristic of AP stories. Constants $w_{ijj'}$ describe the contribution of each of the scores $s_{ij''k}$ to persuasive force function $G''_{j'}(t)$. Each persuasive force function $G''_{j'}(t)$ favors a position denoted by j'. These positions often coincide with the positions j'' of scores $s_{ij''k}$ but need not do so as discussed in of Fan (1987).

These $w_{ijj'}$ permit different types of information favoring a position to have different weights. For instance, it is conceivable that information from the President of the United States might be more or less persuasive than messages from Congress for the issue of whether more should be spent for military defense. To take this possibility into account, scores $s_{3j''k}$ with index $i=3$ could refer to the quoted source being the President, and scores $s_{5j''k}$ with $i=5$ could refer to the quoted source being from Congress. Both indices would be odd if the scores were due to direct quotes favoring the position indexed by j''. Indices $i=4,6$ could be used if descriptions of Presidential and Congressional action indirectly supported a position on defense spending. A score attributed to the President ($s_{31k}$) and one identified with Congress ($s_{51k}$) could both favor the same position such as more defense spending ($j''=1$), and both scores could come from the same kth story. These scores would be differentiated by their indices i. If Presidential statements had greater persuasive force, then $w_{3jj'}$ would be greater than $w_{5jj'}$.

In the simplest case, the persuasive forces would favor the same positions as the scores contributing to these forces. Then, $w_{ijj'}$ would only have a positive, non-zero value when $j''=j'$. However, the $w_{ijj'}$ can also reflect ambiguities in the message scoring. For example, it is conceivable that the average message scored as favoring Same defense spending actually has a portion favoring More spending as well. In this case, the $s_{ij''k}$ favoring Same defense spending could contribute both to $G''_1(t)$ for More defense spending and to $G''_2(t)$ for Same defense spending with different weights $w_{ijj'}$ for the two contributions. If a position score $s_{ij''k}$ makes no contribution to persuasive force function $G''_{j'}(t)$, the corresponding refining weight $w_{ijj'}$, is zero.

The scores of step III-1 were for three positions $j''=1,2,3$ corresponding to support of More, Same and Less defense spending with no attribution by source so that $i=1$ for all scores. It is also reasonable to postulate that the $G''_{j'}$ functions causing opinion change for the issue of defense spending only received contributions from scores favoring these same three positions. In this case, the refining weights could be given by Table 5 where each $s_{ij''k}$ only contributed to the persuasive force function $G''_{j'}$ favoring the same position indexed by j''.

TABLE 5

Refining weights
In this Table, the non-zero $w_{ijj'}$ are indicated by their appropriate index numbers.

| Index j' for persuasive force $G''_{j'}(t)$ favoring | Index i for source = 1 Index j'' for scores $s_{ij''k}$ favoring | | |
|---|---|---|---|
|  | More (j'' = 1) | Same (j'' = 3) | Less (j'' = 3) |
| More (j' = 1) | $w_{111}$ | 0.0 | 0.0 |
| Same (j' = 2) | 0.0 | $w_{122}$ | 0.0 |
| Less (j' = 3) | 0.0 | 0.0 | $w_{133}$ |

All values $w_{111}$, $w_{122}$, and $w_{133}$ would further have the same value if all scores $s_{ij''k}$ were equally persuasive. Both the simple model of Table 5 and equality in the $w_{ij''k}$ values functioned well for the defense spending analysis of Fan (1987, Chapter 4).

(III-5) For opinion predictions, the computer also loads a set of "population conversion rules." These rules are summarized as an array of constants $k'_{2jrj}$. These constants are used in equation A.26 of Fan (1987). This equation is reproduced here:

$$B_j(t) = B_j(t - \Delta t) + (T/R) \cdot \Delta t \cdot \quad (A.26)$$
$$\left( \sum_{j',r} G''_{j'}(t) \cdot [k'_{2jrj} \cdot B_r(t - \Delta t) - k'_{2jjr} \cdot B_j(t - \Delta t)] \right).$$

The $G''_{j'}(t)$ terms are from equation A.29 (see above), R = the number of random messages collected in step I, T = the total number of messages identified as relevant in step I, $\Delta t$ = the time interval used by the computer for iterative opinion calculations, $B_j(t)$=the percentages of the population in subpopulations $P_j$ as discussed in step III-2, and "modified persuasibility constants" $k'_{2j'rj}$ (from Table 5) describe the ability of persuasive forces $G_{j'}$ to move persons from a "target subpopulation" $P_r$ to a "destination subpopulation" $P_j$.

The number of people persuaded to change their opinions from that of $P_r$ to that of $P_j$ is proportional to the size $B_r$ of the target subpopulation and the magnitude of the persuasive force $G''_{j'}$. The constant of proportionality is the modified persuasibility constant $k'_{2j'rj}$. If a $G''_{j'}$ cannot cause any conversion of people in $P_r$ to join $P_j$ then $k'_{2j'rj}=0$. For example, information favoring Less defense spending should not persuade those favoring Less spending to support More spending. The computer assumes that all $k'_{2j'rj}$ have the same constant value denoted by $k'_2$ whenever a transition can be caused.

Figure 4:
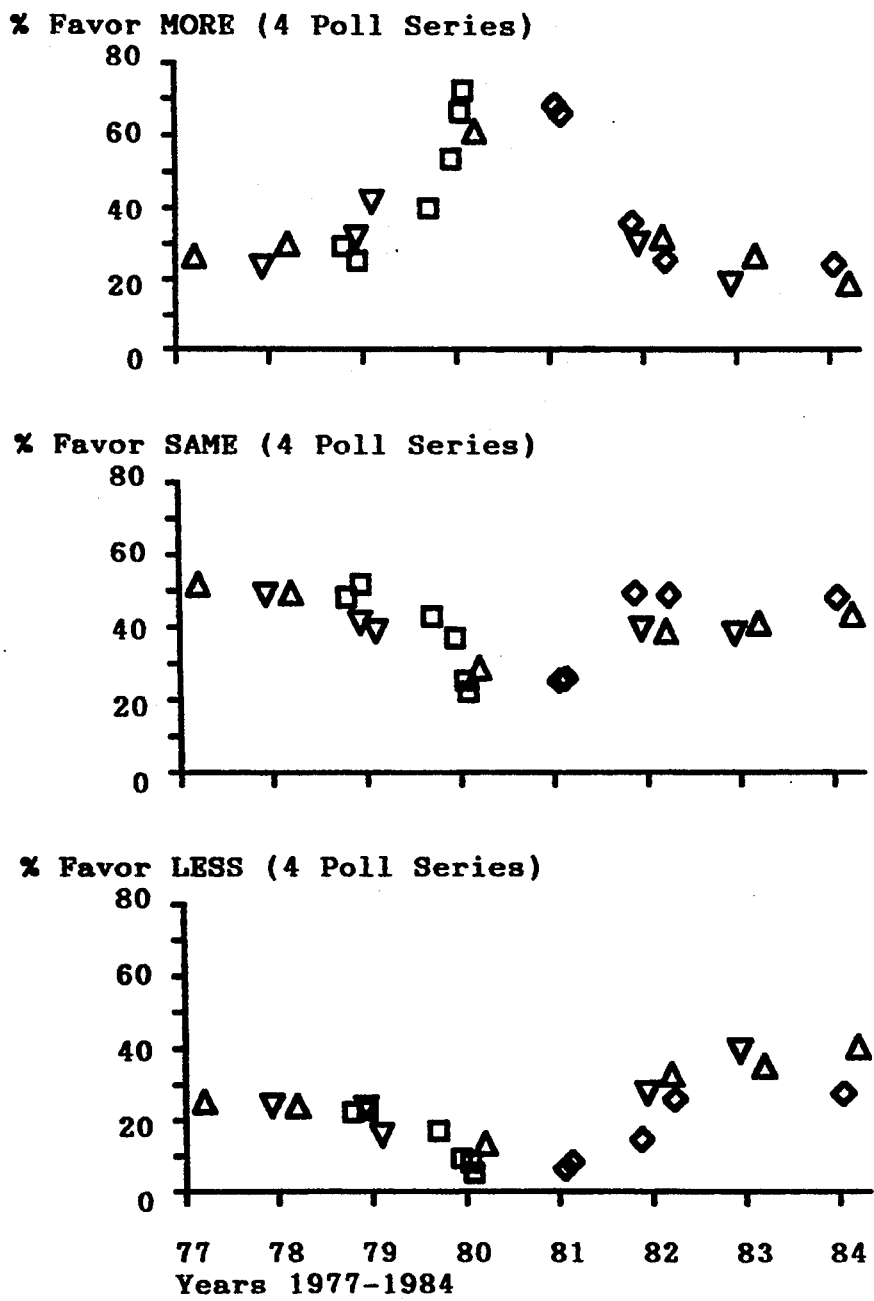
FIG. 4.1 illustrates examples of persuasive forces of infons.

In FIG. 4.2 of Fan (1987) it is assumed that the population conversions for defense spending are as follows:

$G''_1$ converts members from $P_3$ favoring Less to $P_2$ favoring Same, $G''_1$ converts members from $P_2$ favoring Same to $P_1$ favoring More, $G''_2$ converts members from $P_3$ favoring Less to $P_2$ favoring Same, $G''_2$ converts members from $P_1$ favoring More to $P_2$ favoring Same, $G''_3$ converts members from $P_1$ favoring More to $P_2$ favoring Same, $G''_3$ converts members from $P_2$ favoring Same to $P_3$ favoring Same.

These conversions would lead to the population conversion rules of Table 6:

TABLE 6

Population conversion rules
All non-zero $k'_{2j'rj}$ are entered with their appropriate indices and have the constant value of $k'_2$. In this Table:
the position of More corresponds to j = 1, j' = 1, and r = 1;
the position of Same corresponds to j = 2, j' = 2, and r = 2; and
the position of Less corresponds to j = 3; j' = 3, and r = 3.

| Index j' for persuasive force $G''_{j'}$ | Index r for target subpopulation $P_r$ | Index j for destination subpopulation $P_j$ | | |
|---|---|---|---|---|
| | | j = 1 | j = 2 | j = 3 |
| | r = 1 | 0.0 | 0.0 | 0.0 |
| j' = 1 | r = 2 | $k'_{2121}$ | 0.0 | 0.0 |
| | r = 3 | 0.0 | $k'_{2132}$ | 0.0 |
| | r = 1 | 0.0 | $k'_{2212}$ | 0.0 |
| j' = 2 | r = 2 | 0.0 | 0.0 | 0.0 |
| | r = 3 | 0.0 | $k'_{2232}$ | 0.0 |
| | r = 1 | 0.0 | $d'_{2312}$ | 0.0 |
| j' = 3 | r = 2 | 0.0 | 0.0 | $k'_{2323}$ |
| | r = 3 | 0.0 | 0.0 | 0.0 |

(III-6) Using the loaded rules, the computer performs calculations of public opinion as a time trend using equations A.29 and A.26 as follows:

(a) The computer chooses as t, the time of the first poll $t_{P1}$.

(b) The computer calculates, for time $t=t_{P1}+\Delta t$, all values of $G''_{j'}(t)$ using equation A.29, the $s_{ij'k}$ and $t_k$ loaded in step III-1 from step II, constant p and constants $w_{ij'j'}$ assigned in step III-4.

(c) The computer uses the poll percentages, $B_{P1j}$ at $t_{P1}$ as the first $B_j(t-\Delta t)$ in equation A.26. (The $B_r(t-\Delta t)$ values are the same.)

(d) The computer calculates $B_j(t)$ at $t=(t_{P1}+\Delta t)$ from these $B_j(t-\Delta t)$, the R and T values calculated in the initial story retrieval step I-2, the $G''_{j'}(t)$ calculated in step b immediately above, a specified t, and the $k'_{2j'rj}$ terms assigned in step III-5.

(e) The computer repeats the calculations of step b above after advancing time t by t to obtain values of $G''_{j'}(t)$ one t later. The computer repeats step d using as $B_j(t-\Delta t)$ the $B_j(t)$ calculated in the previous step d.

(f) The computer repeats step e, advancing time t in increments of $\Delta t$, until the t is greater than the $t_{Pn}$ of the last poll time with index n. The result is a set of values for $B_j$ at times $\Delta t$ apart. The computer writes all these results to disk, and displays the opinion time trend as a graph on the monitor and on the printer.

An example of these data plotted as time trends is shown in FIG. 4.6 Fan (1987). The measured $B_{Pj}(t)$ values from the published polls described in step III-3 above are also plotted as squares for comparison.

The computer also writes the calculated values of $G''_{j'}(t)$ to disk. The $G''_{j'}(t)$ functions used for the computation of FIG. 4.6 of Fan (1987) are plotted as the time trends of FIG. 4.4 of Fan (1987).

(g) During the calculations of step f, the computer calculates and sums a series of "squared deviations" between the calculated opinion and the published opinion values. These squared deviations are calculated whenever the time $t_{Pn}$ of a published opinion poll coincides with one of the times t in the calculations of step h or is between two of these times t.

If time $t_{Pn}$ coincides with one of the times of step f, then the computer calculates, as the squared deviation, the square of the difference between the calculated opinion $B_j(t_{Pn})$ and the poll value favoring the same position $B_{Pnj}(t_{Pn})$. A separate squared deviation is calculated for each position j and all squared deviations are summed.

If time $t_{Pn}$ is between two calculation times $t-\Delta t$ and t, and if $\Delta t$ is 24 hours or less, then the computer calculates the squared deviations between the poll value $B_{pnj}$ and both $B_j(t-\Delta t)$ and $B_j(t)$. The smaller of the two squared deviations is used for the summation. This decision is based on the argument that there are at least 24 hour uncertainties in the times of the polls and in the times of the AP messages so it is not unreasonable to choose the lesser of the deviations for estimating the calculation errors.

If the $\Delta t$ is longer than 24 hours, then the computer calculates the $B_j(t_{Pn})$ corresponding to the measured $B_{Pnj}$ by performing a linear interpolation between the $B_j(t-\Delta t)$ and $B_j(t)$ to obtain the $B_j(t_{Pn})$.

After calculations at all of the times of step g, the computer will have calculated squared deviations for all poll points. The computer then computes a mean squared deviation by dividing the sum of the squared deviations by the total number of deviations computed. The computer writes the mean squared deviation to the display device and the printer.

(III-7) Optionally, the computer computes the mean squared deviation for a number of trial values of constant p, the $k'_{2j'rj}$, and the $w_{ij'j'}$. The computer chooses as optimal those constants those giving the minimum mean squared deviation.

Alternative Embodiments

Although a specific example of the preferred embodiment is given above, a number of modifications of this embodiment are possible within the scope of this invention:

I. Alternative Messages and Scoring

Broadly speaking, the determinations in the preferred embodiment occur in three defined steps: collecting messages, scoring the messages, and using the message scores to determine time trends of public opinion. Since these steps are largely independent, it is possible to vary both the messages and their scoring.

The essential feature of the messages is that they must be representative of those available to the population and relevant to the issue for which opinion is computed. As discussed in Chapter 1 of Fan (1987), the messages can be from any source ranging from personal experiences to those in the mass media. Any of these messages can be used in the computations of this patent so long as three critical features can be assigned:

(a) numerical scores for the extent to which different attributed sources in the message support different positions of the issue,
(b) a time dependent function describing the availability of the message to the population, and
(c) a numerical validity score for the reputation of the medium transmitting the message.

Therefore, the following alternative methods can be used:

I-A. Alternative Messages

In addition to AP stories in the preferred embodiment, messages can be collected from any source relevant to the issue for which opinion calculations are made. These can include other mass media messages both in the written press and in the electronic press. The messages can be in any form ranging from personal experiences, through words and pictures on written pages to broadcasts via television and radio.

Besides actual messages which the computer can retrieve and score (see following section), it is also possible to postulate specified numerical scores for items a and c in this alternative embodiment. Then a mathematical function can be postulated for item b. With these specifications, it is possible to include in opinion calculations messages which cannot be measured easily but which can be modeled mathematically.

I-B. Message Scoring

Every message must be scored for the extent to which it supports different positions within the issue being analyzed. These scores $s_{ij''k}$ in equation A.29 of the preferred embodiment were obtained by the computer assisted content analysis of step II of the preferred embodiment.

This same procedure can be performed for any message comprised of text which can be transferred to characters readable by computer. If the text is only found as written words on paper, it is possible for the system operator to read and enter the text into the computer by use of the keyboard. Alternatively, it is possible to use an electronic device to read the text and convert it into computer readable form.

I-C. Message Availability to the Population

For AP stories in the preferred embodiment, it was assumed that information in an AP dispatch would have its maximum persuasive force on the date of the story. After that time, the effectiveness was postulated to decrease exponentially with time with a characteristic persistence constant. This time course is described in the $e^{-p(t-tk)}$ term of equation A.29. This same time course can also be used for other mass media messages from newspapers, television and radio.

However, other mathematical functions may be more appropriate for other message sources. For example, information from a book may have a time course which increases over a substantial time period before finally decreasing.

In principle, it is possible to postulate any arbitrary time dependent mathematical function to describe the availability of a message to the population. Such a function would replace the $e^{-p(t-tk)}$ in equation A.29. It is also possible to measure this availability directly. For a book, for instance, it is possible to approximate the availability by the measured pattern of sales over time. Since the $e^{-p(t-tk)}$ term is specific for each message with index k, this term could be replaced by a different measured or postulated function for each message.

The discussion so far has only been for the time course of the message availability. More completely, the availability of the message also includes a scaling factor describing the number of people reached at a particular time—for instance when the message's persuasive force was the greatest. The larger the audience at this time, the greater will be the total effect of the message.

If only AP messages are used, then this scaling factor will be constant for all messages so the factor was absorbed into constant $k'_2$ of equation A.26 (see Appendix A of Fan, 1987). This procedure means that different $k'_2$ should be used for messages from different media. Therefore, if messages from more than one medium are used, messages from different media will need different $k'_2$.

I-D. Validity of the Medium

Like the scaling factor for message availability just discussed, the reputation of the medium is also absorbed into constant $k'_2$ (see of Fan, 1987) for the analysis of AP stories. Again, if other types of messages are used, this $k'_2$ should differ according to the medium.

II. Replacements for G'' Functions

In, it is proposed that the G'' functions in equation A.26 can be replaced by equation A.13 reproduced below:

$$H_{jr}(t) = G_j(t)/(d_{jr} G_r(t) + d_{jj} G_j(t) + 1) \tag{A.13}$$

where $d_{jr}$ and $d_{jj}$ are both constants. In the preferred embodiment, these constants were assumed to be sufficiently small that their product with the G functions in equation A.13 are much less than 1. Functions G'' and G are related to each other by a constant factor as discussed in of Fan (1987).

To use this equation in opinion calculations, equation A.26 is replaced by equation A. 15 of Fan (1987) reproduced below:

$$dB_j(t)/dt = \tag{A.15}$$

$$\sum_{j,r} [k_{2j'rj} \cdot H_{j'}(t) \cdot B_r(t) - k_{2jjr} \cdot H_j(t) \cdot B_j(t)].$$

This equation can be solved at intervals of $\Delta t$ essentially as described in step III of the preferred embodiment once the $H_{jr}(t)$ are calculated. All other terms in the equation have already been described in that step III.

III. Inclusion of Unawareness

So far in this patent, the assumption has been made that all people were aware of the issue being analyzed. When a significant fraction of the population is unaware, it is possible to use equations A.34–A.36 of Fan (1987) to determine expected public opinion (see of Fan, 1987 for justifications). These equations are reproduced below:

$$A(t) = A(t - \Delta t) + \tag{A.34}$$

$$\left(\left[(T/R) \cdot \sum_{j,j'} k'_{1jj} \cdot F_j(t) \cdot (1 - A(t))\right] - u \cdot A(t)\right) \cdot \Delta t.$$

for all j and j' where u is constant and $$F_j(t) = \sum_{i,j'',k} w_{ijj''} \cdot s_{ij''k} \cdot e^{-p(t-t_k)} \tag{A.35}$$

for all odd i, all j'', and all k where $t < t_k$. Finally, $$A(t) \cdot B_j(t) = A(t) \cdot B_j(t - \Delta t) + (T/R) \cdot \Delta t \cdot \tag{A.36}$$

$$\left(\sum_{j',r} G''_{j'}(t) \cdot [k'_{2j'rj} \cdot A(t) \cdot B_j(t - \Delta t) - k'_{2jjr} \cdot A(t) \cdot B_j(t - \Delta t)]\right) + (T/R) \cdot t \cdot \left[\sum_{j'} k'_{1jj} \cdot F_{j'}(t) \cdot (1 - A(t))\right] -$$

$$u \cdot A(t) \cdot B_j(t).$$

for all j' and r.

The computer calculates functions $F'_{j'}(t)$ using equation A.35, and the same scores $s_{ij''k}$, $w_{ijj''}$ values and constant p as appear in equation A.29. However, the summation this time is only over odd i instead of all i. The computer then reads values for constants u and the $k'_{1jj}$ as well an initial value, typically from measured opinion polls, for the fraction $(1-A(t-t))$ of the population at $(t-t)$ who are unaware. Employing these data, the computer can calculate A(t) at increasing intervals of t using the A(t) of one calculation as the A(t−t) of the next calculation (see analogous strategy for calculations $B_j(t)$ as described in step III-9 of the preferred embodiment). The calculated values of A(t) and the data discussed above can then be inserted into equation A.36 to compute the fraction A(t).$B_j(t)$ of the population holding the opinion with the corresponding index j.

IV. Alternate Concept and Diagnostic Symbols

In the preferred embodiment, the concept and diagnostic symbols all comprised of a single character. Alternatively, it is possible to use concept and diagnostic symbols containing any combination of data bits. For example, strings of characters can be used. It is only necessary that reserved codes (not necessarily the "<" and ">" of the preferred embodiment) be used to mark the beginnings and ends of concept symbols. With these control codes, the computer can identify the beginnings and ends of the concept and diagnostic symbols. With this identification, the computer can remove concept symbols and text equivalents from a previous text filtration step before any further text analysis steps.

In the text of the output files from the preferred embodiment, the control codes for the beginnings and ends of the concept symbols were "<" and ">". In the text equivalents, on the other hand, the control codes marking the beginnings and ends of the concept symbols were spaces. This difference illustrates that it is unnecessary that the control codes be the same in the text and in the text equivalents in the output files.

V. Parsing of Text by Words Instead of Characters

In the preferred embodiment, words were defined as any arbitrary string of characters. With this definition, comparisons between words in the text and words in the dictionary were performed by permitting a word to start at any character in the text. Also, any leading and trailing letters were permitted. Alternatively, it is possible to require that the words begin and/or end with defined control codes such as spaces, carriage returns, etc. In this case, the dictionary searches could be for words beginning or ending with a control character. The dictionary could also have reserved control characters at the beginnings, in the middles, and/or at the ends of word entries to indicate that replacement characters are possible for the control characters.

VI. Opinion Determinations without Reference to Poll Measurements

Opinion determinations in the preferred embodiment began with the first $B_j(t-\Delta t)$ being taken from the results of a public opinion poll. However, it is also possible to take advantage of the results of FIG. 4.10 of Fan (1987). This figure shows that the opinion calculations will converge to a consensus value as time proceeds regardless of the first $B_j(t-\Delta t)$. Therefore, it is possible to perform two opinion calculations beginning with widely disparate values for an opinion $B_j(t-\Delta t)$ e.g. 0% and 100%. Opinion in the time period during which the two calculations converged could then be taken as a reasonable estimate of expected opinion.

VII. Alternative Determinations of Scores for Blocks of Text

In step II-B4 of the preferred embodiment, the block of text scores $s_{ij''kq}$ for a particular i and j'' were obtained after division by the sum of all $s_{ij''kq}$. Alternative divisors with appropriate weights could be used based on some combination of $s_{ij''kq}$ scores. As yet another alternative, there might only be the summing of the counts of concept symbols with no subsequent division step.

VIII. Alternate Use of the Specified Distance

When the specified distance is greater than zero in step II-A15 of the preferred embodiment, a matching target symbol can only marked if it is separated from the matching operator symbol by no more than one diagnostic distance number. Alternatively, the separation can involve more than one diagnostic distance if the total of all intervening diagnostic distances between the matching operator and target symbols is less than the specified distance. The same specified direction rules would still be used as in the preferred embodiment.

IX. Alternations in the Contents and Text Equivalents of Blocks of Text

In step II-A15 of the preferred embodiment, the essential concepts of a block of text are summarized as a final transformed text equivalent. The concepts from one block of text can be transferred to the text equivalent of the following block of text by the use of carry-over symbols which are added to the following text equivalents (see steps II-A14 and II-A16). This is done when the contents of one block of text implied the presence of certain concepts in other blocks of text from the same story.

This procedure can be generalized in two ways. The first generalization is to alter not just the text equivalent of the following block of text but also text equivalents of other specified blocks of text. The modification can involve not only the addition but also the deletion or replacement of elements in these other text equivalents.

The other generalization is the alteration of the text of other blocks of text. For example, the sample text equivalent of step II-A16, carried the connotation of "American." Besides using carryover symbols to insert the concept symbol for "American" into the text equivalent of the next block of text, it is possible to insert the word "American" into the text of another specified block of text.

Words would be inserted in, altered in or deleted from the text of a block of text when it is desirable that the words should continue to appear in all subsequent filtration or scoring steps for a block of text. Conversely, if it is preferable that the connotation should disappear in subsequent manipulations, it would be more appropriate to change text equivalents since text equivalents are always erased before any following text analysis steps.

X. Hardware Based System

In this alternative embodiment, the microprocessor 10 and software (FIG. 1) is replaced by an alternative hardwired logic system.

Figure 2:
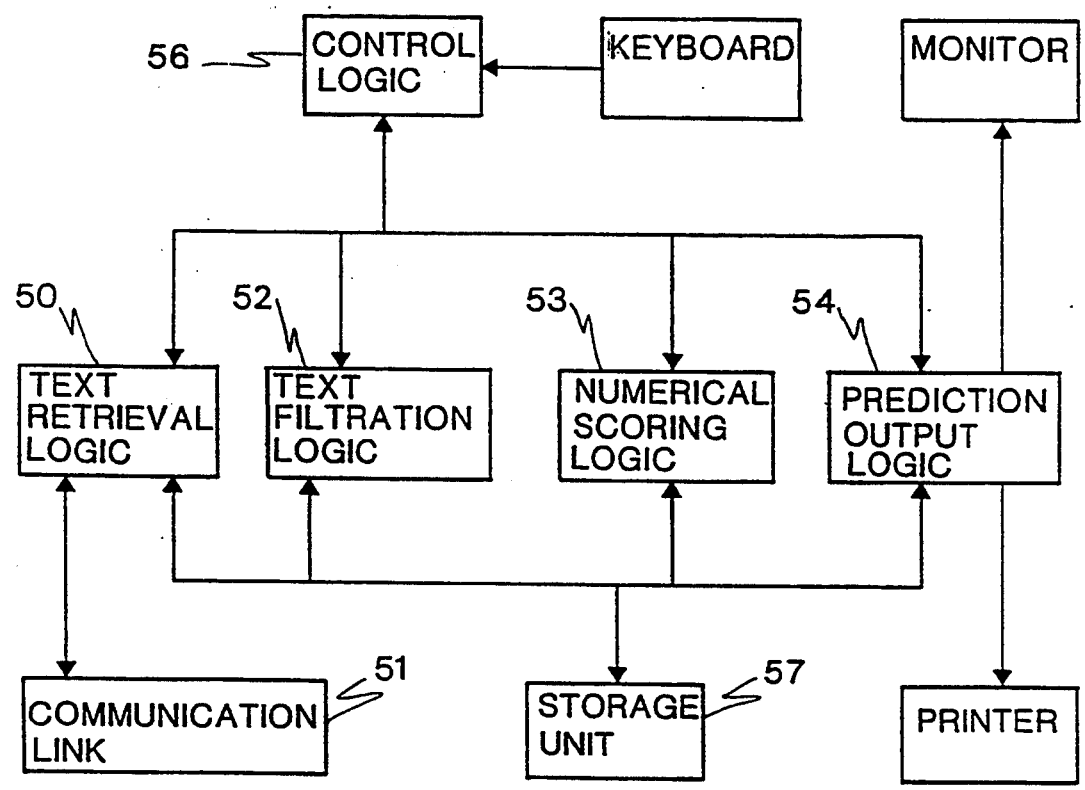
FIG. 2 is a simplified block diagram of an alternative hardware logic embodiment of the invention.
Figure 3:
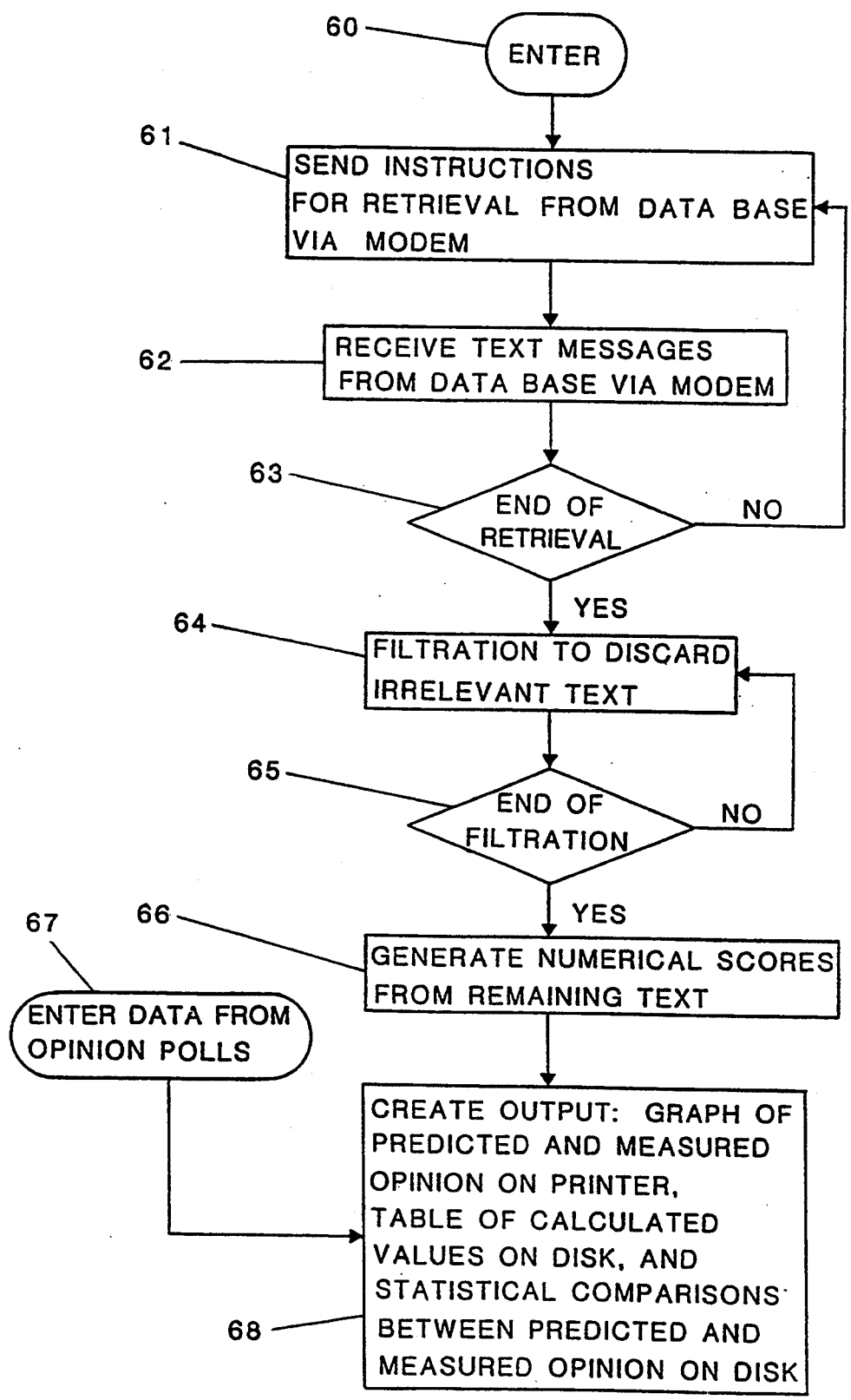
FIG. 3 is a logical flow diagram showing the functional operation of the alternative embodiment.

Referring now to FIGS. 2 and 3, a block diagram and flow diagram, respectively, of the opinion prediction operation of this hardware system is shown. The system includes text retrieval logic 50, text filtration logic 52, numerical scoring logic 53, prediction and output logic 54, and control logic 56. Output logic 54 is connected to drive a monitor and a printer, while control logic 56 includes a keyboard input. Text retrieval logic 50 is connected to a communication link 51 from which data may be acquired, for example, from a data bank. Digital storage unit 57, either random access memory or magnetic medium based, is connected to all logic modules 50, 52, 53 and 54.

Control logic 56 includes hardwired logic for controlling the other logic modules to perform the functions outlined in the flow diagram of FIG. 3. Referring to FIG. 3, the start of operation of the system is represented by block 60. In block 61, logic 56 causes retrieval logic 50 to command an external data base via a communication link 51 to retrieve text and to store it in storage unit 57, in the same manner as described above with respect to step I of the software embodiment. In block 62, retrieval logic 50 receives the text of retrieved messages from the data base via the link 51 and stores the text in storage unit 57. If a signal indicates that more text is to be retrieved in block 63, the retrieval logic 50 repeats blocks 61 and 62. When no more text is to be retrieved, the logic 50 will have finished the equivalent of step I of the preferred embodiment.

At this point, control logic 56 causes filtration logic 52 to activate the first dictionary and its corresponding set of text filtration rules (block 64), which are predetermined and stored in storage unit 57. Logic 52 uses this dictionary and set of rules to remove text irrelevant to the prediction in the same manner as described above with respect to step II of the software embodiment. At the end of this text filtration, the filtered text is stored in storage unit 57 and logic 52 checks for the presence of a subsequent dictionary and its corresponding set of text filtration rules (block 65). If another pair is found, logic 52 repeats the filtration process using the paired dictionary and set of rules. After no more filtration dictionaries and rules are found, the logic 52 signals control logic 56 to activate the scoring logic 53. Logic 53 operates pursuant to present text scoring dictionary and rules stored in unit 57 (block 66) and assigns numerical scores for the remaining text, in the same manner as described above with respect to step II of the software embodiment. After calculation of the scores, the scores are stored in storage unit 57.

Before or during the operation of the system, the operator has the option of entering the results of data from measured public opinion polls into storage unit 57 via the keyboard and logic 56 (block 67). In block 68, control logic 56 activates prediction logic 54 which uses specified parameters, refining weights $w_{ij'j''}$ and population conversion rules $k'_{2j'rj}$ stored in unit 57 to compute time trends of public opinion in the same manner as described above with respect to step III of the software embodiment. The results are plotted as time trends on the printer 12 with reference to FIG. 1. For comparison, the processor also plots the results of time trends from measured opinion polls. Logic 54 may optionally also compute statistical comparisons based on the differences between predicted and measured opinion values, if such values are available.

XI. Predictions for Habits

For the purpose of clarity and to aid in the understanding of the invention, all embodiments presented above have focused on the ability of information to change public opinion. However, opinion is only one example of a social trait. As indicated above, this invention also encompasses other social traits including habits like smoking.

The mathematical model in equations 1–7 of the Background of the Invention section above has already been extended to cover habits in "Ideodynamic predictions for the evolution of habits" by David P. Fan in *Journal of Mathematical Sociology*, Vol. 11, pp. 265–281, 1985. However, since that model also used equations 1–7, that theory extension was also inoperable.

Therefore, an alternative embodiment could involve adding some of the concepts in that former extension to the embodiments described above to yield a functional system for predicting the fraction of the population with certain habits.

By their very nature, habits are activities performed at frequent intervals. Therefore, members of the population can be assigned to various positions based on the frequency with which they repeat the activities. In the smoking example, both smoking and non-smoking would be defined as habits. If desired, it is also possible to divide the smokers according to the frequency with which they smoke. Each position as defined in the preferred embodiment would have both a corresponding habit and a corresponding opinion. However, the fraction of the population with a habit need not match the fraction of the population holding the opinion that the habit should be adopted. For example, there may be many smokers who would like to quit.

In this embodiment for habits, opinion and habits are predicted independently of each other. Nevertheless, the two predictions share the same three steps of: (I) gathering messages relevant to the habit, (II) scoring the messages numerically for their ability to influence specified target subpopulations, and (III) analyzing the ability of the messages, as represented by their scores, to change the habits of appropriate target populations.

XI-A. Messages in the Mass Media

All messages relevant to opinion change for a habit are also be assumed to be pertinent to change in practice of that habit. Thus anti-smoking messages would be assumed to able to influence both opinion on the desirability of smoking and the chances that that people will stop. These messages would be those described in the preferred embodiment and would lead to functions $G''_j$ of equation A.29.

XI-B. Mathematical Functions Replacing Measured Messages

Some messages are difficult to measure directly. Since the ultimate impact of messages is described by persuasive force functions $G''_j$ in the preferred embodiment, messages which cannot be measured can nevertheless be included in the analysis if they can be modeled by postulated mathematical $G''_j$ functions. For habits, the paper by Fan cited earlier in this section includes two functions describing a "recidivism" effect and a "social pressure" effect. The recidivism effect in turn incorporates functions describing the "nostalgia" and "euphoria" phenomena. These functions are described in detail below:

XI-B1. Recidivism Functions

A person who has recently changed a habit has a "nostalgia" for the old habit and hence a better chance of reverting to an old habit than someone who had never had the former habit. Again, in the smoking example, a smoker who has quit will be more likely to start than someone who has never smoked. The system of this invention can account for this phenomenon by assigning mathematical "nostalgia" functions corresponding to personal experience infons favoring the start of smoking. These functions would have high values shortly after a change of habit with the values diminishing as time proceeds.

Similarly, the system of this invention can also include "euphoria" functions describing the honeymoon feeling just after a change of habit in which a person is very happy to have successfully made the habit change. As with the nostalgia function, the euphoria function will also decrease with time.

The euphoria and nostalgia functions were merged into equations 16 describing the combined "net recidivism" effect in the paper by Fan in the Journal of Mathematical Sociology mentioned earlier in this section. The combined effects yielded a recidivism persuasive force function $G_{jR}(t',t)$ with the form:

$$G_{jR}(t',t) = k_R \cdot e^{-k_N(t-t')} \cdot (1 - e^{-k_U(t-t')}). \qquad (16)$$

This function uses the term G since it has the same purpose as the G functions of step III of the preferred embodiment, namely the persuasion of susceptible members of the population to undergo social change. In this function, subscript j indicates the position toward which the function is likely to draw recruits and subscript R refers to the function describing the recidivism effect. The function is measured at time t and depends on an earlier time t' at which members of the subpopulation left the habit characterized by subscript j. If $G_{jR}(t',t)$ is the function describing the recidivism to smoking, then t' would be the time before the measurement time t when the smoker had quit. Parameters $k_R$, $k_N$, and $k_U$ are constants. In habit computations, this function $G_{jR}$ is added to the $G''_j$ functions of equation A.29 and entered in place of the $G''_j$ in equation A.26.

XI-B2. Social Pressure Functions

Besides the recidivism infon impact functions, it may also be convenient to postulate other functions G reflecting informational forces for social change. For example, in the Fan paper discussed earlier in this section, it was postulated that there are social pressure messages which can be modeled by assuming that messages in favor of smoking or non-smoking occur in proportion to the number of people observed in these categories. This phenomenon is described by equation 9 of the paper by Fan discussed earlier in this section:

$$G_{jS}(t) = k_S \cdot D_j(t) \qquad (9)$$

where $G_{jS}$ carries subscript S denoting that it is a social pressure infon impact function. Subscript j refers to the position the function favors, $k_S$ is a constant and $D_j$ is the fraction of the population practicing the habit corresponding to the position indexed by j.

XI-C. Habit Trend Determinations

The basic system of this invention can be used to compute the fraction of the population with a habit by a method essentially the same as that described in step III of the preferred embodiment.

However, not all people would would like to change a habit may actually do so. Therefore, the $k'_{2j'rj}$ terms in Table 6 describing the ability of a message to cause a social change would be smaller for behavior change than for opinion change.

In the calculations, recidivism persuasive force functions, tailored for each subpopulation, are added to the social pressure persuasive forces and the G functions from measured messages as described above for opinion change. Since the recidivism persuasive force functions depend on the time of a prior habit change, the population needs to be divided into many small subpopulations depending on the time of the previous habit change. The computations of step III of the preferred embodiment are made for the various subpopulations and the results for the subpopulations are then summed to get the overall time trends.

XII. Predictions for Other Social Traits

For previous alternative embodiment extends the predictive methods of the system from opinions to habits. In principle, the methods can be extended further to any measurable social trait for which people can be grouped into subpopulations according to a specified set of positions. Such traits could include the purchase and use of products.

In all cases, the same methods would be used: The relevant population would be divided into appropriate subpopulations according to the traits being measured and according to the sensitivities of the subpopulation members to various incoming messages. The members of a subpopulation would all have the same trait such as not having purchased a product. The system would then calculate numerical scores for the ability of various messages to convince people to make a measurable change such as purchasing the product. The scores would then be used to compute expected social change as a function of time. The result would be a time trend for the social trait.

Thus it will be seen that this invention has a very broad scope given its ability to predict social changes in all areas ranging from opinions through habits to the purchase of products by consumers.

One important aspect of this invention is the use of computers to determine the effectiveness of messages favoring different positions. This computer based technology permits an impartial and unbiased assessment of the different components of messages supporting different ideas. Therefore, besides merely being used in the context of social change, the text analysis portion of this invention permits the user to determine, for any purpose, the extent to which different ideas are favored. For example, personnel management is of crucial importance in the industrial sector. In order to hire and evaluate personnel, it is often necessary to examine the texts of letters of reference and the contents of text in personnel files. The text analysis portion of this invention will permit the employer to glean from such textual information as to whether an employee or prospective employee has important qualifications or deficiencies in areas of particular importance to given jobs. To be more specific, some jobs may require great accuracy and patience while initiative and creativity might be more critical for others. The text analysis of this invention will permit the employer to scan and evaluate written reports about the employee for comment on these traits.

The ability to predict the effect of information on social traits will also be useful for industrial campaigns to persuade the work force to adopt desirable habits. An immediate example would be efforts to educate workers about appropriate safety measures and to persuade them that the measures should be taken seriously.

The coupling of text analysis with predictions of social traits permits an examination of the amount and quantity of information needed to cause a social change. Once of the unique features of this invention is its ability to include opposing information in analyzing the effects of favorable information. Thus, it is possible to evaluate the effects of advertising and public relations. A decrease in market share for a commercial product or favorable opinion for a position could be traced to a competitor mounting an even more effective campaign than that of the original advertiser or public relations expert. The conclusion could be that nothing was done wrong but only that more needs to be done.

The following section of this patent is an excerpt from a manuscript written by the inventor named in this patent. This section is referred to above as Fan (1987). The ending subsections of this section are for convenience sake referred to in the main text of this section as Appendices A, B and C; these subsections are integral with this section and this patent, and not a separate part thereof.

PREDICTIONS OF PUBLIC OPINION FROM THE MASS MEDIA: Analysis by Computer Content Analysis and Mathematical Modeling
by
David P. Fan
Department of Genetics and Cell Biology
University of Minnesota
St. Paul, Minn. 55108-1095

TABLE OF CONTENTS
Page
TABLE OF CONTENTS
1-a
DEDICATION
1
ACKNOWLEDGMENTS
2
INTRODUCTION
5
Outline of This Book
12
Organization of This Book
13
CHAPTER 1
FORMULATION OF IDEODYNAMICS
16
1.1 Strategies Used in Formulating Ideodynamics
16
1.2 Nature of the Population
18
1.3 Nature of Persuasion
19
1.4 Nature of Persuasive Messages
22
1.5 Relationships between Ideodynamic Structures
30
1.6 Overview of Opinion Calculations
31
1.7 Details of Opinion Calculations for the Awares
33
1.8 Details of Opinion Calculations for the Unawares
43
1.9 Time Scale of Ideodynamic Analyses
44
Figure Legends 1.1–1.3
46
FIGS. 1.1–1.3
47
CHAPTER 2
IDEODYNAMICS AND PREVIOUS MODELS
50
2.1 Significant Features of Ideodynamics
50
2.2 Model Comparisons
60
CHAPTER 3
DATA FOR CALCULATING PUBLIC OPINION
69
3.1 Time Series of Opinion Polls
69
3.2 Relevant Persuasive Messages in the Associated Press
73
3.3 Retrievals from the Nexis Data Base
75
3.4 Summary of Data used for Opinion Projections
78
Figure Legend 3.1
80
FIG. 3.1
81
CHAPTER 4
COMPUTER TEXT ANALYSIS BY METHOD OF SUCCESSIVE FILTRATIONS
82
4.1 General Text Analysis Programs
82
4.2 Strategy for Content Analysis Using Successive Filtrations
4.3 Sketch of Filtration and Scoring Computer Program Runs
87
4.4 Text Analyses for Defense Spending
89
4.5 Text Analysis for Troops in Lebanon
92
4.6 Democratic Primary
95
4.7 Text Analysis for the Economic Climate
97
4.8 Text Analysis for Unemployment versus Inflation
98
4.9 Text Analysis for Contra Aid
98

4.10 Summary Features of Text Analysis by Successive Filtrations
100

4.11 Extensions of the Text Analysis Procedure
104

CHAPTER 5
PROJECTIONS OF PUBLIC OPINION
106

5.1 Opinion Predictions for Defense Spending
106

5.2 Opinion Predictions for Troops in Lebanon
117

5.3 Opinion Predictions for the Democratic primary
120

5.4 Opinion Predictions for the Economic Climate
123

5.5 Opinion Predictions for Unemployment versus Inflation
124

5.6 Opinion Predictions for Contra aid
125

5.7 Summary of Constant Used in Poll Projections
127

5.8 Summary of Statistics for Poll Projections
128

Table Legends 5.1–5.3
130

Tables 5.1–5.3
131

Figure Legends 5.1–5.45
146

FIGS. 5.1–5.45
146

CHAPTER 6
METHODOLOGICAL SIGNIFICANCE OF WORK
191

6.1 Validation of Ideodynamics
192

6.2 Data and Issues for Successful Ideodynamic Calculations
195

6.3 Positions for Which Persuasive Messages Are Scored
199

6.4 Computer Text Scoring
200

6.5 Ideodynamic Calculations of Opinion Time Trends
203

6.6 Insensitivity of Predictions to the Starting Opinion Values
211

6.7 Interpretations for All Ideodynamic Parameters
211

6.8 Significance of No Opinion Change
212

6.9 Analysis of Persuasive Messages Acting on Public Opinion
213

CHAPTER 7
SIGNIFICANCE OF WORK TO THEORIES OF OPINION FORMATION
215

7.1 Mass Media Messages and Opinion Leadership
215

7.2 Reinforcing Role of Persuasive Messages
218

7.3 Cumulative Effects of Information Rather than Minimal Effects of the Media
220

7.4 Caveats for Laboratory Experiments
225

7.5 Law of the 25-Hour Day
225

7.6 Interpretations of Ideodynamic Parameters
226

7.7 Nature of Effective Persuasive Messages in the Mass Media
229

7.8 Cause and Effect
234

APPENDIX A
MATHEMATICS of IDEODYNAMICS
239

A.1 Structure of Ideas
239

A.2 Structure of the Population
239

A.3 Structure of Messages
240

A.4 Nomenclature Simplification
244

A.5 Infon Properties
244

A.6 Infon Persuasive Force
245

A.7 Information Influencing the Unawares
245

A.8 Information Influencing the Awares
246

A.9 Effect of Information on the Population
249

A.10 Modifications for AP Infons Assuming No Unawares
253

A.11 Comparison with Uniform Distribution
259

A.12 Modification for AP infons Assuming Non-negligible Unawares
259

A.13 Extensions to Very Long Times
261

A.14 Models with No Dependence on Subpopulations
261

APPENDIX B
DATA FOR CALCULATING OPINION CHANGE
263

B.1 Defense Spending 1977–1984
263

B.2 Troops in Lebanon 1983–1984
265

B.3 Democratic Primary 1983–1984
265

B.4 Economic Climate 1980–1984
266

B.5 Unemployment versus Inflation 1977–1980
267

B.6 Contra Aid 1983–1986
267

Table Legends B.1–B.6
269

Tables B.1–B.6
273

APPENDIX C

SUMMARIES OF TEXT ANALYSES 279

C.1 Strategy for Content Analysis by Successive Filtrations 279

C.2 Text Analysis for Defense Spending—Including Detailed Example 279

1. Filtration to select for dispatches on American defense spending 279

2. Filtration to select for paragraphs on defense spending 281

3. Numerical scoring for three positions on defense spending 284

4. Numerical scoring for two positions on defense spending 288

5. Text analysis for defense waste and fraud 289 a. Filtration to remove dispatches not on American defense spending 289 b. Filtration to select paragraphs on defense waste and fraud 290 c. Numerical scoring for stories on defense waste and fraud 290

C.3 Text Analysis for Troops in Lebanon 290

1. Filtration to select for paragraphs on American Troops in Lebanon 290

2. Filtration to remove paragraphs on military action and Christmas entertainment 290

3. Numerical scoring for dispatches on troops in Lebanon 291

C.4 Text Analysis for the Democratic Primary 291

1. Analysis using bandwagon words 291 a. Filtration for paragraphs about candidates 291 b. Scoring using bandwagon words 291

2. Analysis using name count 291

C.5 Text Analysis for the Economic Climate 292

1. Filtration to eliminate dispatches on non-American economies 295

2. Filtration to select paragraphs discussing the economy 292

3. Numerical scoring 292

C.6 Text Analysis for Unemployment versus Inflation 292

1. Filtration to eliminate dispatches on non-American economies 292

2. Numerical scoring 292

C.7 Text Analysis for Contra Aid 293

1. Filtration to select paragraphs on Contra aid 293

2. Numerical scoring by Fan 293

3. Numerical scoring by Simone French, Peter Miene and Janet Swim 293

Tables Legends C.1–C.7

Tables C.1–C.7

APPENDIX D

DETAILS OF ACTUAL PUBLIC OPINION PROJECTIONS 304

D.1 Computations of Persuasive Forces 304

D.2 Population Conversion Models 304

D.3 Opinion Projections 305

REFERENCES 307

AUTHOR INDEX 317

SUBJECT INDEX 324

INTRODUCTION

This book concerns the power of information on society. The central thesis is that public opinion can be swayed in a predictable fashion by messages acting on the populace. When the bulk of the relevant messages are in the press, then the press becomes the principal determinant of society's attitudes and beliefs. Although previous work has suggested that the press is able to set the agenda, this is book is unusual in demonstrating that the press also is able to mold opinion within agenda items.

The importance of the press on opinion has long been recognized. This is seen in the concept of governmental press censorship which was invented long ago. However, the assignment of the preeminent role of the press in opinion formation in a free democracy is in apparent conflict with a sizable body of literature describing the "minimal effects of the media." With this shield, journalists and editors could work without feeling that every one of their daily choices was affecting opinion.

However, the conflict between press importance and its minimal effect is more apparent than real. As summarized in Chapter 7, the impact of a piece of news is most appropriately assessed quantitatively. In other words, messages in the mass media should be given numerical strengths. Although any one news story or restricted group of media messages, can have effects ranging from very small through very large, opinion can frequently be computed from the cumulative effect of all news stories, most of which can indeed have relatively minimal effects. Therefore, in general, the concept of the "cumulative effects of information"—comprising mainly of mass media information for many issues—is more useful than the law of minimal effects.

This idea of the cumulative impact of information still permits working members of the press to proceed without constantly worrying about the effects of their every word because individual news items are still likely to have small impacts. However, over the long term, all the effects accumulate with the totality of press messages capable of being the major influence on opinion.

Thus society should realize that individual messages can indeed have minimal effects with long term trends being of great importance.

As just noted, this book does not propose that the press will always be the dominant force in opinion formation. Rather, the hypothesis is that it is the totality of relevant information which will shape opinion. Therefore, the press will only be the primary influence if other messages are Of minor importance.

Obviously, the importance of the press is related to its credibility, This trust has no direct relationship to whether the public ranks the press as credible in opinion polls. It is only essential that the public as a whole use no alternate sources of information for polled issues discussed in the mass media. For example, the press in closed societies is not likely to be the main determinant of attitudes if its reputation is so low that sizable portions of the populace rely on rumor and the underground press.

In an open society like that in the United States, press trustworthiness is likely to be greater. It was to explore the domain of media dominance in opinion formation that studies in this book were performed on a variety of topics. Issues were chosen from both the domestic and foreign policy arenas. The two issues with the clearest foreign policy implications concerned whether more troops should be sent to Lebanon (1983–1984) and whether American aid should be sent to the Contra rebels in Nicaragua (1983–1986). The domestic topics included those on governmental policy and economic issues. The policy question was whether more should be spent for national defense (1977–1986). The two economic issues focused on whether unemployment or inflation was the more important problem (1977–1980), and whether the economic climate was improving (1981–1984). The remaining domestic issue was voter preference for the best candidate in the Democratic presidential primary (1983–1984). For all these cases, the mass media has the principal role in influencing public opinion.

For the Democratic primary, the press could not be expected to be the dominant influence if there were important additional informational sources including campaign advertising. It was to avoid the complication of such non-mass media information that the Democratic primary was studied before the Iowa caucuses, a time when national media stories should have been the most important for opinion nationwide. At these early times, campaign advertising was negligible country-wide while opinion poll results were obtained from this large population base.

From the discussion above, a quantitative analysis is able to reconcile the minimal effects of the media with the cumulative effects of information. Obviously, such quantitative assessments imply a mathematical analysis, and, indeed, this book describes the new mathematical model of ideodynamics for calculating the impact of information on the population. This model was constructed on the premise that time trends of opinion percentages could be predicted from the relevant messages available to the public.

This model also has the important feature that it can unify many seemingly conflicting results. A useful analogy is to the story of blind men reporting on an elephant. The man studying the leg could report that the elephant was like a tree trunk while the man examining the tail could find that the elephant was most like a rope. The contradiction vanishes when the entire elephant is considered in overview with both the leg and tail being special cases of the more general model which is the elephant. In the same way, the cumulative effects of information can encompass both individual groups of mass media messages having minimal effects and the totality of the media having major effects.

The unifying power of ideodynamics derives importantly from its quantitative nature. By giving numerical values to the contributions of different phenomena, there is no need to assert or imply that certain phenomena are always more or less important than others. Instead, the question becomes the relative importance of different phenomena under specific circumstances. For instance, this book also demonstrates that opinion formation is frequently affected rather little by reinforcement of previous opinion due to resolution of cognitive dissonance in the direction of favorable information. This statement does not deny the existence of opinion reinforcement and does not assert that such reinforcement is never important. In fact, such reinforcement is explicitly included in ideodynamics. Instead, the statement is merely that such reinforcement is small relative to the forces in the mass media causing opinion change for cases like the six studied in this book.

The elephant analogy can be extended to the emphasis in this book on the global behavior of the population. The concern is less with the behavior of subpopulations and selected media messages than on the effect of the totality of messages on attitudes within the entire population. In the analogy, the theory is less concerned with the behavior of the parts of the elephant during locomotion than on the path of the elephant as a whole. There is no implication that the elephant's path is more important to study than the effects of the legs, for example, on elephant movement. The analogy is only pursued to highlight the fact that this book is mainly about the macro effects of the totality of information on overall attitudes without a systematic dissection of all contributing factors, even though some such dissections are performed.

The theory is also formulated with very few parameters so that it can be tested empirically. The empirical testability means that confidence in the model could be derived from the finding that stories in the Associated Press could give good time trend predictions of public opinion percentages over time spans ranging from 3 months to 9 years. The success of applications to real data is crucially important because it could demonstrate that the approximations and calculated population parameters are reasonable, even though some might seem heroic at first glance.

Among the parameters examined, the most interesting lead to the conclusions that there is no lag before the onset of persuasion, and that the impact of a mass media message decreases exponentially with a half-life of only one day. This means that the effect is entirely dissipated within a week. These results argue that there is no two step transfer of information from the press to the populace via opinion leaders. Rather, the people are influenced directly by the mass media. Examination of the equations also show why the big lie can be effective in propaganda, why the cause of fringe groups can be helped by terrorism, and why the political left and right can both accuse the press of unfair bias.

To be consistent with the previous discussion on the importance of quantitative assessments, these parameters might have other values in future studies resulting in different implications for other circumstances The mathematical predictability of opinion indicates a large public malleability in the hands of the mass media. This malleability is likely to arise from the law of the 24-hour day which is first introduced in Chapter 1. This law simply acknowledges that the public is constantly bombarded by new information with so much being available that a person can only reflect carefully on a small fraction. As a result, most information is taken at face value.

This importance of superficial information is at the very heart of the words reputation and prejudice. These words both imply decision making based on observations or information from the past. By bringing such prior information to bear, an individual is spared the time and effort needed to make a careful detailed examination of the current details of the issue. In fact, the time needed to make careful evaluations of all current information simply may not be available.

These considerations stress another of the recurring themes in this book, the importance of real time for examinations of social issues. It is not enough to describe pathways and sequences for social changes without an appreciation of the time spent in each step. For example, it has already been mentioned that the constraints of real time lead to superficiality in decision making for the population as a whole. Such superficiality is not likely to be observed when people are forced to ponder issues carefully in laboratory studies, focus groups and interviews where people are asked to reconstruct their states of mind.

An important consequence of the superficiality forced by time limitation is the ability to use mathematical equations to calculate public opinion from persuasive messages. For a wide variety of issues, like those mentioned above, persuasion is furthermore due to information largely confined to the mass media.

Throughout this book, the emphasis has been on message impact with little discussion of message generation. This emphasis certainly does not mean that message senders work in a vacuum, oblivious to other factors including actual or anticipated public opinion. In fact, both Chapters 2 and 7 discuss how message generation can be dependent on opinion within the context of the model. However, the interdependence of opinion formation and message generation do not exclude these two phenomena from being studied separately.

In the same way, even though a nuclear war can involve an exchange of missiles, it is still possible to study separately missile damage and missile launch. Indeed, a thorough understanding of missile impact will aid in an complete analysis of nuclear war. By analogy, a complete description of the persuasive process can benefit from a careful study of the impact of communications on the populace. An accurate description of message effect can then be used as a firm base from which to continue the analysis of message generation.

The key to uncoupling missile launch from missile impact is a valid description of the pertinent properties of the missile, namely, its trajectory and megatonnage. Once these properties are recognized, it is possible to model both missile launch and impact in terms of these parameters. Given the appropriate parameters, the analyst of missile impact can predict the devastation without regard for the factors influencing the launch.

In the same manner, once persuasive messages are coded in terms of the equivalents of the trajectory and megatonnage, knowledge of the senders motives are not important in considering message effect. An important goal of this book was to develop and validate parameters which are sufficient to describe a persuasive message without regard for the message sender. A later analysis could then turn to message generation, with the messages coded in the same terms. When both message generation and impact are understood, then the trade of messages in a persuasive process can be explored in the same way that an exchange of missiles can be examined for a nuclear war.

The work in this book focused on message impact rather than message generation because impact was likely to be more predictable. The law of the 24-hour day argues that opinion will usually reflect messages. In contrast, opinion is more frequently only one factor rather than the sole factor in influencing the message sender. In addition to opinion, new discoveries and facts can greatly affect the messages broadcast. If not, nothing new would ever be disclosed by the mass media since the very novelty of a discovery must mean that very few people are aware and hence that there is very little opinion favoring the dissemination of this rare event. Therefore, a thorough analysis of the dissemination of mass media messages must include not only an examination of opinion but new events which are unpredictable by their very nature.

The foreseeable response of the populace to information is clearly important for understanding social behavior for issues as trivial as fads and as profound as war and peace. For instance, the predictability and consequent superficiality of information absorption suggest that the average member of the public in modern democracies may make no more carefully reasoned decisions for most issues than persons in more primitive societies. Furthermore, since the model should apply to all societies, the predictions should be as valid in dictatorships and as in democracies so long as all the information available to the public can be coded.

Outline of This Book

As discussed above, this book explores the new mathematical model of ideodynamics describing social responses to information. Although the outlines have already been published, the model has been modified as a consequence of its application to empirical data, the focus of this book. Therefore, this book begins with a presentation of ideodynamics followed by an examination of the ability of the model to incorporate previous theories (Chapters 1 and 2). Then the book considers data applications (Chapters 3 to 5). At the end (Chapters 6 and 7), there is a discussion of the conclusions to the be drawn from the work.

The empirical testing of the model involves its use to predict public opinion from information in the mass media. The computed opinion is in the form of percentage support of polled positions with the values appearing as continuous time trends calculated every 6 or 24 hours. Therefore, to the extent that polls are like snap shots, the trends from these new computational methods are like moving pictures, capable of filling in the gaps between actual poll points and extending opinion estimates to times when polls have not yet been taken.

The studies in this book show that mass media messages—as exemplified by Associated Press stories—can be used to predict the opinion percentages published by reputable national polling organizations such as ABC News, one of the major poll sources for this book. Successful projections were made for all six of the issues analyzed. For each issue, the procedure consisted of:

(1) gathering the texts of AP dispatches relevant to the issue, (2) scoring each story for the extent to which it supported different positions within the issue, (3) using these scores in the equations of ideodynamics to compute opinion time trends, and (4) comparing the computed time trends with published poll data.

Each study was based on two new methods. One was a previously unreported computer procedure for scoring AP stories. The other involved computer solutions for the equations of ideodynamics.

Organization of This Book

Chapter 1 describes the deduction of ideodynamics from known phenomena in the area of persuasion. An appreciation of this chapter is essential for understanding the opinion computations.

Ideodynamics considers persuasive messages to have structures similar to that of MIRVed missiles. The analogs of the independent warheads of the Multiple Independent Reentry Vehicles are message components each one able to have an impact on appropriate target subpopulations. These message components are called infons. For example, a persuasive message relevant to defense spending could have one infon or component favoring more spending, another infon favoring same spending, and yet another favoring less spending. Like MIRVed missiles, all the infons are bundled together in the same persuasive message and launched at the population. This chapter models the effects of infons on the population mathematically.

Chapter 2 discusses the main features of ideodynamics in the context of previous models for the impact of information on society, especially those in the area of public opinion. Therefore, readers primarily interested in the new methodology can skip this chapter.

Chapter 3 describes the data used for the calculations and therefore should be read.

Chapter 4 describes the new text analytic method used for obtaining infon scores for the messages obtained for Chapter 3. Readers less interested in computer content analysis than opinion projections need not read Chapter 3.

This chapter is free standing, describing a general technique of content analysis able to score any text for the extent to which different ideas are favored. The methodology is not restricted to generating scores for infon support of different positions. For example, it is also possible to use this text analysis for other purposes such as assessing whether a letter recommendation comments favorably on specific traits for person being discussed.

Since the major function of Chapter 4 is to produce infon scores, it is possible to bypass this chapter, for opinion projection studies, by use of alternate scoring procedures. The most straightforward would be to ask human judges to score the persuasive messages.

However, the computer methods do have distinct advantages: The critical features of the persuasive text are explicitly defined. Large amounts of text can be scored. And, all scoring criteria are applied uniformly to the entire body of text examined.

Chapter 5 describes how infon scores for persuasive messages are used to compute expected public opinion and is at the heart of this book from the standpoint of opinion projections.

Each of the six studies in this book is considered in detail. Most of the final results fall into four major categories: (1) a set of graphs describing the time trends of persuasive information favoring different positions, (2) a set of graphs comparing published opinion poll results with opinion calculated on the basis of infon scores and the first set of published opinion percentages, (3) a set of graphs showing the optimizations of the various constants in the ideodynamic equations, and (4) a table showing the goodness of fit based on the squares of the differences between the poll projections and the opinion percentages in published polls.

Chapter 6 examines the implications of the results of the studies on further applications of the method. Strictly speaking, this chapter need not is be read by those interested only in the technical aspects of the methodology. However, this chapter is even useful for methodological considerations since it examines both the strengths and robustness of the techniques as well as the weaknesses and limitations.

Chapter 7 discusses the broader significance of the work in this book to theories of effective persuasion and examines the procedures by which ideodynamics can be extended to include theories of message generation.

Appendices. This book is written so that the reader can follow the main thrust of the arguments without a detailed study of either the mathematics of ideodynamics or the computer text analyses. However, both of these technical areas are explained more fully in the appendices (Appendix A for the mathematics of ideodynamics, Appendix D for the computer calculations of opinion based on ideodynamics, and Appendix C for the computer text analyses). The primary data for the analyses are also presented (Appendix B). References are made to the appendices throughout the text.

Further technical details of the procedures and computer programs used for this book are given in a pending patent application.

CHAPTER 1

Formulation of Ideodynamics

The main thesis of this book is that information controls public opinion. For many issues in a free democracy, the driving force for opinion change is persuasive messages in the mass media. Support for this thesis derives from the ability to use messages in the press to calculate time trends of public opinion. The calculations are performed by computer and are divided into two main areas, those for text analysis and those for assessing the impact of information on opinion.

The studies are Grounded in a general model for information impact applicable to the adoption of both behaviors and attitudes. In this book, however, the discussion will focus on attitudes since the applications are restricted to public opinion. Appendix A presents an improved version of the mathematical model which has already been called ideodynamics (Fan, 1984, 1985a and 1985b). The name ideodynamics is drawn from ideo to refer to ideas and dynamics to emphasize changes with time.

In order to present the arguments without undue distractions, the current chapter discusses the formulation of ideodynamics with minimum reference to alternative models. Relationships to other models are discussed in Chapter 2.

Ideodynamics was developed to explain a number of known features concerning the formation of public opinion. Therefore, the model is deduced from phenomena which needed to be explained and shares the deductive approach used by other workers like Downs (1957) in *An Economic Theory of Democracy*.

1.1 Strategies Used in Formulating Ideodynamics

One of the essential considerations in formulating ideodynamics was that the model should be testable using data from observations. This condition is important since, as with any mathematical model, simplifying approximations are needed. The predictive powers of a model provide a good test of its soundness. If the approximations are valid for a large number of circumstances, the model should successfully predict measured values for many cases. If the approximations are appropriate for only a small number examples, then the predictions from the model should frequently fail.

Therefore, empirical testability provides a method for assessing the validities of the approximations. As with any set of simplifications, it is always possible to imagine complications which will lead to failure of the approximations. Nevertheless, the model can succeed in a large number of instances if the complications usually make only minor contributions within the total constellation of relevant phenomena. The usefulness of the simplifications will depend on the extent to which the resulting predictions are accurate. To guard against the possibility that the accuracy is fortuitous, the model can be tried under a variety of conditions. The calculations will gain in robustness as acceptable predictions continue to be obtained. The important advantage of empirical testability is that a crucial criterion for a model's success can be the predictions obtained. In this way, the validity need not rely solely on the plausibility of the argument.

Testability, however, is clearly a two edged sword. Although accurate predictions can argue that imagined concerns are of minor importance, consistently inaccurate predictions would also force abandonment of the model.

Once a model can be tested empirically, it is both possible and desirable to be bold in postulating simplifying approximations. After all, if the simplifications are too extreme, then the model will fail to give useful predictions. Therefore, a reasonable strategy is to begin with the minimal model involving the smallest number of parameters. More complicated approximations involving more parameters would only be added if the minimal model did not give good predictions.

Another important advantage of using simple approximations is that the mathematics and resulting computations are less complicated. Not only would the procedure be simpler to understand, but fewer errors would be made in formulating the mathematical theory and performing the resulting calculations.

With these considerations, ideodynamics was developed using quite simple approximations. For many public issues, the population was assumed to follow blindly the information in the mass media. Interestingly, this simple model did give reasonable opinion projections suggesting that the media is not only responsible for setting the agenda (Cook, et al., 1983; Erbring, et al., 1980; Funkhouser, 1973a and 1973b; Funkhouser and McCombs, 1972; Iyengar, et al., 1982; McCombs and Shaw, 1972; MacKuen, 1981 and 1984) but is also the key agent in determining opinion.

1.2 Nature of the Population

Since one of the major requirements was empirical testability, ideodynamics was structured so that tests could be applied using readily available data, namely those from public opinion polls.

The starting point for any opinion poll is a question relating to a particular issue. In ideodynamics, the issues are defined as they are in opinion surveys. In particular, issues are topics for which members of the populace can each hold only one of two or more mutually exclusive positions or ideas. For instance, the first issue in this book concerns American public opinion on funding for military defense. This issue was defined as having three ideas favoring more, same, and less spending since these were the positions in several published polls.

Since public opinion polls divide people into subpopulations, each holding a different viewpoint, ideodynamics also divides the population into subpopulations along the same lines. However, the model makes the distinction between individuals unaware of the issue and persons aware of the topic and holding an opinion. The unawares comprise a portion of the No Opinion or Don't Know groups in opinion polls. The awares are subdivided into those holding each of the permitted answers to polled questions. The Don't Knows might also include some who are aware but are undecided. The defense spending analysis in this book ignored the No Opinions including both the unawares and the awares but undecided because the No Opinions were few in number, usually comprising less than 10% of the total population. That left the three subpopulations of awares supporting more, same or less spending. The differences in treatment between the awares and unawares are discussed in Appendix A and Section 1.7 below.

1.3 Nature of Persuasion

Having defined issues, positions, and subpopulations as is done for opinion polls, it is possible to turn to the manner by which ideodynamics analyzes persuasion and calculates opinion percentages. For these analyses, ideodynamics notes that persuasion occurs in two steps: (1) message generation by senders, and (2) message impact upon receivers. The vital links between these two steps are the messages themselves.

One of the key simplifying assertions of ideodynamics is that the messages, when properly coded, can include all the relevant information about the senders needed for the accurate assessement of message impact. Such coding simplifies the analysis by enabling separate analyses for message impact and message generation. Therefore, it becomes possible to study messages and their effects without simultaneously considering how the messages were created.

The Introduction has already drawn the analogy between persuasive actions and intercontinental ballistic missiles. To assess the effects of missiles, it is unnecessary to know where they came from so long as certain key features such as trajectory and megatonnage are available. The effects will be as devasting regardless of whether the missiles were sent by accident or by design.

In the same way that missile effect can be determined without knowing anything about the missile sender—so long as the relevant traits of the missile are known, it should be possible to compute the effects of persuasive messages on receivers without knowing anything about the source. It is only crucial that the pertinent traits of the message be coded.

Clearly, message broadcast and message impact are not independent events. Some message senders are likely to be receivers and vice versa. Also, message sources are likely to change their messages after interaction with receivers. For example, Rogers (1983) stresses the importance of message receivers asking senders for more information.

However, any interaction between message sender and receiver will still proceed by way of messages. Therefore, it is still possible to separate the analysis of persuasion into the two distinct portions of message generation and message effect—so long as the messages themselves can be captured and analyzed.

After separating message generation from message effect, it is still be possible to study interactions between message senders and receivers. For example, if a receiver transmits a question to a sender, then that question, itself, is a message. The person receiving the question can then become a sender and send a message in response. To examine the behavior of this person, it is sufficient to know that a message was received in the form of a question. The impact is to cause the sending of the answer, another message. Interactions between message generation and impact are discussed further in the final chapter of this book.

Having argued that proper coding obviates the need for further information about message senders, it is necessary to consider in detail the message coding scheme used in ideodynamics. This coding must take into account the fact that different messages will have different effects on different subpopulations.

The differences in effects have been examined by many authors in considering cognitive dissonance and the "minimal effects" of the media. These two topics are related to each other, with communication theorists dating back to Lazarsfeld, Berelson and Gaudet (1944) proposing that the principal effects of the media are not to convert opinion but to reinforce it. In other terms, people are likely to suppress dissonant messages while preferentially selecting information favoring their position to reinforce their current viewpoint. This concept of the "minimal effects" of the media still has adherents (Chaffee, 1975; Klapper, 1960; Kraus and David, 1976; McGuire, 1986; Rogers, 1983) although this viewpoint is not uncontested (Graber, 1984; Noelle-Neumann, 1984; Page, Shapiro, and Dempsey, 1987; Wagner 1983).

Any model which can account for opinion reinforcement needs to account for an important logical consequence of the resolution of dissonance and the resulting reinforcement of previous opinion: The population must be divided into subpopulations holding different positions, just the type of subdivision identified by polls and used in ideodynamics. That is because information favoring a position should only reinforce opinion among people supporting that position. In the defense spending case, for example, a message supporting more spending should only reinforce opinion in the subpopulation already favoring this idea.

It should further be noted that the concept of minimal effects does not mean "no effects" of the media. Thus the media is permitted to have some—perhaps small— effect in changing minds within a population. Similarly, cognitive dissonance is not assumed to result invariably in reinforcement. On rare occasions, dissonance can be resolved in favor of the dissonant information. Consider again, the case of information favoring more defense spending. Although the major effect might be to reinforce those already supporting this position, it is possible that the same information might also have a weak conversion effect to increase the numbers of people favoring this position. The people converted must have held some other viewpoint earlier such as that supporting same spending.

Even though it may small relative to reinforcement, the conversion effect can be very important. In fact, the essential question from the standpoint of opinion is whether reinforcement is so strong that no change occurs at all. In the absence change, opinion will stay static and invariant, a situation which is known to be false for a large number of issues. For any issues where opinions do change, reinforcement cannot be so overwhelming as to block all shifts. If changes can occur, the crucial element in determining public opinion is the residual amount of persuasive force, however, small, which can override the reinforcing information since those are the effects which will cause the opinion alterations.

The critical role of factors overriding reinforcement is reminiscent of the work of Granovetter (1973, 1978, 1980) on "the strength-of-weak-ties." This author looked at the sources from which people learned about the jobs they took. The finding was that the most useful sources were frequently those with which the job-seeker had relatively little interaction. Reinforcement in the present job did not leed to job changes so interactions leading to reinforcement were unimportant regardless of their frequency or intensity. The key element was information about new jobs even if that information was rare. If there was sufficient reinforcement for the original job so that a person did not change employment, then that non-change would not have been recorded in the Granovetter studies. The finding that weak ties are very important to changes in state are in agreement with ideodynamics which argues that the mass media may have as its main function the reinforcement of a person's viewpoint, but projections of public opinion must focus on an analysis of the few factors which do induce change.

1.4 Nature of Persuasive Messages

The previous section has discussed how the same message can affect different subpopulations differently with most of those in favor of a message's position being reinforced and a few of those opposed being converted. Messages in ideodynamics are coded to account for both opinion reinforcement and conversion.

For simplicity, consider the issue of American aid to the Contra rebels in Nicaragua (1983–1986). For this issue (see following chapters), there were only the two positions of pro (favoring continued aid) and con (opposing continued aid). If a message favors only the pro position, that message should reinforce the opinion of the pros and might convert a few of the cons. If a con message arrives at the same time, then this con message should reinforce the cons and might convert some of the pros. With these two messages, both the pro and con positions would be reinforced. Simultaneously, there could also be opinion conversions in both directions with pro message recruiting the cons and con message converting the pros.

Logically, it is plausible that the result should be the same if the two messages were not in separate communications but were part of a single mixed message. Returning to the analogy of messages being ballistic missiles, the model is that a single launched message could split into a number of Multiple Independent Reentry Vehicles. A message with two components favoring the pros and cons would be like a MIRVed rocket with two warheads, one favoring the pro position and the other the con position. The assumption is that the target would be indifferent to whether the warheads were sent in one missile or in two separate missiles. The end effect would be as devastating.

Therefore, the analysis can be made in terms of message subunits favoring different positions, each one being analogous to a single Independent Reentry Vehicle and being treatable as a persuasive entity in its own right. For ease of reference, the word infon was defined to refer to the concept of "a message component favoring one of the possible positions being considered." The first part of this term is from the word information and refers of persuasive messages. The ending of infon is the same as that in elemental entities such as electrons and introns in the physical and biological sciences. In fact, ideodynamics postulates that infons are also elemental in that the entire persuasive power of a message can be coded in the properties of its infons.

Infons are categorized in four dimensions:

(1) The first dimension is the position favored by the infon. Since each infon favors a specific position, an infon is only defined once the positions under consideration have been specified. In fact, the same message can have infons defined differently for different issues. In a message discussing both defense spending and Contra aid, for example, the infons for the defense spending analysis would be defined in terms of favoring more, same or less spending. The same message used in a Contra aid study would be coded as having different infons, this time either favoring or opposing aid.

(2) The second dimension of the infon refers to whether the infon directly or indirectly supports its position. This distinction is useful because persons aware of the issue and its associated arguments can draw an inference from indirect data while an unaware individual can only be persuaded about an issue if there is a direct statement in the message about the issue. For instance, someone unaware that defense and domestic programs competed for the same funds could not connect a deficiency in a domestic program with defense spending while someone aware of the association might.

(3) The third dimension refers to the sender or source of the infon. Using this dimension, information favoring more defense spending from two different sources—such as the President of the United States and Congress—could be assigned to two different infons. This distinction is made in case some sources have more persuasive powers than others as has been studied extensively by Page, Shapiro and Dempsey (1987).

(4) The fourth dimension gives the index number of the message containing the infon. Therefore, all infons from the message labeled as message 1 would carry the index number of 1. As just discussed, the infon would be further be identified by its position (the first dimension), its directness (second dimension), and its source (the third index).

In summary, although several infons within a message can favor the same position, each infon can only support one position. Whenever a message supports more than one position, that message must be divided into infons, at least one for each of the positions favored.

Every infon is identified by indices reflecting the four dimensions of position favored, directness, source and the index number of the message containing the infon. An example would be an infon supporting more defense spending (first dimension) resulting from a direct statement (second dimension) by the President of the United States (third dimension) in a message indexed by the investigator as message number 1 (four dimension). The purpose of specifying the four dimensions is to permit infons to be grouped for further analysis. All groupings are based on these dimensions.

After a message is subdivided into its infons for the topic under study, each infon is then assigned three properties independent of each other. These properties are assumed to be sufficient to explain the infon's persuasive effects in the same way that trajectory and megatonnage will yield a description of the damage from nuclear warheads:

(1) The content of an infon is a numerical score describing the ability of the contents of the infon to persuade appropriate subpopulations. In this book, the measured infons all came from AP dispatches so infon content was measured as the number of typical AP paragraphs favoring the infon's viewpoint.

(2) The validity of an infon is attributed to the reputation of the medium of the message. Like the infon content, the infon validity score is also numerical. Typically, a receiver is unable or does not have the time to check the reliability of the medium so the receiver depends on its general reputation. For instance, the validity will be much higher for a trusted friend than for a total stranger. Since this book's infons came from AP dispatches, all validities were assigned a value characteristic of the AP which was the medium.

(3) The audience size of an infon is a mathematical function describing the numbers of people exposed to the infon as time proceeds. Since it is a mathematical function, the audience size is unlike the infon's content and validity scores which are numbers. Obviously, the audience size is zero before the infon is emitted. Also, the audience size will be much larger for an infon from the mass media than one from a personal experience where there is only one receiver. The audience size will have a very short duration for a one-on-one conversation returning to zero as soon as the discussion terminates. The equivalent duration for a book can be quite long since the book may continue to be sold and read for months.

With this brief overview, the individual properties of infons can be considered in greater detail:

The infon content score combines aspects of both salience and directionality as used by previous authors for coding persuasive messages. To compare infon content scores with schemes used by others, consider, for instance, two messages, A and B, both providing 100% support for the position of more defense spending. Suppose that message A is more persuasive because more is said, because what is said is more effective, or because the quoted source is more credible. The effectiveness can be due to cognitive and/or affective appeals (Abelson, et al, 1982; Conover and Feldman, 1986; Marcus, 1986; Rosenberg, et al, 1986).

One type of score used for persuasive messages has been directionality. For instance, Page and Shapiro (1983a) have coded a number of news stories in the New York Times newspaper and in television evening news on a five point scale from "clearly pro," "probably pro," "uncertain or neutral," "probably con," to "clearly con." With this method, both stories A and B favoring more defense spending would be given a score of clearly pro.

Story A, being more persuasive, would either have a higher salience or a greater "quality" which has been defined by Page and Shapiro (1983a) to include the "logic, factuality, and degree of truth or falsehood."

Therefore, messages A and B would be characterized by two different quality and salience scores and a common directionality score.

The scoring in ideodynamics is somewhat different. The first step is to define the positions relevant to the polled question. Any number of positions is permitted. Then, for each persuasive message, ideodynamics assigns one or more infons to each position with different infons having different sources and directness of appeal. Each of these infons will then have a characteristic content, validity and audience size. If the message has no component supporting a particular position, then the content scores of the infons favoring that position are zero. Therefore, besides incorporating the trait of directionality, the content score also incorporates the salience and quality values because the higher the salience and/or quality, the higher will be the content score. Obviously, salience is not only included in the content of the message but is also related to the message's audience size as will be discussed in the next section. The infon content score, therefore, incorporates portions of the concepts of directionality, salience and quality.

Returning to the example of defense spending, it is possible to specify a very simple structure where infons are defined to favor only the two positions of more spending or less spending. Also, it is possible to consider only direct infons and to make no distinctions based on infon source. In this case, infons will only be distinguished by the index number of the corresponding message and the positions favored. When this simple structure is applied to the two hypothetical messages A and B, both favoring only more defense spending, both messages would have a content score of zero for the infon favoring less spending. Since both messages support more spending, the content scores of their infons favoring this position would both be positive with the more persuasive message (message A) having the higher score.

An important advantage of the ideodynamic coding of messages is that infons can easily code quite complicated issues where there are many positions. This flexibility was demonstrated in the example of the Democratic primary of 1983-1984 (see following chapters). For this issue, persuasive messages were divided into six different infons favoring the positions of advantageous for John Glenn, advantageous for Walter Mondale, advantageous for Others, disadvantageous for Glenn, disadvantageous for Mondale, and disadvantageous for Others. It would obviously have been more difficult to use a single pro-con scale to distinguish six positions.

Since the content score describes the ability of the infon to persuade the audience, this score depends on the interpretation by the message receivers rather than by the sender. Since social changes result from changes among the receivers, it is their perceptions which are of greatest importance.

The decision to code directionality of mass media messages from the receivers' point of view was also taken by Page and Shapiro (1984) although these investigators have subsequently coded their directionality in terms of the intent of the message source (Page and Shapiro, 1987). The change was not made for theoretical reasons but rather for ease of scoring. However, these authors noted that there was generally good agreement between the two approaches for information scoring in the mass media. The coded material was either text from New York Times articles or summaries from the Television News Index and Archives from the Vanderbilt Television News Archive. It is conceivable that conflicts between a sender's intention and a receiver's perception might have be more pronounced if there had been inclusion of non-verbal messages such as those transmitted via a television screen.

Validity was the second property assigned to infons and referred to the reputation of the medium carrying the message containing the infon.

Introduction of the validity score recognizes that the audience makes two credibility decisions about information attributed to a quoted source. First, the audience must decide that the quoted source actually said what was reported. This decision is given in the validity score reflecting the reputation of the medium. However, the audience must also evaluate whether the quoted source is trustworthy. This credibility is included in the infon content score.

Infon validity as used in ideodynamics has not always been included explicitly by other investigators in assessing the effects of the mass media. For example, Page and Shapiro (1984, 1985, 1987) assume that information in the New York Times and over network television both have a very high validity in that the public will assume that the President actually made a statement if he is quoted as having done so. All analyses were performed entirely in terms of the credibility of the sources quoted by the medium. This high reputation of the medium is clearly reasonable for much of the mass media in the major Western democracies.

However, in the more general case, the medium can contribute importantly to the believability of information since sources like trusted friends, respected news wires and personal experiences will have high validities while sources like suspected pathological liars and untrustworthy scandal sheets will have low validities.

The importance of the medium has been recognized for many years. For instance, in 1959, Hovland (1959) had already proposed that the impact of a message was greater in an experimental setting when the subject thought the medium of message had the sanction of the investigator (see also Eagly and Himmelfarb, 1978).

The third infon characteristic was audience size. This property is simply the curve describing the number of people exposed to the message containing the infon as time proceeds. Messages like AP dispatches have large audience sizes just after emission with the audience decreasing gradually thereafter. For the mass media, it is convenient to introduce four more terms, the time at which the message is broadcast, a persistence constant describing the rate at which the message becomes inaccessible to the population, a memory constant describing the rate at which people forget about the infons in the message, and the audience size at the broadcast time. These four terms can describe the audience size at all times for AP messages (see Appendix A).

Like the content score, the audience size also incorporates aspects of the salience of persuasive messages. The ideodynamic audience size increases when more people are exposed due to messages having higher salience.

1.5 Relationships Between Ideodynamic Structures

Infons are the last of the important structures within which ideodynamics organizes data. At this point, it is useful to consider the relationships between the basic ideodynamic structures discribing issues, messages and the population.

At the center is the issue which is divided into any number of mutually exclusive positions. The generality of the model is reflected in the lack of limitation on position number. Both the population and messages are organized according to the positions of the issue.

The population is divided into subpopulations following members' responses to opinion polls. Each subpopulation favors a unique position of the issue. As noted in Section 1.2 above and as will be discussed below, this definition of subpopulations permits an explicit mathematical modeling of the resolution of cognitive dissonance in favor of opinion reinforcement.

Section 1.4 described how all messages are divided into infons with each infon able to favor only one position. Although there is frequently great overlap, the positions of infons need not coincide absolutely with the positions corresponding to the subpopulations. For example, in the example of the Democratic primary, there were infons disadvantaging Mondale. There was no corresponding poll or subpopulation position corresponding to opposition to Mondale. On the other hand, it was also possible to perform the analysis (see following chapters) with infons scored as favoring only more or less defense spending with no infons supporting same spending. At the same time, there was a subpopulation measured as favoring same spending.

1.6 Overview of Opinion Calculations

Ideodynamics examines opinion formation using issues with mutually exclusive positions, and using subpopulations and infons each favoring a single position. The strategy is to analyze opinion structure through an examination of opinion change. The argument is that opinion can be calculated at any later time if opinion is available at an earlier time and if all intervening opinion changes are known. In the same way, the location of an automobile is defined if an earlier position is specified and if the entire subsequent pathway is Given. This emphasis on analysis of change is also at the heart of epidemiologically based models predicting logistic increases for the adoption of innovations like new technologies (Bartholomew, 1976; Hamblin, et al., 1973).

The modeling through change permits public opinion to be dependent on opinion at an earlier time. The dependence on past opinion is one important means for a population to reflect its history. If there was much successful persuasion in the past so that opinion favoring a position became high, then opinion would still be favorable if there was very little change in the meantime. In contrast, if this favorable persuasion had not occured, then there might be few people holding the favorable viewpoint at the earlier time. As a result, there would still be very few people in favor if there was not much intervening opinion change.

In focusing on opinion alterations, ideodynamics assumes that infons favoring a position will cause members of appropriate subpopulations holding different viewpoints to change their minds. The power of infons to affect opinion are described mathematically using "persuasive force functions" as described (see Appendix A).

One infon can alter the persuasive power of another due to phenomena like opinion reinforcement and message saturation. Reinforcement means that an opposing infon would be weakened and be less able to cause opinion conversions. Therefore, ideodynamics models opinion reinforcement by permitting infons favoring a position to decrease the persuasive force functions for opposing infons. Infons repeated too shrilly and frequently can lose their effectiveness. Ideodynamics also permits this excessive propaganda to have diminishing returns.

Once the persuasive force functions have been formulated, it is necessary to examine the expected effects of all the different infons acting on the population. Considering again the analogy with ballistic missiles, the infons of a message are like the component warheads of a single MIRVed rocket in that all these infons are launched together. Then the individual infons would hit different target subpopulations with different effects.

For example, infons favoring more defense spending are assumed in Chapter 5 to convert members supporting the same spending position to favor more spending. However, it is not necessary for an infon favoring a particular position to recruit persons only to that position. Again, in the defense spending case, infons favoring more spending were also assumed to be able to cause those favoring less spending to move half way and support same spending. The specifications of the appropriate target subpopulations and the resulting conversions for all possible sets of infons are given in "population conversion models." These models will vary from issue to issue.

Ideodynamics assumes that the larger a susceptible target subpopulation, the greater will be the conversion. This statement is equivalent to saying that more deaths will result from a nuclear missile landing in a densely populated area. In addition, opinion conversion is increased if the persuasive force function is higher in the same way that more deaths will also occur if the megatonnage of the warhead increases. These arguments are both incorporated into the basic "ideodynamic equations for opinion change." Since change is proportional to both the size of the target subpopulation and the strength of the persuasive messages, the terms in the ideodynamic equations are non-linear and therefore differ significantly from linear models such as many in econometrics.

1.7 Details of Opinion Calculations for the Awares

Following the principles just enunciated, the actual projection of public opinion proceeds in three main steps:

(1) The first step is to construct mathematical functions describing persuasive forces due to infons.

(2) The second step is to develop a "population conversion" model for each issue studied. As mentioned above, infons favoring a position are presumed to act on appropriate target subpopulations to convert a portion of the members to join other subgroups.

By studying ensuing changes, there is no need to be concerned with the reasons for the initial state reflecting the previous history of the population. Therefore, any opinion poll can be taken as the starting time for the opinion projections. From that time forward, an analysis of intermediate attitudinal changes will be sufficient for calculating opinion at any later time.

(3) The last step is to calculate public opinion using the infon persuasive force functions and the ideodynamic equations for opinion change corresponding to the population conversion models.

Each of these three steps is discussed in greater detail below focusing on opinion derived from AP stories since those were the examples in this book. This discussion begins by examining a population made up entirely of awares holding different positions. The modifications for the unawares are considered in Section 1.8 below.

As noted in Section 1.6 above, the awares are able to digest indirect information as well as direct information so persuasive force functions for the awares include both classes of infons. Each infon's persuasive power is encoded as a persuasive force function which changes with time (Appendix A, Equation A.28). As justified in Appendix A, the persuasive force function for an individual infon can be approximated by the product of the infon's content score, the validity score, and the audience size function. That is, the persuasiveness of an infon increases if there is a larger content score in favor of a position, if the medium has a higher reputation, and/or if the audience size is increased.

While each infon has its own characteristic content score, most AP infons for any one issue will have approximately the same reputation during the entire time periods studied so the same constant validity score can be assigned to all AP infons.

Besides the content and validity scores, the persuasive force function is also dependent on the audience size. Since this function varies with time, it is the audience size function which will govern the time-dependent shape of the persuasive force function.

So far as audience size is concerned, it is assumed that AP infons have their maximal effect on the day of their transmission with that effect dwindling exponentially with time. The exponential drop seems plausible since public exposure to information in print media is likely to decrease continuously, but rapidly, with no shard cut-off.

The rate of decrease is characterized by a "persistence" constant which has been optimized (Chapter 5) to have a one day half-life suitable for all issues studied. With a one day half-life, the persuasive effect of a message drops to one-half after one day, one-quarter after two days, one-eighth after three days, and so on.

Although newspapers published AP stories a day or so after the dates of the dispatches, the dispatch dates themselves were used for the calculations in this book since it seemed likely that radio and television messages with the same approximate content would have appeared on the dispatch dates.

As described in Chapter 4, AP messages were scored for the numbers of paragraphs supporting each of the positions within the issue being analyzed. Since the scores were in numbers of paragraphs (Chapter 4), the heights of the persuasive force plots for AP infons are given in paragraphs. FIG. 1.1 shows the persuasive forces for two separate infons (top two frames) favoring the same position. These functions describe the strengths of the infons with respect to their ability to cause opinion change.

The simplest model for the combined effect of two infons would involve adding the persuasive force functions of the individual infons (FIG. 1.1, bottom frame). This addition requires the assumption that the two infons behave as independent units. The justification for this approximation is based on the second law of thermodynamics which can be restated as the "law of 24-hour day."

Time does not go backwards so every individual, regardless of intellect, capability or interest, only has the time to consider thoughtfully a very small number of issues. Due to this time constraint, knowledge must be superficial for the vast majority of issues about which a person has opinions. Therefore, only a very small percentage of the public will be experts able to form carefully considered opinions for any given issue. Instead, each issue will have its own collection of experts with those experts changing from issue to issue. Downs (1957) has also noted that the bulk of the population does not devote much time or effort to careful analyses of most issues.

For instance, most people have neither the time nor resources to consider seriously all the factors relevant to the question of whether defense spending should be increased or a decreased. Nevertheless, 90% or more of the population (Appendix B) usually had opinions on this topic. Without the time or background to study the problem in detail and hence to relate different pieces of information with each other, the majority of the public is likely to treat all new infons as independent pieces of information. In fact, the population might even treat individual phrases within persuasive messages as independent infons (Chapter 4).

The independence of persuasive force functions also bears on the modeling of opinion reinforcement. That is because the impact of infons is described by these functions. Therefore, if reinforcement occurs, the persuasive effects of opposing infons will be decreased resulting in a persuasive force function with a smaller value.

There are two basic methods for including reinforcement in the model. The most direct is simply to reinterpret a message as having a conversion infon with a lower persuasiveness if reinforcing information is present. This decreased persuasiveness means a lower persuasive force value at the measurement time and could arise from the content of the conversion infon having a lower content score or a smaller audience size as people avoid unfavorable information. The infon content scores in this book were obtained by computer to assure consistency. This strategy would have been difficult to apply if the interpretation of all infons depended on the context of other persuasive information within both the same and other messages received by the public.

However, it is also possible to model opinion reinforcement mathematically based on infons scored as if there were no other infons around. In such a procedure, small message units such as AP paragraphs would be scored for the positions they supported without regard to paragraphs in either the same AP story or in other stories. Then, the ability of a reinforcing infon to diminish a conversion infon would be modeled by mathematically decreasing the persuasive force function for the conversion infon if a reinforcing infon had occurred earlier (Appendix A, Equations, A.12 and A.13). For these equations, an infon which is more effective at making opinion conversions also has a greater ability to reinforce.

This mathematical approach has the advantage that the corresponding equations contain constant parameters describing the importance of reinforcement. Fortunately, satisfactory opinion calculations were obtained when these parameters were set to zero. This result is consistent with the law of the 24-hour day and the idea that most people for most issues are sufficiently distracted that they do not spend the time to associate one piece of information with another. As a result, it was possible to ignore reinforcement in computations of expected public opinion.

The phenomenon of opinion reinforcement is but one example of infons interacting with each other. Although a reinforcing infon can theoretically decrease the activity of a conversion infon, it is also possible that continued rapid repetition of conversion infons can also lead to information saturation with diminishing effects for additional infons. This possibility is included in Equation A.13 (Appendix A). As with reinforcement, message saturation could also be ignored with their corresponding constant parameters being set to zero in empirical tests of the model.

Since additivity of infon persuasive force functions gives acceptable opinion calculations, it is possible to ignore all infon interactions, even those not associated with opinion reinforcement and information saturation. the result of additivity is that the combined persuasive power of the two infons (FIG. 1.1, bottom frame) is the sum of the individual effects (Appendix A). In other words, the residual effects of the first infon is added to the effects of the second.

This same strategy of ignoring message interaction was also adopted, for instance, by Page and Shapiro (1987), who scored the directionality of television news from the viewpoint of an "intelligent, attentive audience with average American beliefs and values." These investigators made no effort to relate the contents of one message to another, either in the scoring or in the subsequent calculations.

Once the persuasive force curves are drawn, the next step is to construct a population conversion model giving the likely effects of the various persuasive forces on each of the subpopulations. For clarity, it might be useful to consider the example of defense spending with the population conversion model of FIG. 1.2. In this figure, the names for all the subpopulations begin with B (for "believers" in a viewpoint) and the names for all persuasive force curves began with G in reference to the G" functions used for the calculations (Appendix A, Equation A.29). Therefore, the subgroups were BMore, BSame and BLess and the persuasive force functions were GMore, GSame, and GLess favoring, respectively, more, same and less spending.

Each action leading to an opinion change is represented by an arrow. The name(s) besides the arrows refer to individual persuasive forces. The tail of the arrow leads from the target population whose size is decreased by the persuasion. The arrow head points to the destination population whose number is increased in the same process. In FIG. 1.2, infons favoring more spending are assumed to be able to persuade those favoring less spending to alter their opinion to support same spending. The same infons can also act on those already favoring same spending to support more spending.

In this figure, there is a "sequential conversion" of those favoring less spending to favor first same spending and finally more spending. This model makes no comments about the length of time a person must stay in the same spending group en route from favoring less to more spending. The time can be almost instantaneous for some people and much longer for others. The essence is that more information is needed to move from less to more than from less to same.

Different infon persuasive force functions can act on the same subpopulation. For instance, infons favoring more and same defense spending are both assumed to persuade those preferring same spending to favor more spending and to convince those holding the less spending position to prefer same spending (FIG. 1.2). At the same time, a given infon can also act on different target subgroups to cause different conversions. In general, the population conversion model provides the full description of the target populations which lose members, the persuasive forces functions causing the conversions, and the destination populations whose numbers are increased by the opinion changes.

The details of the population conversion models will depend on the total number of polled positions, the total types of infons, and the changes which are likely to occur. In the case of the Democratic primary, the most complex example in this book (Chapter 5), there were four polled positions (pro- Mondale, pro-Glenn, pro-Others, and No Opinion) and six types of infons (pro-Mondale, pro-Glenn, pro-Others, con-Mondale, con-Glenn and con-Others).

Once the infons have been scored and the results used to construct persuasive force functions and once the population conversion models have been formulated, public opinion is calculated using ideodynamic equations. These equations, applied to mass media infons, are based on the following principles:

(1) The number of people converted is proportional to the persuasive force functions.

(2) The number of people converted is also proportional to the number of people in the target population. In the extreme case of everyone already holding the opinion of the infon, there will be no non-believers and hence a non-existent target population. Then, there will no be converts regardless of the strength of the persuasive infons.

(3) The constant of proportionality is the "persuasibility" constant (Appendix A, Equation A.14). This constant reflects the fact that some attitudes are closer than others to the core beliefs of an individual. Very firmly held attitudes will be much more difficult to alter. Thus, the persuasibility constant for defense spending will be larger than that for religious beliefs which are probably much more refractory to change. The difficulty of changing religious beliefs is seen in the tight correlation between religious beliefs across generations (Cavalli-Sforza, et al., 1982).

The persuasibility constant is related to the volatility of opinion and to the malleability of the population under the influence of new information. Both opinion volatility and population malleability are large for issues with high persuasibility constants.

Based on the studies in this book, there can be wide differences in the persuasibility constant depending on the issue.

(4) In addition, ideodynamics also includes "refining weight" constants to account for the fact that not all opinion conversions from one target subpopulation to another proceed by exactly the same persuasibility constant. In effect, the persuasibility constant can be considered to be the coarse adjustment and the refining weights to be the fine adjustments since the persuasibility constant could differ 50-fold from issue to issue while the refining weights varied less than 3-fold for any one of the six issues tested (Table 5.2). As discussed in Appendix A, the refining weights also include adjustments to account for variations in message scoring. modified persuasibility constant, set here at the unrealistically large value of 2000 per AP paragraph per day to demonstrate the shapes of the curves. All refining weight are assumed to be the same and are set to 1.0. Also, the time between calculations is the very short interval of 2.4 hours to illustrate the fine structure of the curve.

In summary, the general rule in ideodynamic calculations is that all opinion conversions increase with the sizes of the target subpopulations and the magnitudes of the persuasive force functions which depend in turn on the infons' contents, validities, and audience sizes. The durations of the audience size functions for AP infons are governed by the persistence constant.

As a result, opinion calculations only depend on a persistence constant which is common for all issues, a modified persuasibility constant different for every issue and refining weights which usually have the value of 1.0. In the simplest cases, like that for defense spending (Chapter 5), the modified persuasibility constant was the only independent constant which needed to be fixed since the initial default assignment of 1.0 for all refining weights was satisfactory.

It is the empirical testability of the model and its success in six out of six cases which permits the suggestion that this parsimonious model is both robust and highly predictive.

In ideodynamics, persuasive messages can both reinforce opinion and lose their effect due to over-repetition as discussed above. However, in initial computations, it was assumed that neither reinforcement nor saturation was important. Since these minimal approximations gave Good opinion projections, they are the ones used for the results in the following Chapters.

1.8 Details of Opinion Calculations for Unawares

The previous section has considered the special case where the entire population consisted of awares. If unawares are also added, then the equations will change somewhat because the unawares cannot remember information which did not lead to awareness of the issue. In addition, only direct information can act on the unawares as noted in Section 1.4 so indirect infons are not included in persuasive force functions for the unawares. The details of the mathematics for the unawares are presented in Appendix A.

Upon acquiring awareness, the unawares can adopt one of the positions of the awares or become aware and undecided, with the choice of these two possibilities depending on the details of the population conversion model for the unawares. Rogers (1983), for example, prefers the movement of the unawares first into the group of aware but undecided before subsequently adopting a position. However, the direct adoption of a position might also occur.

As with opinion conversion, the acquisition of awareness is assumed to be proportional to the relevant persuasive force functions and the target population size. However, the constant of proportionality will be different. This constant is referred to as the "artentireness" constant (Appendix A) and recognizes that the population may be more or less attentive to the issue being considered.

Besides acquiring awareness, the population can also forget about an issue so the ideodynamic equations also include a loss of awareness due to forgetting (Appendix A).

For the cases in this book, the entire population could be considered to be aware of the issue since the number of Don't Knows in the poll results was usually less than 10%. Therefore, there was no need to model the conversion of the unawares to awareness.

1.9 Time Scale of Ideodynamic Analyses

The equations of ideodynamics discussed so far have all assumed that membership in the population does not change during the entire time span of the analysis. Thus there is assumed to be no birth or death and no migration either into or out of the population. These approximations were satisfactory for time intervals up to the 9 years studied for defense spending (see later chapters).

As times increase to generations and centuries, modifications will be needed in the model. At a minimum it will be necessary to account for birth and death. Death can easily be modeled by the loss of awares using terms similar to those describing forgetting (Appendix A). Birth can be modeled by the introduction of new unawares into the population. The acquisition of awareness by has been described in the previous section. In accounting for birth and death, corrections will also be needed in the ideodynamic equations if the population changes size.

Besides birth and death, long term opinion calculations over generations will also need to account for the fact that the constants in the ideodynamic equations might change slowly with time. For instance, public belief in press trustworthiness might diminish if evidence of unreliability is presented.

In practice, however, the public is concerned with a large number of issues only within time spans substantially shorter than a generation. For example, the issue of the Democratic primary of 1984 (see later chapters) was not important for more than a few months. Therefore, this book has not considered opinion changes over very long time spans.

Although the emphasis in this Chapter has been on public opinion, ideodynamics can also be extended to other social traits like habits (Fan, 1985b).

The next Chapter contains a summary of the principal features of ideodynamics in the context of other models.

FIG. 1.1 Example of Persuasive Forces of Infons

The population was assumed to be exposed to two AP dispatches at the beginning (top frame) and two days after the beginning (center frame) of week 0. The information in each dispatch is separated into infons favoring different polled positions. This figure plots the infons from the two dispatches favoring one of the several possible positions. The top two frames give the effects of the two infons separately with a one day persistence half-life. The combined effect (bottom frame) is the sum of the individual forces. The units for the infon force curves are average AP paragraphs. In this example, both the first and second infons had values of one paragraph on the their emission date.

FIG. 1.2 Population Conversions Model for Defense Spending

The boxes denote the subpopulations under consideration. The words in the boxes begin with B to refer to those "believing" or having an opinion favoring more, same, or less spending. The calculations for the persuasive forces G are given in Appendices A and D. For this figure, infons scored as supporting more, same and less spending are used to calculate persuasive force curves supporting the same three positions (GMore, GSame, GLess). The tail of an arrow indicates the target population which loses numbers by opinion conversion due to the persuasive forces over the arrow. The head of the arrow points to the population gaining members from the conversion.

FIG. 1.3 Illustration of the Impact of a Single Persuasive Infon Favoring More Defense Spending A single infon with a maximum value of one AP paragraph was assumed to arrive at the population at week 0. The infon's persuasive force (top frame) has the same shape as those in FIG. 1.1. The population at $-1$ weeks is presumed to be evenly distributed among those favoring more, same and less defense spending. The effects of the infon in the top frame on public opinion are drawn in the three lower frames using the population conversion model of FIG. 1.2 and assuming a modified persuasibility constant of 2000 per AP paragraph per day.

CHAPTER 2

Ideodynamics and Previous Models

The previous chapter examined the formulation of ideodynamics. The present chapter considers the principle features of ideodynamics in the context of other models for social change. As noted in the Introduction, and as will be discussed again at the end of this chapter, an important goal of ideodynamics was to provide a framework encompassing seemingly disparate conclusions. Throughout this discussion, special attention will be paid to three features of ideodynamics which are unique in being present simultaneously: empirical testability, parsimony, and equations grounded in real time.

2.1 Significant Features of Ideodynamics

One of the unusual aspects of ideodynamics is its capacity to predict opinion trends for which the time intervals of the computation are arbitrarily small. As a result, the computed trends can reflect rapid opinion changes.

The 6 or 24 hours used for the examples in this book, were chosen because it seemed unreasonable to calculate at intervals much shorter than 6 hours since the message and opinion poll data were not known to any greater accuracies. Twenty-four hours was used for long time trends lasting longer than one year in order to decrease the time needed for the computations.

The logistic equation is the best known other example of a calculation for social change where the time interval of calculation can be of infinitesimal size (Bartholomew, 1976; Fan, 1985a; Hamblin, et al., 1973).

Other investigators who have explicitly included time in their models have usually used time intervals ranging from weeks to months. Obviously, the longer the time interval, the less precise will be the calculations of public opinion or any other social response.

As the time interval diminishes, messages appearing in one time interval will continue to exert their influence in the next time interval. To account for this phenomenon, time lags have been invoked for the continued persuasive force on messages. As for this book, the lagged information has typically been assumed to decrease geometrically or exponentially over weeks or months (e.g. Hibbs, 1979; Ostrom and Simon, 1985).

Besides permitting opinion calculations over time intervals as short as hours, ideodynamics is also testable empirically. For such tests, it is essential that the number of parameters in the model be small with respect to the number of predicted values which can be compared with empirical data. Given enough variable parameters, a general model might fit any set of data. In ideodynamics, it is possible to obtain a very large number of computed values by calculating opinion time series. In fact, there is no theoretical limit to the number of points which can be tested because a new set of values is predicted as soon as another time interval is added. A new interval can be added either by extending the test time or by subdividing the original test interval into smaller subintervals. By creating a new time interval, the constants in the ideodynamic equations do not increase. Therefore, after fitting the parameters to a few time points, it becomes impossible to adjust the constants to fit later data points. Additional poll values will then test the model critically since the constants will already have been set and can no longer be adjusted.

If the model gives good fits for a large number cases, despite the paucity of parameters, then the model will have been shown to be both general and robust. It was to explore generality and robustness that ideodynamics was tested with six examples using the simplest formulation with the minimum number of parameters. The critical empirical testing of ideodynamics then takes advantage of time series with hundreds or thousands of time steps and a similar number of predictions (Chapter 6).

Besides being able to study the sufficiency of very few parameters, the testability of ideodynamics also permits bold simplifying approximations in the choice of relevant persuasive messages. Therefore, AP messages alone were assigned to represent all mass media messages.

This justification is based on the structure of American news diffusion. In the United States, the written press read by the majority of the population is locally based. A relatively small percentage of the population will get their news from either news magazines like Time or Newsweek or newspapers with national circulation like the New York Times, the Wall Street Journal or USA Today.

Most local newspapers do not have the resources to have their own reporters on the national or international scene. Therefore, these papers rely on the wire services for their coverage of non-local news—news for all of the topics in this book. For these topics, then, most readers read material coming directly from the wire services. Among these, the AP is clearly dominant. Given its prominence and its very wide distribution, the AP also takes tries to take neutral positions so that its stories will be acceptable to publishers with different political preferences.

The other common source of news for the population is the electronic media which were not included in the analyses in this book. This omission was due to the difficulty in assessing TV and radio news. It might have been possible to use the news summaries in the Vanderbilt Television News Archives (Chapter 3). However, these summaries were extremely brief and did not give a complete idea of broadcast content.

As a result, the approximation was made that AP stories could also represent news in the electronic media even though those stories were not quoted verbatim in news shows. Common observation of the similarity in news from the AP and electronic broadcasts suggests that this approximation is also plausible. Indeed, Paletz and Entman (1981) have reported that there are frequently great similarities in reports from various segments of the mass media.

With these justifications, the AP alone was used to represent all national and international news from both the written and electronic press. Given the testability of the model, this approximation could at least be tried. If it was invalid then inaccurate opinion time trends would have been calculated, and it would be known that one or more aspects of the model, including the choice of news source, was faulty. The problem could be traced to the choice of the AP if other choices for persuasive messages gave better calculations.

On the other hand, accurate computations verified empirically for a large number of issues would suggest that the model is predictive and that AP news is sufficient for opinion calculations despite the peculiarities of each issue.

One significant aspect of ideodynamics is its disaggregation of the population. The result was a non-linear model in which opinion change was due to the the product of persuasive force functions and target population sizes. In contrast, alternative linear models have been proposed where relationships are drawn between opinion and information without subdividing the population.

Among the influential studies in the persuasion literature, for instance, are those by Funkhouser (1973a,b) reporting that the important items on the public agenda correlated well with mass media coverage over a seven year period. In the recent study of Ostrom and Simon (1985), Presidential popularity was calculated from a number of factors including legislative success and activity in the domestic field, foreign policy, economic prosperity, war, sympathy, and unanticipated variables. At monthly intervals, the factors were computed and correlated directly with Presidential popularity. Some information was permitted to act in a lagged fashion extending from month to month in a decreasing fashion. Still on the topic of Presidential politics, Markus (1982) has examined the effects of party identification, perceptions of candidate traits and incumbent performance dissatisfaction on political candidate evaluations during a period of about one calendar year. Since one of the cases in this book concerns inflation versus unemployment as a priority problem it is useful to note that Hibbs (1979) has also studied the relationship between public perception of the relative importance of these two problems in relation to contemporaneous and past behavior of the economy in these areas.

This is but a partial list of studies in which opinion is calculated from the information structure alone without subdividing the responding population and modeling the differential action of different information on different subpopulations. One of the logical consequences of calculating opinion from the information structure alone is that the computation yields the same results regardless of the population structure before the calculation time.

An analysis of the ideodynamic equations (Appendix A) shows that these calculations are equivalent to the ideodynamic equations being evaluated under conditions where the population is at equilibrium with the news structure. In other words, all changes caused by persuasive messages are assumed to have occurred. For defense spending, for example, that would mean that the same opinion would have been found in the time interval of calculation regardless of whether the population in the previous time interval consisted of only those favoring more spending or only those supporting less spending. This approximation becomes progressively more inappropriate as the time interval of computation decreases since at very small time intervals, such as the 6 or 24 hours used in this book, it is rather unlikely that opinion would totally reflect the messages in that restricted time period. Ideodynamics is able to overcome the restriction of assuming population equilibrium by subdividing the population and modeling opinion formation via change in opinion from a previous time.

One of the important considerations underlying the formulation of ideodynamics was that it should be possible to separate message creation from message impact. This separation recognizes that the essential link between message generation and message impact is the message itself. The purpose of this book was to demonstrate successful tests of the part of the model dealing with message impact. Success here would mean that the structures used for coding messages could incorporate all the crucial features of persuasive information needed for explaining message effect. As a result, a full understanding of persuasion would be obtained from an analysis of how messages were generated once message effect could be computed.

Message structure in ideodynamics is based on infons and their properties. The approximation was that messages could be separated into infons using the four dimensions of position favored, directness, message source, message medium, and message index number. The only relevant features of infons postulated to be essential to persuasive were the content scores, validity scores and audience size functions. Successful empirical tests would suggest that models for message generation could stop with the coding of messages as infons.

In fact, models for message creation have already been examined where the output messages are structured as infons. One example is the ideodynamic derivation of the logistic equation for the diffusion of innovations. For this equation, it is assumed that infons favoring the adoption of social innovations are generated in proportion to the number of people who have already adopted that innovation. This would be the case if all adopters of an innovation would have shown and told others about the innovation with approximately the same effectiveness. This approximation, together with the approximation that the non-adopters did not send messages opposing the innovation, directly leads to the logistic equation (Fan, 1985a).

In another instance of the addition of a message generation step to ideodynamics, it was found that there would be no change in the ratios of people for and against a position if partisans of both sides broadcast their views with the same efficiency (Fan, 1985a). Although this result may not seem obvious at first glance, it is reasonable when the analogy with genetic systems is examined. The ratio of colorblind to non-colorblind people will stay constant if both groups can reproduce as efficiently and if both groups have the same life expectancy.

These two examples demonstrate that infons can provide the needed structure to model message generation as well as message impact.

Part of the usefulness of infons for modeling both message synthesis and message impact lies in their flexibility. For instance, infons and infon persuasive force functions also permit the modeling of the reinforcing effects of the media and information saturation due to message overload. Ideodynamics is unusual in being able to include these phenomena explicitly in the mathematics (Chapter 1 and Appendix A). This is done by permitting reinforcing infons to attenuate the persuasive force functions of infons acting to convert the reinforced individuals. At the same time, saturation by conversion infons could also lead to decreased effectiveness of the conversion infons themselves. However, based on empirical tests, it appeared that there was no significant time-dependent opinion reinforcement (Chapter 7).

The flexibility of infons is also seen in their capacity to provide a uniform structure which is readily adaptable for analyses of information with persuasive components lying in many directions such as supporting and/or disadvantaging one or more of three groups of Presidential candidates (see following chapters). This ability to consider several different positions simultaneously is difficult to do with schemes such as those of Page and colleagues (1983a and b, 1984, 1985, 1987) in which communications are scored on a directionality scale from pro to con.

Important advantages also derive from the non-linear aspect of ideodynamics resulting from the multiplication of persuasive force functions by the sizes of appropriate target subpopulations. One instance is the ability to overcome implicit restrictions on population structure. To illustrate, consider mixed messages in the simple case of only two positions, pro and con. A concrete example would be warning notices in cigarette advertising. The message here is clearly mixed. The manufacturer's component is favorable to smoking while the warning notice is not. To simplify the analysis, assume the hypothetical case where the pro- and anti-smoking messages have equal persuasive force. In this case, the directionality would be neutral using the method of Page et al. (1983a and b, 1984, 1985, 1987). In their calculations, such a neutral message should not affect public opinion.

To examine the situation more closely, consider a population consisting entirely of smokers. For such a group, the anti-smoking component of the message might make some of the members want to quit. Whether they would actually quit is explored in the extension of ideodynamics to habits (Fan, 1985b). Therefore, a neutral message with an anti-smoking component is likely to win converts to the non-smoking cause when the population consists only of smokers.

Conversely, if the population consisted only of non-smokers, a certain number of these persons would want to start when faced with a message with a pro-smoking component. This analysis demonstrates that neutral messages are not necessarily neutral since population shifts can occur. Instead, neutral messages can cause an increase in either the smokers or non-smokers—depending on the starting population. Therefore, the persuasive effects of messages cannot be calculated in the absence of knowledge of the starting population.

If this population does not consist of only smokers or non-smokers but rather a mixed group, then the arguments just presented will apply to the individual subpopulations. If the pro- and anti-smoking messages were of equal force and if each group of messages is able to persuade one percent of their target subpopulation, then one percent of the smokers should want to quit while one percent of the non-smokers should want to start. Only with equal numbers in the two groups would there be equal traffic in both directions resulting a net change of zero in the desire to smoke.

Therefore, if directionality is the only measure for persuasive messages, and if population shift is correlated with directionality alone, the implicit approximation is that the population is sufficiently close to fifty-fifty in favor of pro and con that there is an approximate net balance between the movement from pro to con and con to pro. Ideodynamics does not make this approximation. Instead, the sizes of the target subpopulations are entered directly into computations of opinion movement—from both pro to con and con to pro—using products of these population sizes and their corresponding persuasive force functions.

The adapability of ideodynamics is further demonstrated by its ability to examine the frequently mentioned concept of opinion leadership originally proposed by Lazarsfeld, Berelson and Gaudet (1944) (see also Campbell, 1979; Katz, 1957; Katz and Lazarsfeld, 1965; Weiss, 1969). In this concept, information in the mass media is postulated to act first on opinion leaders who then make the transfer to the rest of the population of ideas is that of the opinion leader.

Ideodynamics can treat opinion leadership in two different ways. In the most complete, the total population would first be divided into subpopulations of opinion leaders and followers. The analysis would first be made for the impact of media messages on the leaders. Then each infon generated by the opinion leaders could be modeled for their content, source, and audience size. Finally, ideodynamics would consider infons from the opinion leaders acting on the population as a whole. Such an analysis could be quite complex requiring the inclusion of significant imponderables such as the identification of the opinion leaders for particular issues and their infon generation patterns.

However, there is an alternative method for including opinion leadership based on an analysis of the functions of the opinion leader. If media messages are not substantially distorted by the opinion leaders during the two step transfer, then these individuals could be considered to be amplifiers of the message. A significant amount of time might be needed for the opinion leaders to retransmit messages. This would only enter into the ideodynamic calculations by shifting the audience size curve to later times assuming that the original source of the infons was the mass media. Therefore, if most media messages were retransmitted accurately by the opinion leaders and if the retransmission had a characteristic time delay, then the mass media could still be considered to be the original message sources with the effects of the opinion leaders being absorbed into a time delay in the audience size curve for mass media infons.

From this argument, the decrease in audience size after the transmission of a mass media message will give an idea about the likelihood of the importance of opinion leaders responsible for a second step transfer of mass media information. In the studies in this book, the effects of all mass media infons disappeared exponentially with a one day half-life. Therefore, any delays due to opinion leadership must occur within a very few hours.

So far, the stress has been on the ability of ideodynamics to permit different information to have different effects on different subpopulations. Another type of population heterogeneity tolerated by the model involves non- uniform information transfer. For example, there is no difficulty with people preferentially exposing themselves to information compatible with their own system of beliefs (Klapper, 1960; Sears and Freedman, 1967; Campbell, 1979). Since such information should reinforce beliefs, preferential exposure is reflected in the constant multiplier describing the persuasive power of the reinforcing infons (Appendix A, denominator of Equations A.12 and A.13). If all subpopulations are as avid in avoiding information favoring other positions, then the same constant can be used for all reinforcing infons.

It is also unnecessary that every member in the population have the same chance of receiving all infons. The model only requires that an infon's chances of reaching more people increases in proportion to the number of copies of the infon released, regardless of an infon's geographic location or other special broadcast circumstances. For instance, one class of infons, those from personal experience, will only affect the person who had the experience. It is sufficient that more individuals would receive personal experience infons as more are Generated—which will certainly be the case.

This class of infons is obviously just one example of the Geographic localization of persuasive messages. Here, the sender and receiver occupy exactly the same site. In a less extreme case, persuasive messages might Generally be localized to the region of the sender as has been found by Haegerstrand (1967) for the diffusion of such agricultural innovations as the antitubercular vaccination of cattle in Sweden. Again, there is no difficulty so long as more information means more people having a chance of becoming exposed. It is only important that there be no large population isolates where the information available to the general population penetrates with either much Greater ease or difficulty. If the isolated populations are small, then their effects can be ignored.

In ideodynamics, there is no statement of the amount of time that a person needs to stay in a particular subpopulation before undergoing an opinion change. Therefore, a person might move from favoring less defense spending to the position of supporting more spending almost instantaneously. The model only states that at least two infons are required for this conversion while only one is required for the movement from less spending to same spending.

2.2 Model Comparisons

Having discussed some of the important features of ideodynamics it is appropriate to compare this model with others. A reasonable starting point might involve the topic just treated, namely heterogeneities within the population. First of all, a variety of other mathematically based models do not discuss the question of population inhomogeneities as has been done above (Allen, 1982; Bartholomew, 1976, 1981, 1982; Bentler, 1980; Bentler and Speckart, 1979; Brams and Riker, 1972; Cavalli-Sforza and Feldman, 1981; Cavalli-Sforza, et al., 1982; Coleman, 1964; Cook, et al., 1983; Daley and Kendall, 1965; Goldberg, 1966; Gray and von Broembsen, 1974; Huba and Bentlet, 1982; Huba, et al., 1981; Karmeshu and Pathria, 1980a,b; McIver and Carmines, 1981; Sharma, et al., 1983)

Turning to less mathematical models, ideodynamics is consistent with the idea that at any one time there will be "innovators" and "laggards" (using Rogers and Shoemaker's, 1971, terminology) among the remaining individuals who have not been converted. The requirement in ideodynamics is only that the same proportion of a subgroup should be recruited, at all times, upon contact with an infon of a particular strength. Thus there would be no conflict with laggards becoming gradually more persuasible as additional infons favoring change are sent to the target subpopulation and as the innovators are convinced to change their minds.

The separation of a subgroup into laggards and innovators is but one example of dividing a subpopulation into members ranging from one extreme to another. Obviously, different results are expected whenever measurements are made on persons at one extreme or another, regardless of the dimension used for scoring the individuals.

For instance, Coleman, Katz and Menzel (1966) measured the time of adoption of a new antibiotic among physicians with different social traits. The percent making the adoption was charted over a period of about a year and a half for two subpopulations at the low and high extremes for characteristics such as attendance of meetings, subscriptions to journals, social participation in the the medical community, etc. The most sensitive time for comparing the two populations is that at which 50% adoption occurred since the steepest rate of increase typically occurs at this time. The time for 50% adoption usually differed by two to five months for extreme subgroups depending on the social characteristic used for partitioning the population. However, the general shapes of the adoption curves always had the typical S- shape characteristic of the logistic equation. The curves began just after the introduction of the antibiotic, hence 0% adoption, and finished at approximately 100% with the period required for the total change being in the range of a year and a half to two years. In general, the early adopters were physicians with the greater social interactions.

Given the similarities in the shapes of the curves for subpopulations with extreme characteristics, the curve for the total population would also have had the same logistic shape somewhere between the curves for the population extremes. In other words, the population treated in these studies was probably sufficiently homogeneous that logistic plot could apply to the population average without denying the existence of population heterogeneities.

If desired, ideodynamics can also be applied to any subpopulation of the total. In this book, for example, the unawares were ignored. This is one of the advantages of the introduction of infons. The analysis involves defining the infons acting on each of the subpopulations remaining in the analysis and then describing the action of these infons on a single subpopulation or group of subpopulations, a step which can be accomplished with no changes in the model.

It should be noted that any population, however small, can always be further subdivided to make even finer distinctions among the individual members until the subpopulations are so small as to have only one member. So long as a subpopulation is larger than one person, almost all social science models assume that the subpopulation is sufficiently homogeneous that some generalizations can be made. Thus when Coleman and his colleagues drew time trends for doctors who attended four or more meetings the approximation was that these physicians were sufficiently homogeneous that their data could be pooled to give a common curve.

In brief, Rogers and Shoemaker's separation of laggards from innovators makes generalizations about these subgroups. Similarly, Coleman and his colleagues draw generalizations from their physicians pooled by social traits. The broad generality in ideodynamics about population behavior is to assume that the percentage recruitment from a target population is proportional to the size of that subpopulation. Fortunately, this approximation permits certain population heterogeneities and means that ideodynamics is compatible with the results of other investigators, as just demonstrated and as discussed in the previous section.

In addition to being compatible with other models from the standpoint of the treatment of population heterogeneities, ideodynamics can also encompass other models. One group would include models for social change in which time does not appear explicitly in the analyses and in which the information passing from information sender to receiver is not measured but deduced. Some of these models have emphasized the pathways by which social decisions occur within a single individual. For instance, Rogers (1983) has proposed that knowledge of an innovation is followed by persuasion before a final decision to adopt. He has also noted that innovators adopt an innovation earlier than laggards. The steps in decision making have also be studied by Bentler and colleagues (Bentler, 1980; Bentler and Speckart, 1979; Huba and Bentler, 1982; Huba, et al., 1981) based on modifications of the model of Fishbein and Ajzen (1975). These authors have proposed for chemical dependency that an individual typically moves from usage of alcohol to cannahis to hard drugs like heroin.

As already discussed, the system of social networks through which persuasive information passes has been studied extensively by Coleman, Katz and Menzel (1966) and Granovetter (1973, 1978, 1980) among others. Here, the emphasis was on who was likely to interact with whom and suggested that innovations first entered social networks through weak interactions with other groups. Then, the innovation spread rapidly upon penetration into a group of tightly knit homophiles comprised of closely interacting individuals sharing common traits.

Since studies on the pathways of social interactions and decision making frequently use data from one time surveys, the messages and their associated infons are not measured directly. Instead inferences are made about the transmitted messages. For instance, awareness of innovations were assumed to be due to messages arriving at the population at the time that awareness occurred; messages favoring hard drug consumption were assumed to be correlated with cannabis usage; and additional messages about an innovation were presumed to be transmitted as interpersonal communications occurred in a social network.

With its emphasis on real time, ideodynamics is generally consistent with models describing the steps just described for social changes. An ideodynamic analysis would formulate the implied messages in terms of infons and would add the crucial element of real time.

For instance, if the time from awareness through persuasion and decision is relatively rapid then the population conversion model and its associated equations would treat these two steps as occurring essentially simultaneously with persons moving directly from unawareness to adopting a position. On the other hand, some decisions might indeed take a long time. For instance, the time between awareness and adoption of the innovation of 2-4D weed spray among Iowa framers was in the range of years (Beal and Rogers, 1960). In this case, the population conversion model would reflect movement of the unawares first into the pool of aware but undecided and then into adoption of the innovation. For cases where economic decisions are involved, the ideodynamic equations for habits (Fan, 1985b) might be more useful.

Yet other time independent studies have been performed where subjects are exposed to actual persuasive communications in a laboratory setting with the characteristics of the population being measured both before and after the exposure. Using this protocol, for instance, Iyengar et al., (1984) have suggested it is more difficult to influence experts than novices through television news on the subject of energy policy. Ideodynamics suggests that these studies might benefit from a consideration of the time needed for persuasion. For instance, it may be informative to compare the results of survey questionnaires at various times after the exposure to television news rather than only once such as immediately after information exposure. If there is any lag in the decision making process, say from awareness through persuasion to decision, then the time of the post informational measurement might be of great importance.

Besides social science descriptions in which real time is not explicitly included, there are other models in which time is explicitly incorporated. In one class of these models, persuasive messages are not explicitly described as is done in ideodynamics. Instead, the messages are inferred from the characteristics of the message senders. Of these, perhaps the most successful has been the epidemiologically based model yielding the logistic plot for the diffusion of innovations (see previous Section). This equation derives from assuming that all people adopting the innovation generate favorable infons equally. In a more recent variant, Sharma, Pathria and Karmeshu (1983) postulate that some people receiving a message about an innovation are "stiflers" who do not generate favorable infons.

Another model in which infons are deduced from the structure of message senders is based on genetics (Cavalli-Sforza and Feldman, 1981). Here the messages from parents (vertical transmission) are assumed to have forces different from those from peers (horizontal transmission) and teachers (oblique transmission). This model was formulated in terms of generations and is therefore most appropriate for slow moving transmissions of social traits such as culture or religion which typically change very little within a generation (Cavalli-Sforza, et al., 1983).

From a historical perspective, it is understandable that models based on epidemiology and genetics do not explicitly include measured messages because the factors responsible for change in these areas are not easily determined directly. For example, the logistic curve is based on epidemiological models of infectious diseases where the infectious virus, bacteria or other microorganism usually cannot be traced during their movement from an infected individual to a new victim. Similarly, the transmissible agents in genetics are the genes in the sperm and eggs which, again, are not easy to measure in the natural population.

Ideodynamics can also encompass other models with implied messages by explicitly coding the implied messages as infons (Fan, 1985a, and Chapter 7). Yet other models are like ideodynamics in including real time and measured messages. The key advantage of measured messages is that they reflect the uncertainty in the real world. However, new messages can never be predicted with certainty, so calculations of social change based on actual messages can never extend beyond the time when the messages are available.

Since the crucial aspect of measured messages is that their compositions cannot be predicted ahead of time, measured messages for this discussion will include not only direct messages but also those presumed to be correlated with historical events. The main constraint is that the measured messages should not be deduced solely from the structure of the population. Therefore, some measured messages can be quite direct such as newspaper articles when scored, for example, as described above by Page and Shapiro (1983a,b). Other measured messages might be more indirect such as those correlated with historical facts such as roll-call votes in Congress (Ostrom and Simon, 1985). The public is not likely to be aware of such votes. However, indirect messages arising from such votes might indeed be disseminated to the public. Ideodynamics has the advantage over models like these by subdividing the population before computing opinion (see previous Section).

Time dependent models by other authors in which messages are explicitly measured include the agenda-setting and persuasion models by Erbring, Goldenberg and Miller (1980) and MacKuen (1981, 1983, 1984). It has already been shown that these models can all be considered to be special cases of ideodynamics (Fan, 1984). Like ideodynamics, these models also divide the population into different subpopulations.

Throughout the previous discussion of other models, an effort was made to see if previously reported phenomena were inconsistent with ideodynamics. It was reassuring that this model is compatible with these other social science models, some superficially disparate. Therefore, as noted in the Introduction, ideodynamics is not so much a competing as an umbrella model—the equivalent to the elephant in the elephant analogy—with a structure suitable for incorporating the details of many of the other models discussed above.

Important novelties of ideodynamics include the incorporation real time in the analyses, the existence of the logistic equation as a special case and the explicit mathematical modeling of opinion reinforcement and other message interactions. Any alternative models should also be able to account for all these features simultaneously. The capacity to derive the logistic equation is especially important given its ubiquitous usefulness in explaining social science time courses. The importance of concurrent studies in real time of a number of measurable social variables—media messages and public opinion in this book—has also been stressed by Neuman (1987) in his extensive review of the persuasion literature.

CHAPTER 3

Data for Calculating Public Opinion

The theory in Chapter 1 provided a method for calculating the results of opinion polls in a time dependent fashion given the information available to the public. It was also demonstrated that this model could be tested using two types of data, a time series of public opinion polls, and a representative sample of the information available to the population for each polled issue. This chapter concerns the actual data used for the empirical testing of ideodynamics.

3.1 Time Series of Opinion Polls

As discussed in the Introduction, one of the key goals of this book was to assess the generality of ideodynamics. Therefore, it was important to study issues which were varied and disparate in nature. As a result, case studies were performed for two foreign policy issues, a domestic policy issue, two economic issues and an electoral campaign.

One important criterion was that the information influencing the public should be readily available for study. It would obviously have been very difficult to calculate public opinion from persuasive messages if they could not be captured for analysis. Since the public record was most complete for the news portion of the mass media, the decision was made to concentrate on issues where this was the source of the majority of the relevant messages.

The most convenient method for obtaining mass media messages was to retrieve them from an electronic data base such as the Nexis data base sold by Mead Data Central of Dayton, Ohio. Since the data base extended back to 1977 for the Associated Press (AP) dispatches used for these studies, the decision was made to study only issues with poll time series since 1977. As argued in Chapter 2, the Associated Press was likely to be representative of both the written and electronic press.

Another consideration was that the poll points from most time series should have changed significantly during the polling period since very simple models could predict no change at all in poll results. Therefore, the most dramatic tests involved polls with marked opinion changes.

Parenthetically, the condition of opinion change meant that the public was reasonably persuasible for those issues where change was found. By definition, public opinion would have stayed constant for issues for which the public had very firm convictions. For instance, the abortion poll series since 1977 with the largest number of time points was one from NBC news from 1977 to 1982. In this series, the widest opinion swings were only 5 to 10 percent (data from B. I. Page and R. Y. Shapiro compiled at the National Opinion Research Center (NORC) in Chicago).

Five issues were chosen for careful analysis given the conditions of (1) illustrative of issues in many domains, (2) many times points since 1977, (3) significant opinion changes, and (4) most relevant persuasive messages coming from the mass media. The polls (see Appendix B for details) were mainly from the extensive compilations of time series made by Page and Shapiro at NORC (see Page and Shapiro, 1982). For comparison, another test issue involved opinion on Contra aid for which opinion stayed reasonably constant. For this issue, the poll series were obtained from the Roper Center at the University Of Connecticut.

One of the most interesting poll series was that of public opinion toward the advisability of more, same or less defense spending. The important persuasive messages for this topic were most likely to be localized in the mass media since the relevant considerations were constantly changing. All other methods such as books were too slow to reflect these fluctuations. The public certainly could not calculate the amount of money which should have been spent on defense by making calculations from a set of general principles. Very few people with an opinion on defense spending even knew what the defense budget actually was.

The Page and Shapiro compilations contained four poll series from 1977–1984 (Table B.1). These time series were all pooled into one because a common curve could be drawn through all the points (FIG. 3.1). However, the reader can concentrate on any one data set since each time series is denoted by a different symbol. Initially, opinion projections were made for 1977–1984. Later, a test was made for the ability to extend the text analysis and opinion calculations to 1986. For these studies additional published polls were obtained from the Roper Center at the University of Connecticut yielding a total time series with 62 polls (Appendix B).

The defense spending issue was interesting because public opinion underwent a large increase and then a marked decrease. However, the changes were slow. During all of 1979, those favoring more defense spending rose dramatically from 20–30% to approximately 70%. Opinion then remained high high for another year before the one year drop back to 20–30% in 1981.

Another issue with striking opinion shifts was whether more American troops should have been sent to Lebanon in 1983-1984 (Table. B.2). The troops had been sent as part of the Multinational Peacekeeping Force after Israel withdrew from Lebanon in 1982. In contrast to the defense spending example, only 2 to 3 months were needed for people in favor of sending more troops to change from 7% up to 31% and back down to 9%.

Together, troops in Lebanon and defense spending permitted the testing of the computational methods for dramatic opinion changes spanning days or months.

The two previous examples of defense spending and troops in Lebanon concerned policy issues. The next topic involved political popularity in the 1984 Presidential election (Table B.3). The choice was made to study the Democratic candidates because none had the extra advantage of incumbency. Also, the analysis ran from 1983 to 1984 stopping just short of the first real test of strength, the Iowa caucuses in 1984.

After that time, relevant information became less and less restricted to the mass media with candidate advertising and other campaign messages being progressively more significant. Unfortunately, these non-news media messages were much more difficult to obtain. Also they were much less uniformly broadcast to the nationwide population. The difficulty of studying the non-news messages would have made the opinion calculations much less precise since accuracy depend on analysis of all the information available to the public.

Without doubt, there was significant local advertising and other campaigning in Iowa in preparation for the caucuses and in New Hampshire in anticipation of the primary which occurred shortly thereafter. However, the poll series for this chapter was taken for the country as whole. For the nationwide public, the national news news media probably was reasonably representative of the information available.

The three previous issues shared the feature that most members of the population probably were not personally affected by policy on defense spending, troops in Lebanon or the candidates in the Democratic primary. Although a small fraction of the population was likely to to have been directly involved for any one of these issues, the majority probably felt no special individual concern about these topics. Even for troops in Lebanon, the number sent was only several hundred so most people would not personally have known anyone in the marine contingent.

It seemed likely that the population should have been more malleable for such distant issues than others where most people have a personal stake (Everson, 1982). An example of the latter type issue was the economic climate of the country where there was a steady increase in those feeling that the economy was improving and a parallel decrease in those with a downbeat mood during the period from March 1981 to March 1984. There was not much change in the percentage feeling that economic conditions were staying the same (Table B.4).

The economic issue of the relative importance of unemployment and inflation was similar to the problem of the economic climate in that the public had personal experiences or observations with both problems. Both issues might have been influenced by factors outside the mass media in which case the model might not have been expected to work if only AP messages were used to represent the driving forces for change.

Polls for unemployment versus inflation (Table B.5) showed that the public seemed to be very aware of the problem, as was true for the economic climate, with less than 3% in the Not sure group. This topic was also chosen because there were significant movements in public opinion, with opinion focusing on the importance of unemployment having a high of around 50% and a low of around 20% in the time period from 1977 to 1980.

As a reference point for the other computations, it was useful to have an issue for which there was little opinion change. If the model is valid then it should also predict opinion constancy when required. This test was performed for the issue of whether aid should have been sent to the Contra guerrillas fighting the government of Nicaragua from 1983 to 1986. This issue was similar to that of troops in Lebanon in being concerned with military involvement in a small foreign country. From the opinion standpoint, the major difference was the large opinion fluctuations for troops in Lebanon and the very small variations for Contra aid (Table B.6). Parenthetically, the polls for Contra aid were only obtained from the Roper Center after the scoring for the relevant news messages to insure that the scoring would not be biased by knowledge of poll results.

3.2 Relevant Persuasive Messages in the Associated Press

With the polls in hand, the next step was to collect the pertinent persuasive messages. Although it would have been desirable to sample both the electronic and written press, it was difficult and tedious to obtain the unaltered contents of television and radio news.

For television, there were the Television News Index and Abstracts of the Vanderbilt Television News Archive. However, the summaries were very brief with abstracters condensing news segments as long a few minutes into a single phrase. Clearly, analyses based on these summaries would have depended heavily on the abstracters.

The case was much better for the print media. Here, it was possible to retrieve an entire news item in virgin form from electronic data bases. These sources contain not only the full texts of stories from wire services such as the AP and United Press International, but also newspapers such as the New York Times and the Washington Post, and news magazines such as Newsweek and Time.

Since AP stories are likely to be representative of the mass media in general (Chapter 2), this book focuses on AP dispatches. In addition, messages were restricted to this wire service because the audience size was more uniform for news from a single source. It would have been difficult to weight the relative audience sizes of items in the AP with those, for example, from news magazines with more limited circulations.

Even for AP stories, the impact of a dispatch depended on whether it was actually printed and, if so, whether the placement was prominent. Important information in this regard could have been obtained from the "news budget" the AP routinely sends its subscribers twice a day. These budgets are summaries of important dispatches in preparation. Newspaper editors save space in upcoming editions based on these budgets. Later, a dispatch corresponding to a budget item is sent carrying the designator BJT in its heading region. These budget stories typically stand a very good chance of appearing in a featured place. Unfortunately, the budget designator was stripped from AP dispatches before entry into the Nexis data base used for these studies. Therefore, there was no convenient way to know the probable disposition of an AP dispatch so all AP dispatches were assumed to be equally important. In future studies, it may be more useful to use the VuText data base from which the BJT designator is not removed.

Fortunately, it is only necessary that all AP dispatches on a given polled topic have the same prominence since comparisons were only made between stories on the same issue. There would have been no problem with all articles on one topic being buried in small items in obscure places in the mass media while all stories on another were given featured treatment.

3.3 Retrievals from the Nexis Data Base

One attractive feature of using a full text data base like Nexis is the retrieval method since the search is not at the mercy of abstracters. Instead, the investigator chooses combinations of key words which are scanned through every word in all articles in the data base. Although the basic elements of the search commands are simple, complex thoughts can be expressed by combining groups of words (see Appendix B for the details of the retrievals for the five examples in this book).

All stories with the desired word combinations were identified even if their main topic was not on the polled issue. For instance, an article dwelling on poverty might have included a single statement that too much was being spent on defense given the magnitude of the economic problem. Such a dispatch would have been identified in the Nexis search for articles on defense spending. The same article might well have been missed by human readers. Therefore, the pertinent dispatches identified by the Nexis search for this book may were probably more complete than those in previous reports using human coders.

The decision could have been made to study only those articles concentrating on the polled issue. However, a deliberate decision was made to include the stories in which the issue was only mentioned peripherally. This choice seemed more appropriate since the public at large was exposed to the mass media in a different way from trained readers specifically scoring particular issues. The bulk of the population was probably not trying to draw critical judgements for most issues and might not have noticed when one article began and another stopped. Therefore, for the general population, an isolated statement favoring less defense spending might have had as much of an impact in an article on poverty as in a story on defense spending.

With the possibility that the public might assimilate information for an issue from a wide number of contexts, the decision was made to be inclusive rather than exclusive in identifying potentially relevant AP dispatches. The culling of truly pertinent stories occurred at later steps in the text analyses.

The result was that over a thousand relevant dispatches were found for each of the issues in this book. It seemed both impractical and unnecessary to analyze all dispatches for all issues. For four of the six issues, it was decided to retrieve only a few hundred dispatches at random for detailed study. Since the dispatches were all numbered in reverse chronological order from the most recent to the one furthest back in time, retrieval by random dispatch number should have yielded a representative sample. For unemployment versus inflation and Contra aid, almost all of the identified articles were retrieved. These more complete retrievals were made to test the possibility that a few hundred dispatches was not enough and that a larger sample was needed.

Although it was possible to retrieve the full texts of each of the chosen articles, the decision was made to restrict all retrievals to text within 50 words both before and after one of the key words used in the original search. Careful reading of typical stories indicated that this condition led to the retention of essentially all relevant text with large portions of irrelevant text being discarded (see sample text in Appendix C). One of the most frequent examples involved extracts and descriptions of news conferences in which comments were made on a variety of totally unrelated topics.

For defense spending, the search was for AP dispatches with "defense" or a synonym being close to "spending" or a synonym (Appendix B). Since the aim was to find all possibly relevant dispatches, no commands restricted the search to American defense spending. Dispatches on non-American defense spending were eliminated at a later step.

Among those dispatches retrieved using the 50 word rule, the amount of collected text was equivalent to about 199 words of retrieved text per dispatch. Since the typical AP dispatch contained 400-900 words, only small extracts were obtained from most dispatches, consistent with the idea that comments on defense spending were frequently in articles discussing other topics. Text on other topics outside the 50 word limit was discarded.

The initial set of retrievals was made for calculations from 1977 to 1984. A second set of retrievals was made from 1981 to 1986 to study the ease with which the computations could be extended beyond 1984. For this second study, a set of retrievals was also made for stories about defense waste and fraud (Appendix B). These stories were also analyzed to see if they contributed significantly to opinion favoring less defense spending.

For the topic of American troops in Lebanon, the search was for articles with words referring to Lebanon, America and troops. In contrast to the case for defense spending, many dispatches on troops in Lebanon were entirely about this topic and were retrieved in toto since about 420 words were retrieved per dispatch. In fact, the scanning of a random collection of stories showed that many were devoted entirely to Lebanon.

In the Nexis data base search for the Democratic primary, there were seven candidates. Therefore, the search was for all dispatches with the name of at least one of the candidates. Because the typical retrieval had 310 words per dispatch, under the 400-900 words per typical article, many dispatches were not retrieved in their entirety.

For the economic issues, it was conceivable that personal experience would contribute substantially to opinion on the economic climate. In priniciple, ideodynamic calculations should have inluded infons from those infons. Obviously, those infons are very difficult to study. Therefore, the assumption was made that the mass media included most of the important persuasive messages. The validity of this approximation would be tested by the accuracy of the opinion projections.

As usual, AP dispatches were considered to be representative of mass media messages so the Nexis data base was searched for word pairs referring to the economic climate. The retained dispatches typically had 197 words per average story. This number was close to the 199 found for defense spending and corresponded to less than half the text of a typical AP dispatch. Therefore, most of the retrieved text came from dispatches in which the economic climate was only one among several topics discussed.

For unemployment versus inflation, AP dispatches representing mass media messages were obtained from the Nexis data base by searching for dispatches in which unemployment and inflation were close enough that there was likely to be nearby text comparing the two. This gave approximately 177 words per dispatch, a figure comparable to those for defense spending and the economic climate. Therefore, for unemployment versus inflation as well, most dispatches covered several topics with none being discussed throughout.

The AP stories in the Nexis data base relevant to Contra aid were identified by looking for the word Contras in close proximity to a word referring to spending. This topic was also like all others except for troops in Lebanon in having fewer retrieved words (258 words) per average dispatch than present in the typical AP story.

3.4 Summary of Data Used for Opinion Projections

There were only two types of data collected for the calculations in this book, time series of public opinion polls and AP dispatches relevant to the polled issues. The issues were chosen in part because they were each polled extensively with 8–62 time points in each series. Aside from the issue of Contra aid, another consideration was that opinion should change significantly. In addition, the topics were diverse, and most of the relevant persuasive messages were expected to be in the mass media.

Reasonable approximations (see next two chapters) to measured opinion poll time trends could be computed using nothing mass media messages as represented by AP dispatches retrieved from the Nexis data base.

FIG. 3.1 Poll data for defense spending. After subtraction of the Don't Knows and the Not Sures, the data in Table B.1 were normalized to 100% and plotted using the same symbols, one for each of the four independent time series (see Appendix B).

CHAPTER 4

Computer Test Analysis by Method of Successive Filtrations

Since the methodology in this book was designed to project public opinion from persuasive messages in Associated Press dispatches, two steps were involved. The first was to score the AP dispatches in the format of ideodynamics (Chapter 1 and Appendix A). The second was to use the scores to project poll results.

The decision for this book was to score the messages using a computer method. The advantages were twofold. First, consistency was guaranteed so human Judges could not be accused of scoring, either consciously or subconsciously, with one eye on the measured opinion time trends in order to improve the projections. Second, the dictionaries and rules for computer analyses would shed light on those features of the text which were especially important for influencing public opinion.

4.1 General Text Analysis Programs

Early in the history of computer assisted text analysis, the strategy was to customize the analyses to individual problems (see e.g. McClelland's N- Achievement in Stone et al., 1966). In more recent times, the emphasis has been on the development of general text analysis programs and dictionaries applicable to a wide variety of text. The first widely used program of this latter sort was the General Inquirer (Stone et al., 1966) which has been updated (Kelly and Stone, 1975).

The General Inquirer and a number of relatives assign words in the text to a number of predefined categories (typically in the range of a hundred) using dictionaries and disambiguation rules with various degrees of complexity (see Weber, 1985 for a recent review). The disambiguation is necessary because many words in natural language can take on different meanings in different contexts. A frequently cited example is the word spring which can refer to a coil of metal, a time of year, a source of water, or a jumping action. Among recent dictionaries and complex disambiguation routines for the General Inquirer are the Harvard VI Psychosocial Dictionary (Dunphy et al., 1974; Kelly and Stone, 1975), and the Lasswell Value Dictionary (Lasswell and Namenwirth, 1968; Namenwirth and Weber, 1984).

Text parsing Programs have also come from the natural language area of artificial intelligence. Many of these are also general in nature, adaptable to diverse texts. Among these are ACTOR (Hewitt, 1976), BORIS (Dyer, 1982), HEARSAY II (Fennel and Lesser, 1977), MARGIE (Schank, et al., 1973), READER (Thibadeau, et al., 1982), DEREDEC (Lecomte, et al., 1984) and RELATUS (Duffy and Mallery, 1986).

Another general text analysis program based on the assignment of words to predefined categories is the MCCA program of McTavish and Pirro (1985). Like the programs mentioned above, MCCA is meant to be useful for a wide variety of text. In initial studies, the AP dispatches retrieved for the studies in this book were analyzed using the MCCA program but the output did not correlate well with the sense of the dispatches in terms of supporting individual polled positions.

An examination of the output suggested several problems. One of the most immediate was due to assignment of individual words to predefined categories. As a result, relationships between words were lost. A prime example was the use of negation words like not. After the program run, there was no way to determine what was modified by this word. This was a serious problem for wire service stories which could cover many different topics in the same dispatch as happened in reports of press conferences. In such stories, only a small portion of the dispatch was relevant to the issue under study. Therefore, the mere abundance of negation words was not highly indicative of whether the story had a negative connotation for the topic being examined.

A further problem was the predefined categories in the MCCA program including those for Good, Sin, Faith-Belief, etc. These categories could give a good idea of the psychological state of the message generator. However, the categories were not easily adaptable to policy questions such as whether American troops should be sent to Lebanon, especially since some of the most crucial words were highly unusual including Israeli, Syrian, British, French, Italian, Christian, Shiite, Druse, and others. To be successful, a general text analysis program would have required an astronomical number of word categories to distinguish between these troop sources while simultaneously separating American policy in Lebanon from that in Grenada, where troops were also sent. The unsatisfactory nature of pre-assigned categories was not restricted to the MCCA program but was characteristic of all automated text analyses assigning words to all purpose categories.

Another important drawback was the multipurpose function of MCCA, and other general purpose programs. To be useful for a wide variety of text, as mentioned above, disambiguation procedures were needed to account for words having different meanings in a wide variety of contexts. Therefore, the dictionaries tended to be relatively small with the disambiguation subprograms concentrating on assigning proper meanings to common words. As dictionaries grow, the disambiguation problems increase even more rapidly.

The limited dictionaries frequently were inappropriate for text important to public opinion. Key words in such text were often highly specialized, including many proper nouns as just discussed. Furthermore, each individual issue was also likely to have words requiring customized and unusual implications. For instance, "neglect" in the context of defense spending implied that the military budget should be increased.

The refined disambiguation subprograms in general text analysis programs also meant that the dictionaries were very difficult to change because a single addition or deletion meant that all disambiguation steps had to be checked to see if any should be modified by the word change. The absence of disambiguation procedures would certainly have facilitated dictionary changes—however, at the cost of increased confusion in word usage.

4.2 Strategy for Content Analysis Using Successive Filtrations

The previous considerations suggested that an improved method of computer content analysis should: (1) be able to assure a high degree of precision by examining key words in proper relationships with each other, (2) be able to resolve ambiguities in natural language, and (3) permit the use of flexible dictionaries including very specialized words.

The strategy in this book was to abandon the idea of making a single pass through the text using a general program and a fixed dictionary. Instead, there was return to the philosophy of tailoring the analysis to individual issues. As noted by Weber (1985), "single-concept coding schemes often have high validity and reliability."

One of the important departures from single pass programs like those discussed in the previous Section was the decision to process the text through a series of "filtration" computer runs to remove different irrelevant material at each step. Each filtration run was guided by a small number of rules and a rather limited dictionary with only a few key words, words with few ambiguity problems in the context of the remaining text.

There were some unexpected advantages to this strategy of making multiple passes through the text. By doing so, it was possible for the dictionary and rules at each pass to be very simple thereby minimizing the errors in their construction. As soon as one or two criteria were identified by reading a random sample of the text (typically 50,000 to 100,000 characters), a small dictionary and set of rules could be devised for eliminating irrelevant passages.

At the end of the run, the text was now more homogeneous than that in the input file. This meant that it was much easier to decide on the dictionary and rules for the next filtration step. Greater text homogeneity meant that the reader's mind was not cluttered with material which as not pertinent.

However, as important, if not more so, was the fact that word relationships useful for the analysis were typically already built into each set of filtration rules. For example, the first filtration step for dispatches on defense spending restricted this spending to American policy (see Section 4.4 below). Therefore, this step already imposed the relationship that defense spending be linked to the United States. As a consequence, there was no need to worry about this linkage in further steps in the analysis.

Another advantage of the filtration steps was the disambiguation accomplished. As mentioned above, the word "neglect" typically implied the support of more military spending. Without the filtration steps to focus on paragraphs specifically discussing defense spending, it would not have been possible to give "neglect" this very special meaning.

Superficially, it might be supposed that multiple computer runs would greatly slow the analysis. Interestingly, this was not the case. Although there was time lost in analyzing the same text several times, there was a compensating gain. First of all, as noted above, the steps for developing the dictionaries and rules were simple and hence rapid.

In addition, the machine time needed for each run was shortened because the dictionaries and rules were shorter than would have been needed for the more complex dictionaries and rules needed for a single pass analysis. Therefore, a great deal of computational time was saved. Furthermore, with each succeeding pass, the amount of text diminished due to the elimination of irrelevant material so the runs became even faster. Given the slowness of checking long dictionaries and evaluating complicated assignment rules, the total machine run time could be shorter with a strategy of multiple runs using simple dictionaries and rules.

After successive filtrations, the text became sufficiently homogeneous that a simple dictionary and a small number of rules could be constructed for assigning numerical scores for the extent to which each AP dispatch favored the positions being considered. These scores were for the infon contents discussed in Chapter 1.

4.3 Sketch of Filtration and Scoring Computer Program Runs

Although the text analytic steps—both for filtration and scoring—are described in detail in Appendix C for each of the five cases studied, it is useful to outline the procedure here.

The analysis involved: (1) checking the text for dictionary words, (2) identifying clusters of key words, and (3) making filtration or scoring decisions based on the word clusters.

To begin with the first step, a new dictionary was constructed for each analysis with words grouped under a limited number of concepts. For defense spending, for instance, one of the essential concepts was "American" since the topic was spending by the United States and not some other country. The words under this thought did not actually have to be a synonym for America. It was sufficient that there be a strong implication of the United States. Therefore, acceptable words included not only "America," "United States," and "U.S." but also "House," "Senate," "Ford," "Carter," and "Reagan."

After the dictionary check, the concepts corresponding to the dictionary words were evaluated. In scoring defense spending, for instance, one filtration steps was to select AP dispatches discussing the idea of "American defense spending." This idea required the simultaneous presence in the article of the three concepts of: "American," "defense," and "spending."

This example is the simplest case where the only requirement was that that certain concepts all be together in the same text. In more complex cases, it was necessary to insist that two words be close together to belong to the same thought. For instance, a "defense" word had to be close to a "spending" word in the filtration step to select paragraphs actually devoted to defense spending. Otherwise, the spending was probably for some other purpose.

In yet other cases, the sequence was also important. In the Presidential primary example, the word "endorsed" implied the concept of "favorable to candidates whose names are further into the text". In other words, "endorsed" was interpreted to favor a candidate only if it appeared before the candidate name as in "endorsed Mondale." There was no such connotation when the sequence was reversed as in "Mondale endorsed."

However, "endorsed" was sometimes also found in the context of "endorsed by." In this word pair, the word "endorsed" was combined with the concept of "change the direction of action of the word" due to the presence of the word "by." The result was the idea of "favorable to candidates whose names are earlier in the text." In this way, the phrase "Mortdale endorsed by" was scored as supporting Mondale while "endorsed by Mondale" was not.

Similarly, it was not difficult to add an additional word like "not" of the negation class so that the phrase "Mondale was not endorsed by" could be considered be unfavorable to Mondale. Therefore, both the order and distances between words could be used for the filtration or scoring decisions.

After the words in the text were represented by the concept categories and after groups of concept categories were evaluated to describe more complex meanings, decisions were made about the text being considered. These decisions depended on whether the text was to be filtered or scored.

For filtration steps, certain Complex meanings led the text to being discarded while others meant that the text was retained. For some runs, the decisions pertained to the entire retrieved text from a dispatch while, for others, decisions were made for individual paragraphs within a story. The program output from a filtration run was a shortened file containing only the non-discarded text which was then either refiltered or scored using another dictionary and set of rules.

For scoring runs, individual paragraphs were evaluated as favoring a polled position if there was a word cluster referring to support for that position. For a paragraph with more than one scored cluster, the score was divided among the corresponding positions. The dispatch scores for the scored positions were the sums of the individual paragraph scores. Because every scored paragraph added to the infon content score, a dispatch had a higher salience if it transmitted more relevant material (Chapter 1).

The text analyses for the five cases in this book are sketched below.

4.4 Text Analyses for Defense Spending

Stories on this topic were processed through two successive filtration steps before by the scoring run. In Appendix C, one of the retrieved dispatches for defense spending is traced through all the steps to illustrate the method. That dispatch also demonstrated that text further than 50 words from one of the search words (Chapter 3) was usually irrelevant to the polled topic.

The text analysis for defense spending began with a filtration step using the criterion that the dispatch concern American defense spending. Therefore, the requirement was that the dispatch have at least one word each referring to America, defense and spending.

In addition, entire dispatches were discarded if they had the words "fund" or "aid." Fund (with no trailing characters like funds, funding, etc.) was found in articles on topics like the Environmental Defense Fund. Aid (not aiding or aided) tended to refer to American aid for defense spending in another country like El Salvador.

After this dispatch filtration step, the 692 dispatches were reduced to 377 with 199 words per average dispatch.

After the previous Step removed entire dispatches irrelevant to American defense spending, a single criterion was used for the next filtration step. Only paragraphs directly concerned with defense spending were retained. This was accomplished by requiring that a word referring to defense be close to a word connoting spending. Since the previous filtration step had already enriched for dispatches on American defense spending there was no need to require a reference to the United States in this second filtration.

Some spending words did not directly refer to money. For instance, "cut" and "side" almost always implied funding and were therefore considered to be spending words. The word "side" is perhaps a surprise, but it was found in phrases like "defense side" in budgetary discussions. The ability to use a multipurpose word like "side" in this very specific fashion was due to the disambiguation performed during both the initial Nexis search (Chapter 3 and Appendix B) and the previous filtration step.

After the second filtration, all but 37 of the 377 stories retained from the previous filtration were found to contain pertinent paragraphs. However, for each dispatch, many paragraphs concerned other subjects since the text within each article was reduced to 27% of the original.

After the previous two filtration steps, the remaining paragraphs were sufficiently homogeneous that the computer could easily score for infons in favor of more, same and less defense spending. In this scoring, the first condition was the removal of all phrases referring to "non-defense."

Then, two alternative sets of dictionaries and rules were used. In one, the dispatches were scored for support for all three of the positions of more, same and less defense spending. In the alternative scheme, the scoring was only for support of more and less spending. The two scoring schemes differed in both their dictionaries and in their rules.

In the scoring for three positions, only one criterion was used to score a paragraph as favoring more, same or less defense spending. That criterion was that a defense word be in close proximity to modifier words which favored one of the positions. Naturally, the orders and distances between modifier words were used to fine tune the sense of modifier. Since the previous filtration step had already required that defense words be close to spending words, there was no need to examine both spending and defense in the final scoring step. This step was performed on 5–10% of the words in the original retrieved text. Among the 377 stories truly relevant to defense spending, 72% had at least one scored paragraph. Therefore, the scoring was not based on only a small number of dispatches.

The text scored for three positions as just described were rescored for the support of only the two positions of favoring more or less spending. The details are given in Appendix C.

In the two position scoring, the rules were simplified by removing the category of infons favoring same defense spending. Thus information was forced into two categories, that favoring more and that favoring less spending. The result was that words like "keep" and "maintain" which referred clearly to same spending were deleted from the dictionary. Also some words like "freeze" were reassigned from supporting same spending to favoring less spending.

Besides the changes dictated by decreasing the scoring categories, the dictionary was further altered. Some of the words favoring more (bolster) and less (alternate, weaken, without) were deleted. Also, nuclear arms reduction was interpreted to favor less defense spending. In the three position analysis described earlier, nuclear arms reduction had no implications for defense spending. Thus the words "nuclear" and "arms" were only present in the dictionary for the two position analysis.

This inclusion of arms reduction meant that eight more dispatches were scored as favoring more or less defense spending. Therefore, the final number of dispatches with at least one paragraph with a positive score was 280 or 74% of relevant 377.

Both the initial Nexis retrievals and the subsequent text analyses described above focused on information directly relevant to defense spending. However, it was also possible that indirect messages could influence opinion on this topic. A good candidate for such indirect persuasive information was stories on defense waste and fraud.

Therefore, AP dispatches were identified if they had a word connoting defense close to a word mentioning waste, fraud or corruption (Appendix B). There was no requirement that the story be about defense spending. Of the 878 identified from Jan. 1, 1977 to Apr. 12, 1986, 512 were retrieved at random for text analysis.

The harvested text was passed through two filtration steps, the first discarding entire dispatches if they were about waste and fraud in countries other than the United States. The second filtration retained those paragraphs with word combinations implying both defense and waste or fraud or corruption.

At this point, every remaining paragraph was scored as favoring less defense spending if it contained a word cluster uniting the ideas of defense and waste or corruption or fraud. The implication was that such stories would suggest that funds for the military were unwisely spent and should therefore be reduced. Of the original 512 retrieved dispatches, 147 or 29% were scored as having an average of 1.3 paragraphs each on defense waste and fraud.

4.5 Text Analysis for Troops in Lebanon

The text for troops in Lebanon was the most complex of the five examples. Nevertheless, only two filtration runs were needed before the final scoring step (Appendix C).

Since essentially none of the retrieved dispatches were totally irrelevant to the topic, the first filtration focused on selecting relevant paragraphs rather than eliminating entire dispatches. The main criterion was that paragraphs should be directly concerned with American troops in Lebanon. Therefore, the retained paragraphs had to have words mentioning America, troops or policy, and Lebanon. In addition, backup conditions eliminated paragraphs on other topics like the domestic American economy, or troops from other countries.

The rules for the Lebanon analysis permitted ideas to be carried forward from one paragraph to the next so that pronouns like "they" and "them" referred to troops if troops were mentioned in an earlier paragraph. Similarly, the understanding was that a story continued to be about Lebanon if that area of the world was mentioned previously unless there was a change of locale to places like Grenada or the Caribbean since the United States also had troops in Grenada during part of the same time period. In addition, a new Lebanon reference was needed when words like Arab, Christian, and Druse were found in the previous paragraph. America was also carried forward until mention of another country like Britain, Italy and France which were also part of the Multinational Force stationed in Lebanon in 1983-1984.

While references to America and Lebanon continued to be carried forward until a paragraph had a word to cancel the thought, the troop idea was only carried forward if the next paragraph actually had an appropriate pronoun.

In this first filtration step, the text on Lebanon was reduced to 31% of the original retrieval. However, the number of dispatches with at least one relevant paragraph only dropped by 11%. As a result, the average dispatch now had 156 instead of 420 words.

The second filtration step was influenced by the requirement of retaining words like "keep" and "support" in the final scoring dictionary. These words were needed because the scoring was for the positions of favoring more, same or less troops in Lebanon. However, such words were also plentiful in text describing military combat. For instance, sentences sometimes spoke of artillery support for ground groups.

To avoid the confusion, it was decided to remove all text on actual combat and all paragraphs on entertainer Bob Hope's Christmas visit to Lebanon. The remaining paragraphs directly advocated positions on the deployment of troops in Lebanon.

In this step, the implicit decision was that descriptions of combat could be ignored. Such descriptions were not logically associated with the need to send either more or less troops. If the combat situation was unfavorable, the public could either feel that more troops were needed to correct the problem or that troops should be withdrawn because the situation was hopeless.

This second filtration step reduced the text to 15% of the original. The dispatches with at least one relevant paragraph only decreased to 80% of the original. The remaining text of story each averaged 85 words, quite similar to the 81 found after the two filtration steps for defense spending.

After the two filtration runs for troops in Lebanon, the text was scored for favoring more, same and less troops. The major criterion was to score for a word referring to troops or policy near a modifier word connoting more, same or less. Some words—like stay and withdraw—were able by themselves to favor keeping or removing troops since the concepts of America and Lebanon were already present in all dispatches. The previous filtration step had assured that the remaining paragraphs took policy positions on American troops in Lebanon. Therefore, as for defense spending, the previous filtration steps simplified the final scoring.

Even after the filtrations, some words retained important ambiguities. One of the most notable was "peacekeeping." This word could refer to "peacekeeping force," in other words troops. Elsewhere in the text would be phrases like "peacekeeping role," which tended to support a continued troop presence.

This problem was overcome by first asking if "peacekeeping" preceded "force" within a short distance. If so, then "peacekeeping" and "force" gave the concept of "troops." Otherwise, "force" was ignored because it was used as a verb connoting coercion a significant amount of the time. If "peacekeeping" was not before "force," then it could act on a policy word to give the sense that troops should be kept in Lebanon.

A different strategy was used to assign the proper meaning to "state" (as in "he stated that"), a word with policy implications. However, "state" was also often found in the phrase "secretary of state." Therefore, the dictionary search was first for the pair of words "of state." Once this word pair was found and removed, "state" could refer to policy.

Policy on troop deployment was frequently qualified by conditional words like "if, question, reappraise, why," etc. Since the majority of the debate was between troop retention and troop removal, such a qualifier led to the paragraph have equal scores favoring the two positions.

Using these main conditions, the text after the two filtration steps was scored for favoring the three positions of more, same and less troops. Of the original 467 dispatches, 54% had at least one paragraph with a non-zero score, again indicating that the scores were not based on a small minority of the total dispatches.

4.6 Democratic Primary

From the poll data for the Democratic primary (Appendix B), people with opinions were divided into three groups, those favoring Mondale, Glenn and Others. Therefore, the text was scored for these three groups of candidates.

Two different text analyses were used. One was based on what might be called "bandwagon" words describing a candidates successes and failures. As noted by Brams and Riker (1972) and Straffin (1977), it is possible to model the bandwagon effect mathematically assuming that uncommitted persons recognize the winning side and adopt the traits of that side while shunning the losers. However, the public must somehow assess which sides are winning and losing. For political candidates, the analysis in this book assumes that these perceptions are formed from descriptions in the press of the candidates' successes and failures. The bandwagon effect implicitly assumes that the decision to support a candidate is made principally from these perceptions rather than on a thoughtful analysis of other pertinent factors such as a candidate's stand on issues. Therefore, the bandwagon words used in this book just refer to candidates' successes and failures.

The alternative text analysis used candidate name counts and was predicated on the idea that name recognition, regardless of context, was the crucial consideration for a candidate's popularity (Kinder and Sears, 1985; Mueller, 1970a; Stang, 1974; Zajonc, 1968, 1980).

The more complicated analysis was obviously the one dependent on bandwagon words. Here, unlike defense spending and troops in Lebanon, the positions did not lie on a continuous scale ranging from one extreme to another. Instead, information for each candidate could be placed on some scale from very favorable to very unfavorable. Rather than choosing a very finely graded scale, the text was simply judged to favor or disadvantage a candidate.

In the bandwagon analysis, the first step was a filtration to select for paragraphs containing at least one of the last names of the Democratic candidates. This step reduced the text to 55% of the original. All the dispatches still had at least one paragraph with a candidate name. After this reduction, 199 words were left in the average dispatch.

After this filtration, paragraphs were scored for favoring and disadvantaging all three groups of candidates. The main criterion was that a candidate's name should appear near an advantageous or disadvantageous cluster of modifier words. These were bandwagon word clusters in that no attention was paid to the reasons for an opinion on a candidate. The implication was that the public favored a candidate if it looked as if that candidate was getting support from some source whatever the reason.

The most common of these bandwagon words in the retained text were "elected"—found 112 times, "backed"—found 94 times, and "favored"—found 73 times. There were also negative words of which "failed'"—found 24 times, "weak"—found 16 times, and "vulnerable"—found 11 times were among the most frequent.

This bandwagon scoring approach ignored the positions and activities of the candidates. For instance, Jesse Jackson was frequently in the news during the period studied because he was negotiating the release of a navy pilot shot down during a raid over Lebanon. Also, there were reports of Alan Cranston supporting the idea of a nuclear freeze. These and other reports on the candidates' activities and stands on issues were consciously omitted during the bandwagon analysis.

Since candidate activities and positions were not scored, a majority of the articles had zero scores favoring or disadvantaging the candidates. Nevertheless, 37% of the original did have positive scores for at least one of the six possible positions.

As an alternative to the bandwagon text analysis described above, it was possible to imagine that candidate name use was sufficient to determine popularity (Kinder and Sears, 1985; Mueller, 1970a; Stang, 1974; Zajonc, 1968, 1980). Therefore, the same dispatches were analyzed for their mentions of candidate names.

Paragraphs were scored as mentioning Mondale, Glenn or others since distinctions were not made for the contexts in which names were mentioned. With all names being counted and no context being scored, all 425 dispatches had at lease one paragraph in support of a candidate.

4.7 Text Analysis for the Economic Climate

The text analysis for this topic was performed in three steps. The first was to keep only those stories on the United States, the second was to discard paragraphs which were not about the economy, and the third was to assign the numerical scores. Sixty-six percent of the original dispatches had at least one paragraph scored as supporting one or more of the three positions with many dispatches having mixed messages.

4.8 Text Analysis for Unemployment versus Inflation

For the text analysis for this topic, there was only one filtration step where dispatches on non-American economies were eliminated. Then the paragraphs were scored for the relative importance of unemployment and inflation using the criterion that words for these concepts should be close to modifier words suggesting their importance. Forty-four percent of the original dispatches had at least one paragraph taking a position on this issue.

4.9 Text Analysis for Contra Aid

The text analysis for this topic was developed without knowing the results of public opinion polls. At the beginning of the analysis, the Roper Center was contacted at the University of Connecticut to determine that a sufficient number of polls existed to obtain a reasonable time series. This was to assure that the text analysis could not be influenced by the results of opinion polls.

This topic also tested the ability of persons besides the author (Fan) to construct the dictionaries and rules for the text analysis. Working as a team, three graduate research assistants (Swim et al., see Appendix C) from the Department of Psychology at the University of Minnesota constructed the dictionaries and rules for both the filtration and scoring steps.

Swim et al. first devised a filtration step to keep only those paragraphs with words connoting the United States, aid, and Nicaragua. The reference to the United States was required because the polls were for American opinion on American aid to the Contras. At this step, not attempt was made to separate aid to the Contras opposing the Nicaraguan government from aid to the government itself.

After this filtration, Swim et al. decided that the text was ready for final scoring. Since the scoring is typically the most subtle step, rules and dictionaries were developed independently both by Fan and Swim et al. The text surviving the filtration was then analyzed twice, once using the procedure of Fan and once using the method of Swim et al.

Fan used the same general strategy employed for the other analyses of this book. He insisted that word combinations favoring or opposing aid be in close juxtaposition with words referring to the Contras or a synonym. The result was paragraph scores either favoring or opposing aid, or both. The concept of supporting both positions could either be due to two word clusters, one opposing and one favoring aid, or to conditional words like "if" appearing in paragraphs with only one word combination favoring either idea.

Unlike Fan, Swim et al. counted many word clusters only indirectly favoring or opposing aid. For example, "talks" . . . "failed" was interpreted to imply that aid should be given. In another instance, "Schultz" . . . "over eager" was interpreted to mean that no aid should be given. Furthermore, Swim et al. did not impose the requirement that any of these words be close to a mention of the Contras, as Fan had done. Swim et al. took advantage of the filtration having restricted the paragraphs to those already discussing America, aid and Nicaragua.

By counting many indirect statements while Fan did not, Swim et al. found that 906 of the 969 retrieved dispatches had paragraphs relevant to Contra aid. In contrast, the number for Fan was 770. Therefore, Fan did not score 15% of the stories which Swim et al. found to be relevant. These stories presumably only had indirect statements on Contra aid. In addition, Swim et al. found 3.4 paragraphs per average scored dispatch to be relevant to Contra aid while Fan only found 2.0. stories. Therefore, by using a different dictionary and set of rules including a significant number of indirect statements, Swim et al. gave scores to almost twice as many paragraphs as Fan. Fortunately, both text analyses gave essentially the same opinion Projections (Chapter 5). This result will be discussed further in the Chapter 6.

4.10 Summary Features of Text Analysis by Successive Filtrations

One of the obvious strengths of the text analysis in this book was that each issue was probed with a customized dictionary and set of rules. Therefore, it was possible to have much greater specificity and flexibility than was possible with general programs using fixed dictionaries and rules.

The necessity of different criteria was clear from the poor overlap in the dictionaries and rules for the five examples in this book. For troops in Lebanon, proper nouns like Lebanon, Beirut, Christian and Shiite were critical. For the Democratic primary another set of proper nouns, those of the Presidential candidates, were crucial instead. Among the few words appearing consistently in all analyses were those referring to the United States and those words like "no" and "not" connoting negation.

The specificity of the analysis also meant that a single story could be relevant to a number of different issues. Thus the same dispatch could be analyzed with two different sets of dictionaries and rules in order to provide two different types of infon scores. For example, some of the articles identified as relevant to the economic climate were probably also pertinent to defense spending and/or unemployment versus inflation. Those dispatches would have yielded different types of scores depending on the issue being studied. The same article could have had paragraphs both favoring more defense spending and supporting an improving economic climate.

Another advantage of the method of successive filtrations is its generality. It may seem contradictory to speak of the generality of the method when the advantage discussed in the previous section was specificity. However, the method was general due to the overall strategy of progressively culling irrelevant text in a series of filtration steps.

In addition, the text analysis of this book benefitted from the use of simple dictionaries and rules. This was possible using two sequential filtration steps when two distinct criteria could be developed to remove irrelevant text. The resulting simplifications in the rules minimized logical errors in their construction.

The simplifications were possible due to the ability of filtration steps to relate thoughts within the text to each other. For defense spending, for instance, the first filtration imposed the condition that all dispatches be about the United States. Therefore, in subsequent steps, the concept of America was already implicit in the remaining text. There was no need to include a reference to the United States in the second filtration step selecting for paragraphs directly speaking of defense spending. In consequence, words referring to the U.S. could have been anywhere in the text in the first filtration and to be totally absent in the second. A single set of rules for a one pass program would have been much more complex than the two individual sets of rules combined. The rules for a one pass run would have had to have been able to retain paragraphs on defense spending when there was also reference to America either earlier or later in the dispatch.

The successive text filtrations also permitted the use of words with unusual meanings (see above). Very general words (like "cut" and "side") could safely be used in special senses (like spending) if previous filtration steps put such code words into the proper contexts. Also, the specific, unusual and jargon-like nature of many words was revealed only as the text became more homogeneous. Therefore the text filtration was very useful for word disambiguation.

The keys to handling code words were: (1) the strategy of text filtration before final scoring, and (2) the tailoring of the rules and dictionaries to individual situations. The use of code words was much more problematical for general text analysis programs where the same program and dictionary was used for a wide variety of text.

Contrary to what might be expected, the time required to analyze the text was decreased rather than increased by the filtration steps even though some portions of text were reanalyzed several times. This economy occurred at three steps. The first was in the construction of the dictionaries and rules.

Typically after examination of 50,000–100,000 characters of text from random dispatches, sufficient repetition was seen that most of the relevant rules and dictionary words could be extracted.

The time needed for obtaining a workable dictionary and rules was shortened by using only one or two criteria for each filtration run. After the filtration, the text was more homogeneous and more dispatches were represented for a given number of characters of text since significant amounts of irrelevant text were discarded. Therefore, the text for constructing the dictionaries and rules was derived from more and more dispatches as the files were filtered. This had the advantage that the most subtle decisions, those used for the scoring, were made from large samples of relevant text, more than was practical with the unfiltered stories where the density of pertinent material was low. It was obviously more time efficient to make rules from text highly purified for relevance. Also, the fewer the rules and the smaller the dictionaries, the less was the time needed to debug the logical errors in the rules.

The strategy of using simple dictionaries and rules also resulted in shortening the computer runs themselves. The initial filtrations usually employed the simplest rules and the smallest dictionaries so the runs were quite rapid. With successive filtrations, the amount of next diminished so that more complex rules and larger dictionaries did not lead to significant increases in time. Using a one pass computer program, the rules would have been more complex than those used at any one step and the dictionaries would have been bigger, thereby slowing the runs. In other words, a great deal of computer time would have been spent carefully examining irrelevant text.

The strategy in this book was to tailor each analysis, at all steps, to the specific question being asked. Consequently, no additional time was required to interpret the outputs of the computer runs. As described in this chapter, the final scoring runs gave the infon content scores in terms of the number of paragraphs supporting individual positions. These scores were then used directly for calculating public opinion without further interpretation.

The situation is quite different for analyses using predefined dictionaries and word categories in programs such as those discussed in Section 4.1 above. For those programs, no time was spent in the construction of the dictionaries and rules. Instead, the entire time was used in the interpretation of the data generated and that time could be considerable. Sometimes, as for the examples in this book, there was even no obvious way to interpret the output of a general text analysis program like MCCA in a useful form.

The methods in this book were also designed so that the logic of every step was directly related to the initial goal of each analysis. The customized nature of each step meant that it was possible to make the positions much more specific than was possible using the predefined categories in general text analysis programs.

However, even for such general programs, it is sometimes possible to extract themes not present in individual predefined dictionaries by performing factor analyses based on separate runs using different dictionaries. For example, Weber (1985) used this technique to show that editorials with frequent reference to American leaders and topics will also have a high content of words relating to high status and occupations. Although factor analysis is a powerful procedure, it is difficult to consider its greater indirectness to be an advantage.

Another important consideration in developing the methods was to obtain a system where it was very difficult to fit the text analysis to poll data, either consciously or unconsciously. There is no easy way to adjust the text analysis with the goal of matching opinion percentages. Adjustments in the content analysis would have involved changing the rules or the dictionaries. However, any such changes would have affected the analysis for all AP dispatches. Therefore, there was no good way of foreseeing the effects on the opinion projections.

Any changes in the dictionaries and rules for the text analysis also had to be Justifiable as logical consequences of the meanings within the text. There was no place in the programs to add arbitrary correction factors.

Also, the dispatches were examined by design in random order during the constructions of the dictionaries and rules. Therefore, it was never obvious which dispatch scores needed to be changed in order to get a better opinion projection. In fact, for no analyses were opinion poll data examined during text analysis steps. Therefore, the devising of the dictionaries and rules proceeded without regard to poll data for all analyses even though it was only for the Contra aid example that those data were not available until the analysis was finished. Furthermore, the dispatch scores went through additional mathematical manipulations before the final opinion projections were obtained (Chapter 5). It was very difficult to guess the final shapes for the opinion projection curves from the raw infon content scores. The quantitative predictions required calculations using the projection computer program.

All these considerations meant that the text analysis had to be performed independently of the opinion projections based upon them.

4.11 Extensions of the Text Analysis Procedure

The computer content analysis in this book should be applicable to text other than those used for calculating public opinion. For instance, responses to open ended questionnaires can be examined for their comments on different topics. Employee letter of recommendation might be scored quantitatively for support of different traits desired for a job.

Different analyses would require different dictionaries and rules. But the overall strategy is broadly applicable using the general text analysis procedure described above.

The strategy in this chapter has required that all the dictionaries and rules be entered by the investigator. There are no provisions for machine refinement. However, as more experience is gained on the sort of rules which are admissible and the types of words which fit into various classes, software might be written which will permit the computer to aid in the development of the dictionaries and rules. The machine might initially be assigned tasks such as looking for similar words to add to a dictionary. Another computer function might be to check for consistency whenever new words and rules are added to a preexisting dictionary and accompanying set of rules.

Later, as the guidelines for the dictionary and rule constructions become clearer, these guidelines might be included in computer programs to suggest both new rules and dictionary words. As more and more such guidelines are included, the procedure might be gradually converted from a fully manual system to one with ever greater degrees of automation in dictionary and rule development.

CHAPTER 5

Projections of Public Opinion

The first chapter in this book outlined ideodynamics and showed how this mathematical model could be used to calculate public opinion from persuasive messages available to the population. The third chapter proceeded to describe six sets of data used for the computations. Those data were time series of public opinion polls and Associated Press dispatches relevant to the polled issues. The fourth chapter then presented a new computer method for scoring AP dispatches for their support of various polled positions.

The present chapter details the use of these scores to compute percentage values for public opinion throughout the time interval for which poll data were available. Opinion is calculated for all six of the cases examined. Since many of the examples point to the same general conclusions, the ramifications of the individual studies are not discussed in this chapter but, instead, are explored together in Chapters 6 and 7.

As outlined in Chapter 1 and discussed further in Appendix D, the opinion calculations involved three steps: (1) conversion of the AP dispatch scores into persuasive force functions appropriate for the computations, (2) construction of detailed population conversion models for the effect of persuasive forces on various subpopulations, and (3) actual calculations of expected poll results. These steps are now considered in detail for the six issues analyzed in this book.

5.1 Opinion Predictions for Defense Spending

Chapter 2 showed how AP stories were collected for defense spending and Chapter 3 then described the methods for obtaining numerical scores for each of the stories. Two sets of scores were obtained for each story. For one set, the dispatches were scored for their support of the three positions of more, same and less spending. For the other set, the stories were scored for their support of only the two positions of more and less spending.

Figure 5:
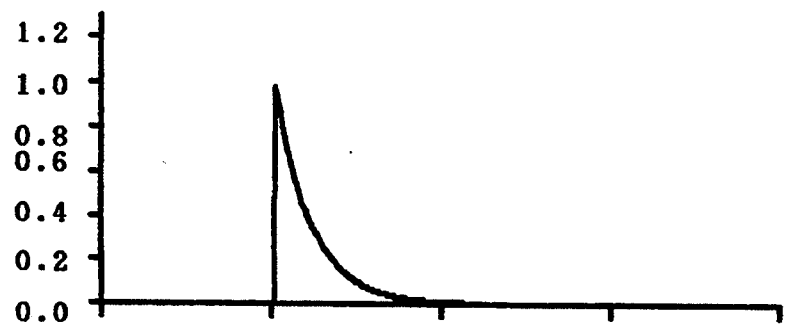
Figure 5:
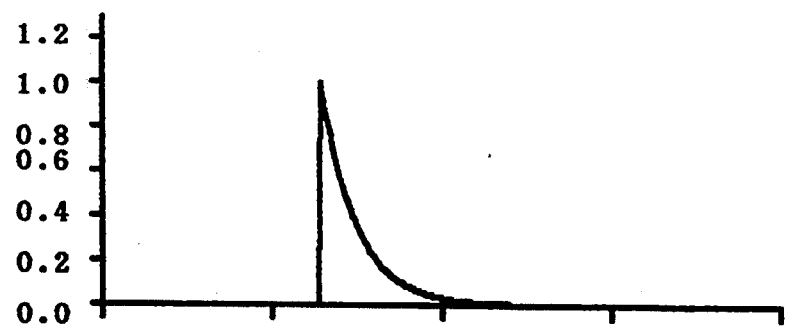
Figure 5:
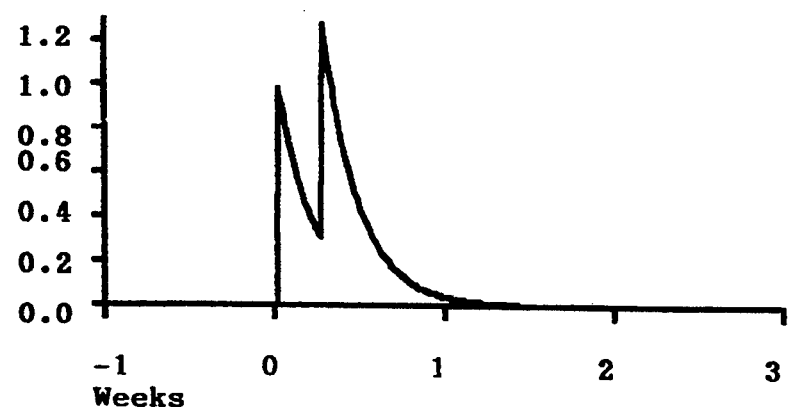
Figure 6:
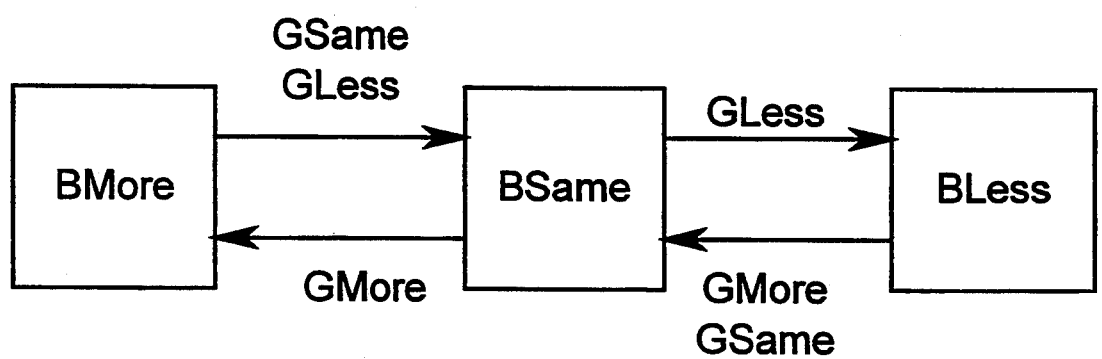
Figure 7:
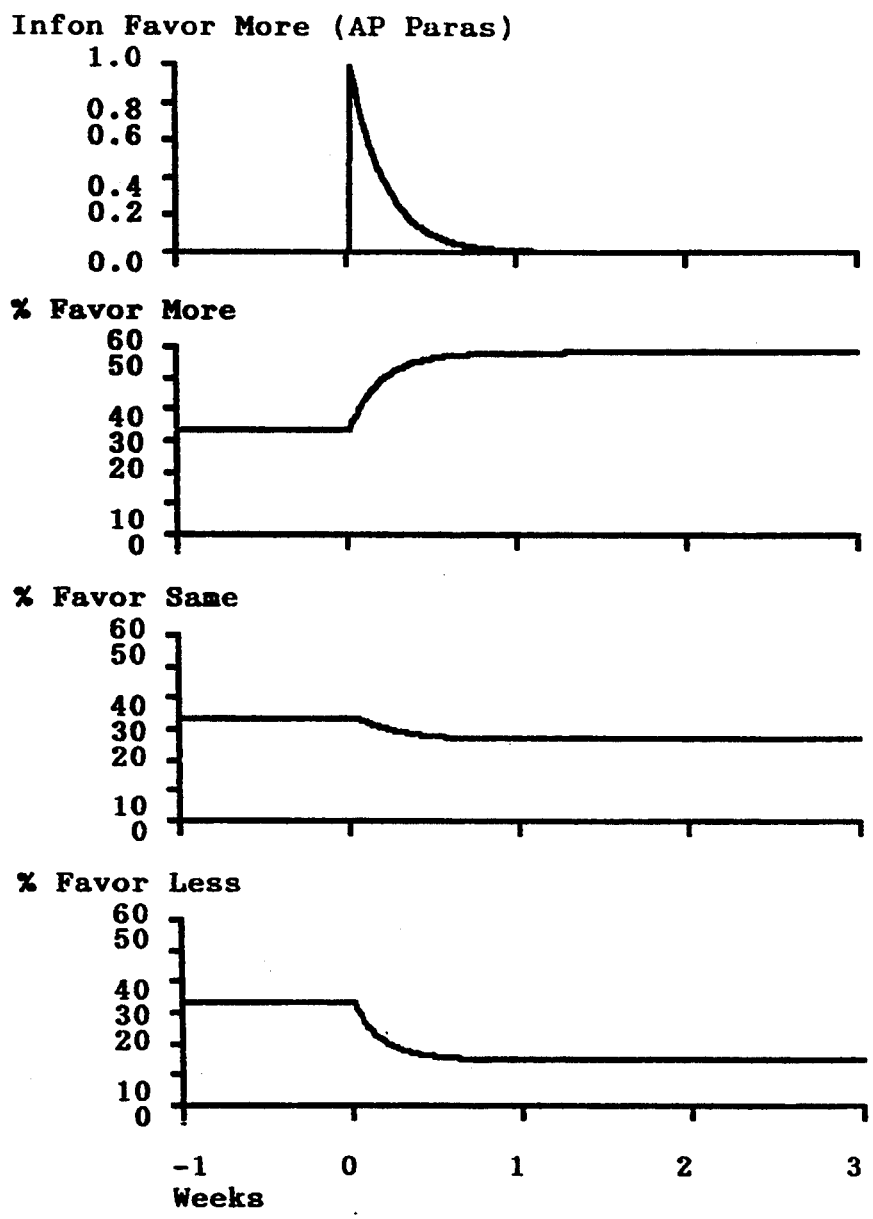
Figure 8:
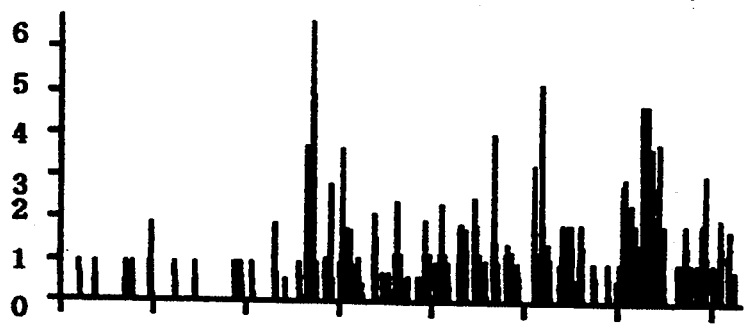
Figure 8:
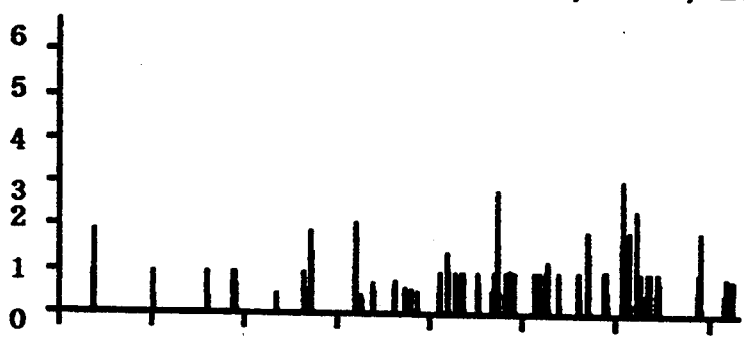
Figure 8:
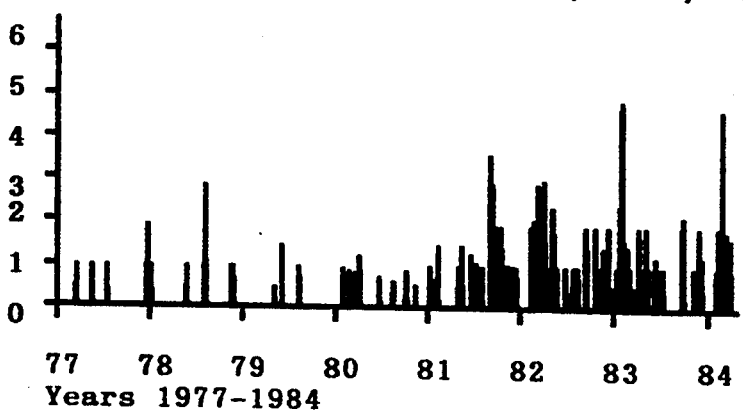
Figure 9:
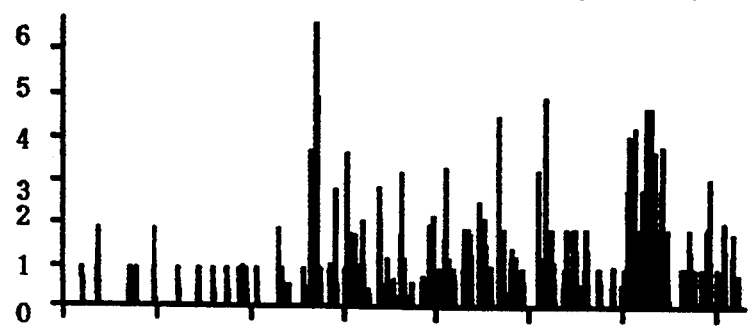
Figure 9:
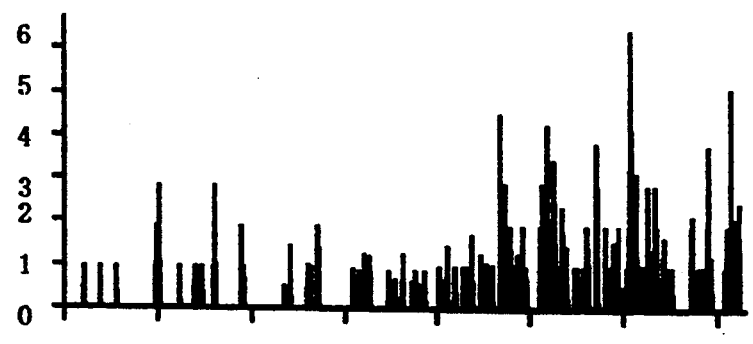
Figure 10:
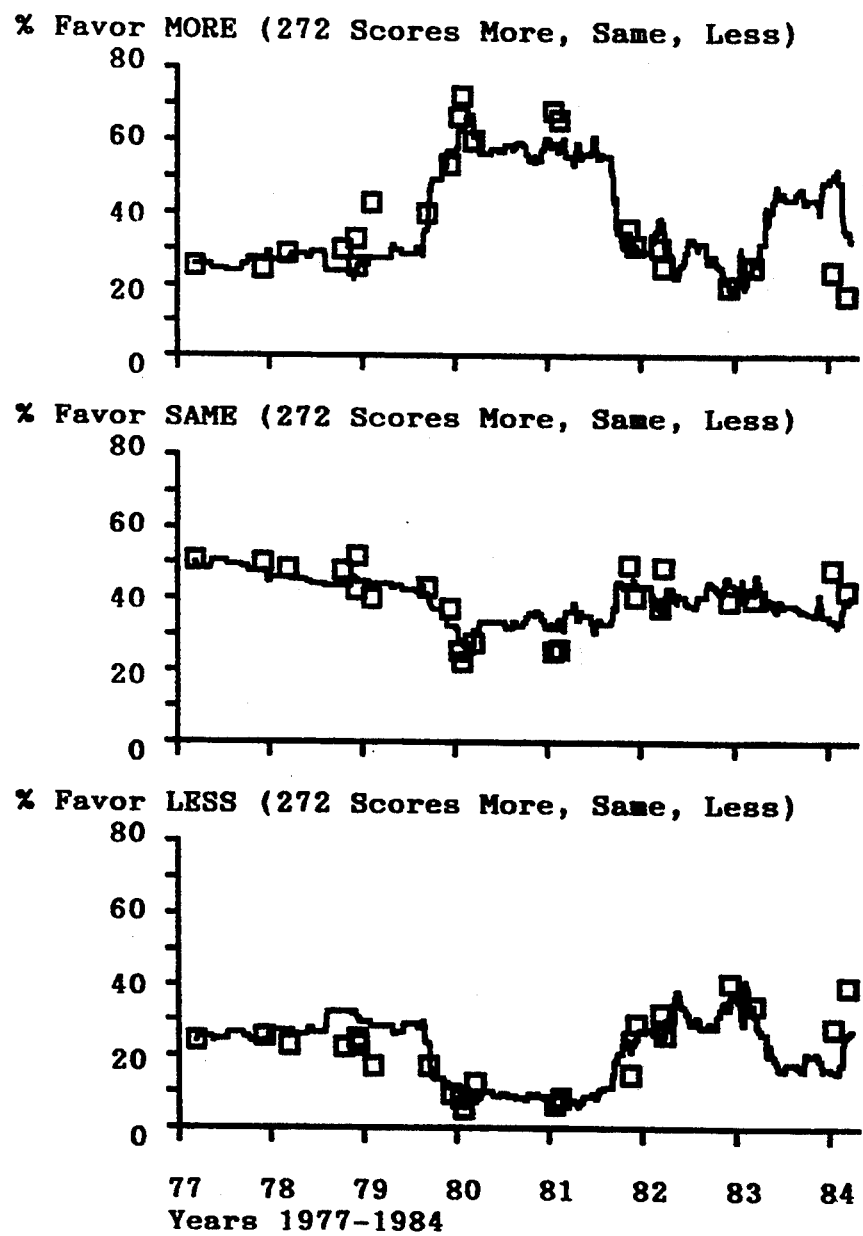
Figure 11:
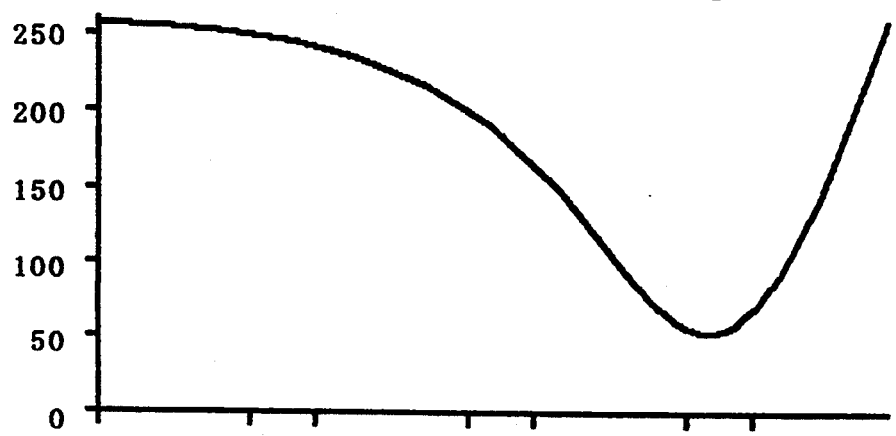
Figure 11:
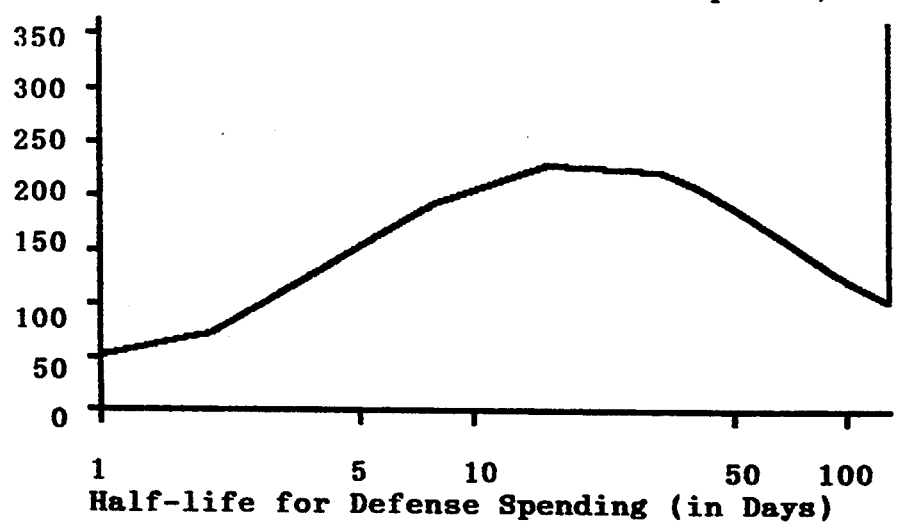
Figure 12:
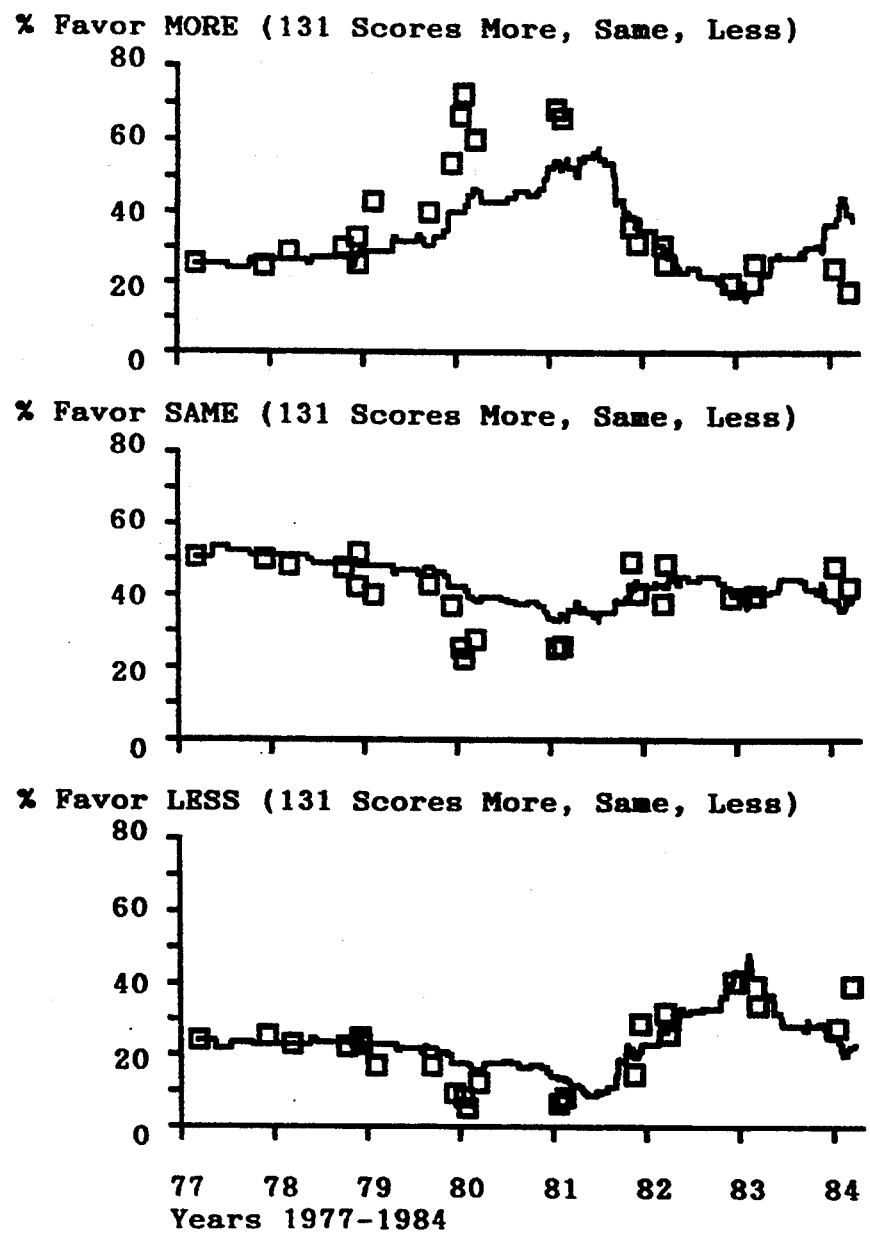
Figure 13:
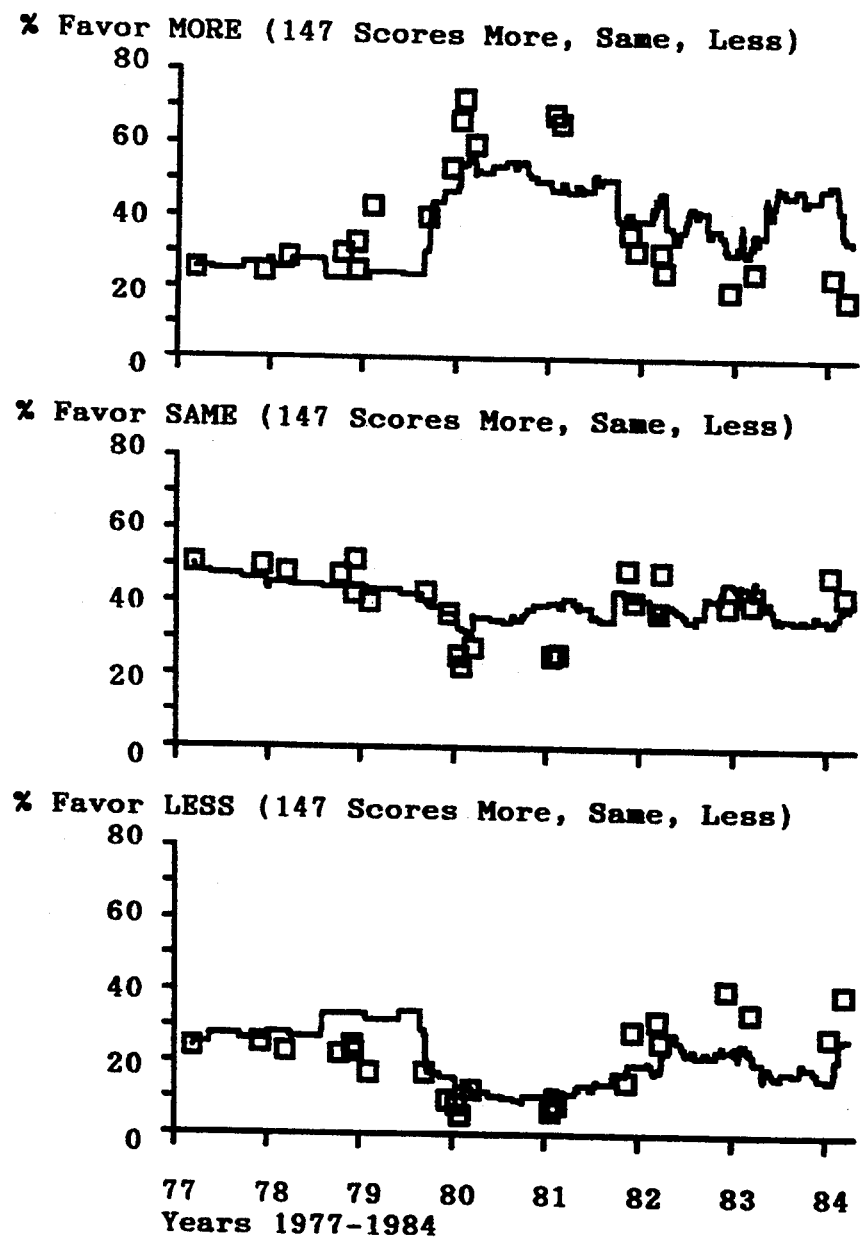
Figure 14:
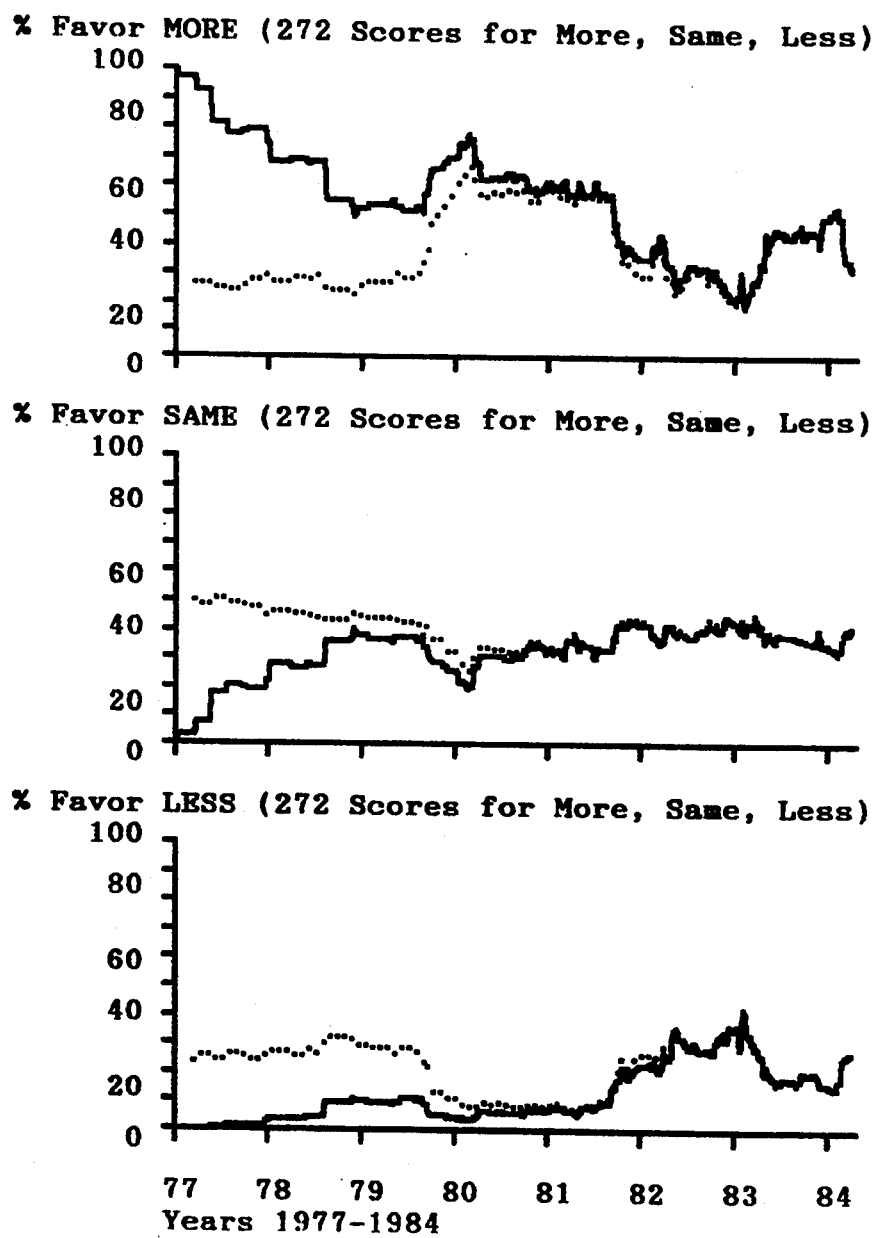
Figure 15:
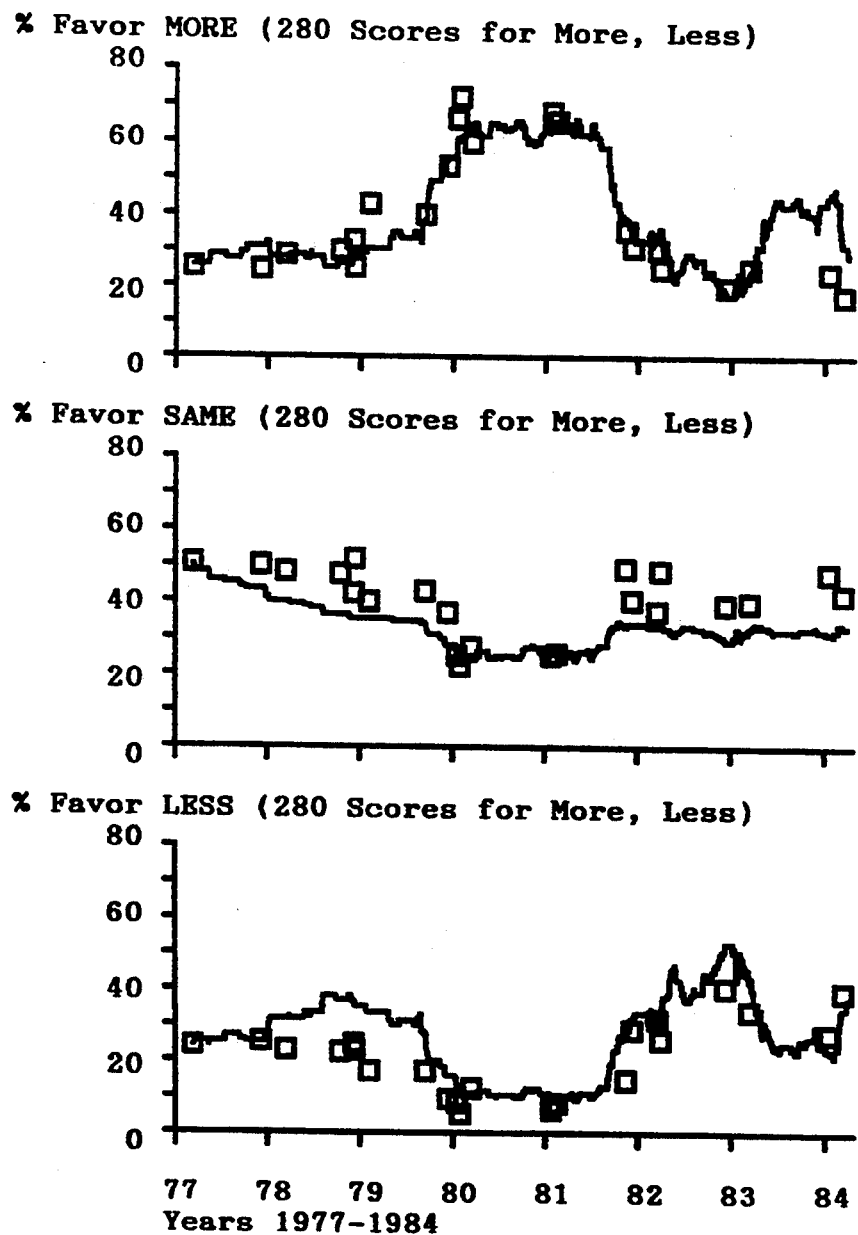
Figure 16:
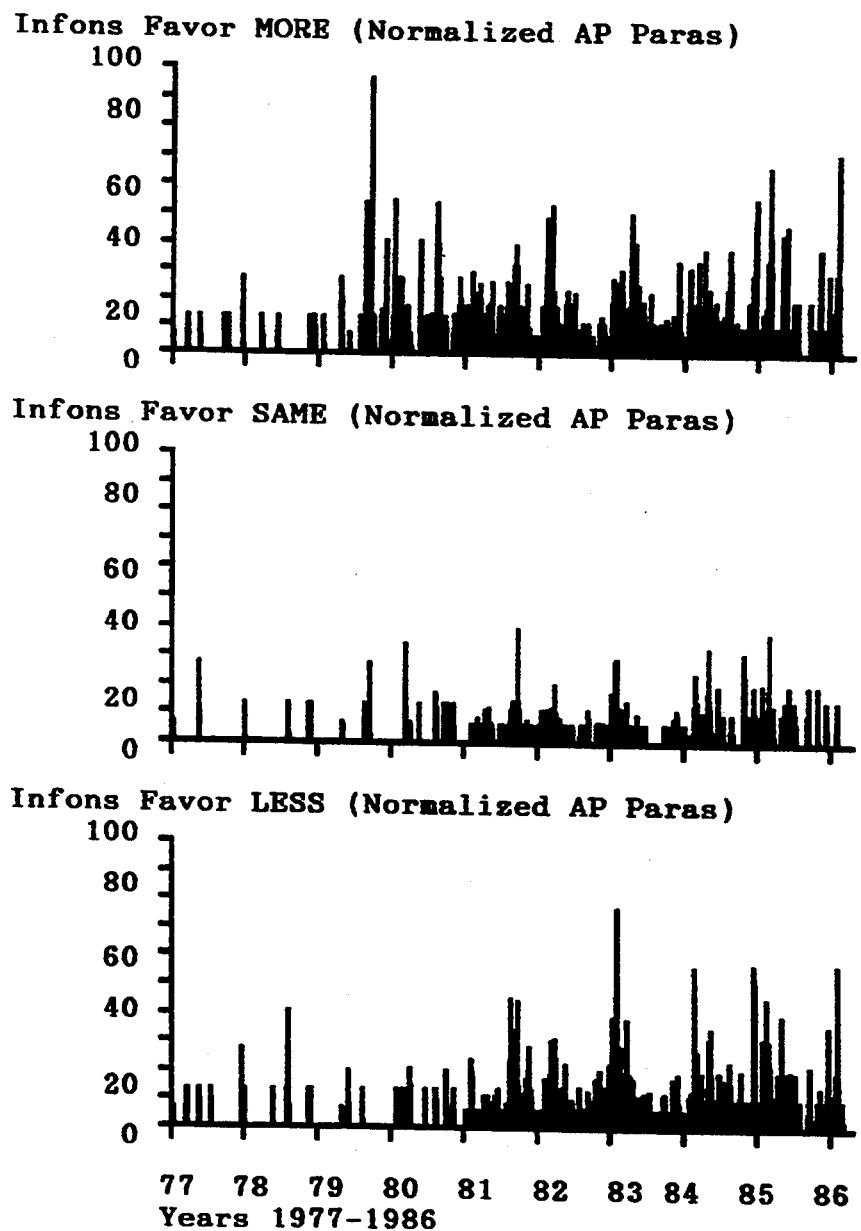
Figure 17:
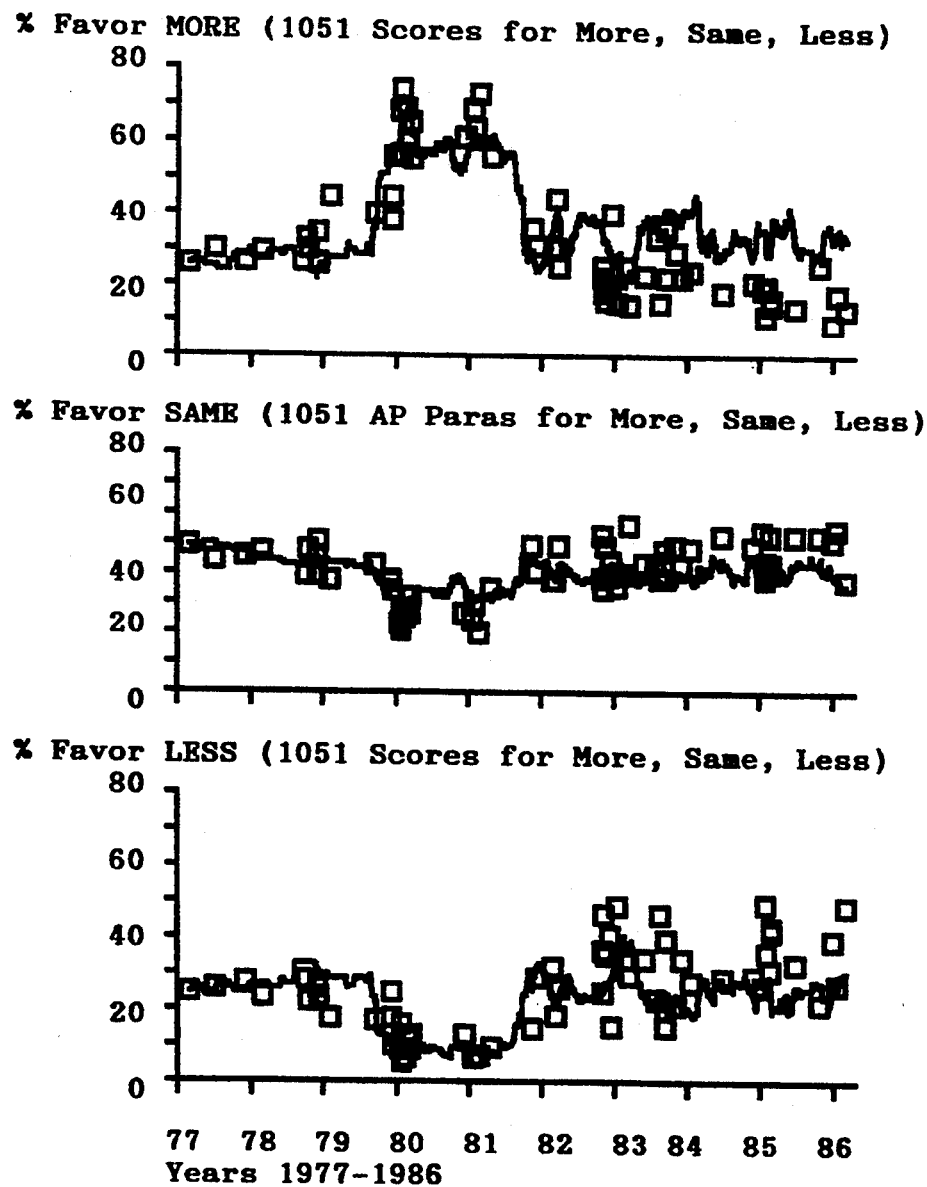
Figure 18:
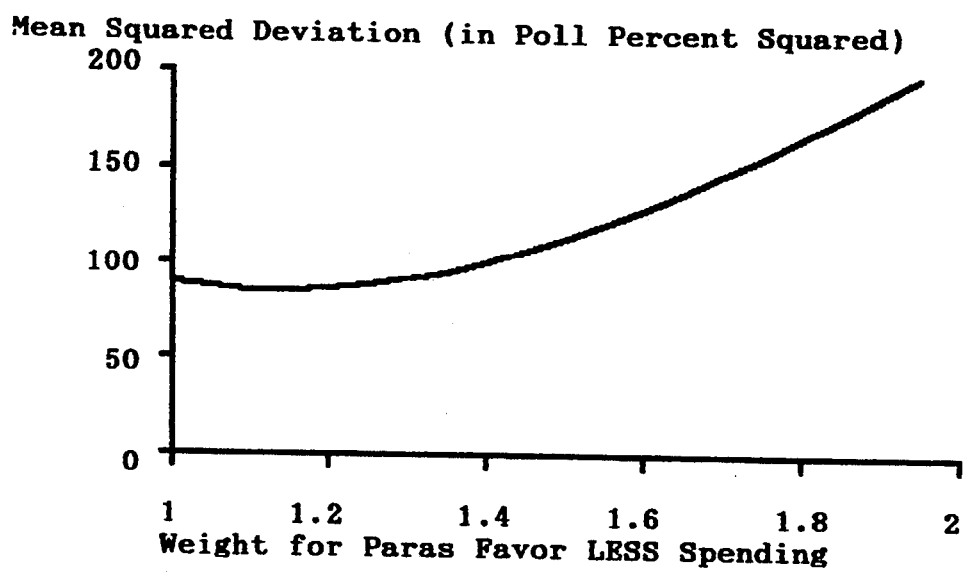
Figure 19:
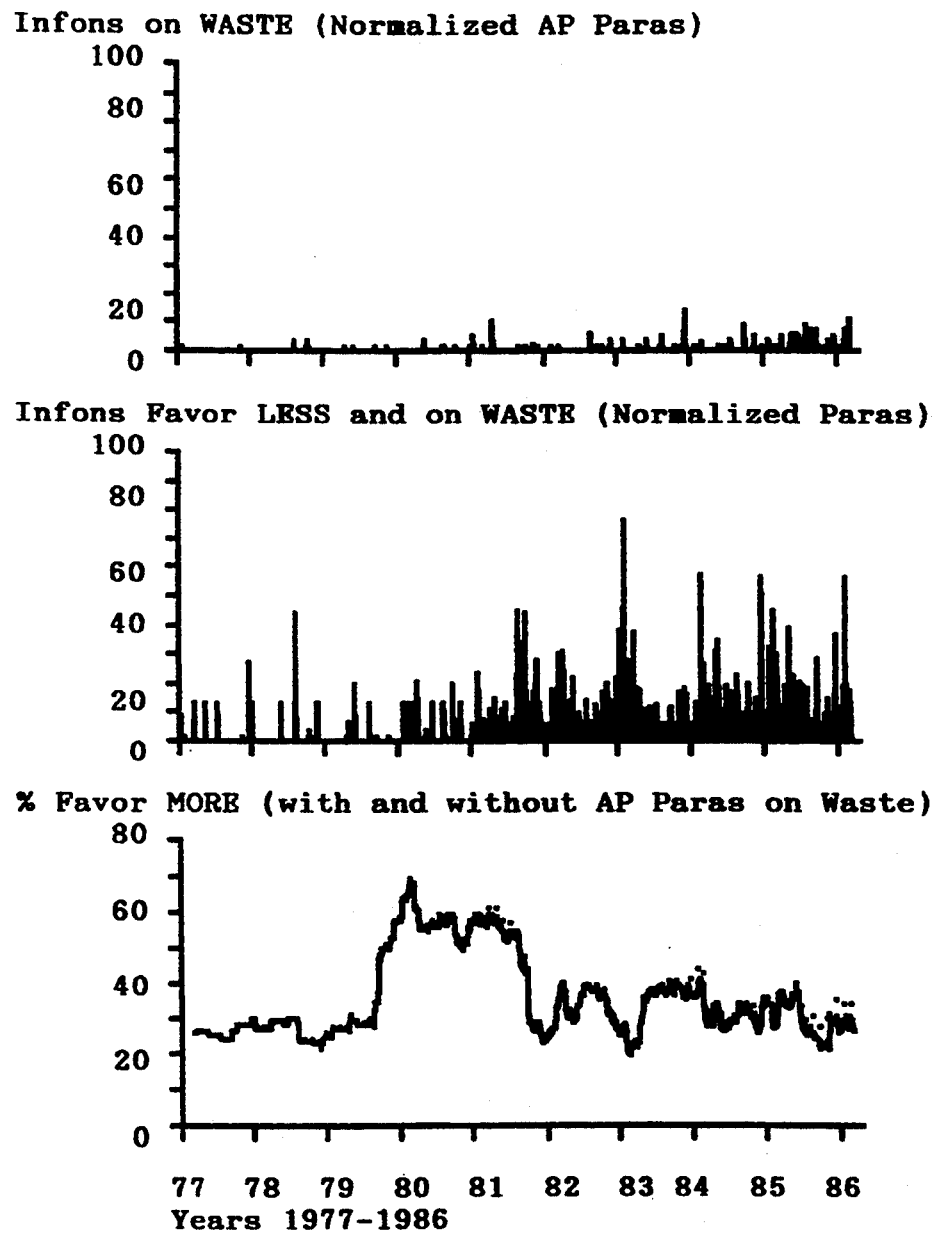
Figure 20:
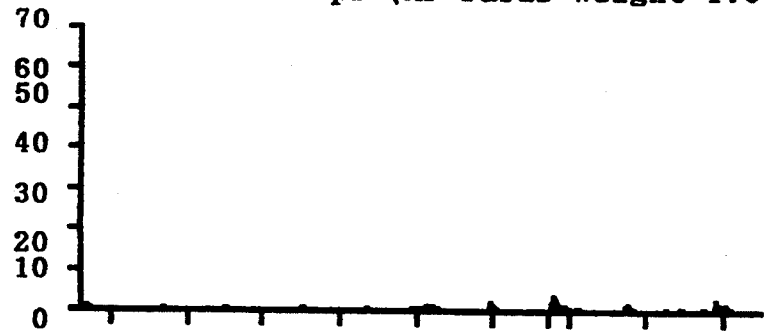
Figure 20:
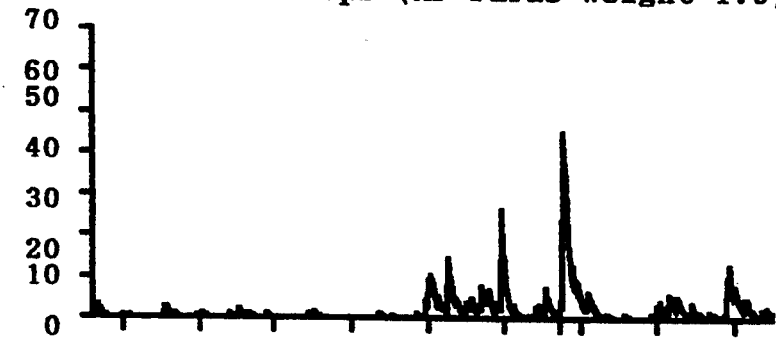
Figure 20:
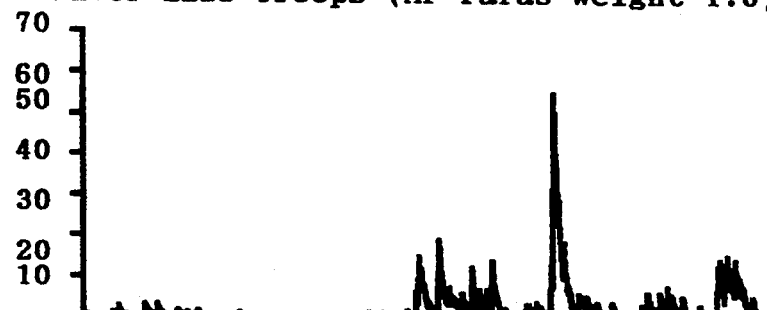
Figure 21:
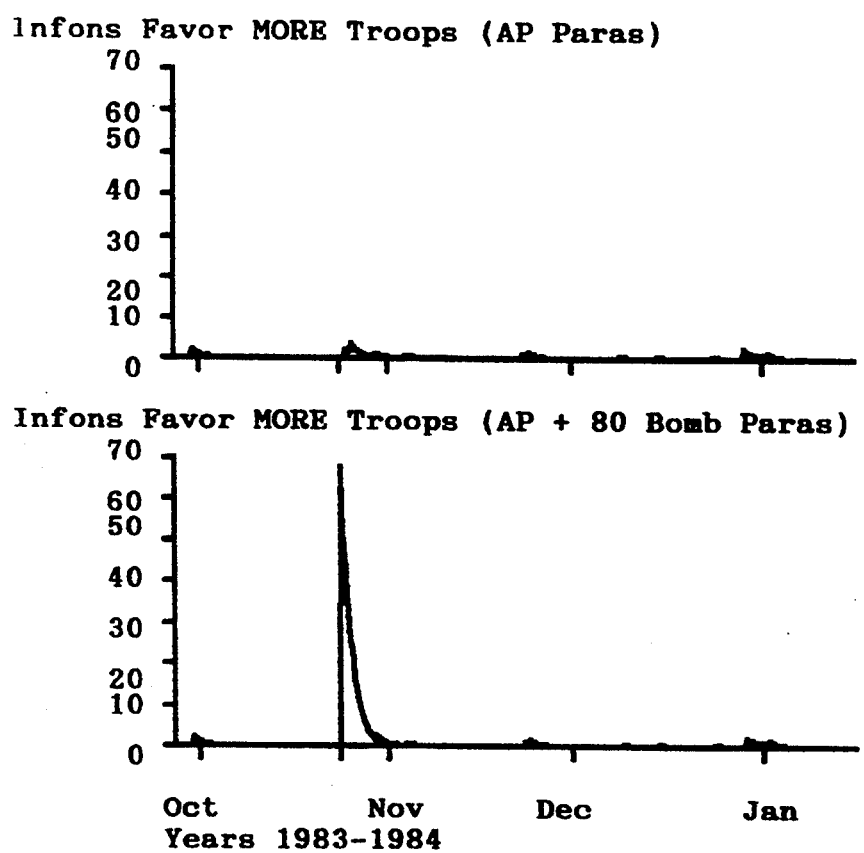
Figure 22:
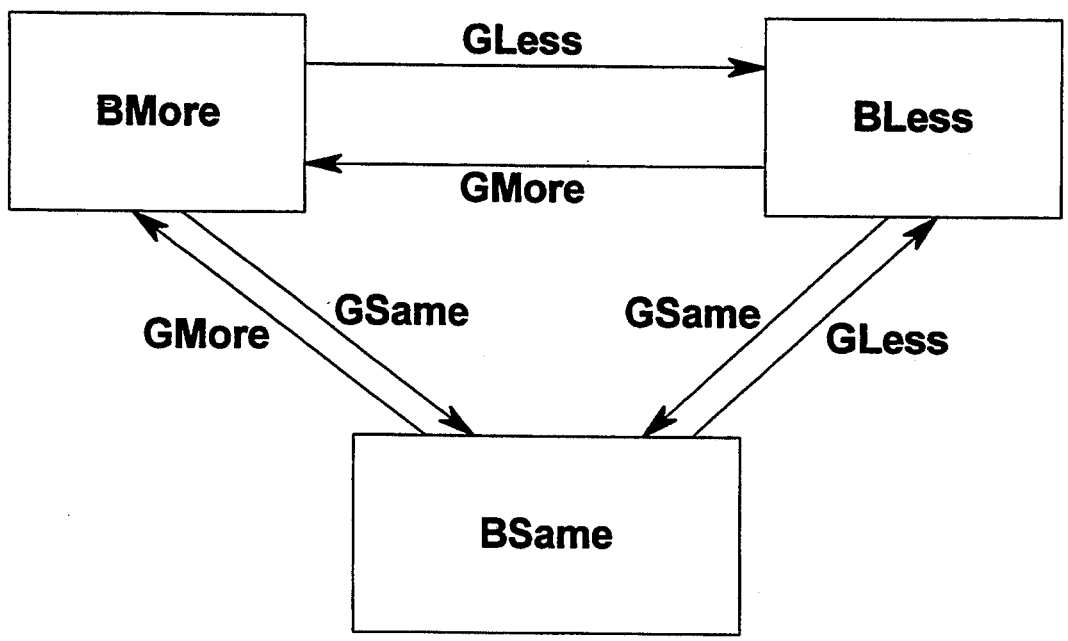
Figure 23:
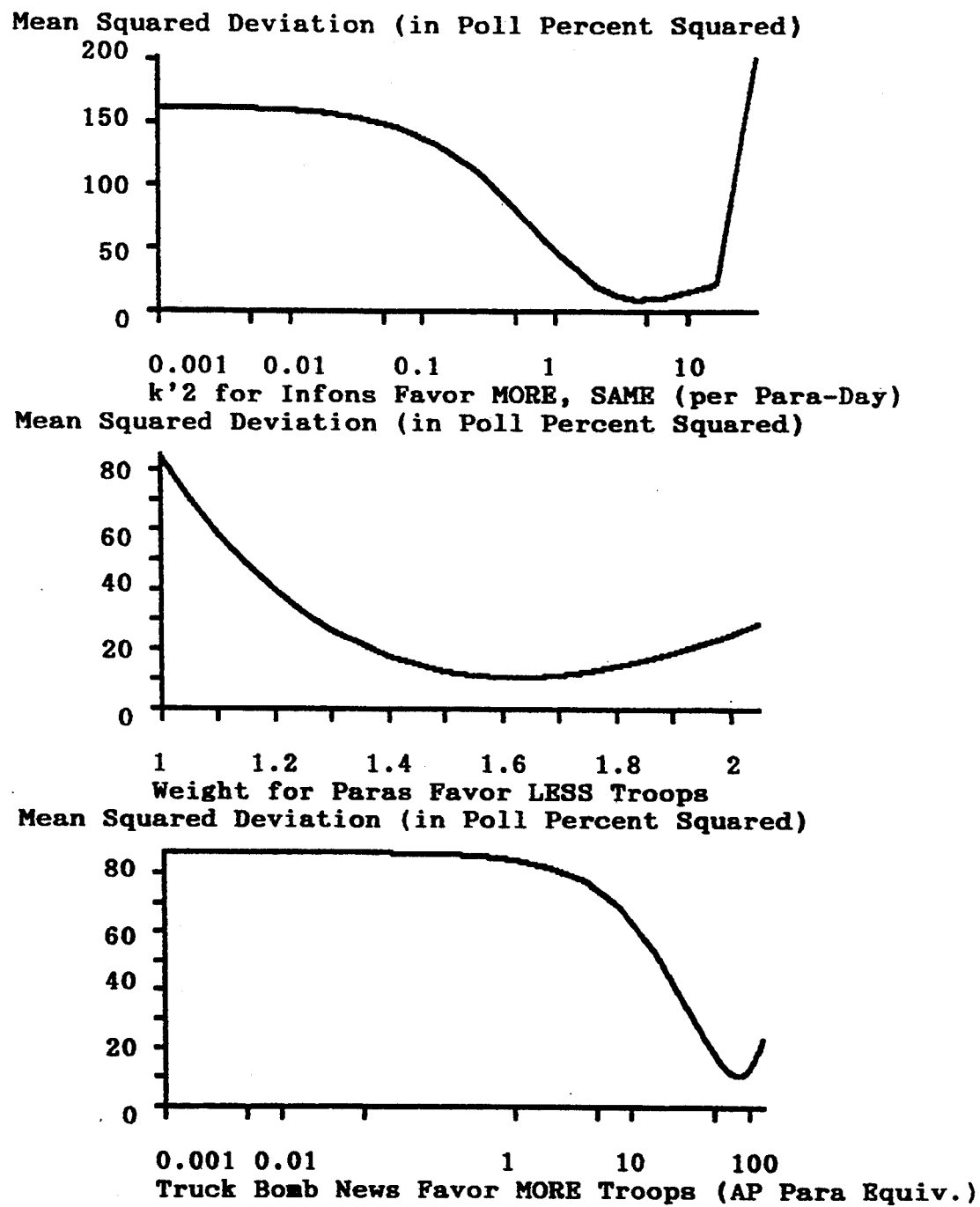
Figure 24:
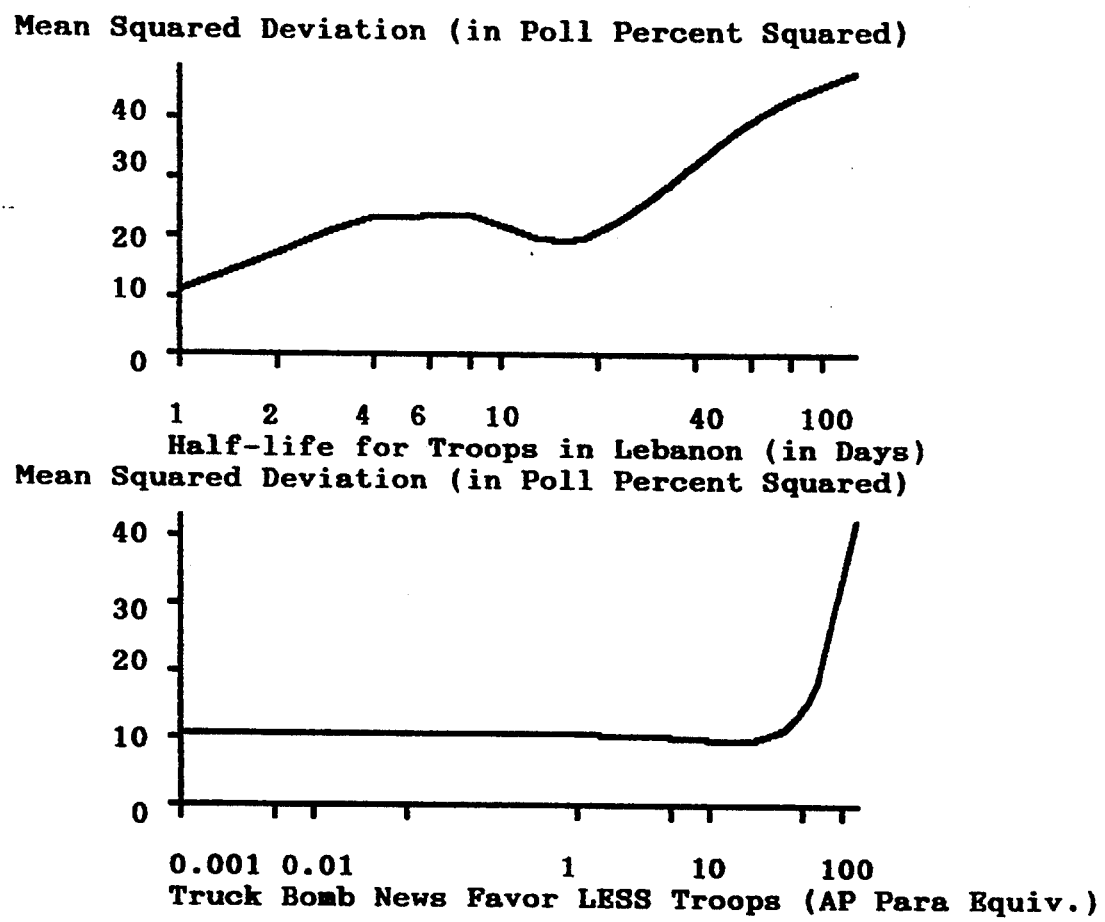
Figure 25:
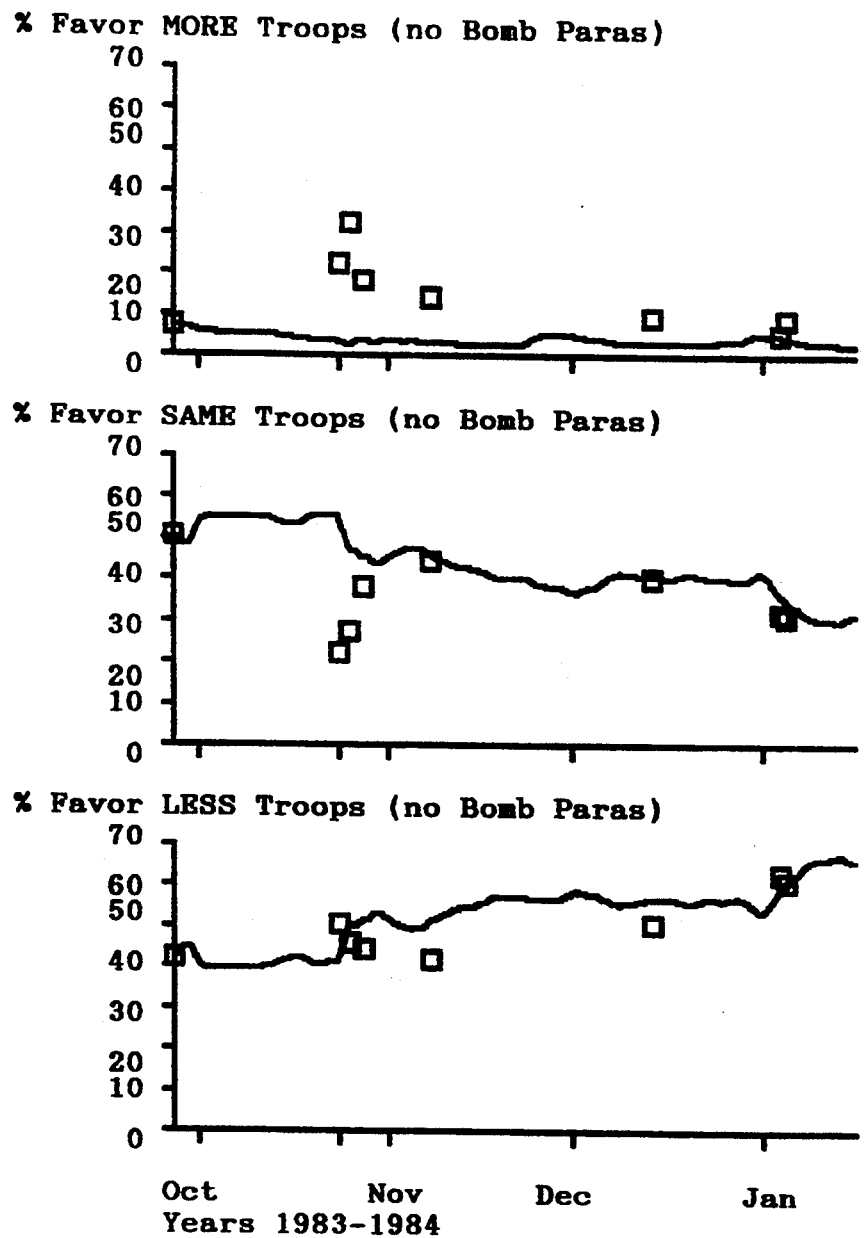
Figure 26:
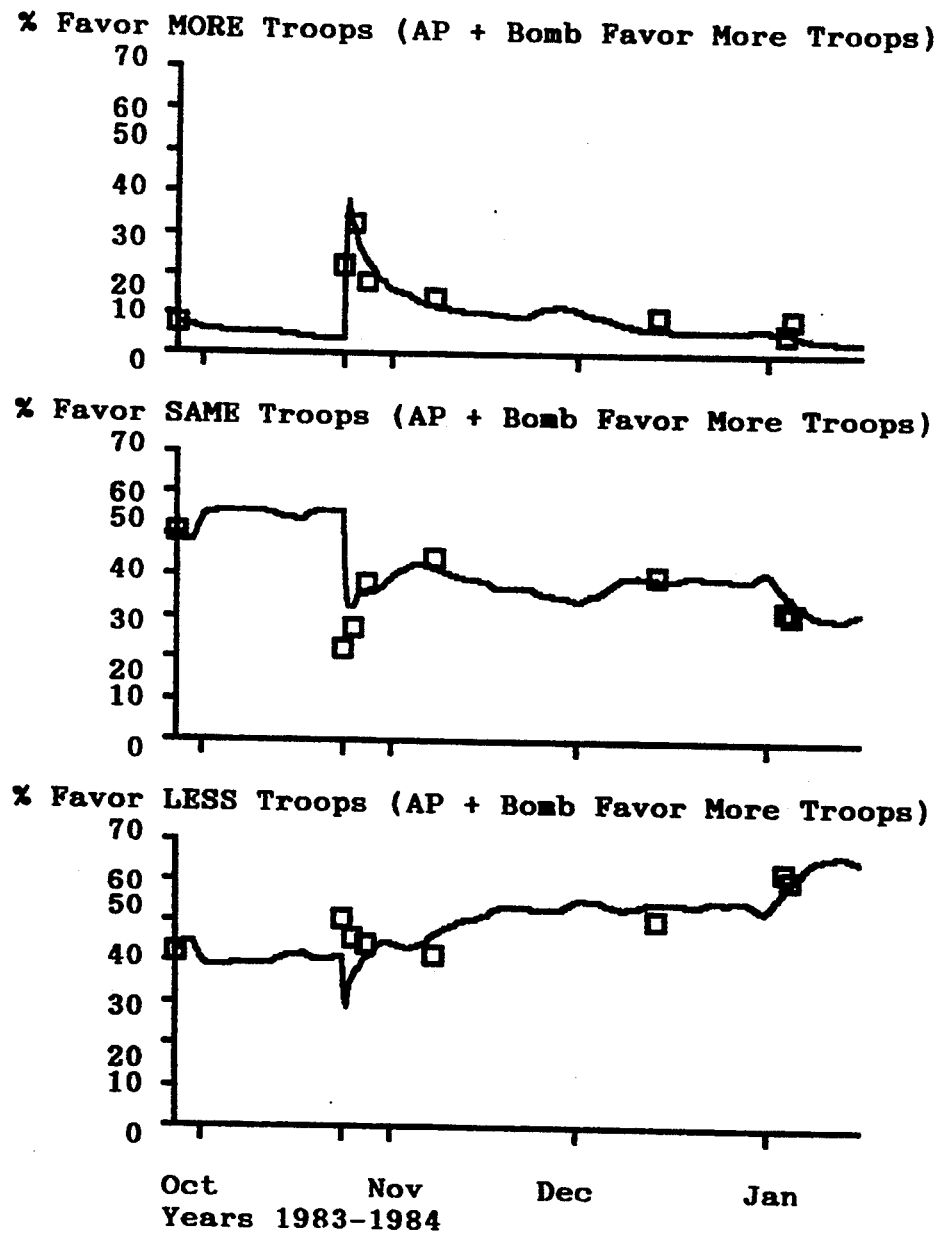
Figure 27:
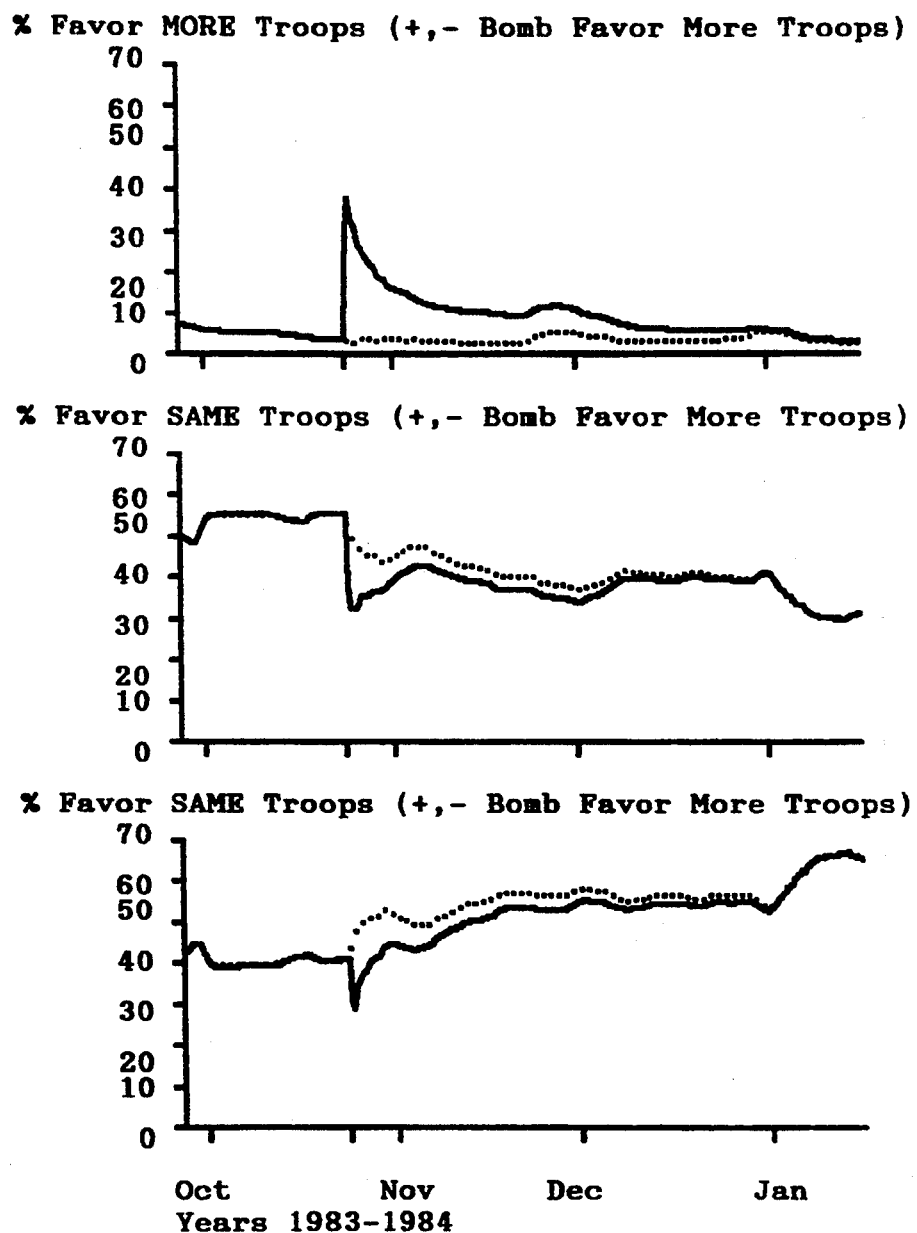
Figure 28:
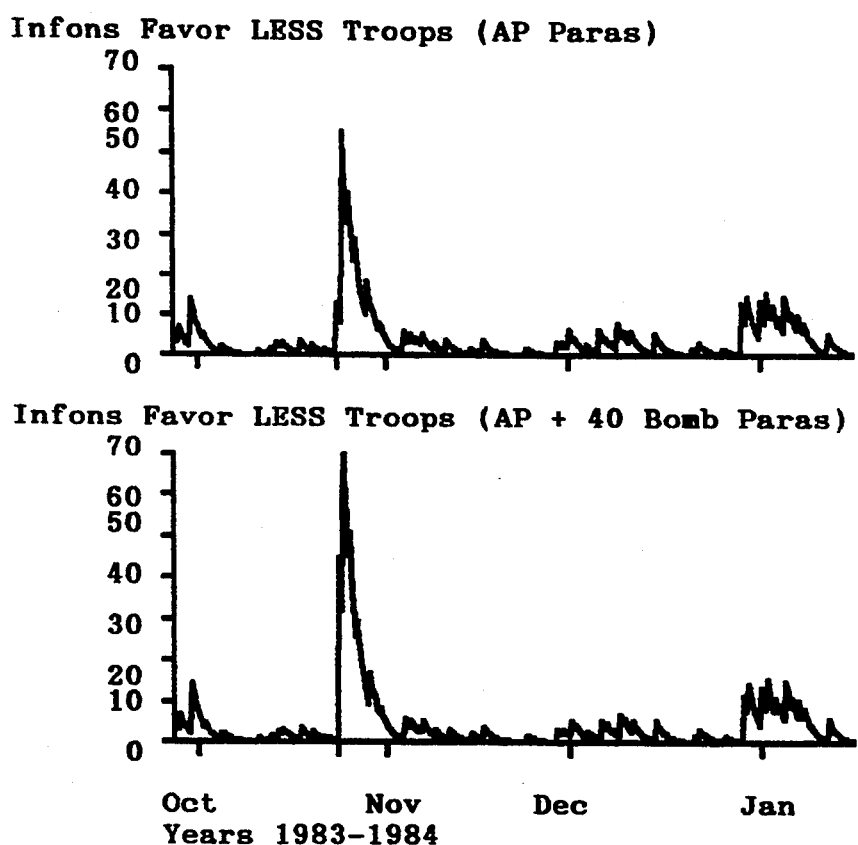
Figure 29:
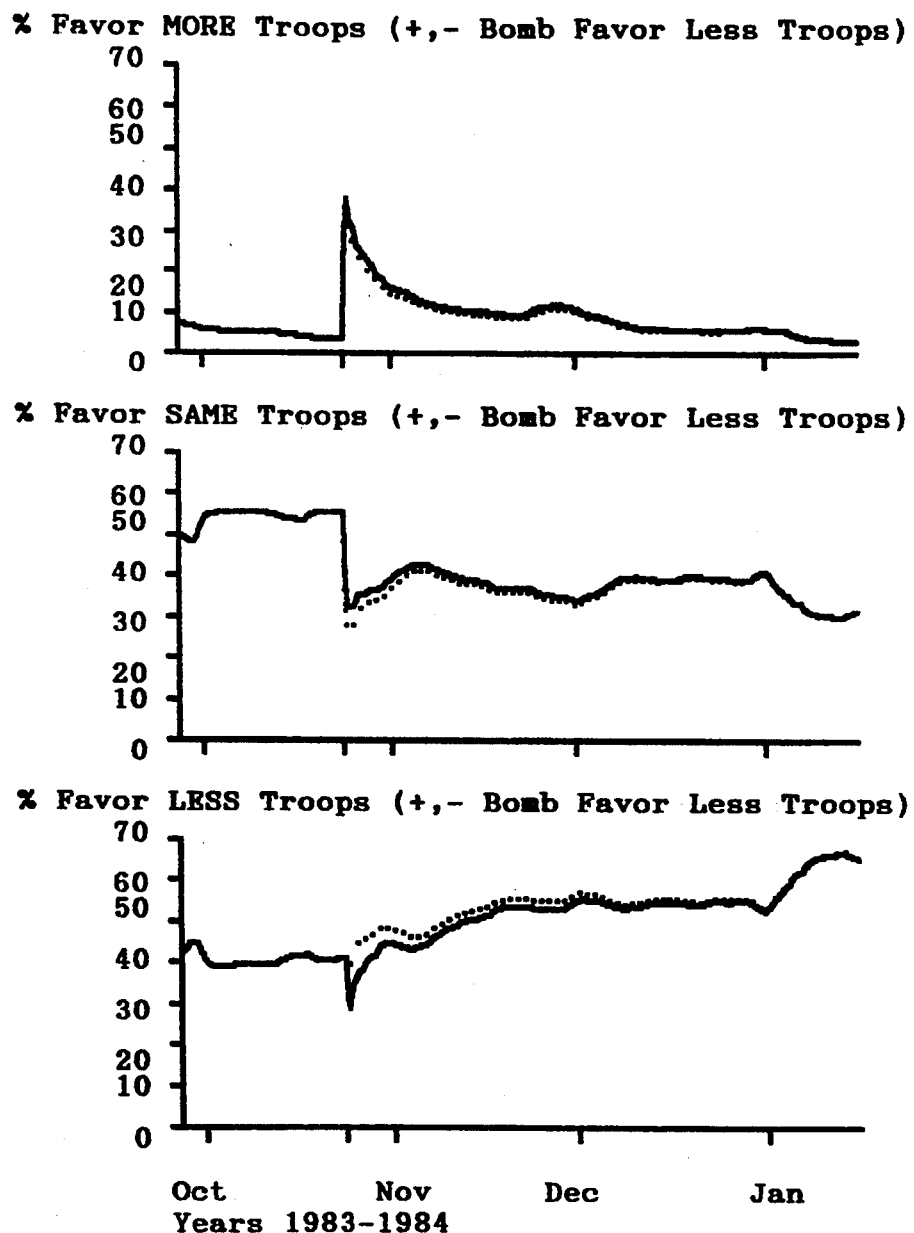
Figure 30:
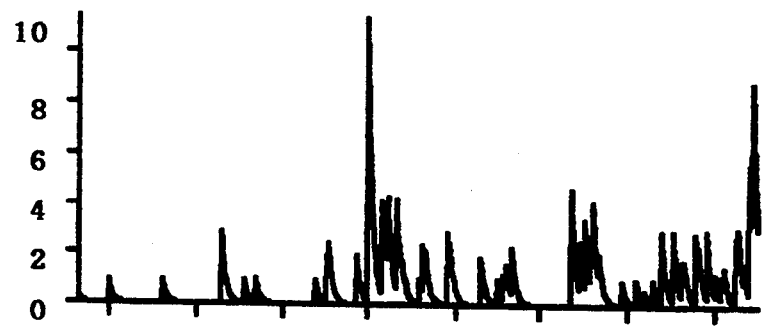
Figure 30:
Figure 30:
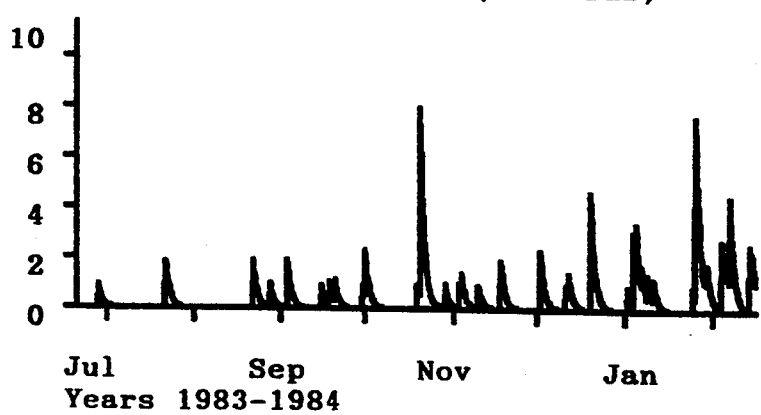
Figure 31:
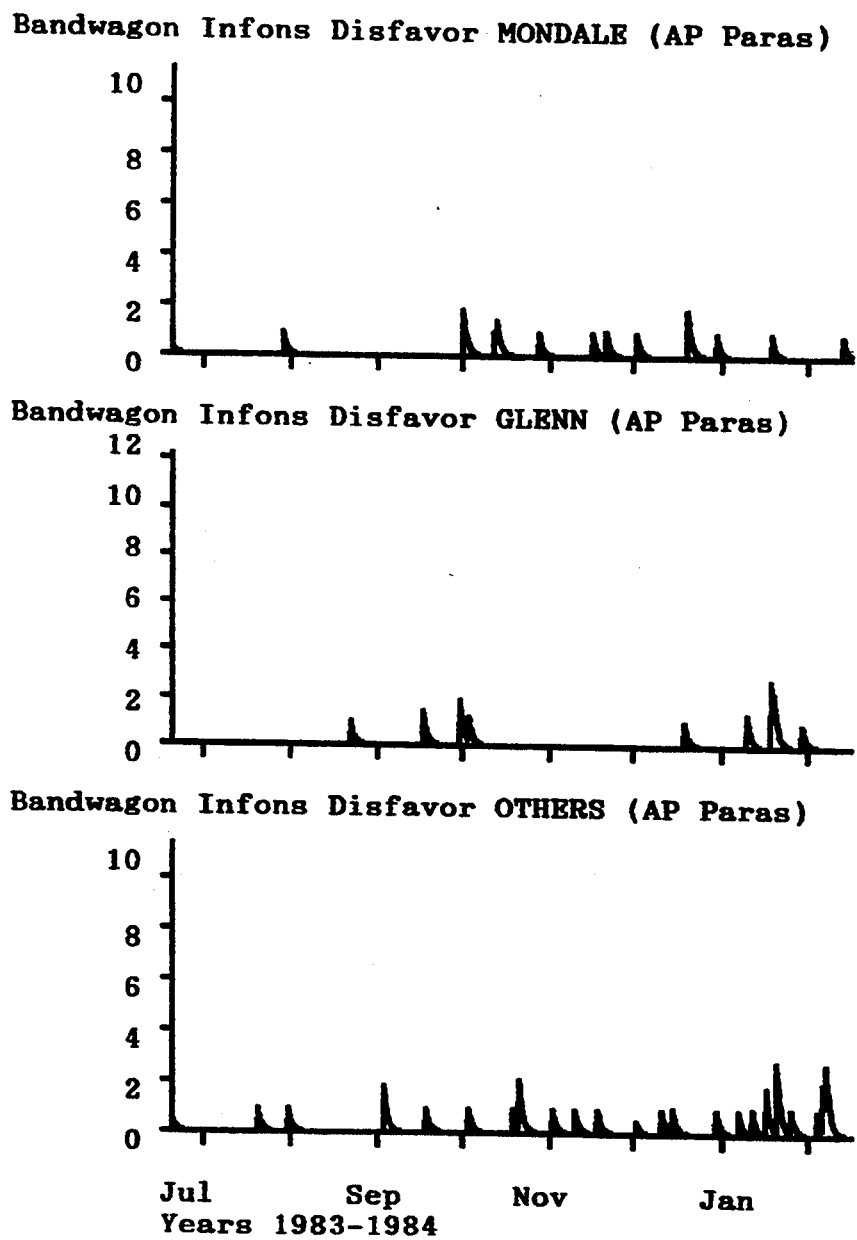
Figure 32:
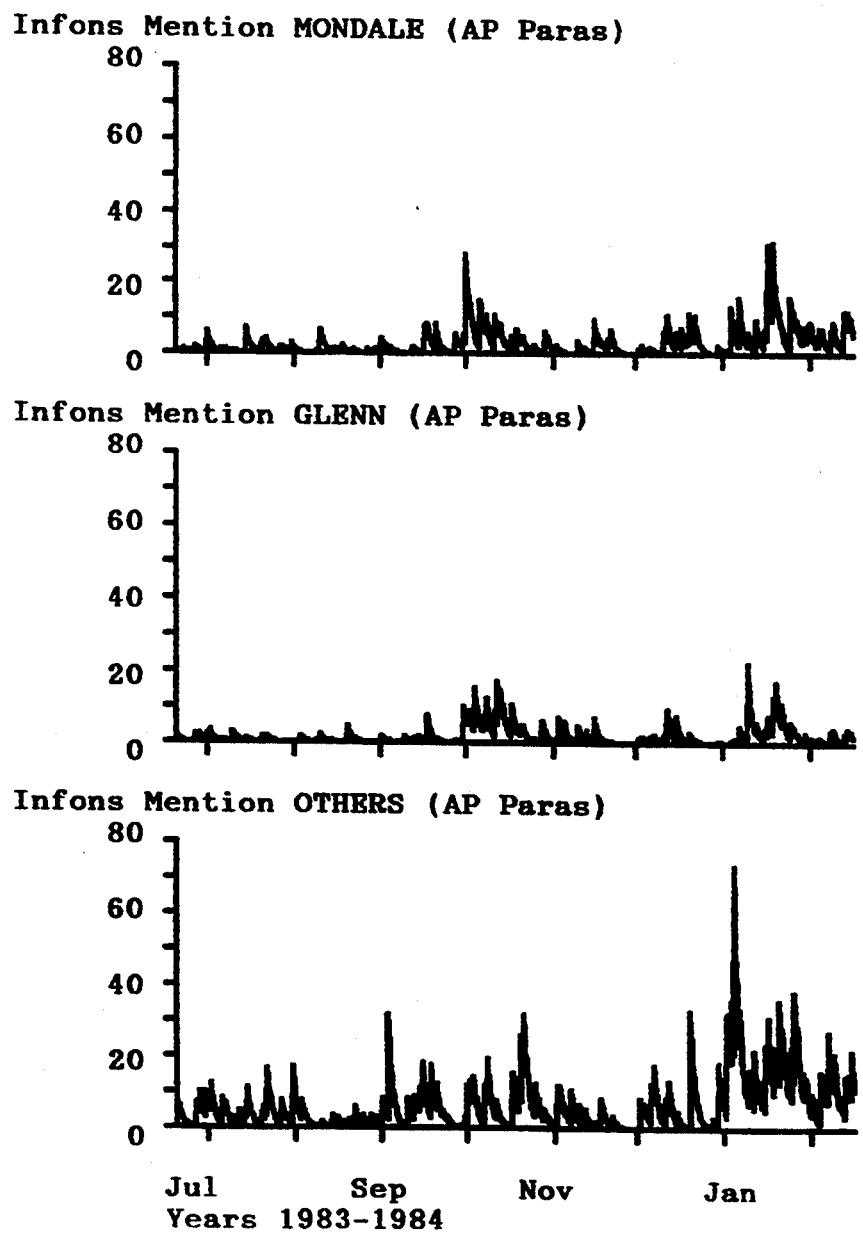
Figure 33:
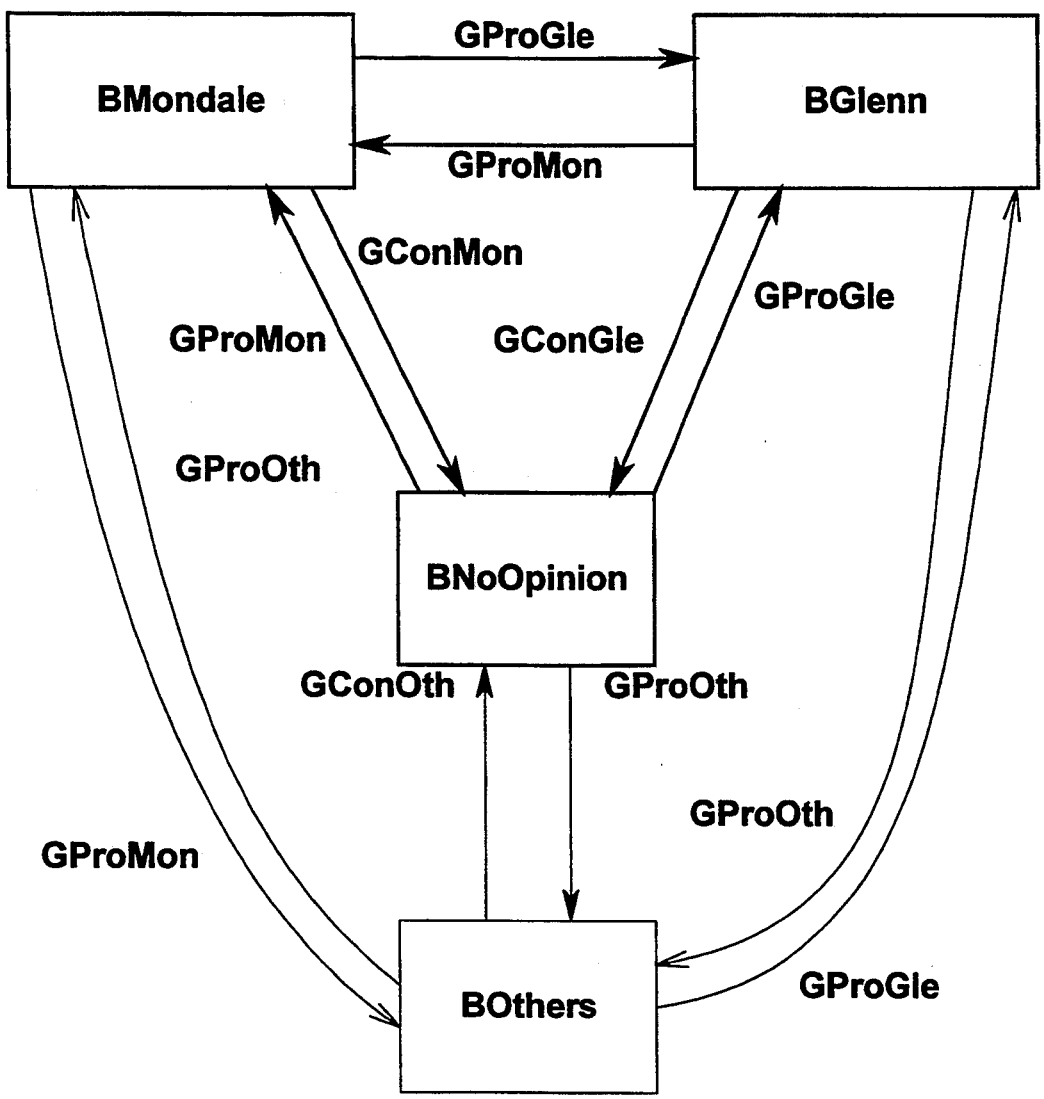
Figure 34:
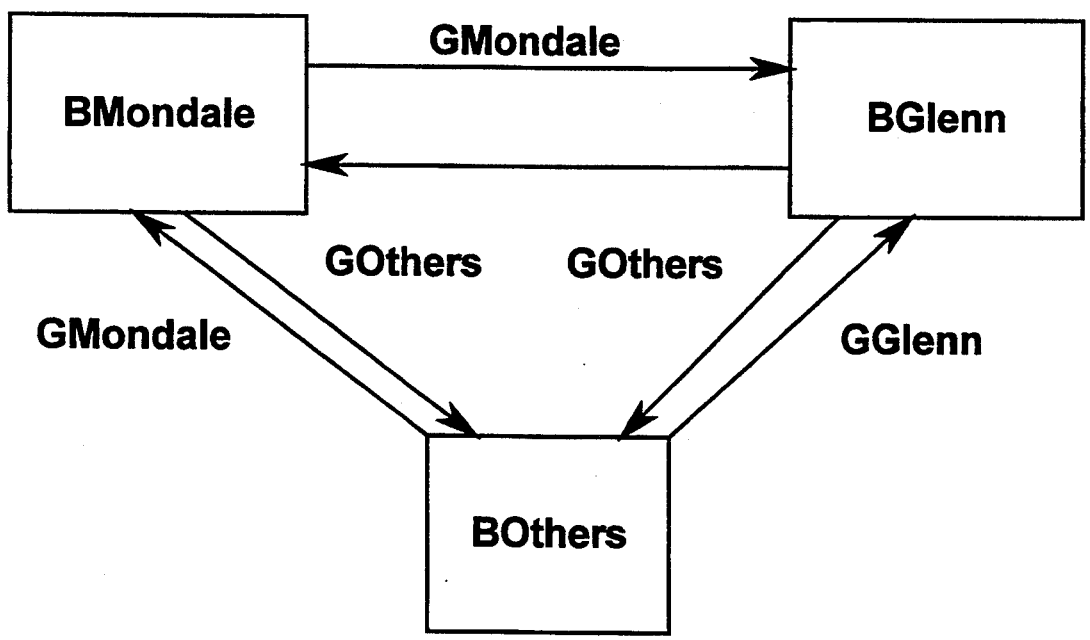
Figure 35:
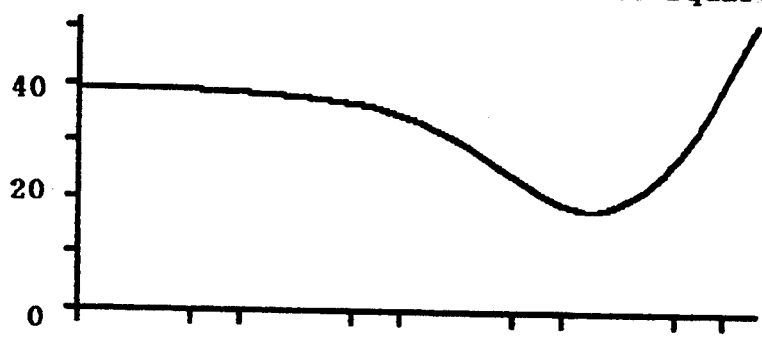
Figure 35:
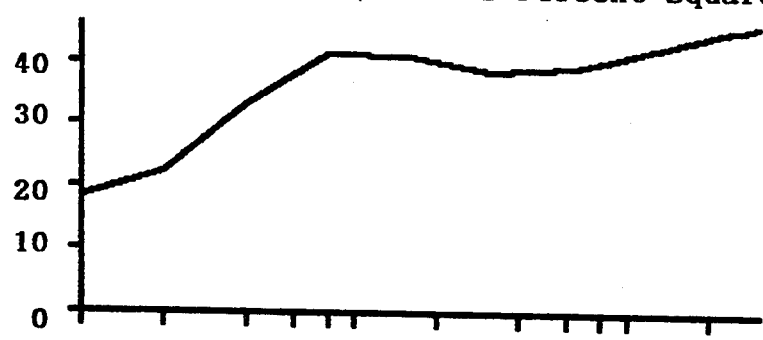
Figure 35:
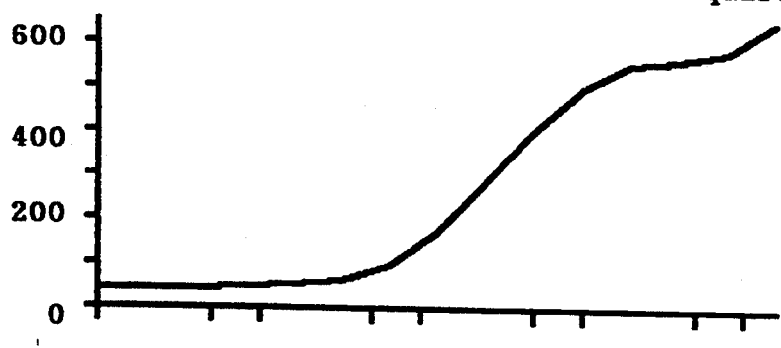
Figure 36:
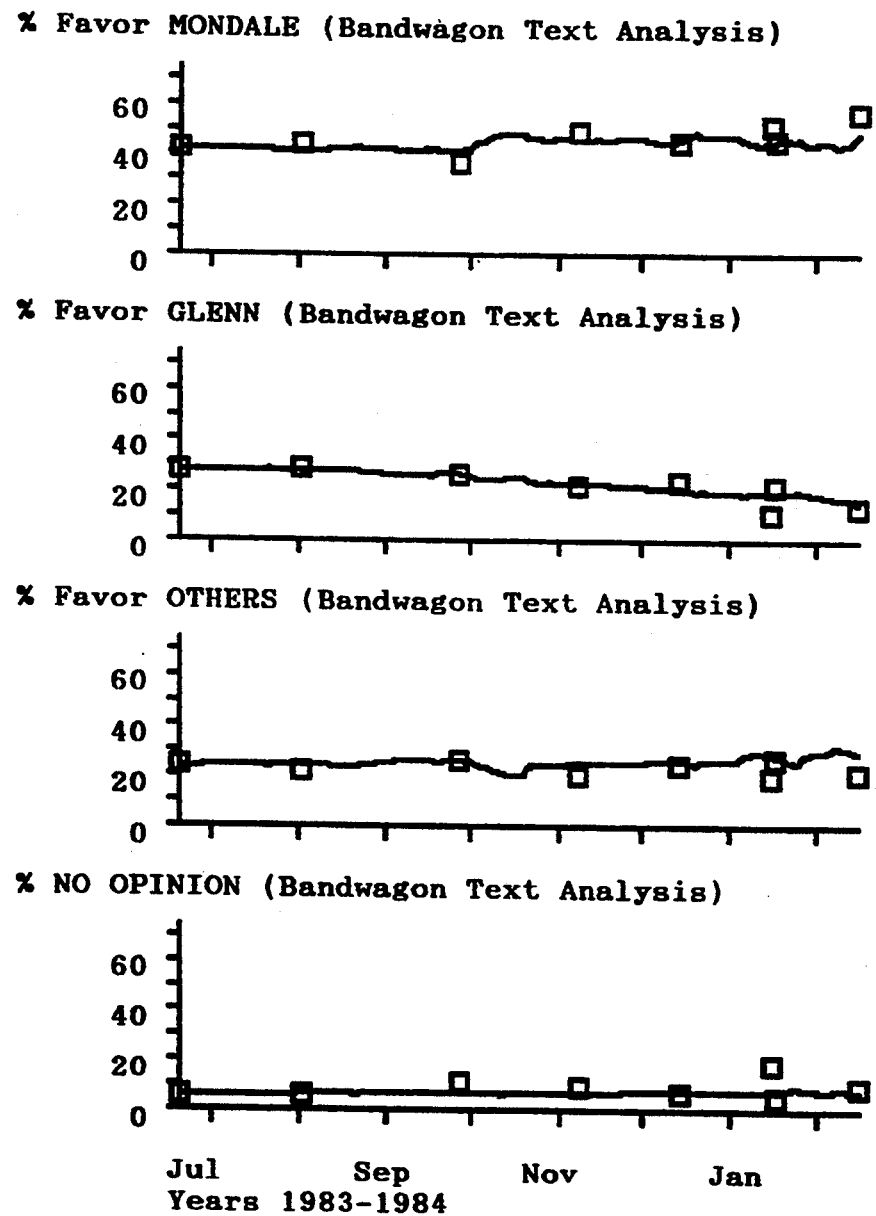
Figure 37:
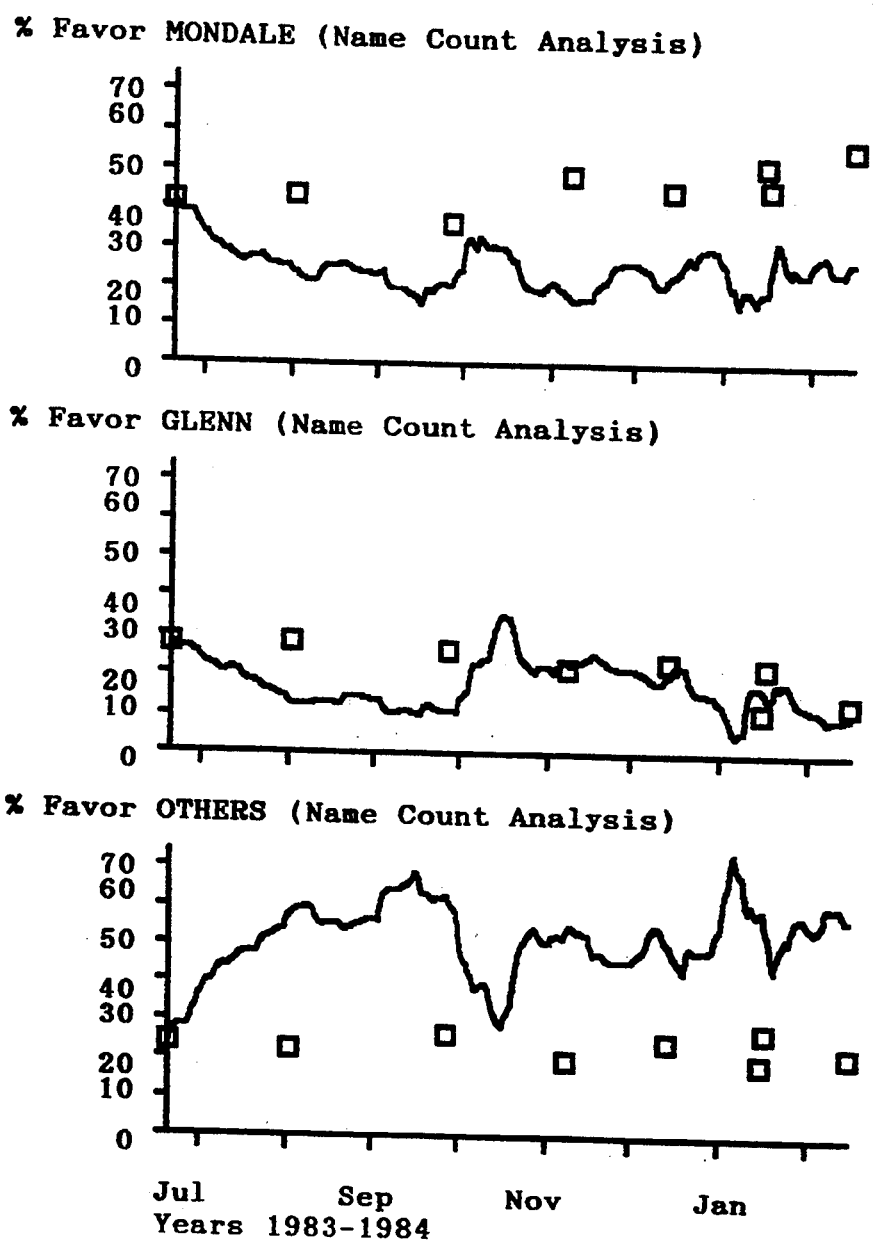
Figure 38:
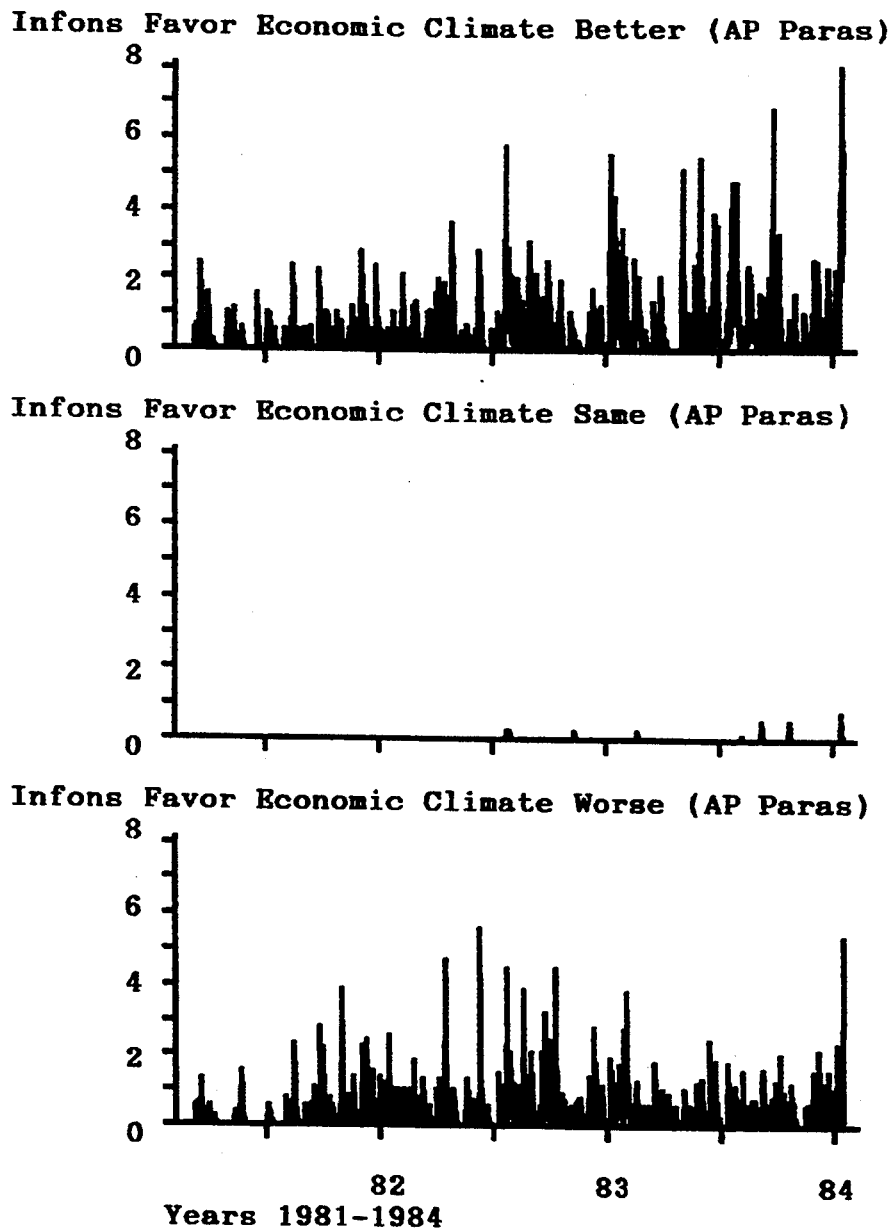
Figure 39:
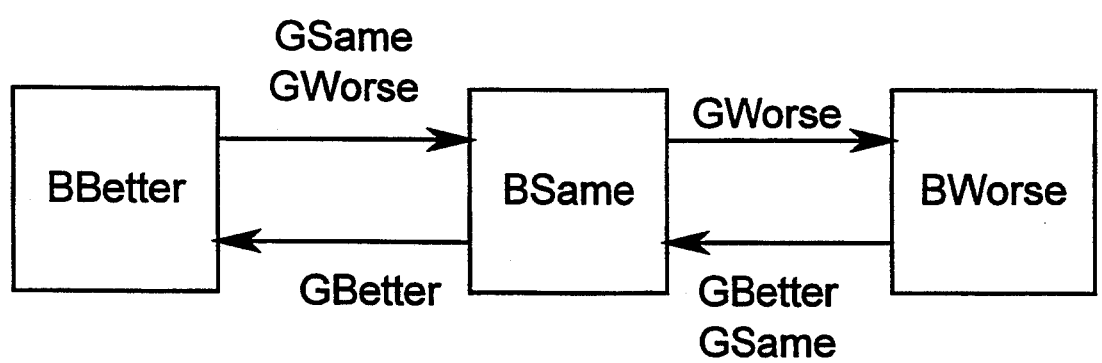
Figure 40:
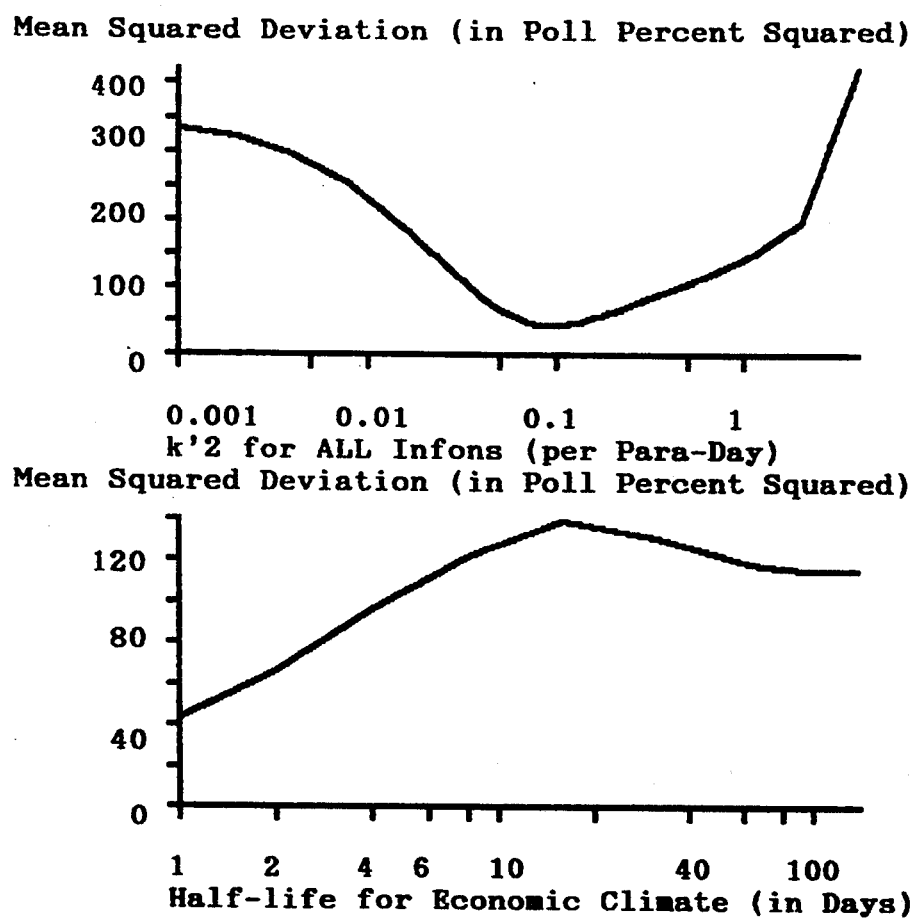
Figure 41:
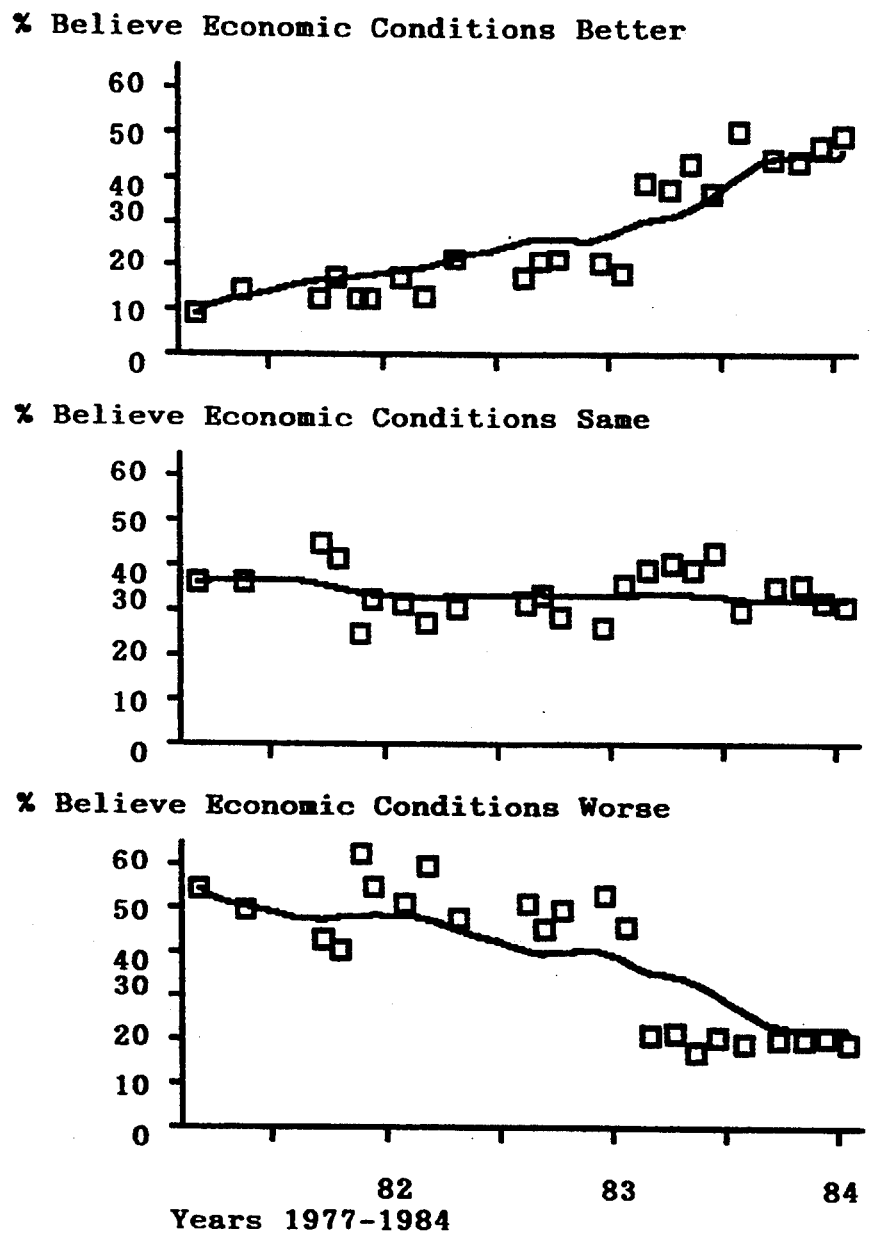
Figure 42:
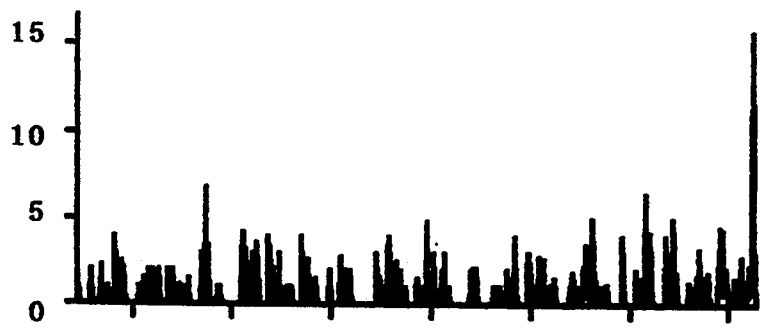
Figure 42:
Figure 42:
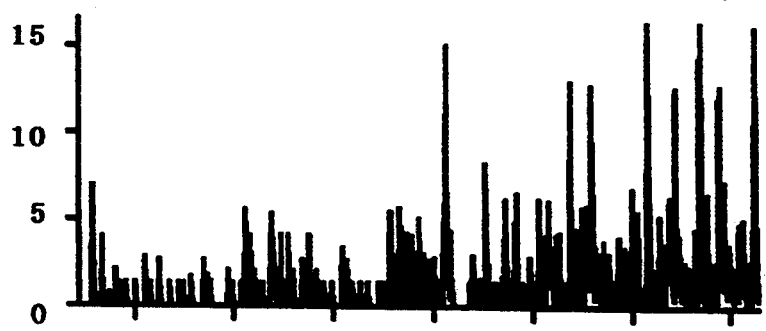
Figure 43:
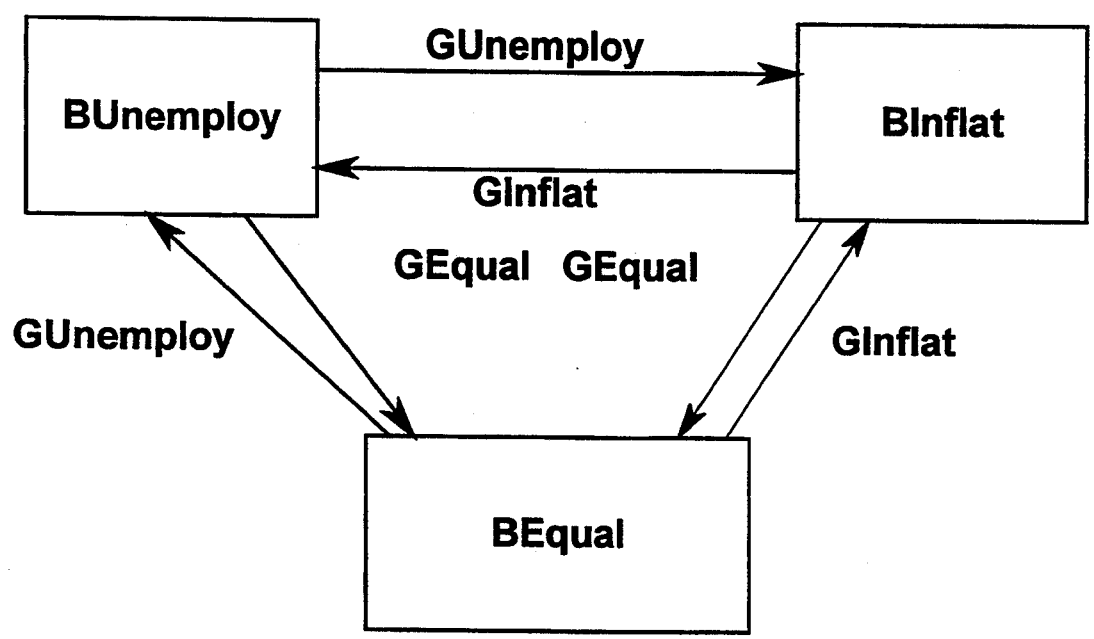
Figure 44:
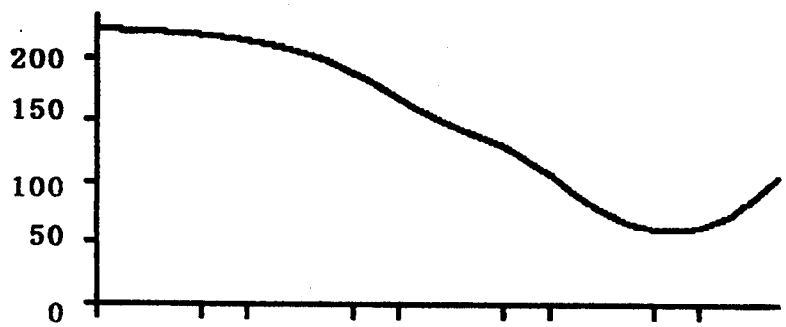
Figure 44:
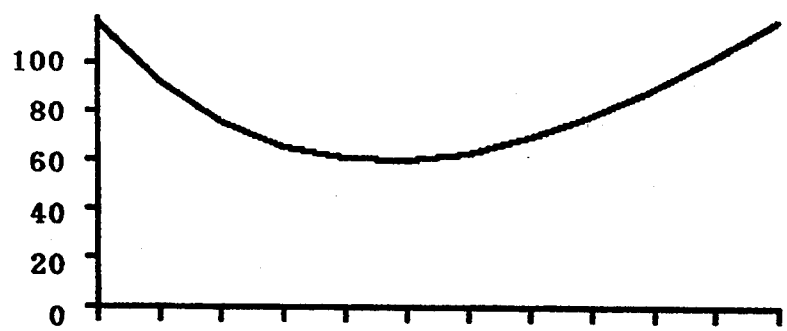
Figure 44:
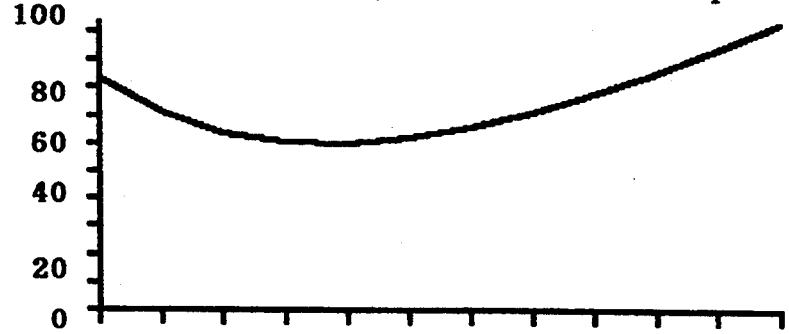
Figure 45:
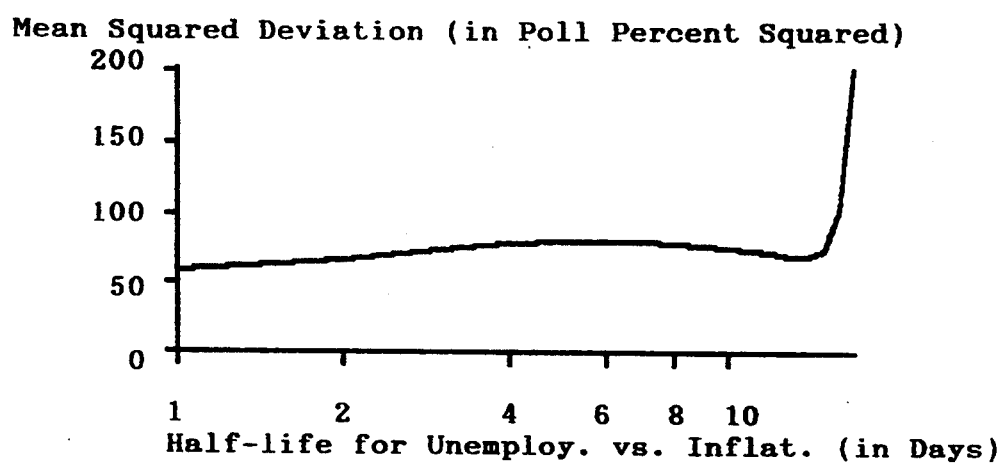
Figure 46:
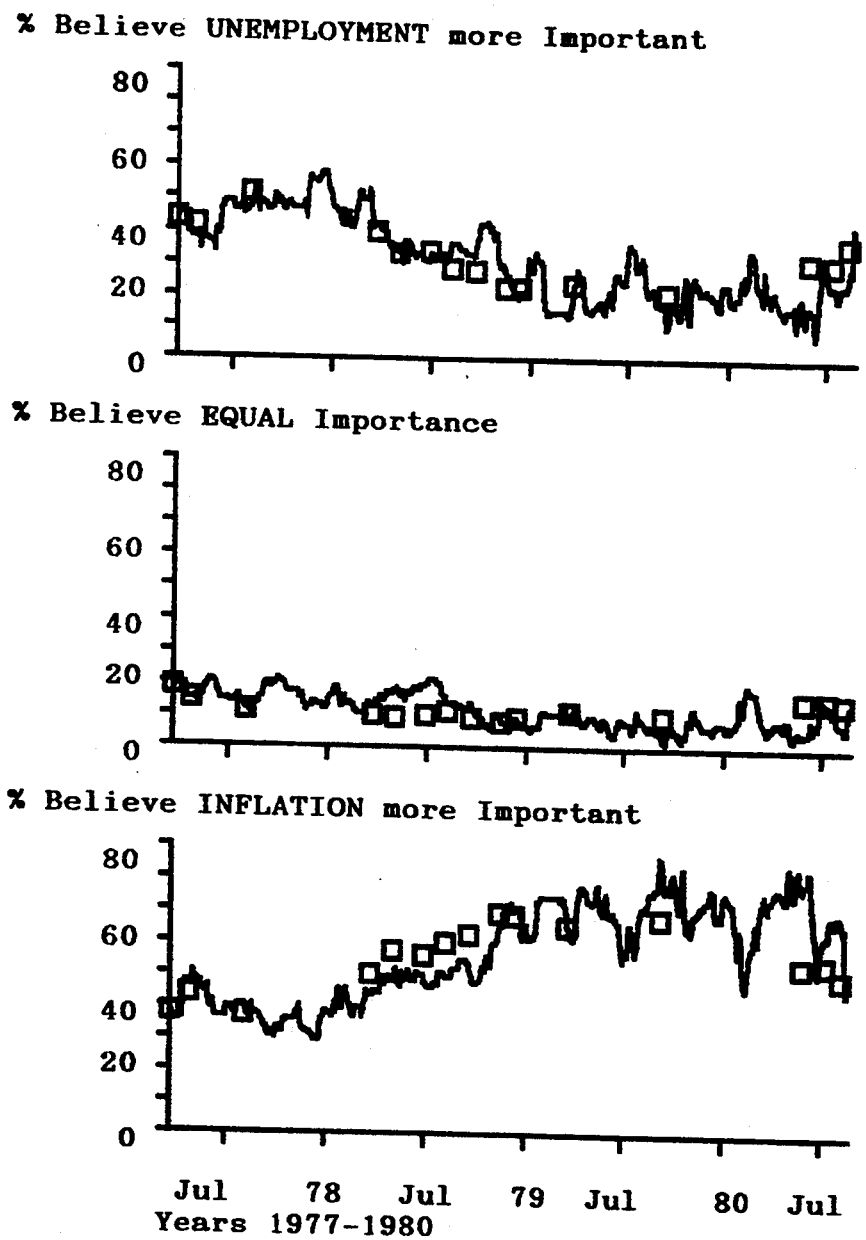
Figure 47:
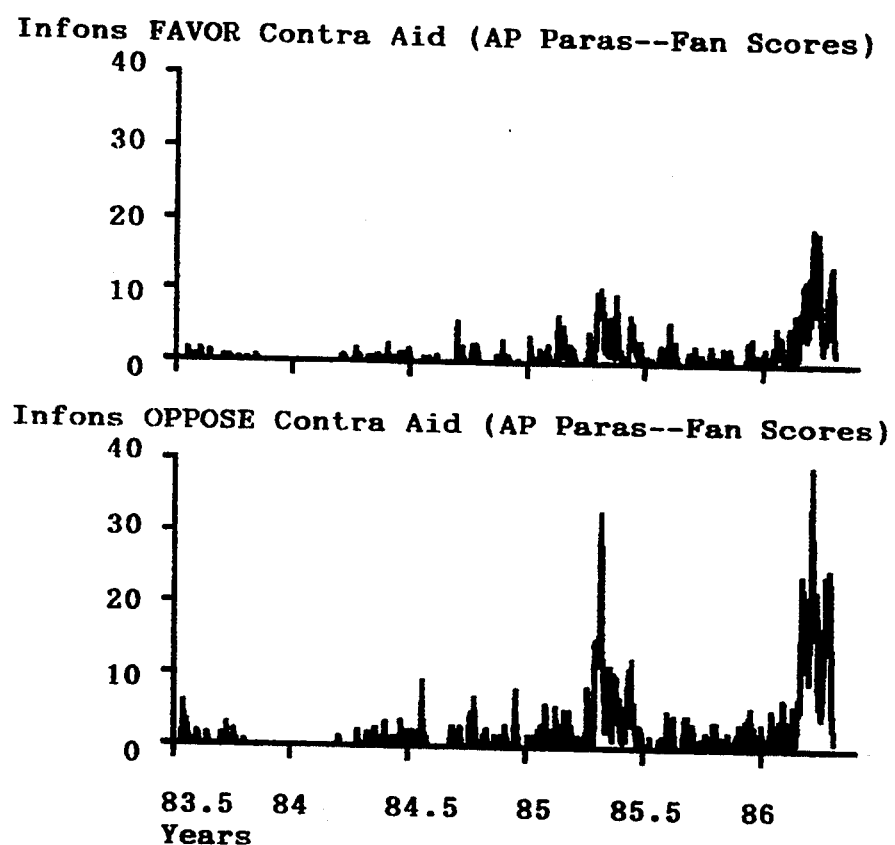
Figure 48:
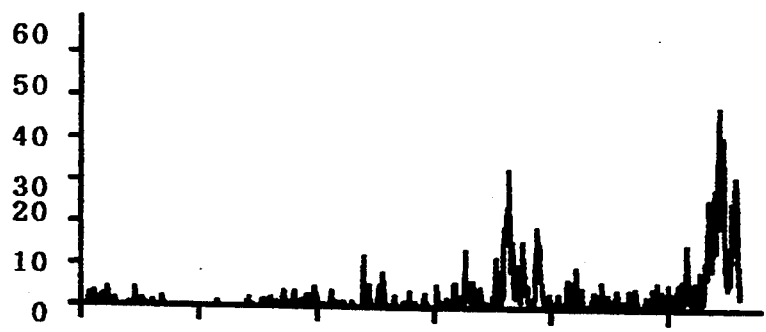
Figure 48:
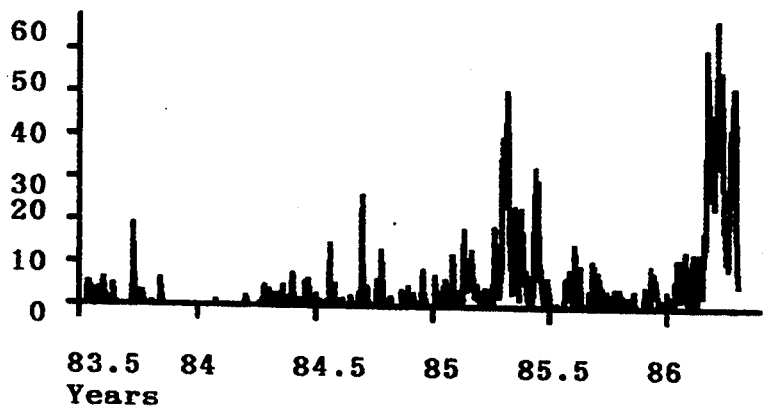
Figure 49:
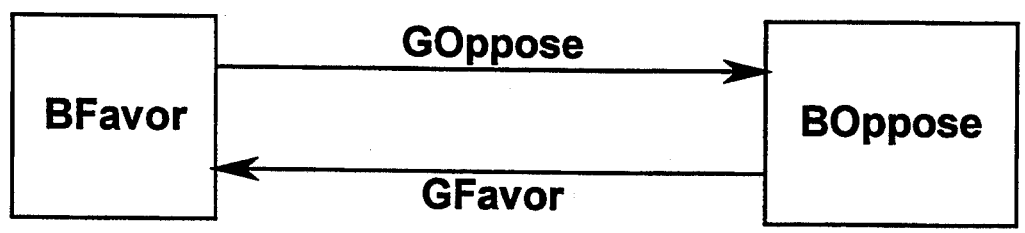
Figure 50:
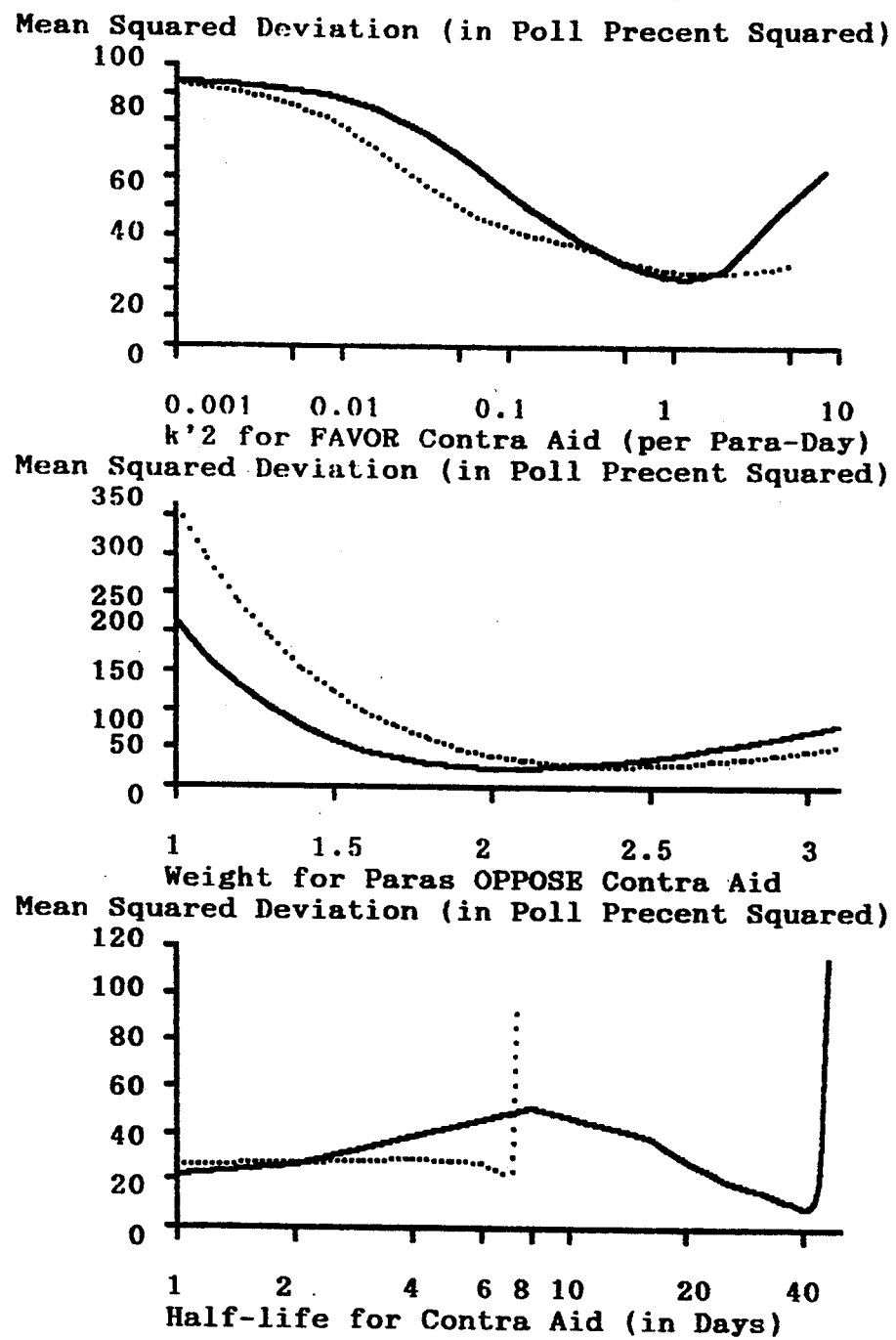
Figure 51:
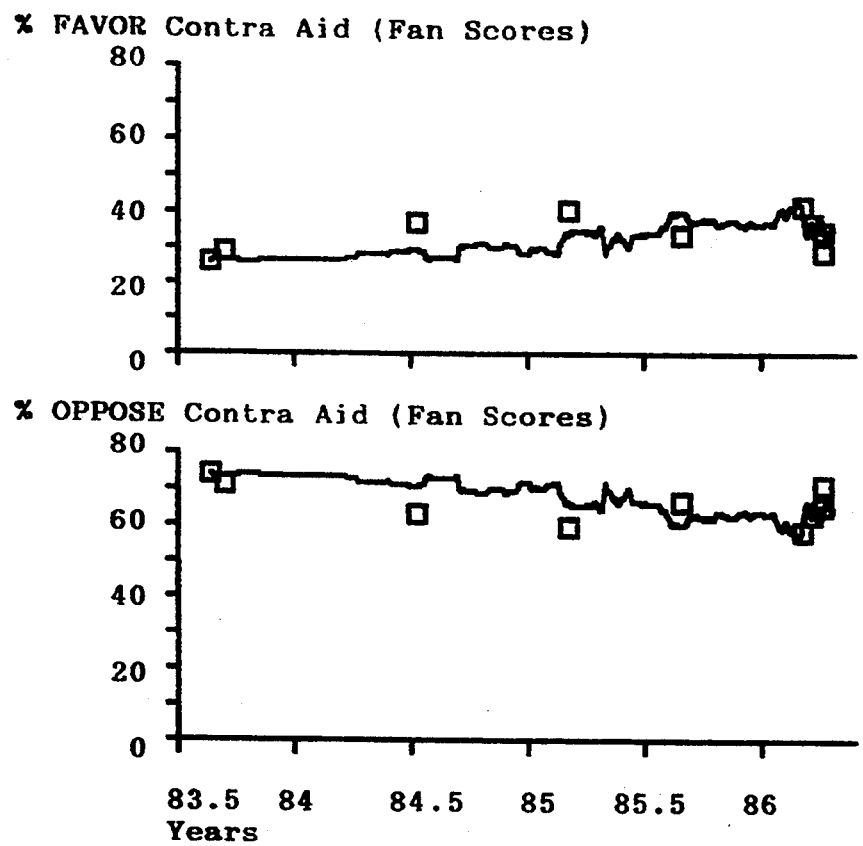
Figure 52:
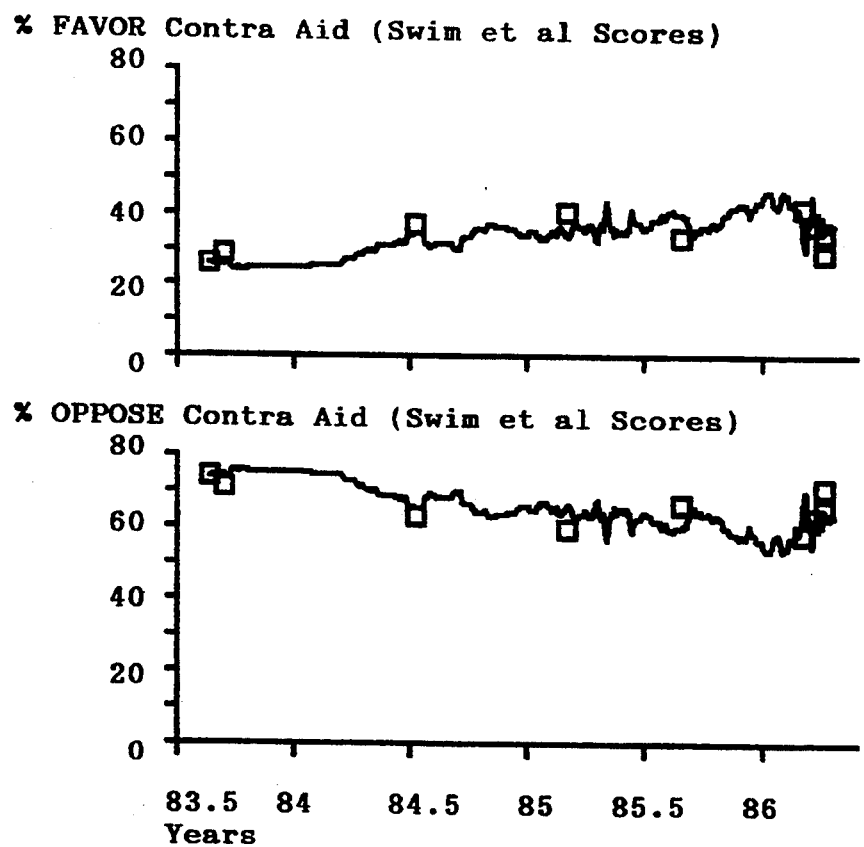

Both sets of scores were then used to compute persuasive force functions describing the time trends of the persuasive forces favoring each of the scored positions. For every position, a separate persuasive force function was computed. When there were three sets of scores, there were three functions favoring the same three positions of more, same and less spending (FIG. 5.1). Similarly, two sets of scores yielded two functions (FIG. 5.2). To compute these functions, a curve like that described in FIG. 1.1 (top frame, Chapter 1) was computed for each infon. Then all the functions for individual infons favoring the same position were added together as shown in FIG. 1.1 (bottom frame). The additivity meant that opinion reinforcement and information saturation were ignored (Chapter 1). When the resulting functions were plotted (FIGS. 5.1 and 5.2), the steep rises followed by the gradual declines in FIG. 1.1 were compressed into spikes due to the condensed time scale of 7 years. The separate sets of persuasive force functions belonging to the two sets of infon scores were used independently for opinion calculations.

For both sets of functions, it was assumed that AP dispatches could represent all the relevant information available to the the public, that all scores had the same weights, that the score for a position only contributed to the persuasive force for that position, and that the persistence constant had a one day half-life (see below). The major difference between the two sets of plots was the deletion of infons favoring same spending (FIG. 5.2) when that position was not scored. Most of those infons were partitioned between the upper and lower curves of FIG. 5.1.

To use the persuasive force functions, it was necessary to devise a population conversion model. This was already done for the defense spending analysis (FIG. 1.2). When used for infons scored for more, same and less spending, all three persuasive forces were used in the calculations. When the same model was applied to content scores for infons favoring only more and less spending, the persuasive force function favoring same spending was always zero.

The ideodynamic equations corresponding to the population conversion model were then written (Chapter 1 and Appendix A). To use these equations, it was first necessary to set their parameters: the persistence half-life, the modified persuasibility constant and any required refining weights. In initial trials, the refining weights were all set to 1.0 corresponding to the approximation that all infon content scores had the same weight. This was a safe strategy because the refining weights usually differed very little from 1.0.

To set the other constants, opinion time trends were calculated using arbitrary values for the persistence constant and the modified persuasibility constant. At each time corresponding to that of an actual poll, deviations were computed between calculated opinions and the actual values starting with the measured opinions at the time of the first poll (Chapter 1 and Appendix A, Equation A.14). The squares of these deviations were calculated for all poll values, and averaged to give the Mean Squared Deviation (MSD) (Appendix A). The chosen persistence and modified persuasibility constants were those giving the minimum MSD.

Refining weights different from 1.0 were only tested if the predictions were systematically high or low for one or more of the opinion positions. If a refining weight gave a significant improvement in the MSD, then the persistence and modified persuasibility constants were reoptimized for the new refining weight(s).

The final constants in this chapter were those giving the least MSD for all constants, unless otherwise stated.

Rather than simply computing the MSD for every set of trial constants, time trends of opinion projections resulting from a number of arbitrary values for the constants were typically plotted to examine qualitatively the consequences of increasing or decreasing particular constants. Based on these plots, it was clear that persistence half-lives much longer than a day usually meant that the population would have responded to media information more slowly than was actually found. Also, as the modified persuasibility constant increased, the fluctuation in opinion calculations became larger and larger around a general time trend. This result was expected since a larger persuasibility constant corresponds to more volatile issues with more people being persuaded for the same amount of information.

Given these qualitative observations, systematic trials for the persistence constant typically started with a one day half-life. Then, additional values were tested, increasing iteratively by factors of two until MSD 5 to 10 times the MSD at the one day half-life were reached. Test values for the persuasibility constant usually began with values very close to zero (e.g. 0.001 per AP paragraph per day) corresponding to a population being impervious to persuasion and then increased in two-fold steps beyond the value for which the minimum MSD was reached. In the region where different parameter values gave approximately the same MSD, values were tested on a finer linear scale between the two-fold jumps.

For all parameters, the MSD were plotted against trial values of the parameters (see optimization curves below). For these plots, the values for the other parameters where those giving the minimum MSD. In this way, the reader can assess the sensitivity of the MSD to changes in the trial parameters. Where the optimization curves are steep, in the range of a minimum, the MSD is very sensitive to parameter changes. Where the curves are shallow, wide variations in the parameters will have relatively small effects on the MSD. It is possible to read from the optimization curves the amount of permissible variation in a parameter before the MSD increased beyond the tolerance limits set by the analyst. The values discussed in the remainder of the chapter will refer to the values of the parameters at the minima of the optimization curves.

Turning away from general strategy and toward the specifics of the projections using infons scored for more, same and less spending, it was found that the optimal modified persuasibility constant was 0.6 per AP paragraph per day (see below). Expected opinion throughout the time period of message collection was calculated using this optimized constant, the initial poll values and the persuasive force curves in FIG. 5.1 computed using the best value for the persistence half-life, one day (Appendix A, Equations A.26 and A.29). The expected opinion is plotted together with actual poll data in FIG. 5.3.

The one day value for the optimal persistence half-life was found by plotting trial values for the half-life versus the MSD (FIG. 5.4, lower frame). This optimization plot shows that the MSD was still decreasing as the half-life was shortened to one day. It was conceivable that an even shorter half-life would have been appropriate. However, it seemed unreasonable to set the half-life much shorter than one day since there was at least that much ambiguity in the timing of the poll points and in the timing of the AP stories dispatches.

The optimization curve for the persistence constant (FIG. 5.4, lower frame), however, did show a second minimum over 100 days before a rapid increase above that time. The precise explanations for the steep rise at long half-lives are not clear.

The upper frame of FIG. 5.4 shows the optimization for the modified persuasibility constant. This constant clearly gives a single, well behaved minimum MSD at 0.6 per AP paragraph per day. Comparison of the projections in FIG. 5.3 with actual poll points did not indicate that scores favoring any position were either systematically too high or too low. Therefore, all refining weights were left at the value of 1.0 used for optimizing the persistence and modified persuasibility constants. These values meant that all infons were given the same weight.

For the projections of FIG. 5.3, only 692 of the 9314 identified dispatches were studied. It was conceivable that smaller samples could give estimates which were just as good. Therefore, the 692 stores were divided into approximately two equal, random subgroups of 325 and 383 dispatches each. Only 16 dispatches in one group were also present in the other. Using the modified persuasibility constant optimized above, opinions were recalculated using the two dispatch subsets (FIGS. 5.5 and 5.6). Not surprisingly, there were greater deviations between the predictions and the poll results with the smaller sample sizes. These differences could be seen quantitatively by the increase from 7.2 poll percent for the total dispatch set to 9.4% and 10.3% for the two subsets (Table 5.1).

Yet another projection was made to explore what would have happened to a subpopulation comprised only of those favoring more defense spending. Therefore, the full set of infons and the optimized modified persuasibility constant and uniform weights were used to remake the projections assuming that the initial population only had people supporting more spending (FIG. 5.7). The calculation showed that by three years later the subpopulation should have behaved much as the population as a whole.

This result was significant technically because it meant that there was no need to account for the statistical errors inherent to the first poll point. The calculations ultimately homed to the values dictated by the information structure. The calculations for late times were not adversely affected even by extremely inaccurate initial conditions (FIG. 5.7). If the errors in the initial poll point are not large, then the achievement of the proper values would have occurred much more rapidly.

So far, the discussion has concerned opinion calculations made from infons scored for the three positions of more same and less defense spending. In addition, projections were also made for infons scored only for more and less spending. For these projections the data were from all 692 dispatches (FIG. 5.8). The same modified persuasibility constant of 0.6 poll percent per AP paragraph per day was used for all infons so that the projections could be compared directly. Again, all scores were given the same weight. The RMSD was 8.3 poll percent for the two position model in contrast to the 7.2% for the three position model. Therefore, the two position scores gave slightly less good results than the three positions scores.

In the calculations from both the two and three position scores, the projected time trends of public opinion appeared to move in steps since the time between infons was usually large relative to the week during which an infon had its effect. This was reasonable since only 7% of the total identified dispatches were studied. On an expanded scale, each step would have had the shapes in FIG. 1.3. The steps were also much less tall because the modified persuasibility constant had a value over 3000 times smaller in FIGS. 5.3 and 5.5-5.8, than in FIG. 1.3.

Using infons scored for either two (FIG. 5.8) or three (FIG. 5.3) positions, the time courses for all three opinions favoring more, same and less spending followed quite well the main features of the actual poll data. The change was most dramatic for people favoring more spending. There was the dramatic rise in opinion from 1979-1980 and the equally impressive drop from 1981-1982. Both the timing and the magnitudes of the actual changes were mirrored in the calculated opinion.

Comparison of the poll projections (FIGS. 5.3, 5.5, 5.6, and 5.8) with the infon force curves (FIG. 5.1 and 5.2) showed that the rise in opinion favoring more defense spending in 1979 was due to the great increase in information favoring this position. During this time, however, there was no diminution in messages arguing for less spending. The subsequent drop in support for more spending was not due to the disappearance of messages favoring this idea. Rather there was a significant augmentation in messages from the opponents.

Besides permitting the calculation of the best modified persuasibilty constant, the optimization curve for this unknown (FIG. 5.4, upper frame) also shows that the projected values are much better than would have been predicted by the model that opinion had stayed constant throughout the polling period. The condition of no opinion change is equivalent to a very small value for the modified persuasibility constant. When this constant is zero, the population is completely resistant to information and will never undergo opinion change regardless of the presence of persuasive messages. Therefore, a very low modified persuasibility constant such as 0.001 per AP paragraph per day (FIG. 5.4) gave three almost unchanging opinion curves throughout the seven year period, flat plots corresponding to the curves in FIG. 5.3. From the optimization curve of FIG. 5.4, the MSD was over 250 poll percent squared for $k'_2=0.001$. The corresponding value of around 50 poll percent squared for the projection using the best persuasibility constant was less than 1/5 as large. This decrease in the MSD meant that the ideodynamic fit was much better than the model of no opinion change.

For comparison, 1000 simulations were made for predicted poll values drawn at random. For each simulation, the MSD was calculated for the differences between actual poll values and random poll points. The probability that the ideodynamic predictions were no better than chance were ascertained by counting the number of simulations among the 1000 where the MSD from random poll results was smaller than that from the ideodynamic predictions (right hand column of Table 5.1).

For completeness, square roots for the MSD (abbreviated as RMSD) were computed both for the random and ideodynamic estimates. The average value among the 1000 simulations is also given in Table 5.1 (second column).

Because there were 1000 independent draws, it was also possible to compute a standard deviation for the MSD, and from this standard deviation, the number of standard deviations from the random MSD to the ideodynamic estimate (Table 5.1, third column).

The chances that the calculated fit was no better than that obtained from random poll points were less than 0.001 (Table 5.1). Therefore, the ideodynamic projection is statistically much better than those obtained by either no opinion change or by a random choice of poll values.

It should be noted that both poll points and projected opinion values were correlated with each other as time proceeded since opinion at a later time was dependent to some extent on opinion at earlier times. Therefore, in the absence of simplifying approximations which are difficult to justify rigorously, it was inappropriate to calculate $r^2$ regressions requiring time independence for the poll values.

Ideodynamics postulates that the parameters in the opinion projection equations should be constant, changing very little over the time period of the calculations. If this is true and if language usage remained the same, then it should have been possible to extend the opinion projections to a later date simply by retrieving more AP dispatches and running the same programs under the conditions used for the studies from 1977 to 1984. To test this hypothesis, the Nexis data base was searched from Jan. 1, 1981 to Apr. 12, 1986 using the commands first employed for defense spending. From the 10,451 dispatches identified, 1067 were retrieved at random and analyzed using the same text analysis described above for the three positions favoring more, same and less spending.

The only change was a single alteration in the dictionary for the first filtration step. After 1984, the disease of acquired immune deficiency syndrome became much more prominent. Therefore, its synonym AIDS was found in a significant number of dispatches describing spending for defense against AIDS. Consequently, it was necessary to eliminate dispatches if they contained the word AIDS so this word was added to the dictionary in the first filtration together with the words "fund" and "aid." When any of these words appeared in a dispatch, the story was eliminated as being irrelevant to American military spending.

After the text analysis, 507 stories had non-zero scores for defense spending. This was about half the initial number of dispatches and was not very different from the 39% found in the analysis for stories from 1977-1984. Perhaps the 39% was a little low since text ceased to be collected whenever the reader felt that a story was unlikely to be about defense spending. Therefore, late mentions of defense spending would have been discarded in the first set of retrievals. This manual interference in the collection did not occur for the retrievals from 1981 to 1986.

Since neither set of retrievals included all possible stories, and since there was overlap between the two data sets, all paragraph scores were corrected to the expected value corresponding to all dispatches being collected. For instance, if only 1/10 of all dispatches were collected at random in a time period, all paragraph scores in that period would have been multiplied by 10. The persuasive force curves including these corrections are shown in FIG. 5.9. These data showed that there was very little change in the information structure from 1982 to 1986 with the ratios of information favoring the three positions staying relatively constant.

Based on these results, it was expected that opinion would also be quite stable. This was indeed the case both for projected and measured opinion (FIG. 5.10). Stability in the poll results could be seen even though there were fluctuations in the data from different polling organizations after 1982.

Despite this scatter, it seemed plausible that opinion favoring more spending might have been systematically overestimated after 1983. Therefore, a least squares optimization was performed over the entire time period from 1977 to 1986 to see if a better projection could be obtained by giving information favoring less spending a greater weight. From the optimization curve in FIG. 5.11, a weight of about 1.2 gave a marginally better fit to the poll points. Given the small effect of the weight (decrease in MSD of less than 1/20), none was used in the computations of FIG. 5.10.

One interesting result of this optimization is that the small improvement in the fit required a greater weight for data favoring less spending. That meant that information opposing more defense spending was more effective than information supporting more spending. Since many pro-spending infons came from the Reagan administration, the suggestion from FIGS. 5.10 and 5.11 was that a popular president and his administration was in fact less effective than the opposition in swaying public opinion, a result different from that obtained by Page and Shapiro (1984) and Page, et al. (1987).

One possible explanation for the underestimate in opinion favoring less defense spending was the presence of additional indirect information not included in the analyses described above. A good candidate seemed to be stories on waste, fraud and corruption by defense contractors. Therefore, additional dispatches were retrieved focusing on these topics and all paragraphs discussing these issues were scored as favoring less defense spending (Chapter 4). All these paragraphs were given the same weight as paragraphs directly supporting less defense spending and a persuasive force curve based on these waste and fraud infons alone was constructed using the usual one day half-life (FIG. 5.12, top frame). Inclusion of these extra infons in the opinion computations meant that their persuasive force curves were added to the persuasive force curve for infons directly advocating less spending (FIG. 5.9, bottom frame). Quick inspection shows that the waste and fraud infons (FIG. 5.12, top frame) were negligible when compared to the direct infons favoring less spending. Therefore, there was very little difference between the persuasive force curves with (FIG. 5.12, center frame) and without (FIG. 5.9, bottom frame) the added infons.

This sameness in persuasive force meant that there was very little difference between the opinion projections for more spending with and without considering waste and fraud (two lines in bottom frame, FIG. 5.12). Therefore, by taking into account all relevant information, an ideodynamic analysis was able to suggest that opinion on defense spending was not greatly influenced by information on waste and fraud. The only caveat to this interpretation was that the public might have weighted this information much more heavily than information directly speaking to the issue. Unfortunately, there was no direct method to test this possibility.

5.2 Opinion Predictions for Troops in Lebanon

The issue of troops in Lebanon was like defense spending topic in that opinion both increased and decreased significantly. As usual, opinion calculations began with the construction of infon persuasive force curves using AP dispatches scored for favoring more, same or less troops (Chapter 4). Then computations of poll percentages were made with only one modified persuasibility constant being the only variable parameter. Unfortunately, a good fit was not obtained. Examination of the projections suggested that two modifications could improve the calculations.

First of all, opinion favoring less troops seemed to be systematically underestimated so scores favoring this position were given a refining weight of 1.6 by least squares optimization. Persuasive force curves including this weight for scores opposing more troops and a weight of 1.0 for other infons are plotted in FIG. 5.13.

Furthermore, on Oct. 23, 1983 there was the unexpected explosion by a terrorist of a truck laden with explosives in the headquarters of the United States Marines in Beirut, Lebanon killing over 200 soldiers. It seemed reasonable to suppose that the population reacted viscerally to this report, feeling that some action was required, either putting more troops in or pulling the ones there out. Therefore, a new persuasive force curve was computed including 80 paragraph equivalents for information favoring more troops (FIG. 5.14, lower frame) and no paragraphs favoring troop removal. For reference, the persuasive force without this truck bombing infon is replotted from FIG. 5.13 (top frame).

One difference between the plots of FIGS. 5.13 and 5.14 is the beginning time for the curves. FIG. 5.13 illustrates the fact that data retrievals always began at least 6 months before the date of the first poll date unless that was before Jan. 1, 1977, the beginning date of the Nexis data base for the AP. This was to assure that the residual effects of prior messages was included in the opinion calculations.

For the persuasive force curves described above, the universal persistence half-life of one day was used.

The opinion computations themselves then required the formulation of a population conversion model. Among these, the best for troops in Lebanon was a "direct conversion model" (FIG. 5.15) where individuals could move directly from any one subpopulation to another without passing through any intermediate subgroups, however transiently.

As was standard practice, the persuasive force curves in FIGS. 5.13 and 5.14 were calculated using constants optimized by minimum MSD. These constants included the modified persuasibility constant, the weight for scores favoring less troops (FIG. 5.16), and the persistence constant (FIG. 5.17).

The effect of news of the truck bombing on Oct. 23, 1983 was modeled by injecting artificially, on that date, two infons of unknown magnitude, a truck bombing infon supporting more troops and a truck bombing infon favoring less troops. The persuasive force curves for these two infons were assumed to be characterized by the same one day persistence. For comparability, the content scores for these truck bombing infons were given in AP paragraph equivalents.

While the optimization for the truck bombing infon favoring more troops showed a marked improvement at a value of 80 AP paragraph equivalents (FIG. 5.16, lowest frame), there was no need even to invoke a truck bombing infon favoring troop withdrawal since the optimization showed that the fit did not improve significantly as more paragraphs were added up to about 40 AP paragraph equivalents (FIG. 5.17 lower frame). As the number of paragraphs increased above this number, the fit got appreciably worse.

As for defense spending, the optimization for the persistence constant showed two minima, one with a one day half-life and one with a 14 day half- life (FIG. 5.17, upper frame). As argued, for defense spending, the lower minimum corresponding to a one day half-life was the chosen because it seemed unreasonable to have a yet shorter half-life.

The poll data from October 23 were omitted from the optimization calculations since that was on the date of the truck bombing infon. Given the rapid changes in the infon and poll data, accurate projections on this date would have required that the infons and poll values be assigned to specific hours, an impossible task given the uncertainties in the timing of both the infons and poll itself.

Examination of the opinion projection patterns shows that one of the largest effects was due to the introduction of the October 23 truck bombing infon. Without this infon, there would have been little opinion change during the entire polling period, in disagreement with the poll data (FIG. 5.18). Once the infon was introduced, opinion fit quite well (FIG. 5.19).

Comparisons of projections with and without the truck bombing infon favoring more troops (FIG. 5.20) showed that this infon did have a very large effect immediately after October 23. However, within a couple of months, the effect was effectively dissipated with new opinion reflecting AP information at later times. This result is like that in FIG. 5.7 for defense spending where opinion moved more gradually to conform with the information structure.

As discussed above, there was no need to postulate any truck bombing infons favoring fewer troops. That was because there was already a large amount of information favoring fewer troops (FIG. 5.21, top frame). The introduction of 40 more paragraphs on October 23 did not significantly change the shape of the persuasive force curve favoring less troops (FIG. 5.21, lower frame). Therefore, there was also little effect on the opinion calculations (FIG. 5.22). This result is quite like that for stories on waste and fraud for defense spending where the additional news was insignificant compared with other infons supporting less spending.

In contrast, the truck bombing infon favoring more troops had a very large impact (FIG. 5.20) because there was very little other news in favor of that position (FIG. 5.14).

The improved fit by the addition of the truck bombing infon was manifested both by visual inspection of the opinion projections (FIG. 5.19) and the by the RMSD (3.5% with the infon and 9.1% without, Table 5.1). Table 5.1 (right hand column) also shows that the best projection had a probability less than 0.001 of being found by chance.

5.3 Opinion Predictions for the Democratic Primary

Besides being able to model policy issues, ideodynamics was also applicable to electoral situations such as the Democratic primary of 1984. The dispatches for this topic were scored both by the proximity of bandwagon words to candidate names and by a count of the candidate names (Chapter 4). Therefore persuasive force curves were computed for both analyses. The bandwagon analysis yielded curves both favoring and disadvantaging Mondale, Glenn or Others (FIGS. 5.23 and 5.24) while only infons mentioning the three candidates were computed in the name count analysis (FIG. 5.25).

All scores were given the see weight of 1.0 and the persistence constant had a one day half-life.

The first study used the bandwagon content analysis. Since the persuasive force curves for this analysis both favored and disadvantaged all three groups of candidates, neither the sequential conversion model model (FIGS. 1.2) nor the direction conversion model (FIG. 5.15) was appropriate.

Instead, a mixture (FIG. 5.26) of both models was used. This model was unique among the models in this book in including persons with No Opinion. In other models, these persons were ignored, equivalent to the approximation that most of them stayed uninvolved with the majority of the opinion changes being among those who already had an opinion. However, for the Democratic primary, it seemed unreasonable that information unfavorable to a candidate would cause a supporter to favor any one of the other candidates. Rather, it seemed more plausible that the conversion would be to Undecided or No Opinion. Therefore, this category was included for the bandwagon analysis. Information actually favoring a candidate was presumed to be able to draw recruits from any other subgroup.

This model had features of both the direct and sequential conversion models. A person favoring a particular candidate could be convinced to favor another, either directly or by first becoming disenchanted and moving temporarily into the undecided pool.

When content scores from the name count analysis were used, there was no information disfavoring a candidate and hence favoring No Opinion. Therefore, the same approximation was made as for the other studies in this book. That is, the No Opinion subpopulation was assumed to consist of people who were unconcerned about the issue and were not responsive to information about the campaign. Consequently, all persons with an opinion were normalized to 100%. As noted earlier, the inclusion or exclusion of the No Opinions was not crucial to the final curves since they only comprised around 10% of the total population at maximum.

With the exclusion of the No Opinions, the direct conversion model used for troops in Lebanon (FIG. 5.15) was the most reasonable (FIG. 5.27) since it could not be argued that support for any candidate should be preceded by support for another.

For the opinion projections for the bandwagon analysis, the persuasive force curves (FIGS. 5.23 and 5.24) were constructed using the persistence half-life of one day and the same weight for all scores. The remaining unknown was the modified persuasibility constant. Both the persistence and modified persuasibility constants were fixed by least squares optimization (FIG. 5.28, top two frames) using the population conversion model of FIG. 5.26. The best modified persuasibility constant was 1.5 per AP paragraph. The actual poll projections using the optimized constants from FIG. 5.28 showed a reasonable fit (FIG. 5.29) with the most dramatic change being the decrease of almost two-fold in support for Glenn.

For comparability, the same persuasibility constant was used to compute the poll projections using the name count analysis. These calculations were based on the persuasive force curves of FIG. 5.25 and the model of FIG. 5.27. The projections (FIG. 5.30) were obviously unsatisfactory. This is seen in the RMSD of 23.2%, over five times greater than the RMSD for the bandwagon analysis (Table 5.1). In fact, when an optimization was performed to choose the best modified persuasibility constant for the name count analysis, it was found that no improvements were possible beyond the situation of no opinion change corresponding to the modified persuasibility constant having a value close to zero (FIG. 5.28, bottom frame).

The persuasive force curves of FIG. 5.25 give the reason for the inaccuracy. At essentially all times, there was a large excess of name mentions for the minor candidates (bottom frame) as compared to the two front runners. The actual numbers for the name counts is given in Table 5.2. For example, Jesse Jackson was discussed in the news at a frequency (20%) between that of Glenn (17%) and Mondale (27%) due in large part to his efforts to free a naval flier downed in Lebanon. Cranston's name mention of 13% was not far behind that of Glenn due, principally, to his advocacy of a nuclear freeze.

In fact, this excess in the mention of minor candidates was seen throughout the polling period. Therefore, the model predicted a net movement away from both major candidates toward the minor ones. This was seen in the projected drop in support for both Glenn and Mondale with the accompanying rise in the calculated popularity of the Others (FIG. 5.30). Since the projected drop for Glenn was accompanied by the wrong movements in the other two curves (FIG. 5.30), this fit was fortuitous.

From the optimizations for the bandwagon analysis, the proper choice for the modified persuasibility constant gave an MSD over two-fold better than the estimate from a very small modified persuasibllity constant equivalent to no change in public opinion. This improvement was less than that for defense spending (five-fold) and troops in Lebanon (ten-fold). However, it was unreasonable to expect as much improvement because the poll values changed much more for those others examples so it was less appropriate for them to be approximated by no opinion change during the polling period. Since the polls changed much less for the Democratic primary, an estimate of no opinion change gave a much better fit. Nevertheless, this two-fold increase was substantial. The chances of obtaining such a good fit by chance was less than 0.001 (Table 5.1).

The projection using the name count analysis was quite unsatisfactory. As mentioned above, the MSD of 540 was substantially worse than the prediction of no opinion change (MSD of 39). Indeed, the estimate was so bad that it could be obtained 34% of the time from random poll points (Table 5.1).

5.4 Opinion Predictions for the Economic Climate

The economic climate was the first of two economic issues studied. As for defense spending and the Democratic primary, there was no need to make any adjustments by weighting the infon content scores from Chapter 4. The persuasive force curves for this issue (FIG. 5.31) were computed using the usual one day persistence half-life.

For this topic both the direct (FIGS. 5.15 and 5.27) and sequential (FIG. 1.2) conversion models were tried. Among these, the sequential conversion model was better (FIG. 5.32).

With all infons weighted the same, the persistence constant (FIG. 5.33, lower frame) and the common modified persuasibility constant (FIG. 5.33 upper frame) were both set by least squares optimization. This procedure led to an improvement in the MSD of approximately 10 times over the estimate from no opinion change as would be expected from a poll series where the opinion values did vary significantly from the initial value. This is seen in the projections curves (FIG. 5.34). As with all other satisfactory computations, the probability of such a fit by chance was less than 0.001 (Table 5.1).

5.5 Opinion Predictions for Unemployment versus Inflation

The second economic topic was unemployment versus inflation. This issue was like that for troops in Lebanon in that it was necessary to give different infon scores different weights. By least squares optimization it was found that scores favoring the importance of inflation should have had a weight of 1.4 while those favoring equal importance should have had a weight of 0.5. The remaining infon group supporting the importance of unemployment had the reference weight of 1.0. Least squares optimization was also used to give an optimal persistence constant with a one day half-life. The persuasive force curves reflecting these constants are presented in FIG. 5.35.

As for the other examples where the poll positions ranged from one extreme through the middle to the other, it was possible to test both the direct and sequential conversion models for population conversion. Of these the best was the direct conversion model (FIG. 5.36).

Least squares optimizations were used to determine the best values for all constants used in the construction of the persuasive force functions and the modified persuasibility constant for the reference infons favoring importance of unemployment (FIGS. 5.37 and 5.38). Opinion projections were then made using the optimized constants (FIG. 5.39). With the large opinion changes during the polling period, the estimate of no opinion change was so poor that the ideodynamic calculation could give an improvement in the MSD of four to five fold (FIG. 5.37, top frame). For this analysis also, there was a probability of less than 0.001 that the fit could have been obtained by random poll points (Table 5.1).

5.6 Opinion Predictions for Contra Aid

Contra aid was the only study in this book where opinion was fairly static during the time period of the study. The text analysis for Contra aid was unique, having been performed separately both by Fan and by three graduate research assistants (Swim et al. in Chapter 4). Therefore, there were two sets of infon scores (FIGS. 5.40. and 5.41). Although Swim et al. gave scores to about twice as many paragraphs as Fan, the two sets of scores revealed essentially the same overall information structure. For both sets of scores, least square optimizations showed that infons opposing aid needed to have a much greater weight than infons favoring aid. The optimized weights were similar, being 2.0 for the Fan scores and 2.4 for the Swim et al. scores. Also, optimization of the persistence constant gave the best half-lives with values greater than one day for both infon sets (see below). However, the one day half-life was satisfactory so that was the value used for calculating the persuasive force curves (FIGS. 5.40 and 5.41).

Since there were only two positions, the only reasonable population conversion model was that opinion favoring one side could convert people favoring the other (FIG. 5.42). This was obviously the degenerate case where the direct and sequential conversion models collapsed into the same model.

As with all other examples studied (FIG. 5.4, lower frame; FIG. 5.17, upper frame; FIG. 5.28, center frame; FIG. 5.33, lower frame; and FIG. 5.38), the optimization for the persistence constant for Contra aid had two minima, one at a one day half-life and the other ranging from seven to over 100 days. Since the one day minimum was common to all six issues it was used as the consensus value for a universal persistence constant for all issues.

The one day half-life was certainly reasonable since this was also the lowest minimum for the five examples besides Contra aid. It was also more reasonable to set the persistence constant for the other five issues for which the information structure and opinion both changed significantly. For Contra aid, there was little change in either opinion (Appendix B, Table B.6) or the ratio of favorable to unfavorable information (FIGS. 5.40 and 5.41). Therefore, much of any fit in the persistence constant could have been to errors in the opinion polls.

Having justified the use of a one day universal persistence constant based on six independent optimizations for six different topics, the final opinion projections used this half-life. These projections used refining weights of 2.0 and 2.4 for infons favoring less aid for the Fan and Swim et al. infons, respectively. These weights were optimized by minimizing the MSD (FIG. 5.43, center frame). The final curves (FIGS. 5.44 and 5.45) showed relatively little change in opinion during the entire three year period once the modified persuasibility constant was also set by least square optimization (FIG. 5.43, top frame). Nevertheless, there was a substantial improvement in the fit over projections of almost no change at all after the first poll point since the MSD was over three-fold lower than that at 0.001 per AP paragraph per day for the modified persuasibility constant. The probability having of the quality of fit shown in FIGS. 5.44 and 5.45 by chance alone were again less than 0.001 (Table 5.1).

It was gratifying to find that two quite different text analyses could both give essentially indistinguishable opinion projections (FIGS. 5.44 and 5.45). This result is not surprising since both analyses showed that there were the same approximate ratios of infons favoring and opposing Contra aid throughout the polling period (FIGS. 5.40 and 5.41).

5.7 Summary of Constants Used in Poll Projections

This chapter has presented opinion projections for six quite disparate issues. The interpretations of these results are given in the next two chapters. For those discussions it will be useful to have a list of all the parameters which were chosen by least squares optimization for each of the cases (Table 5.3). All constants were optimized under the best conditions for the other constants except for the issue of Contra aid where optimizations were performed using a one day persistence half-life. The constants which were optimized fell into the following categories:

(1) Persistence constant. This constant measured the ability of an AP infon to continue to exert its effect after the date of the dispatch. As noted in Section 5.6 above, the optimal value for this constant was a one day half-life for five out of six issues and this same value was also satisfactory for the sixth. Thus the optimizations for the six issues yielded a universal one day half-life for the persistence constant.

(2) Modified persuasibility constants. For modified persuasibility constants, the least squares optimal value was calculated for a reference set of infon scores. Any needed variations in these constants for infons favoring different positions were incorporated into the refining weights. When all weighting values were the same, as was the case for defense spending, the Democratic primary, and the economic climate, any one of the positions could have been chosen as the reference position.

(3) Refining weights. The refining weight for a position was the constant by which all infon scores for a position were multiplied before construction of the persuasive force functions. This weight included both differences between the persuasibility of the public for different positions and imperfections in the infon scoring (Chapter 1 and Appendix A).

Therefore, when the public was as easy to persuade for all positions and when all infons were scored correctly, all refining weights had the value of 1.0. In some cases the weights were different for different infons scores. An example was the issue of troops in Lebanon where the weight was 1.6 for scores favoring less troops and 1.0 for all other scores. This meant that a paragraph favoring less troops was 1.6 times as effective as a paragraph favoring same or more troops.

5.8 Summary of Statistics for Poll Projections

Statistically speaking, the estimate for a value is the mean with deviations from that mean being characterized by the standard deviation. The standard deviation for a set of values is computed by taking the square root of the squares of the deviations of the individual points from the mean. Similarly, if the estimate for an opinion percentage is given by the ideodynamic prediction, then statistical deviations can be represented by the RMSD computed by taking the square roots of the squares of the deviations between actual poll measurements and the ideodynamics predictions. Therefore, assuming that the differences between two values are statistical, the RMSD is like the standard deviation so that differences between the predicted and measured poll values should be within one RMSD about 68% of the time and within two RMSD about 95% of the time.

The RMSD in Table 5.1 are the minimum values corresponding to the best parameters chosen. These values were 3.5% for troops in Lebanon, 4.3% for the Democratic primary, 4.7% for Contra aid, 6.6% for the economic climate, 7.2% for defense spending (1977-1984), and 7.7% for unemployment versus inflation. The errors decreased with the time span of the projections. For instance, the most accurate computations were for troops in Lebanon and the Democratic primary where the poll series only covered 4 and 7 months respectively. The analyses for the other four examples spanned periods from three to seven years. It was quite possible that text and its interpretation changed with time so that the text analyses should have been modified as time proceeded. Also, the modified persuasibility constants might have been dependent on time, changing slowly over the period of years so they too might have varied with time.

For comparison, national polls frequently have reported errors due to finite sample size in the range of 4% at the 95% confidence level. This is equivalent to two standard deviations from the reported values. Therefore, their equivalent to the RMSD would have been about 2% instead of the 3.5% to 7.7% in Table 5.1. However, besides sample size errors, there are also systematic errors in the polls due to question wording, question sequence, etc. Therefore, the 2% standard error is a minimum error in the opinion measurements.

The importance of these systematic errors is seen in the poll data of FIG. 5.10 where polls were taken at close intervals by different, respectable polling organizations. There are fluctuations in the range of 5 to 10% which may have been real but which may also have been due to differences in the polling instruments. If actual measurements of opinion can have errors in the range of 5 to 10%, then the ideodynamic errors are in the same range and may be as good as those from opinion polls.

From the summary data in Table 5.1, it is also clear that the best ideodynamic opinion projections had very little probability (less than 0.001) of being obtained by chance alone. In addition, all projections were also better than the model of no opinion change after the first poll point. This was seen in the improvements in the MSD as the modified persuasibility constant increased above values near zero (top frames in FIGS. 5.4, 5.16, 5.28, 5.33, 5.37, and FIG. 5.43).

Table 5.1

Statistical comparisons for opinion projections. All computations used the constants in Table 5.2 except that the memory half-life was one day for all calculations including the two for Contra aid.

Table 5.2

Candidate name counts in dispatches retrieved for the Democratic primary. The name counts were for all the retrieved AP dispatches. The others category was the sum of the results for the others.

Table 5.3

Optimal constants for opinion projections. This table summarizes the optimal values determined by minimization of the MSD (FIGS. 5.7, 5.19, 5.20, 5.31, 5.36, 5.40, 5.41 and 5.46) and used for the opinion projections. The only exception was for Contra aid where the half-life of one day was used for the projections. The modified persuasibility constant $k'_2$ had units per AP paragraph per day and the memory half-live was measured in days. Unless otherwise noted, all infons had the weight of 1.0.

TABLE 5.1

| Issue | Ideodynamic Estimate Ideodynamic RMSD (in Poll Percentage Points) | 1000 Monte Carlo Estimates (Assuming Random Poll Values) | | |
|---|---|---|---|---|
| | | Mean Monte Carlo RMSD (in Poll Percentage Points) | Number of Standard Deviations from Ideodynamic MSD to Monte Carlo Mean MSD | Probability of Obtaining Ideodynamic MSD by Chance |
| Defense Spending (1977–1984) | | | | |
| Scores More, Same, Less | | | | |
| 692 retrievals | 7.2 | 24.3 | 5.2 | <0.001 |
| 325 retrievals | 9.4 | 24.3 | 4.9 | <0.001 |
| 383 retrievals | 10.3 | 24.3 | 4.7 | <0.001 |
| Scores More, Less | | | | |
| 692 retrievals | 8.3 | 24.3 | 5.1 | <0.001 |
| Troops in Lebanon | | | | |
| With cTruckBombMore | 3.5 | 26.6 | 4.2 | <0.001 |
| No Truck Bomb Infons | 9.1 | 26.6 | 3.7 | <0.001 |
| Democratic Primary | | | | |
| Bandwagon Text Analysis | 4.3 | 19.9 | 3.7 | <0.001 |
| Name Count Scoring | 23.2 | 22.0 | 0.3 | 0.34 |
| Economic Climate | 6.6 | 23.3 | 5.4 | <0.001 |
| Unemployment vs. Inflation | 7.7 | 27.1 | 4.8 | <0.001 |
| Contra Aid | | | | |
| Fan Text Analysis | 4.7 | 32.9 | 3.3 | <0.001 |
| French et al Text Analysis | 5.1 | 32.9 | 3.3 | <0.001 |

TABLE 5.2

| | Name Count | |
|---|---|---|
| Candidate | Actual number | Percent of Total |
| Mondale | 959 | 27 |
| Glenn | 632 | 17 |
| Others: | 2018 | 56 |
| Askew | 189 | 5 |
| Cranston | 450 | 13 |
| Hart | 251 | 7 |
| Hollings | 255 | 7 |
| Jackson | 740 | 20 |
| McGovern | 133 | 4 |

TABLE 5.3

| | Memory Constant m | Persuasbility Constant $k'_2$ | Infons with Weights ≠ 1.0 | |
|---|---|---|---|---|
| | | | Weight | Position Favored by AP Infons |
| Defense Spending (1977–1984) Scored More, Same, Less 692 retrievals | 1.0 | 0.6 | | |
| Troops in Lebanon with cTruckBombMore | 1.0 | 4.5 | 1.6 $^a$(80 | Less Troops Truck Bomb Imply Less Troops) |
| Democratic Primary Bandwagon Text Analysis | 1.0 | 1.5 | | |
| Economic Climate | 1.0 | 0.09 | | |
| Unemployment vs. Inflation | 1.0 | 7 | 0.5 | Unemployment and Inflation Equally |

TABLE 5. 3-continued

| | Memory Constant<br>m | Persuasbility Constant<br>k′$_2$ | Infons with Weights ≠ 1.0 Position Favored | |
|---|---|---|---|---|
| | | | Weight | by AP Infons |
| | | | 1.4 | Important Inflation Important |
| Contra Aid | | | | |
| Fan Text Analysis | 41 | 1.2 | 2.0 | Oppose Aid |
| French et al Text Analysis | 7 | 1.4 | 2.4 | Oppose Aid |

*a*This line means that the infon favoring more troops due solely to news of the October 23, 1983 truck bombing had a value equivalent to 80 AP paragraphs favoring more troops.

FIG. 5.1. Persuasive forces of AP infons scored for favoring more, same and less defense spending. Of the 692 retrieved dispatches, 272 had scores favoring more, same and less spending (text analysis from Section C.2-3, Appendix C). These infon scores were converted into persuasive force curves assuming that all infons had the same weight of 1.0 and that the persistence half-life was one day. As in FIG. 1.1, the curves for separate infons were added together to give the net forces in the three directions. The heights of the curves for individual infons, before the addition, were the sums of the paragraph scores (see Chapter 3).

FIG. 5.2 Persuasive forces of AP infons scored for favoring more and less defense spending. The same 692 dispatches scored for FIG. 5.1 were rescored as favoring only more and less spending (see Section C.2-3, Appendix C) instead of more, same and less spending. Of these 692 dispatches, 280 had scores favoring more and less spending. These scores were converted into persuasive force curves as in FIG. 5.1 using the persistence half-life of one day and the weight of 1.0 for all infons.

FIG. 5.3 Opinion on defense spending from dispatches scored to favor more, same and less spending. The projections for the three subpopulations favoring more, same and less defense spending (solid lines) began with the opinion measurements of the first poll in March 1977 and continued using the population conversion model of FIG. 1.2 and the persuasive forces shown in FIG. 5.1. All 272 scores favoring more, same and less spending were used for the computations. The modified persuasability constant was 0.6 per AP paragraph per day. Calculations were at 24 hour intervals. For comparison, the squares show the results of 22 published polls (Table B1, Appendix B).

FIG. 5.4 Constant optimization curves for defense spending. Infons from 272 AP messages scored as favoring more, same and less spending were used to project opinion assuming a number of modified persuasability constants k′2 (top frame) and persistence half-lives (bottom frame). For all computations, the MSD (see Section A11, Appendix A), were obtained with infons favoring all three positions having the weight of 1.0. The optimal modified persuasability constant was 0.6 per AP paragraph per day and the best persistence constant was one day. Both curves were obtained using the optimal value for the other constant.

FIG. 5.5 Opinion from a subset of AP dispatches scored to favor more, same and less defense spending. The projections (solid lines) were the same as those in FIG. 5.3 except that only 325 of the original 692 AP dispatches were used for calculating the persuasive forces. The same constants were used as in FIG. 5.3. Of the 325 dispatches, 131 had at least one paragraph with a score favoring more, same or less spending. For comparison, the same poll data are plotted as in FIG. 5.3.

FIG. 5.6 Opinion from another subset of AP dispatches scored to favor more, same and less defense spending. The projections (solid lines) were the same as those in FIG. 5.5 but used 383 essentially non-overlapping dispatches from among the original 692 used for FIG. 5.3. Of the 383 dispatches, 147 had at least one paragraph with a score favoring more, same or less spending. Actual poll values are shown as squares.

FIG. 5.7 Opinion on defense spending assuming the entire population favored more spending at the time of the first scored AP infon in January 1977. The persuasive forces were the 272 scores used for FIG. 5.3 favoring more, same and less spending. All conditions for the calculation were unchanged from those for that figure except that the population was not assumed to begin with the first actual poll point but rather with the artificial initial condition of 100% of the population favoring more spending at the time of the first scored infon. The projections based on 100% favoring more spending (solid lines) are plotted together with those based on the first poll point (dotted lines, replotted from FIG. 5.3).

FIG. 5.8 Opinion on defense spending from dispatches scored to favor more and less defense spending only. The projections (solid lines) for the three groups favoring more, same and less spending began with the opinion measurements of the first poll in March 1977 and continued using the 280 scores for the persuasive forces shown in FIG. 5.2. As for FIG. 5.3, the model was given in FIG. 1.2 and the modified persuasibility constant was 0.6 per AP paragraph per day, the persistence half-life was one day, and all infons had the weight of 1.0. Actual poll points are shown as squares.

FIG. 5.9. Persuasive forces of AP infons from 1977-1986 scored for favoring more, same and less defense spending. The text analysis used for FIG. 5.1 was applied without change to 1067 AP dispatches retrieved from Jan. 1, 1981 to Apr. 12, 1986. The resulting 779 new scores were merged with the 272 from the retrieval used for FIG. 5.1. The combined scores were used to calculate persuasive force curves using the same one day half- life and the same weight of 1.0 for all infons. The paragraph scores were normalized to account for the fact that less than 100% of the identified stores were collected in both retrievals.

FIG. 5.10 Opinion on defense spending from 1977 to 1986. The persuasive force curves of FIG. 5.9 were used to calculate public opinion using the conditions described for FIG. 5.3 (solid line). For comparison, 62 published poll points were plotted including the 22 used for FIG. 5.3 (squares).

FIG. 5.11 Constant optimization curve for the contributions from paragraphs favoring less defense spending. Scores favoring less defense spending were given different weights from those favoring more or same spending which both had the same weight of 1.0. The MSD was plotted against various relative weights for the less spending scores.

FIG. 5.12 Effect of stories on waste and fraud on public opinion on defense spending. A persuasive force curve (top frame) was constructed where all paragraphs on defense waste and fraud (see Section C.2-5, Appendix C) had the same value as paragraphs directly advocating a position on defense spending. The curve on defense waste and fraud (top frame) was added to the persuasive force curve for infons directly supporting less spending (FIG. 5.9, bottom frame) to give the combined persuasive force favoring less spending (center frame). Opinion favoring more defense spending was computed using the combined persuasive force (center frame), in place of the persuasive force lacking the paragraphs on waste and corruption (FIG. 5.9, bottom frame). The projections both with (solid line) and without (dotted line) the paragraphs on waste and fraud are plotted in the bottom frame. The curve without waste and fraud is the same as FIG. 5.10 (top frame).

FIG. 5.13 Persuasive forces for troops in Lebanon from AP infons only. AP dispatches were scored to favor more, same and less troops (Section C.3, Appendix 3). The dispatch scores were converted into infon forces using a persistence half-life of one day. The paragraph scores for infons favoring less troops were each given a weight of 1.6 relative to the infons favoring more and same troops which both had the same weight of 1.0. The extra tic on the horizontal axis between October and November was at October 23. The plot begins with the date of the first retrieved dispatch.

FIG. 5.14 Persuasive forces for troops in Lebanon from AP infons with and without a truck bombing infon favoring more troops. The AP dispatches scores without an extra truck bombing infon (top frame) were the same as in FIG. 5.13 except that the plot began with the date of the first available poll point (Table B.2, Appendix B). In the bottom frame, there was the addition of a truck bombing infon favoring more troops equivalent to 80 AP paragraphs on Oct. 23, 1983, the date of the extra tic on the horizontal axis. The truck bombing infon also had a one day persistence half-life.

FIG. 5.15 Population conversion model for actions of infons favoring more, same and less troops in Lebanon. The boxes denote subpopulations "believing" in more, same, or less troops. The arrows indicate the opinion conversions due to the persuasive forces (beginning with G and shown in FIGS. 5.13, 5.14, 5.21) favoring the same positions.

FIG. 5.16 Optimizations for the modified persuasibility constant, the weight for paragraphs favoring less troops and the value of the truck bombing infon favoring more troops. The best modified persuasibllity constant $k'_2$ giving the lowest MSD was 4.5 per AP paragraph per day (top frame); the optimal weight for infons favoring less troops was 1.6 when all other infons had weights of 1.0 (center frame), and the most favorable value for the Oct. 23, 1983 infon favoring more troops was equivalent to 80 AP paragraphs (bottom frame). For all calculations, the persistence half-life was one day, and there was assumed to be no truck bombing infons favoring less troops. In addition, all optimizations were performed at the best values for the other constants.

FIG. 5.17 Optimization curves for the persistence half-life and the value of the truck bombing infon favoring less troops. The lowest MSD giving the best half-life was 1 day (top frame). There was essentially no change in the MSD from almost zero to almost 40 AP paragraph equivalents for the Oct. 23, 1983 truck bombing infon favoring less troops (bottom frame). Both optimizations were performed at the best values for the other constants described in FIG. 5.16 and FIG. 5.17.

FIG. 5.18 Opinion On troops in Lebanon assuming only AP infons. The projections beginning with the first poll point (solid lines) used the three persuasive force curves of FIG. 5.13, the model of FIG. 5.15, and the optimal constants of FIGS. 5.16 and 5.17 with the exception that both truck bombing infons favoring more and less troops were both omitted. Calculations were at 6 hour intervals. Actual poll points are plotted as squares. October 23 is indicated by the tic between Oct. and Nov.

FIG. 5.19 option on troops in Lebanon with a truck bombing infon favoring more troops The computations (solid lines) were the same as for FIG. 5.18 except that a truck bombing infon on October 23 favoring more troops at the optimal value of 80 AP paragraph equivalents (see FIG. 5.16, bottom frame) was also included. Therefore, the persuasive force curve favoring more troops was that in the lower frame of FIG. 5.14. The other persuasive force curves are in the bottom two frames of FIG. 5.13.

FIG. 5.20 Comparison of Opinion projections with (solid line) or without the truck bombing infon (dotted line) favoring more troops. The curves in FIGS. 5.18 and 5.19 were plotted together.

FIG. 5.21 Persuasive forces from AP infons with and without a truck bombing infon favoring less troops. The AP dispatches scores without an extra truck bombing infon (top frame) were the same as the bottom frame in FIG. 5.13 except that the plot began with the date of the first available poll point on troops in Lebanon (Table B.2, Appendix B). In the bottom frame of this figure, there was the addition of a truck bombing infon favoring less troops equivalent to 40 AP paragraphs on Oct. 23, 1983, the date of the extra tic on the horizontal axis. The truck bombing infon also had a one day persistence half-life.

FIG. 5.22 Opinion projections with and without a truck bombing infon favoring less troops. Projections were made for public opinion as in FIG. 5.19 except that there was the addition of a truck bombing infon on October 23 favoring less troops equivalent to 40 AP paragraphs (dotted lines). For this projection, the persuasive force curve favoring less troops was that in the bottom frame of FIG. 5.21. For comparison, projections without this truck bombing infon favoring less troops are replotted from FIG. 5.19 (solid lines).

FIG. 5.23 Persuasive forces favorable to Democratic presidential candidates from AP paragraphs scored using bandwagon words. Paragraphs were scored as favoring Mondale, Glenn and Others if candidate names were close to favorable combinations of bandwagon words (see Section C.4-1, Appendix C). The infon force curves were calculated using a one day persistence half-life and the weight of 1.0 for all infons.

FIG. 5.24 Persuasive forces unfavorable to Democratic presidential Candidates from AP paragraphs scored using bandwagon words. Paragraphs were scored as unfavorable to Mondale, Glenn and Others if candidate names were close to combinations of unfavorable bandwagon words (see Section C.4-1, Appendix C). The infon force curves were calculated using a one day persistence half-life and all infons with the weight of 1.0 as in FIG. 5.23.

FIG. 5.25 Persuasive forces of AP infons scored by name count only. Paragraphs mentioning Mondale, Glenn and Others were scored as discussed in Section C.4-2, Appendix C). The infon force curves were calculated with a one day persistence half-life and all infons with the weight of 1.0.

FIG. 5.26 population conversion model for actions of infons scored using bandwagon words. The boxes denote the subpopulations under consideration. The words in the boxes began with B to refer to those "believing" or having an opinion favoring Mondale, Glenn, Others or No opinion. The persuasive forces at any particular time were read from the curves in FIGS. 5.23 and 5.24 and were favorable or unfavorable to Mondale, Glenn or Others. Words describing these forces began with G with favorable information denoted by Pro and unfavorable by Con. The candidate or group of candidates was indicated by the first three letters of the name or group. The arrows indicated the opinion conversions due to the persuasive forces shown in FIGS. 5.23 and 5.24.

FIG. 5.27 Population conversion model for actions of infons scored by name count only. The boxes denote the subpopulations under consideration. The words in the boxes began with B to refer to those "believing" or having an opinion favoring Mondale, Glenn or Others. The arrows indicate the opinion conversions due to the persuasive forces (beginning with G and shown in FIG. 5.25).

FIG. 5.28 Optimization curves for constants for the Democratic primary. Bandwagon analysis: Using the population conversion model of FIG. 5.26 and the persuasive forces of FIGS. 5.23 and 5.24, the best modified persuasibility constant $k'_2$ giving the lowest MSD was 1.5 per AP pargraph per day (top frame) for the bandwagon analysis; and the optimal persistence half- life for the same analysis was one day (center frame). The two optimizations were each performed under the best conditions for the other constant. Name count analysis: The bottom frame shows that the best value for the modified persuasibility constant was very close to zero using a persistence half-life of one day using the persuasive forces of FIG. 5.25 and the population conversion model of FIG. 5.27.

FIG. 5.29 Opinion On Democratic candidates when infons were scored by the bandwagon analysis. The projections (solid lines) for the three Groups favoring Mondale, Glenn and others began with the opinion measurements of the first poll on Jun. 19, 1983 and continued using the persuasive forces shown in FIGS. 5.23 and 5.24, the model of FIG. 5.26, and the optimized modified persuasibility constant of 1.5 per AP paragraph per day. Calculations were at 6 hour intervals. Actual poll points are plotted as squares.

FIG. 5.30 Opinion On on Democratic candidates when infons were scored by name count only. The projections for the three groups favoring Mondale, Glenn and others (solid line) began with the opinion measurements of the first poll on Jun. 19, 1983 and continued using the persuasive forces shown in FIG. 5.25, the model of FIG. 5.27 and the same modified persuasibility constant of 1.5 per AP paragraph per day used for FIG. 5.29. Calculations were at 6 hour intervals. Actual poll points are plotted as squares.

FIG. 5.31 Persuasive forces from AP paragraphs favoring better, same and worse economic conditions. Paragraphs favoring these three positions were scored (see Section C.5, Appendix C) and used for the construction of persuasive force curves employing a one day persistence half-live and equal weights of 1.0 for all infons.

FIG. 5.32 Population conversion model for actions of infons favoring better, same and worse economic conditions. The boxes denote the subpopulations under consideration. The words in the boxes began with B to refer to those "believing" or having an opinion favoring better, same and worse conditions. The arrows indicate the opinion conversions due to the persuasive forces (beginning with G) shown in FIG. 5.31.

FIG. 5.33 Optimization curves for constants for the economic climate. Using the population conversion model of FIG. 5.32 and the persuasive forces of FIG. 5.31, the best modified persuasibility constant $k'_2$ giving the least MSD had a value of 0.09 per AP paragraph per day (top frame). The optimal persistence half-life was one day (bottom frame). Both optimizations were performed under the most favorable conditions for the other constant.

FIG. 5.34 Opinion on economic climate. The projections for the three groups feeling that the climate was better, same or worse (solid lines) began with the opinion measurements of the first poll on Mar. 6, 1981 and continued using the persuasive forces of FIG. 5.31, the population conversion model of FIG. 5.32, and the optimal constants from FIG. 5.33. The computations were performed every 24 hours. Actual poll points are plotted as squares.

FIG. 5.35 Persuasive forces of AP infons favoring unemployment more important, equal importance and inflation more important. Paragraphs favoring these three positions were scored (see Section C6, Appendix C) and used for the construction of persuasive force curves employing a one day persistence half-life and the following weights for infons supporting different positions: 1.0 for infons favoring unemployment important, 0.5 for infons favoring equal importance, and 1.4 for infons favoring inflation important.

FIG. 5.36 Population conversion model for actions of infons favoring unemployment important, equal importance and inflation more important. The boxes denote the subpopulations under consideration. The words in the boxes began with B to refer to those "believing" or having an opinion favoring the three positions. The arrows indicate the opinion conversions due to the persuasive forces (beginning with G) shown in FIG. 5.35.

FIG. 5.37 Optimization curves for the modified persuasibility constant and the infon weighting constants for unemployment versus inflation. Using the population conversion model of FIG. 5.36 and the persuasive forces of FIG. 5.35, the best modified persuasibility constant giving the least MSD had a value of 7 per AP paragraph per day (top frame). The optimal weight for infons favoring equal importance was 0.5 (center frame) and that for infons favoring inflation important was 1.4 (bottom frame). All optimizations were performed under the most favorable conditions for the other constants and with a one day persistence half-life.

FIG. 5.38 Optimization curve for the persistence constant for unemployment versus inflation. Using the same conditions and the optimal constants from FIG. 5.37, a persistence constant of one day gave the least MSD.

FIG. 5.39 Opinion favoring unemployment more important, equal importance or inflation more important. The projections for the three opinions (solid lines) began with the measurements of the first poll on Mar. 22, 1977 and continued using the persuasive forces shown in FIG. 5.35, the population conversion model of FIG. 5.36 and the optimal constants from FIGS. 5.37 and 5.38. The computations were performed every 24 hours. Actual poll points are plotted as squares.

FIG. 5.40 Persuasive forces of AP infons scored by the author as favoring and opposing Contra Aid. Paragraphs for these two positions were scored by Fan (see Section C.7-1, Appendix C) and used for the construction of persuasive force curves employing a one day persistence half-life, a weight of 1.0 for infons favoring aid and a weight of 2.0 for infons opposing aid.

FIG. 5.41 Persuasive forces of AP infons scored by the Swim, Miene and French as favoring and opposing Contra Aid. Paragraphs for these two positions were scored (see Section C.7-2, Appendix C) and used for the construction of persuasive force curves employing a one day persistence half- life, a weight of 1.0 for infons favoring aid and a weight of 2.4 for infons opposing aid.

FIG. 5.42 Population conversion model for actions of infons favoring and opposing contra aid. The boxes denote the subpopulations under consideration. The words in the boxes began with B to refer to those "believing" or having an opinion favoring or opposing Contra aid. The arrows indicate the opinion conversions due to the persuasive forces (beginning with G) shown in FIGS. 5.40 and 5.41.

FIG. 5.43 Constant optimization curves for Contra aid. The MSD was calculated for opinion projections using both infon scores obtained by the author (Fan) as plotted in FIG. 5.40 (solid lines) and by Swim, Miene and French as plotted in FIG. 5.41 (dotted lines). For all calculations, the population conversion model was the one in FIG. 5.42. A one day persistence half-life was used for determinations of the best modified persuasibility constants $k'_2$ favoring Contra aid (top frame) (1.2 per AP paragraph per day for Fan infons and 1.6 for Swim et al. infons), and calculations for the optimal weights for infons opposing Contra aid (center frame) (2.0 for Fan infons and 2.4 for Swim et al. infons). The optimal values for the other constants were used for computing the best persistence half-lives (bottom frame) (41 days for Fan infons and 7 days for Swim et al. infons).

FIG. 5.44 Opinion favoring and opposing Contra aid using infon scores by the author. The projections for the two opinions (solid lines) began with the opinion measurements of the first poll on Aug. 20, 1983 and continued using the persuasive forces shown in FIG. 5.40, the population conversion model of FIG. 5.42, a persistence half-life of one day, and optimal values for the modified persuasibility constant favoring Contra aid and the weight for infons opposing aid (FIG. 5.43, solid lines). Computations were performed every 24 hours. Actual poll points are plotted as squares.

FIG. 5.45 Opinion favoring and opposing Contra aid using infon scores by the Swim, Miene and French. The projections for the two opinions (solid lines) began with the opinion measurements of the first poll on Aug. 20, 1983 and continued using the persuasive forces shown in FIG. 5.41, the population conversion model of FIG. 5.42, a persistence half-life of one day, and optimal values for the modified persuasibility constant favoring Contra aid and the weight for infons opposing aid (FIG. 5.43 dotted lines). Computations were performed every 24 hours. Actual poll points are plotted as squares.

CHAPTER 6

Methodological Significance of Work

The previous three chapters have applied computer text analyses and ideodynamics equations to project expected public opinion. The present chapter examines the methodological implications of the procedures used. The next chapter will consider the theoretical significance of the results.

The studies in this book focused on public opinion where there was relatively little social or economic cost for a person changing his mind. A deliberate choice was made to avoid economic issues, including product purchase, because such activities required the weighing of such complicating factors as competing uses for financial resources. Messages due to these important factors were difficult to study directly.

The introduction of innovations into society was also not studied because they frequently involved not only economic considerations but also other social factors. While economics was obviously important for the classical studies of the adoption of hybrid corn (Ryan and Gross, 1943), investigations on the acceptance of family planning (Berelson and Freedman, 1964) also had to contend with complex societal forces related to sexuality and reproduction.

In contrast, people were unlikely to have deep convictions for the issues studied in this book (Chapter 3). Members of the population as a whole clearly have no good idea how much should be spent for defense. Troops were only briefly in Lebanon with little time to form ingrained prejudices. None of the Democrats running for president had ever held that office so none had the advantages of incumbency. The public was well aware that the economy could change so there was no reason to feel that the economic climate should always be good or bad or that unemployment should always be more or less important than inflation. As with Lebanon, the Contras were in a distant land with which few Americans had little personal contact and inherent opinion.

These theoretical arguments for opinion malleability and volatility were bolstered by actual findings that there were substantial opinion movements in all examples except that of Contra aid. In fact, one of the reasons for studying these other instances was that opinion did change, thereby providing the most critical tests of the methodology. However, it was also useful to demonstrate that the calculations could project unchanging opinion for Contra aid when constancy was actually observed. The model would definitely have been weakened by data showing that there was a change in the ratio of favorable to unfavorable information while there was no simultaneous change in opinion.

Although these studies showed the applicability of the calculations to issues where people hold shallow and changeable convictions, the same methodology should theoretically succeed even for more firmly held beliefs if all the relevant messages available to the public can be coded. For firmly held beliefs, the persuasibility constants would simply be decreased so that more information would be needed to cause an opinion shift.

6.1 Validation of Ideodynamics

Since no applications of ideodynamics have been described previously, it was important to validate the model using not only the logic of the argument but also empirical tests.

Such tests benefitted from one of the unusual capabilities of the model, its ability to consider the time dimension divided into infinitesimally small intervals. As noted in Chapter 2, this was possible because opinion calculations were not based solely on the information available to the population but also on the opinion in the previous time interval. The use of small time intervals, like the 6 or 24 hours in this book, permits the tracking of rapid changes like that for troops in Lebanon (FIG. 5.19) where opinion favoring more troops changed from under 7% to over 30% and back down to under 9% all within a few days.

The use of small time intervals is important to empirical tests of ideodynamics because the number of opinion predictions increases and the timing of the computed opinion values becomes more precise as the intervals for the opinion calculations decrease in size. The result is more opinion Projections at more closely defined times. These very precise predictions can then be tested against measured poll data.

In the actual cases studied, the number of times at which opinion values were calculated for each time series ranged from approximately 400 for troops in Lebanon to over 3000 for defense spending. Therefore, the model could be tested by its ability to mimic poll data for hundreds to thousands of time points.

For each of the cases in this book, it was necessary to assign one to three independent parameters in addition to the persistence constant which was set to have a one day half-life for all studies. Therefore, the minimum number of poll points needed to set the parameters should be those sufficient to give one to three independent opinion measurements.

At each poll time, there were two to four polled positions. Opinion for one of the positions could be determined by subtraction from 100% so the number of independent opinion measurements was one less than the polled positions. As a result, a poll series with three points would yield a minimum of three independent poll percentage values (the Contra case with only the two positions of pro- and con-aid). Therefore, three poll points should be the most needed to establish three parameters.

In addition, the poll percentages at the earliest time in the series was used as the starting point for the calculations so opinion values at this time were the boundary conditions also needed for setting the parameters. Therefore, in the worst case, a poll series with four time points should uniquely define the maximum of three parameters. One of these poll series would correspond to the initial poll point, and the other three poll points would be the maximum needed to set three parameters. In the best cases, with only one parameter aside from the consensus half-life of one day (defense spending, Democratic primary, and economic climate), only two poll points were needed, in principle, to define the parameters.

Once the parameters were set, any additional poll points could no longer be fit by adjusting the parameters and would critically test the model empirically. This estimate of needing poll series of two to four points to establish the parameters is only approximate because the opinion values are not truly independent. Instead, opinion at any time is dependent on opinion at earlier times. Nevertheless, these arguments do indicate that series with 8 (Democratic primary) to 62 (defense spending) time points did indeed provide meaningful empirical tests of the model.

Since ideodynamics uses a number of approximations, it will not always be clear which are faulty if the model does not give satisfactory predictions. In contrast, generally accurate calculations for a number of issues will render plausible the total constellation of approximations.

The quality of the fit shown in the tables, figures and section 5.9 of Chapter 5 indicate that the methodology has good predictive powers. It was also significant that the methods in this book were successful for six out six cases tested. In consequence, the collection of approximations used for the computations stand a reasonable chance of being valid.

Since the empirical tests for ideodynamics involved comparisons between poll results and opinion computed from information available to the population, it was essential that scores for persuasive messages be obtained independently of opinion measurements. For this reason, three precautions were taken:

(1) The conditions for the infon scoring of Chapter 4 were developed by examining AP stories in random order so that the analyst would not be tempted—consciously or unconsciously—to bias scores with the goal of fitting poll results.

(2) The same computer scoring was applied to all stories so any changes in scoring rules could not be applied preferentially to a chosen subset of stories in order to achieve scores which would result in good opinion predictions.

(3) For the example of Contra aid, the Roper Center was first contacted to establish that there was likely to be enough polls to construct a reasonable time series for the model testing. However, no poll values were actually obtained until the text analysis was finished both by Fan and by Swim, Miene and French. Only after completion of the text analysis were actual poll percentages obtained from the Roper center. Therefore, for this example, there was absolutely no way for the analysts to adjust the scoring to match measured poll values.

6.2 Data and Issues for Successful Ideodynamic Calculations

Since methodological development is one of the significant aspect of this book, it is useful to consider the appropriate conditions for applying the methodologies:

One important suggestion from the studies presented above is that ideodynamics is applicable to a wide variety of issues. After all, the model was successful for issues drawn from areas as diverse as foreign policy (troops in Lebanon and Contra aid), economic issues (economic conditions and the importance of unemployment versus inflation), domestic policy (defense spending), and political campaigns (Democratic primary).

The accuracy ideodynamics derives from the fact the calculations include all relevant persuasive messages. All the issues just mentioned shared the condition that the mass media were likely to contain the majority of the relevant persuasive messages. Other informational sources such as books or education in schools could not keep abreast of the pertinent news as it was being generated.

The main other sources which had the potential to inform as rapidly were personal experience and underground means of communication such as rumors.

Personal experience was unimportant for all the issues studied. For the Democratic primary in the early stages, defense spending, Contra aid, and troops in Lebanon, it was plausible that the mass media were likely to be the primary sources of all pertinent communications.

For the economic climate and the importance of inflation versus unemployment, on the other hand, personal experience and observation might have been expected to provide significant messages. However, the empirical testing showed that reasonable opinion time trends could be calculated without modifications to account for personal experiences. In other words, personal experience messages could be ignored.

This result suggested that information in the media might color substantially an individual's interpretation of personal experiences. For instance, in both the best and worst of times, people will be aware of others out of work. When the economy is considered to be good, people might interpret a person's unemployment to be his own fault. However, with bad economic news, people might well shift the blame from the individual to general conditions.

Word of mouth communication such as rumors would have been important if the mass media were not trusted by the population. Indeed, if government control of the press is perceived by the public to be biased and untrustworthy, then alternative persuasive messages will become important. Examples would range from underground publications in totalitarian states to rumors during time of war. Reliance on rumor and an underground press are probably minimal in the major democracies at this time.

Another implication of these calculations is that successful calculations can frequently be made using only AP messages. The tests in this book deliberately made the extreme simplifying approximation that AP stories could represent all relevant persuasive messages for the topics studied. If this approximation is valid for a large number of diverse topics, then the AP is indeed likely to be representative of most of the news in the mass media in agreement with the finding of similarity in much of the mass media by Paletz and Entman (1981). Furthermore, opinion calculations will have been shown to independent, generally speaking, of special considerations for special events. Indeed, among all six examples in this book it was only necessary to add one non-AP infon once. That addition was the infon favoring more troops being sent to Lebanon after the truck bombing of American Marine headquarters and was needed to calculate the great increase in opinion just after the truck bombing. In general, the success of the empirical tests argues for the appropriateness of assuming that the AP could represent both the print and electronic media except in very rare cases like the truck bombing incident.

Previous investigators have frequently used the New York Times or the Vanderbilt summaries of television news (e.g. Page, Shapiro and Dempsey, 1985, 1987; Ostrom and Simon, 1985; MacKuen, 1981). There might have been minor differences between the news content in the AP and the New York Times or television broadcasts. However, the variations were probably not large.

Nevertheless, there was likely to be a significant difference in the news stories used for this book and those identified as relevant by human judges. With human judges, there was probably preferential identification of stories concentrating on the topic under study. Stories with oblique inclusion of pertinent messages were likely to have been ignored. The retrievals for this book did not have this bias since the full texts of all dispatches in the Nexis data base were searched using combinations of key words chosen by the investigator (Chapter 2). All phrases relevant to the topic were identified even if they were minor components of a story mainly discussing some other topic.

Since only text in the region of discussions of the relevant issues were collected, the number of retrieved words per dispatch gave a good idea of the fraction of the typical dispatch devoted to the question. The typical AP dispatch had 400–900 words. About 420 words were retrieved per average dispatch for troops in Lebanon consistent with the observation that a large number of these dispatches were devoted mainly to this topic. For the Democratic primary and Contra aid, those numbers were 310 and 258, respectively, already significantly less than a full story while the equivalent values for defense spending, the economic climate and unemployment versus inflation were all under 200, meaning that less than half of the typical story was on these topics.

This inclusion of articles mainly about other topics was appropriate since members of the general public were frequently not looking for text on particular polled topics so thoughts were probably absorbed from whatever was read regardless of whether the ideas were surrounded by similar or dissimilar information.

The computer searches not only identified articles in which other topics were the main focus, but such a search also guaranteed consistency. Unlike a human judge who might have been distracted when the major emphasis was on another subject, the computer always found the programmed word combinations.

The thoroughness of the data base searches was seen in the identifications ranging from 1156 dispatches for Contra aid to 12,393 for the economic climate. Simply to read these numbers of articles would have been a daunting task for any human investigator.

From a methodological standpoint, it is very useful that the AP alone was able represent all persuasive messages aside from the truck bombing example. This finding indicates that calculations can usually succeed without requiring ad hoc adjustments to account for special events. The applicability of the methods to six quite varied topics suggests that many future computations are also likely to be generally valid if only AP messages are analyzed.

6.3 Positions for which Persuasive Messages are Scored

Once the issues have been defined and the relevant persuasive messages have been assembled, it is then necessary to obtain scores for the infons in messages.

As noted in Appendix A, there will be overlap between the positions that infons are scored to favor and those that people are measured to favor in opinion polls. However, the overlap need not be complete. For instance, in the bandwagon scoring for the Democratic primary, there were people with No Opinion and no infons favoring this position while there were infons unfavorable to Mondale and no persons polled to have this viewpoint.

For the other cases, the overlap was much greater. For Contra aid, both infons and subpopulations either favored or opposed aid. In the remaining cases, there were three poll positions, ranging from one extreme through the center to the other extreme. An example was positions of more, same and less spending for defense. Here, infons were also scored to favor either the same three positions or the two positions of more and less spending. Since all messages were considered to contain different infons, each with a content score ranging from zero to some positive number of paragraphs, some AP dispatches were mixed messages with positive scores for two or more infons.

For issues with two extremes and one central position, a neutral message favoring the central idea was distinguished from a message with two equal components favoring the two extreme positions. In the first case, the dispatch would have had a positive score for the neutral position. In the second case, the story would have had two positive scores, one in favor of each of the extremes. Both types of scores were found and provided a more subtle means for extracting information from messages than would be possible by scoring a pro and con message component as being equivalent to a neutral message. As argued in Chapter 2, a mixed pro and con message should not have the same persuasive effects as a neutral message.

Since dispatch scores were given in paragraphs, stories with more relevant paragraphs had higher scores. Therefore, the dispatch content scores were weighted in proportion to message salience.

6.4 Computer Text Scoring

Although human judging can be used to obtain position scores for AP stories, this book relied on a computer method to guarantee uniformity of scoring.

Since the techniques and ramifications of the text analysis have already been presented in Chapter 3 and in Appendix C, they will not be repeated here. However, as an overview, there are several important novelties in the recent computer text analysis procedures.

One feature is the decision to return to the idea of tailoring the analyses to individual issues instead of using a generalized computer content analysis program with a fixed dictionary and invariant scoring rules. The extra time and effort spent in making up specific dictionaries and rules were compensated by lack of need to interpret the results, a situation opposite from that with predefined dictionaries and rules.

The method was also quite general being applicable to any text including those not examined for opinion formation. The possible analysis of letters or recommendation has already been mentioned in Chapter 3. The generality of the method was not at the level of the dictionary or rules but was rather at the level of the strategy including text filtrations as one of the keys.

Precision in the analysis was greatly aided by the use of repeated text filtrations to remove irrelevant text. The remaining text was more homogeneous thereby simplifying subsequent steps and permitting the use of words which would be ambiguous in a general setting. These filtration steps were also useful for incorporating relationships between words in the input text for following steps.

The procedure described above was also surprisingly robust in that apparently important changes in the dictionaries and rules did not affect the basic shape of the curves for predicted opinion. Thus, dispatches for defense spending could be scored either to favor more, same and less spending or just more and less spending. Also, nuclear arms reduction could either be interpreted to favor less defense spending or not. A number of words in the scoring dictionaries could be changed. Yet the basic opinion projections stayed more or less the same (FIGS. 5.3 and 5.8). Therefore, there was no need to be overly concerned that words or rules were either omitted or misassigned during the constructions of the dictionaries and rules.

An equally compelling argument for the robustness of the text analysis was the fact that Fan and Swim et al. could independently arrive at different dictionaries and rules for the text analysis for Contra aid (Chapter 4). The dictionaries and rules were quite different for the two analyses with Swim et al. using quite different strategies and assigning scores to twice as many paragraphs as Fan. Despite the differences, the resulting opinion projections were essentially the same suggesting that the text presented the same thoughts in a number of alternate ways.

In addition, strong conclusions could be made about the message components critical for persuading the public since the computer applied the dictionaries and rules blindly. This was an important advantage of analyzing the text using a structure where all dictionary words and rules had to be justified on logical grounds. No artificial considerations could be introduced for the sole purpose of fitting desired output results.

The dictionaries and rules for the text analyses were all constructed only by looking at the retrieved text without the application of expert knowledge specific to the topics under study. This strategy was reasonable since the goal was to study opinion in the general public comprised mainly of nonexperts. The success of the calculations for six out of six issues, despite the absence of expert knowledge, suggests that appropriate dictionaries and rules can be made in general by nonexperts.

Besides the omission of possibly pertinent information outside of the messages themselves, portions of the text indirectly supporting a position were also ignored with two exceptions. One was the interpretation of waste and fraud infons to support less defense spending, and the other was the inclusion of indirect messages in the Swim et al scoring for Contra aid. Otherwise, it was sufficient to include only those phrases with text directly arguing for a position, phrases analogous to the very brief extracts of film reviews in advertisements (e.g. "best of the year . . . New York Times").

It is likely that there was usually a high correlation between indirect and direct messages since the same opinion calculations for Contra aid were obtained from text analyses by Swim et al. using many indirect messages and Fan scoring only those word clusters directly taking a position on the desirability of aid (Chapter 3). The inclusion of indirect messages meant that about twice as many paragraphs were scored by Swim et al.

The similarities in the opinion projections using either set of scores indicated that the message structure was the same either including or excluding many indirect messages. The most plausible explanation is that direct statements advocating a position are usually coupled with justifications citing information bearing indirectly on the issue. In this case, the result will be the same if either the advocacy or the justifications are scored. A problem will only arise if statements favoring one position are justified while those favoring another are not. However, given the general effort of the American mass media to use a neutral tone, a consistent bias of this sort is unlikely.

The only case including a non-AP infon was that for troops in Lebanon where the very unusual terrorist truck bombing of October 23 generated an important indirect infon favoring more troops. In the case of the Democratic primary, indirect messages due to name counts were not good predictorsol public opinion. Furthermore, it was quite satisfactory to ignore the positions taken by the candidates on campaign issues.

The display of computer message scores as infon persuasive force curves gives a convenient pictorial method for visualizing message structure. This is very useful for showing that information on defense waste and fraud was negligible when compared to direct statements favoring less defense spending (FIG. 5.12). This calculation also illustrated the ability of the computations in this book to assess the relative influences of different types of messages.

6.5 Ideodynamic Calculations of Opinion Time Trends

Once the issue and its positions are defined and the persuasive messages scored, it is then possible to compute expected opinion time trends. For these computations, a number of approximations are made. Their validity derives from the empirical tests in this book comparing opinion time trends with measured poll values.

One reasonable approximation is that the AP can be assigned a uniform validity for all stories on an issue. The validity score in ideodynamics refers to the credence given by public to the medium carrying the message. The approximation for these studies was that the AP and the mass media in general were highly credible and had the same high validity score for all stories for any one issue throughout the time periods of the opinion trend calculations.

A more contestable approximation was that all sources quoted in the AP have the same weight. Although ideodynamics permits different senders of infons to be given different weights, this weighting was not needed for acceptable time trend calculations. Instead, successful opinion computations could be made with the same degree of persuasiveness assigned to all infon sources including news commentators, members of Congress and the President of the United States. In contrast, Page and Shapiro (1984) and Page, Shapiro and Dempsey (1987) have suggested that such weights might be useful because popular Presidents and news commentators have greater influence. However, the data in this book suggest that even a popular President like Ronald Reagan was less persuasive than his opponents for issues like defense spending and Contra aid. In both these cases, a better fit to the opinion data would have required that there be a lower weight for messages from Reagan and his administration (Chapter 5). For Contra aid, infons opposing the administration's position were more than twice as strong as infons favoring that position.

A methodological difference night explain the differences between the results of this book and those of Page, Shapiro and Dempsey. As discussed earlier, the manual searches used by these other investigators might not have systematically included messages where only a small fraction was relevant to the issue.

Typically, infons favoring different positions of a given issue are about as powerful. Only for half the issues, troops in Lebanon, Contra aid and unemployment versus inflation, was it necessary to give different weights for infon scores favoring different positions (Table 5.3). By least squares optimization, it was shown that the maximum ratio between the minimum and maximum refining weights for any one of the six issues was less than three-fold. Part of this weight was probably due to different degrees of effectiveness for infons supporting different positions. This was especially likely for Contra aid where different scoring methods by Fan and Swim et al. both showed that infons opposing aid were twice as effective as infons favoring aid.

However, the need for different weights for different groups of infon scores might also have resulted in part from difficulties in the computer text analyses. No computer program, however good, can be expected to reflect all the subtleties of natural language. Thus it was possible that infons favoring some positions were consistently over or under scored and that scores for some positions should actually have been assigned to two or more infon persuasive force functions (Appendix A). In the studies in this book, no infon scores were assigned to two different persuasive force functions.

One of the most interesting conclusions is that an AP infon's audience size typically decreases exponentially with a persistence half-life of one day. As discussed in Chapter 1, the persistence constant describes the rate at which mass media infons like those from the AP lose their effectiveness. From Chapter 5, this half-life had a consensus value of one day. Since messages action disappeared so rapidly, it seems reasonable that all opinion reactions were immediate. The memory of messages was probably only important in the very small subpopulation of individuals caring deeply about particular issues. For each issue, that subpopulation was liable to be different since any one person only has the time to be vitally concerned about a very small number of the issues for which polls are taken.

As noted in Chapter 1, the number of converts depends on an infon's content, validity and audience size. The strength of an individual infon at any particular time is given in a time dependent persuasive force function constructed by multiplying the content score, the validity score and the audience size at that time. Ideodynamics postulates that the number of people persuaded is proportional to this persuasive force function.

Although not entirely expected, it was extremely useful that opinion reinforcement and message saturation can be ignored. When the population receives more than one infon, it is necessary in principle to consider possible interactions among infons. As discussed in Chapter 1, such interactions could arise from opinion reinforcement due to the resolution of cognitive dissonance in favor of reinforcing messages. Also, interactions could lead to infons becoming less effective at saturating densities.

For simplicity, the calculations in this book were performed by assuming that there were not such interactions. As a result, persuasive force functions for individual infons favoring a position were added to give the net persuasive force function in favor of that position. In a natural extension of the case for individual infons, the fraction of the population converted is assumed to be proportional to the persuasive force function for all infons favoring the position under consideration.

Ideodynamics permits the division of the population into different types of subpopulations depending on the issue with the details of opinion change being specified by a population conversion model detailing the population conversions due to the calculated persuasive force functions. For each issue, there is a different model with the most con, non models involving people expressing opinions on a continuous scale from pro to con. In this case, the two major variants are the sequential (defense spending, FIG. 1.2; and the economic climate, FIG. 5.32) and the direct conversion (troops in Lebanon, FIG. 5.15; the name count analysis for the Democratic primary, FIG. 5.27; and unemployment versus inflation, FIG. 5.36) models. For the more complicated bandwagon analysis for the Democratic primary, a mixed model was employed (FIG. 5.26), and for the very simple case of Contra aid (FIG. 5.42), the model was the sequential and direct conversion models collapsed into one.

Usually the sequential variant was preferred whenever there was a large number of adherents to the intermediate position between two extremes without a large number of messages favoring that position. High frequencies for the central position could then result from traffic between the extremes with some persons having the intermediate opinion en route.

Besides being dependent on the persuasive force functions, the number of converts also increases with the sizes of the susceptible target subpopulations. If everyone is already convinced, there would be no target population and no more recruits could be obtained regardless of the effectiveness of the messages. At the other extreme, if no one favored the position, then the number of potential converts is large so an infon favoring the position could convert a large number of people even if that was a very small fraction of the total possible recruits.

As discussed for the six examples studied, the subpopulations corresponded to the possible responses to poll questions. The more the response categories, the more were the population subdivisions. There would have been no difficulty in dividing the population into many different positions if there are many possible poll responses. However, there is always the practical limit that the sample sizes will be too small for accurate poll measurements if the category number becomes too large. For this reason, the poll data for the minor candidates were pooled for the Democratic primary.

In computing the number people converted, the constant of proportionality is the modified persuasibility constant adjusted using refining weights. As discussed in Chapter 1 and Appendix A, the modified persuasibility constant is the multiplier for the persuasive force function and the subpopulation size in the equations for computing opinion time trends. This constant is modified by the refining weights as will be considered below.

A number of important variables are all incorporated into the modified persuasibility constant for mass media infon induced opinion change (Appendix A, Equation A.25).

First of all, the modified persuasibility constant includes the validity of the medium. As stressed in Chapter 1, the validity of a message is restricted to that of the medium. As argued above, the rapidity of the population response makes it unlikely that opinion leadership was of great importance for the issues in this book. Therefore, the medium for these studies was the mass media in general and the AP in particular.

For opinion calculations, infon validity need not have any relationship to whether the public thinks the press is credible. The mass media need only have a sufficient reputation that other sources of information, such as rumor, do not play an important role. If press credibility drops so far that rumor needs to be included, then ideodynamics still should be able to make reasonable predictions if the rumors can also be coded.

b. The modified persuasibility constant includes the initial audience size.

For mass media infons, the initial audience size refers to the number of people exposed shortly after the message broadcast. The approximation in this book was that all AP messages had the same approximate audience size. It was only critical for the predictions that the audience size stay constant for each issue analyzed. The projections four any one issue would not have suffered if the audience sizes were generally lower for some issues than others, even for mass media messages, since the audience size is also incorporated into the modified persuasibility constant.

c. The refining weights temper the modified persuasibility constant

Chapter 1 and Appendix A note that every issue is characterized by a persuasibility constant describing the extent to which the issue is close to the core beliefs of the population. The more central the issue, the lower is the persuasibility constant. However, it was also noted that there could be differences in the persuasive powers of different infons for different target populations even for a single issue.

These differences in the persuasibility constant were modeled by multiplying the persuasibility constant for a target population and a corresponding infon persuasive force function by an appropriate refining weight to obtain the final constant by which persuasive force functions and target population sizes were multiplied. Based on the studies in this book, there were probably only small differences among the persuasibility constants for any one issue since the ratio of the largest to the smallest refining weights for an issue did not exceed three-fold.

Besides minor differences in the persuasibility constant, the refining weights also corrected for any variations in infon scoring. For example, if some infons were consistently over or under scored, then those differences could be normalized using refining weights. Again, since the refining weights were not large, message misscoring was probably also not great.

Since the refining weights were usually not large, the opinion calculations typically began by assuming that all infons were scored properly and that all persuasibility constants were the same—in other words that the refining weights were 1.0 for all combinations of persuasive forces and target populations leading to opinion conversion.

Fortunately, this simple approximation could be used for three of the six cases studied. For the other three examples, one or two refining weights had values different from 1.0. Deviations in the refining weights from 1.0 were only necessary when the opinion projections for one position were consistently too high or too low.

Leaving refining weights and returning to the modified persuasibility constants, it should be noted that these constants should have changed with the issue while the infons' validities, initial audience sizes, and persistence constant should have stayed the same for all AP dispatches across all topics.

Since the modified persuasibility constants varied from 0.09 to 7 per AP paragraph per day, the superficial interpretation is that the public can be much more easily persuaded for some topics than others. The value of 0.09 was for the economic climate study where the number of articles was over 12,000 with most mentioning the issue only in passing. The greatest ease for changing public opinion was for infons favoring inflation being important for the issue of unemployment versus inflation (7 per AP paragraph per day).

It is perhaps premature to draw firm conclusions from the modified persuasibility constant. It would be dangerous to say that the low value for the economic climate actually meant that people were very fixed in their opinion for this question so that many more paragraphs were needed to cause a change of mind. It is possible that people did not notice the relevant paragraphs in articles on the economic climate because their minds were on other portions of the article. Also, the persuasive strength of a paragraph on the economic climate might have been weaker than one for unemployment versus inflation.

There was also the stochastic problem of having sampled different amounts of text for the six examples. Comparison of FIGS. 5.3, 5.5 and 5.6 shows that the fluctuations in the projections increased as fewer dispatches were included in the analysis. Similarly, the predictions became worse as the modified persuasibility constant increased due, not to the inherent suitability of higher values for the constant, but to a limited sample of messages giving such large fluctuations that predictions deteriorated. Therefore, all the modified persuasibility constants might be underestimates with the problem being most severe for the economic climate where only 3.7% of the identified dispatches were retrieved and least severe for unemployment versus inflation where 99% of all stories were collected.

Yet another complication was the approximation (Appendix A, Equations A.21 and A.22) that all relevant dispatches were identified during the Nexis search. If a significant number were left out, the interpretations of the modified persuasibility constants would also need to be altered.

The incorporation of a number of different constants in the modified persuasibility constant and in the refining weights is both an advantage and a disadvantage. The advantage is that only one small set of constants is needed for accurate opinion predictions. The disadvantage is that the constants incorporate not only audience persuasibility but also audience size and validity of the AP as well as possible infon misscoring. As a result, it is difficult to dissect the contributions of the individual factors.

The relative constancy of the modified persuasibility constants for any one issue over time also meant that the parameters changed only slowly if at all with time although it was possible that the constants valid in early times were less appropriate at later times when studies were continued for as long as 9 years (defense spending, FIG. 5.10). When the refining weights were the same for all positions, the suggestion was that it was as easy to sway opponents as proponents of an idea given infons worth the same number of paragraphs.

6.6 Insensitivity of Predictions to the Starting Opinion Values

One reassuring observation was the convergence of opinion calculations to that dictated by the message structure regardless of the initial opinions used for starting the computations. Therefore, errors in the first opinion time point used for the computation were not important. For example, the projection assuming a population with everybody favoring more defense spending (FIG. 5.7) showed that even this very inaccurate initial poll point still led to the same projections after a delay. Consequently, if initial poll values only have small errors, the projections would home very rapidly to the proper values.

There is another illustration of this point in FIG. 5.20 for troops in Lebanon. In this case, projections were made both with and without the truck bombing infon in favor of more troops. Again, the wide disparities seen just after Oct. 23, 1983 disappeared within two to three months.

6.7 Interpretations for All Ideodynamic Parameters

A major strength of ideodynamics is the fact that it was derived deductively from known phenomena. As a result, all the constant parameters in the model were interpretable in terms of social interactions. There was no appeal to arbitrary parameters only added to fit the data. The ready explanation of all constants demonstrates that ideodynamics does not impose an arbitrary mathematical structure inappropriate for the analysis of opinion formation.

In summary, these parameters for mass media messages are:

(1) The persistence constant describing the exponential loss in their availability to the population and having a universal half-life of one day.

(2) The modified persuasibility constant including the validity of the medium, the size of the typical mass media infon (when only one medium like the AP is used), and the malleability of the population for the issue dependent on the closeness of the issue to the core beliefs of the public.

(3) The refining weights, one for each conversion in the population conversion model. The weights describe the extent to which the infons favoring one position are more or less powerful than infons favoring other positions and the extent to which messages may have been systematically misscored so that unusually high or low content scores may have been Given to infons favoring one or more positions.

6.8 Significance of No Opinion Change

The fact that opinion will reach that dictated by the information structure is of interest in cases where little opinion change is predicted and little is observed. Relatively speaking, that was the case for Contra aid and for the Democratic primary where the changes were not nearly as large as for the other examples.

Using the bandwagon analysis for the Democratic primary, the observed values were the predicted ones. With the name count scoring only, the projections were for a steady decline in opinion supporting Glenn and Mondale with a corresponding rise in those favoring the others until the final level of about 50% was obtained for the others. Indeed, that was the percent name count for this group (Table 5.2). The name count analysis illustrates how an inappropriate information structure will lead to a prediction worse than that of no opinion change because the poll values will be projected to change away from that actually found to that dictated by the erroneous information.

6.9 Analysis of Persuasive Messages Acting on Public Opinion

The ability of ideodynamics to relate percentage values for public opinion with information available to the public, in a time dependent fashion, has obvious practical applications.

It is useful to recall that the calculations were divided into two parts. In the first, messages were scored by computer for their support of individual positions or ideas. In the second, the scores were entered into the ideodynamic equations for calculation of opinion after an initial poll date. It is necessary to stress the two step nature of the process because it is possible to enter message scores from alternative methods into the opinion projections. It would be quite appropriate for human judges, for example, to assess information instead of using a computer program. Such a procedure might be appropriate for calculating public responses to advertising campaigns in which manufacturers wish to improve their market share. This would be especially true if the advertisements were more complex than text, including other visual and aural cues.

It has already been mentioned that the computer text analysis has the advantages of being robust, easy to use, and capable of giving accurate opinion projections. These same comments apply to opinion calculations using infon scores.

Among the important advantages of the ideodynamic opinion calculations is the paucity of parameters. In the simplest cases, it is only necessary to optimize the modified persuasibility constant if the universal persistence half-life is used and if the refining weights are all 1.0. Since this simplest case was sufficient for three of the six samples of this book, the modified persuasibility constant is probably the only parameter which will need to be optimized for a significant fraction of all cases. The scarcity of parameters means that they can be set using very few measured poll values.

CHAPTER 7

Significance of Work to Theories of Opinion Formation

In discussing the ramifications of the studies in this book, the argument is made that the approximations for the computations are plausible because empirical tests with six diverse sets of data yielded reasonable opinion time courses in all cases (Chapter 5). If additional examples confirm the methods, then the theory will be on sounder footing still.

In a recent and thorough review of the persuasion literature with an emphasis on time trends, Neuman (1987) did not find any other reports in which accurate time courses of opinion could be computed from mass media messages. Furthermore, as noted in Chapter 2, ideodynamics does have unique features. For example, this model can be used to compute an opinion time series using arbitrarily small time intervals such as the 6 or 24 hours in this book. This use of very short time intervals has not been reported in the past and demonstrates that mass media messages have a duration of less than a week. The small intervals of calculation also provide enough precision to study very rapid increases and decreases in opinion as was found for troops in Lebanon (Chapter 5). Therefore, this and other unusual features such as the ability to explore opinion reinforcement mathematically means that no other models have been reported with the same powers as ideodynamics. In consequence, further empirical tests can point to limitations of ideodynamics but will not necessarily support competing models for the responses of opinion to information since none have been reported with the same capabilities.

In addition to providing the empirical evidence for opinion being calculable from persuasive messages, the studies in this book also give insights into the processes of persuasion as discussed below.

7.1 Mass Media Messages and Opinion Leadership

Ideodynamics can be adapted to model all news reports first persuading opinion leaders who then rebroadcast the messages and influenced the public at large (Chapter 2). Such a two-step process would have had three important effects: (1) The mass media messages would have amplified audience sizes and credibilities. (2) The effect of mass media messages on the public as a whole would have been delayed as the opinion leaders absorbed and retransmitted news. (3) Continued rebroadcast by the opinion leaders would also have given messages an apparently longer duration than if they had acted on the population directly.

Data in this book on the last two points suggest that opinion leadership of this type is unlikely. The first line of evidence is that the lag between media messages and opinion response was at most a few hours since opinion in favor of more troops in Lebanon increased from under 7% to over 30% within two days after news of the truck bombing of American Marine headquarters in Lebanon in 1983 (FIG. 5.22). That would gave opinion leaders to little time to process and retransmit messages favoring more troops in any reasonable interpretation of the two step process process of persuasion.

The second set of data arguing against this sort of opinion leadership is related to the duration of mass media messages. As discussed in Chapter 5, least squares optimizations for five of the six examples gave a one day persistence half-life for AP messages. The exception was for Contra aid where it was inherently difficult to perform a valid optimization since there was little change in either opinion or the message structure. Therefore, a one day half-life is a good consensus value. From a practical standpoint, this is advantageous because a one day half-life means that infons lose their effect within about a week. Therefore, opinion calculations only need include information within a week or two before the beginning of the computation. This persistence half-life is substantially shorter than the small number of months used by other investigators (e.g. Hibbs, 1979; Kernell, 1978; Mueller, 1970; Ostrom and Simon, 1985; and Zielske and Henry, 1980). Therefore, it is important that this consensus half-life was assigned after least squares optimizations for six independent issues.

This short duration of messages means that long term memory is probably relatively unimportant, so far as persuasion of the public as a whole is concerned, for the issues studied. The majority of the public are casual observers for most polled issues and will probably either undergo mind changes either rapidly, or not be persuaded at all, after becoming acquainted with a news item. If their opinion stays the same, they will soon forget messages as new ones arrives to take their places in our modern society where information is saturating. Perhaps, in a society with fewer new messages, old information might have a longer effect since they will be displaced in a slower fashion. Obviously, there will be a few experts in the populations who will remember old messages and use them for decision making. However, they will only comprise a tiny fraction of the people polled.

In brief, both the rapidity of the public response and the short message duration arue against a two step process of persuasion working through opinion leader.

Since the concept of opinion leadership was formulated from survey data where the respondent was asked to reconstruct his information sources (beginning with Lazarsfeld, Berelson, and Gaudet, 1944), it would be interesting to perform a survey asking people for the reasons they changed opinions for the issues in this book. It is entirely possible that the result would be somewhat different than that suggested by the measurements here studying actual media messages with their actual broadcast times. In fact, memory is often significantly distorted (Markus, 1986) with people misrecalling prior attitudes. The unreliability of memory is further demonstrated in Menzel's (1957) study showing that physicians are likely to remember that they began prescribing an antibiotic at a time significantly earlier than the time they actually did so. When challenged to give the reasons for an opinion change, the typical person may well feel obliged to provide a more coherent reason and sequence of events than actually occurred.

The unimportance of opinion leadership has important consequences for persons interested in generating persuasive messages. The implication for efforts to change public opinion directly is that the messages should actually be directed at the populace and not at some mythical groups of elites who will, in turn, convince the public as whole. However, from a propaganda or public relations standpoint, it may indeed be useful to try first to convince other elites who will broadcast additional mass media messages favoring the propagandist. These elites might indeed have inordinate influences on the public, but that influence is most likely to be due to their access to mass media rather than to their ability to persuade followers directly after receiving media broadcast in a two step process.

It should be realized, however, that this direct importance of the mass media is likely to be restricted to national issues where the media discuss the issues extensively and where local leaders are unlikely to have access to privileged information. For local issues, not subject to wide media debate, it is quite possible that the local elites can have more of a monopoly on privileged information and can have significant influences on their followers without use of the mass media.

7.2 Reinforcing Role of Persuasive Messages

In Chapter 1 and Appendix A, there is an extensive discussion of how the reinforcing role of persuasive messages can be entered into the construction of the persuasive force curves. A refinement was further proposed for the dulling effects due to frequent repetition of persuasive messages. Fortunately, it was unnecessary to invoke either phenomenon for the studies in this book.

The finding that opinion reinforcement can be ignored is not in contradiction with previous data from surveys in which people are asked about their impressions of persuasive messages (e.g. Lazarsfeld, Berelson, and Gaudet, 1944; Trenaman and McQuail, 1961; Noelle-Neumann, 1973, 1977, 1984). A person can say in a survey that his opinion was reinforced without such reinforcement actually taking place. Ideodynamics argues that it makes no difference if a person claims opinion reinforcement so long as his mind is actually as easy to change as that of another person not subject to reinforcing information. If there is no difference in persuasion, then the ideodynamic interpretation is that the subject was fooling himself into thinking that his views were being strengthened.

Having just noted that time-dependent reinforcement was not observed, it is still formally possible that there was a constant level of time independent reinforcement due to favorable infons. In the calculations in this book, constant reinforcement cannot be distinguished from generally lowered scores for infons. However, when the actual infons favoring different positions were examined (Chapter 5), it is clear that infons favoring individual positions were not always present at the same levels. Furthermore, the differences in information were sufficiently large that public opinion did shift. Since it seems rather forced to argue that reinforcement is constant while information favoring change is not, the most plausible conclusion is that reinforcement is usually relatively unimportant-when measured by its effects on opinion change.

One theoretically possible explanation for the small amount of reinforcement observed is that information densities were so low that most people only received one unmixed message. Under these conditions, it would make a difference if most messages were mixed, containing infons favoring more than one position, or if most messages were pure having only one infon with a non-zero content score. With mainly pure messages, it is conceivable that reinforcement could be very large but invisible in the ideodynamic computations since people receiving reinforcing infons would not have received any infons persuading them to change their minds. Similarly, people exposed to infons capable of converting their opinions would not have been exposed to reinforcing infons. Therefore, reinforcement can be very strong but irrelevant because people whose minds are being changed are not subject to the reinforcing infons.

This explanation is unlikely, however, since a significant number of the actual messages were mixed. The sample text analyzed in Appendix C, for example, supported three positions. Any person exposed to infons favoring one of these positions is likely to come in contact with infons favoring the other positions as well.

A distinction must also be made between time dependent and time independent reinforcement. If reinforcement is constant with time, then it will be invisible in ideodynamics. The effects will be absorbed into the persuasibility constant. The critical point for the calculations in this book is that reinforcement should not be higher at some times than others due to changes in the levels of reinforcing information.

Besides ignoring reinforcement, the satisfactory calculations in this book also did not need adjustments for information overload. The end result was the mathematically agreeable conclusion that persuasive force curves could be constructed simply by adding the forces for individual infons.

7.3 Cumulative Effects of Information Rather than Minimal Effects of the Media Having just discussed reinforcement, it is appropriate to comment on the long standing, but not undisputed, concept of the "minimal effects" of the media (Cook, Tyler, Goetz, Gordon, Protess, Leff and Molotch, 1983; Erbring, Goldenberg and Miller, 1980; Funkhouser, 1973a and 1973b; Iyengar and Kinder, 1986; Iyengar, et al., 1982, 1984; MacKuen, 1981 and 1984; Page and coauthors in a series of papers with Page, Shapiro and Dempsey, 1987 being the most recent; Patterson and McClure, 1976; Robinson, 1976; Rogers, 1983; Shaw and McCombs, 1977; Wagner, 1983). One interpretation is that the media have minimal consequences on opinion change because the maximal consequence is reinforcement. As noted in the previous section, reinforcement was not detected for the examples in this book. However, reinforcement may occur in other circumstances.

Nevertheless, under any circumstance, the essential question from the standpoint of social change is whether reinforcement is so strong that no change occurs at all. For issues where opinions do change, reinforcement cannot be so overwhelming as to block all movement. For these issues, the crucial element in determining public opinion is the residual amount of persuasive force, however small, which can override the reinforcing information since those are the effects which will cause the social alterations.

Another interpretation of the law of minimal effects is that mass media messages are small relative to other messages. To draw this conclusion it is necessary that all relevant messages favoring all positions be included in the model, and that is one of the principal features of ideodynamics. For instance, ideodynamics can show that certain messages might have apparently minimal effects because the opposing messages are overwhelming rather than the favorable messages being ineffectual. With fewer opposing messages, the favorable communications might be quite persuasive. Due to this importance of preexisting and other contemporaneous messages favoring all positions, it is difficult to assess the importance of natural messages such as those from a Presidential debate on voter preference (e.g. Katz and Feldman, 1962; Mueller, 1970b; Sears and Chaffee, 1979) unless all other important messages relevant to the campaign are also entered into the calculations. The strength of a message will appear "minimal" if there are many other relevant messages supporting the same position. On the other hand, if there are few other messages of this type, the identical message can seem to have a "maximal" effect.

Both possibilities were graphically demonstrated for the case of troops in Lebanon. In the absence of the truck bombing infon supporting more troops, the opinion projection was poor with a large MSD (FIG. 5.19, lowest frame) and the opinion projection entirely missed the increase in people favoring more troops (FIG. 5.21). When 80 AP paragraphs favoring this position—equivalent to about 10% of all AP paragraphs analyzed—were added on Oct. 23, 1983, there was a dramatic improvement in the MSD which decreased 8-fold. The effect was obvious upon inspection of the projected time trends (FIGS. 5.22 and 5.23). This result was expected because there was very little other information favoring more troops at any time. With a low background, there was a dramatic and "maximal" effect when the persuasive force function favoring more troops included these 80 paragraphs.

The situation was quite different for the addition of a truck bombing infon favoring troop withdrawal with a strength anywhere in the entire range from 0 to about 40 AP paragraphs. Such an addition had essentially no effect on the fit as seen by least squares optimization (FIG. 5.20, bottom frame). This was again expected since there was a large amount of additional information in this direction even in the absence of this truck bombing infon (FIG. 5.24). Therefore, even a very large amount of additional information could have a "minimal" effect on opinion calculations.

Another example of the minimal effects of the media was the small effect of stories on defense waste and corruption on opinion favoring less defense spending (FIG. 5.15). This did not say that such stories were inherently negligible but only that their effects were small in the total sea of infons in that direction. With fewer other infons directly favoring less spending, the waste and fraud stories would have been much more important.

Therefore, individual mass media messages or groups of infons can appear to have minimal or maximal effects depending on the prevalence of other information, both pro and con. The example with Lebanon has shown how minimal and maximal effects can be seen even when all the relevant information is restricted to the mass media.

Although the mass media is likely to be the major source of persuasive messages for some issues, ideodynamics also can include important amounts of information from non-mass media sources if those messages can be coded as infons. In fact these other messages might sometimes even swamp out the effects of mass media infons. An illustration might be the adoption of antibiotic usage which was correlated with physician interactions and not media messages (Coleman, Katz and Menzel, 1966). Mass media messages were not likely to have contained all the technical information a doctor would have desired before making such a professional judgement. For this information a doctor was more likely to seek advice from knowledgeable colleagues. In this case, the mass media might have had a minimal effect due to the primacy of messages of all the water. In the same way, as stated at the beginning of this book, it is more useful to think a series of persuasive messages having a powerful cumulative effect rather than individual messages having minimal effects. Therefore, the law of the minimal effects might be more fruitfully replaced by the concept of the cumulative effects of information.

7.4 Caveats for Laboratory Experiments

The necessity of taking into account all persuasive messages acting on the population also points to an important caveat in evaluating the results of studies where the population is measured just before and after an intervention with persuasive messages. Such studies might involve individuals being exposed to messages such as television news in a laboratory setting with measurements on attitude being made before and after the treatment (e.g. Iyengar, et al., 1982; Iyengar and Kinder, 1986). Without knowing the informational residues from relevant messages received before the laboratory intervention, it is not easy to predict whether the added messages will have a large or small effect as just discussed. Ideodynamics also notes that opinion can continue to change after message exposure within the concerned and motivated subpopulation influenced by remembered information. Although though this effect was not large for the public at large not concentrating on the issue, remembered information may play a more crucial role in a laboratory setting where the subjects might devote concentrated thought on an issue. Therefore, different opinion changes might be found at different times after the time of information exposure. A single time point might give a misleading result.

7.5 Law of the 24-Hour Day

At this point, it might be useful to mention again the law of the 24-hour day discussed earlier in the Introduction and in Chapter 1. This law simply acknowledges that time moves inexorably forward leaving most people with insufficient time to consider most issues in depth. As a result, the public at large is likely to make most decisions based only on superficial information. This unavoidable superficiality is probably central to the success of ideodynamics and stresses the fact that an analysis of the passage of real time is crucial to any understanding of mass behavior.

The law of the 24-hour day means that caution must be exercised in interpreting data from one shot surveys where people are asked to reconstruct the events and reasons involved in decision making (Lane and Sears, 1964; Robinson and Clancey, 1984). The original decision may well have been made without much reasoning and have been based largely on infons merely advocating a position. However, a person asked to reconstruct events is likely to try to find a logical explanation as discussed above.

It is argued in the Introduction and in Chapter 1 that there is a certain inevitability in the superficiality with which the bulk of the population will absorb information about an issue. Indeed, the greater the diversity of decisions made by an individual, the greater will be the variety of relevant information. As a result, the less will be the care with which individual decisions can be made. This consequence is seen at the level of the public as a whole, leading to the ability to use ideodynamics to predict opinion from the structure of persuasive messages.

However, the same arguments of time limitation will apply to the governing, business and other elites within the population. By definition, these people are the ones with the most power. The more powerful the person, the broader the range of responsibility and the more superficial must be the decision making due to time constraints. These comments stress the importance of having competent a competent staff which can subdivide the responsibility so that different individuals have small enough domains that they have the time to assess the primary information with some care.

7.6 Interpretations of Ideodynamic Parameters

As discussed in Chapter 6, the three types of ideodynamic parameters for mass media messages are the persistence constant, the modified persuasibility constant and the refining weights. The relationship between the persistence constant and opinion leadership is considered at the beginning of this chapter. The modified persuasibility constant is discussed at length in Chapter 6. The refining weights also have interesting interpretations.

These weights reflect, in part, corrections needed to account for systematic over or under scoring of certain classes of infons (Chapter 6). One example might be the case of unemployment versus inflation. Here, it was necessary to reduce the content scores for infons favoring the equal importance of unemployment and inflation to half of the value for infons supporting the importance of unemployment. At the same time, infons stressing the importance of inflation needed to be augmented by 140%. It was not easy to design the text analysis for this issue so that infons scored for the equal importance of unemployment and inflation exactly favored equal importance. It was quite conceivable that a significant portion of these infon scores actually had a consistently higher component supporting the importance of inflation. If a portion of the infon scores favoring equal importance were transferred to the inflation important position, all refining weights could actually have been the same, consistent with equal malleability of the public for all positions of the issue. Therefore, for unemployment versus inflation, the refining weights might have mainly reflected scoring errors.

If unemployment versus inflation also can be characterized by the same refining weight for all positions once the messages have been scored properly, the use of a common refining weight may be the rule rather than the exception since it would have applied to four of the six examples tested. Besides unemployment versus inflation, this commonality was also seen for defense spending, the Democratic primary and the economic climate (Table 5.3). Therefore, identity in refining weights may be the rule rather than the exception.

This situation would correspond to strength of feeling being correlated more tightly with the issue than its positions. As the issue comes closer and closer to the population's system of beliefs, the persuasibility constant will decrease and the population will be more and more refractory to messages with opposing ideas. However, once a person has adopted a new position for this issue, any position, he will be as difficult to dislodge. For core beliefs, it may be very difficult to change any opinion. Again, once changed, it would be as difficult to cause a reversion to the original position—if the refining weights are the same for the two conversions.

The ability to dispense with refining weights for three or four of the six positions has the aesthetically pleasing result of reducing the number of parameters needed in the calculations. Therefore, whenever a choice is available, it seems desirable to adjust the analysis so that refining weights are not used. This was an important reason that the name count analysis for the Democratic primary was considered inferior to the bandwagon analysis (Chapter 5). The poll points could have been fit much better than shown in FIG. 5.30 for the name count analysis if refining weights different from 1.0 were permitted. That would have meant giving Mondale a much higher refining weight than that for the Others while the refining weight for Glenn would have stayed the same.

Although interpretations might be given for why those weights are reasonable for the name count analysis, no variations at all were required for the bandwagon analysis. The dispensibility of refining weights for the bandwagon analysis means that this analysis will probably be more useful for future predictions for the popularity of political candidates since no weights need to be optimized. If the bandwagon analysis continues to be better than the name count analysis, the implication would be that people do have the sophistication to look beyond mere names for their candidate preferences—when the names become established. However, the additional implication is that people may not look beyond bandwagon words to the candidates' positions or activities.

In general, if two competing analyses require different numbers of parameters, the most powerful model will be the one with the fewest so this criterion of avoiding additional parameters will be used to choose among different ideodynamic analyses whenever possible.

In contrast to the case for unemployment versus inflation, it is unlikely that the only problem for the Contra aid issue was infon misscoring because both Fan and Swim et al found that infons favoring fewer troops were more than twice as effective as infons favoring more troops. Two, rather different, computer scoring schemes both led to this conclusion. Similarly, infons favoring less troops in Lebanon also were found to be 1.6 times as powerful as messages favoring more troops or troop retention at the same levels. Therefore, if the scoring for troops in Lebanon is also reliable, there is the hint of the generalization that the American public has certain isolationist tendencies leading to a reticence in foreign adventurism regardless of whether the locale is Nicaragua or Lebanon.

Given only two issues, this thought must be considered just a suspicion. However, consistent differences in the refining weights for more foreign policy issues might solidify the hypothesis. This analysis illustrates how important differences in refining weights might give significant insights into differences in the response of the population to different types of information.

7.7 Nature of Effective Persuasive Messages in the Mass Media

The successful applications of ideodynamics give insights into the important aspects of persuasive messages. For instance, the superficiality forced by multiple demands on limited time is probably also at the heart of the success of the big lie in propaganda where totally implausible assertions are made baldly and with no apologies. These lies will be believed since most of the population will be preoccupied with other concerns and will not take the time to pause and reflect carefully on the situation.

However, in order for the big lie to work, the medium transmitting the propaganda must have a good reputation because the populace will assign validity to the big lie in proportion to the reputation of the medium. The importance of the credibility of the medium was recognized even in early fairy tales such as the one about the little boy who cried wolf.

From time to time, however, the public can check the reliability of any medium against other information in the same way that the villagers were able to assess the validity of the wolf alarms. If the medium shows signs of inaccuracy or unbelievability based on the public's comparisons with other information, then the reputation will fall and few reports by the medium, regardless of topic, will be believed.

Although the media cannot afford to tell lies and retain credibility, the press still has very broad latitude in the choice of messages disseminated. Members of the public usually will not fault the media for omitting items because they realize that the press cannot transmit all the information received so some items must be omitted.

The press might even be able to retain its trust in cases where the public might like to know about a suppressed item, so long as reported stories are accurate and the press or its censors can efficiently propagate the idea that the omitted item is one which is too delicate for transmittal to the public at large. One possible rationale is national security. However, the censors must be careful to suppress only those items which the public will forgive the press for suppressing. This may mean that the censorship should be accompanied by simultaneous messages training the public to tolerate the removal of certain items. Such tolerance is seen by public acceptance of censorship during wartime. Furthermore, the public will sometimes even favor overt manipulation of the available information. This is usually true in the public providing unabashed support for public health and anti-drug abuse campaigns. It is the rare person who will insist on the publication of balanced stories presenting both the disadvantages of drug use and the glories of transient highs.

This analysis shows that, a credible medium can transmit the big lie in the short term, and the law of the 24-hour day can prevent close scrutiny Of medium content. However, in the long term, such a strategy has the problem that all which is said, even if true, will be suspect once credibility is destroyed.

Public distrust will be important as soon as the population resorts to alternative media. Ideodynamics asserts that the effects will be minor if a medium loses credibility but is still the only source of pertinent information. In this case, the medium will be able to influence the public more slowly but will still move the public in the directions specified by the media messages. If, the public resorts to other media such as rumor and an underground press, however, then the effects of the original medium can be drastically decreased.

In brief, then, the mass media together comprise a critical instrument in a modern democracy. As discussed above, the media are probably crucial for shaping both the agenda and opinion within the agenda for a large number of issues. However, the analysis may be misleading unless it includes all information bearing on the issue. In the same way, a tugboat pulling an ocean liner to port can have maximal effects in calm seas but minimal effects in a hurricane where the non-tugboat forces on the liner are overpowering. It is only by considering the cumulative effects of all messages relevant to an issue that the true impact of the media can be established.

One of the most sobering aspects of the importance of the mass media is the small number of people involved in determining press contents. Indeed, the concepts of press scoops and exclusivity explicitly acknowledge that a single reporter or small group of reporters for one news organization can have an unusually large effect on the news structure.

The small number of people involved is related to the limited number of journalists covering any given issue. Most local press organizations, both electronic and written, do not have the resources to cover national and international events. For these events, most reports in the press are second hand, derived in large part from wire services like the Associated Press. This press agency in turn will assign only a few reporters to any one story. These persons then have the capacity—and obligation due to limitations of time and space—to select what they feel is newsworthy. As a result, news from Journalists, however unbiased, is still colored by the inevitable omissions made.

In addition to the reporters are the editors who also exercise the power of agenda and set, together with the journalist, the tone of mass media messages. Although editors at the Associated Press and local news organizations can both remove information, they will not be able to add much unless they have access to other news sources. Certainly, there will be a few alternatives such as reports from other newspapers, wire services and television. But, again, the numbers of alternative sources are not many with each of these sources only having a few primary news gatherers. In fact, newspapers typically give prominent treatment to stories identified by the wire services as important (Chapter 3), thereby ceding even more power to the wire services. Since a limited number of journalists and wire service editors are responsible for much of the original news, the public receives its news from a rather restricted group of individuals for any one issue.

The ideodynamic studies in this book also emphasize the need for continual responses to the opposition. The very malleability of public opinion as describe above means that opinions are not permanent so it is always necessary to keep an eye on the activities of the opponents. There are no permanent victories or defeats. If the opponents generate more information, then the proponents must do likewise. As seen for defense spending (Chapter 5), the increase in public opinion in 1979 favoring more spending (FIG. 5.6) corresponded to increased information in this direction without important changes in the messages favoring less spending (FIGS. 5.4). Then, opinion was brought back down not by a decrease in messages favoring more spending but by an increase in messages favoring less spending. The total decibel level of the debate was therefore higher from 1982–1984 than from 1977–1979 even though public opinion about defense spending was about the same in both time periods.

By multiplying Persuasive force curves by the sizes of the relevant target populations, ideodynamics recognizes that mixed messages with strong unfavorable components can be favorable. For example, largely unfavorable information can have a significant positive effect when most of the population is in the opposition. Obviously, if only a miniscule amount of favorable information is included together with the unfavorable then only a tiny fraction of the opposition will be converted. However, if everybody is in the opposition, then a small fraction of a large number can still be sizable in terms of absolute numbers. This is one key to the observation that name mention for a product or political candidate, even if it is unfavorable, can still lead to increased purchases or popularity. However, that strategy must be abandoned as soon as the product or candidate gathers a large number of supporters because the negative publicity will then cause a loss in loyalty.

Similarly, a terrorist can expect to gain favor for his position if the terrorized population is overwhelmingly opposed to his viewpoint. He will not lose a significant number of sympathizers since he had few to begin with. But if even a small mention of his cause is included in the news, that might be able to convert a small number of opponents and hence give the terrorist a significant, but small number of sympathizers. Therefore, at low sympathy, terrorism can indeed be effective for recruiting converts to the terrorist's cause. In fact, the tool of terrorism can be made more effective by condemnations which only serve to highlight that cause.

This gain to the terrorist will be significantly greater if the news is neutral with a sizable component mentioning the terrorist's cause rather than being violently anti-terrorist with a very small pro-terrorist component. This analysis follows from the argument (Chapter 2) that evenly mixed messages are not neutral unless the population is split fifty-fifty on an issue.

As soon as the terrorist has an appreciable number of supporters, however, he should shift his tactics so that his actions do not drive his adherents to the other camp. He should then behave more responsibly. By then he can probably afford to, because he is also likely to have easier access to the media.

7.8 Cause and Effect

Ideodynamics claims that opinion can be computed from an analysis of the content, reputation and timing of the messages arriving at the population. One alternative is to postulate that messages reflect opinion. Of these two Possibilities, the studies in this book suggest that the more powerful and general model involves opinion following messages because this phenomenon was observed for all six cases. The reverse concept of messages tracking opinion clearly cannot always be true. Some messages are clearly event driven. For example, the truck bombing in Lebanon was a newsworthy event which could not have been predicted from the opinion structure. Also, there was no way to predict from opinion on defense spending that net information favoring more spending was going to increase in 1979 and decrease in 1981.

The relationships between message generation and impact might be explained by postulating that opinion always reflects messages while messages reflect both opinion and unusual events. Therefore, in the absence of extraordinary news, it might be possible to model both message generation and message impact by exploring the relationships between the two. This modeling can be performed in the context of ideodynamics which has a structure for separating information generation from information impact.

At the core of this structure are infons which code essential features of persuasive messages. This book has already examined the impact of infons. To extend the model, it is only necessary to postulate mathematical models for how opinion affects infon generation. Persuasive force functions can then be computed based on the expected infons. Using these functions, it will be possible to compute both opinion from messages and messages from opinion to give a time trajectory of opinion without any need to measure messages directly.

The calculation could proceed by starting with a set of opinion values at a particular time. If the opinion structure causes certain messages to be generated, then those messages should be computable since the starting opinion structure will have been specified. The new messages can then be used to predict the opinion structure at the next time interval. The resulting opinion can then be used to calculate the messages in that time interval. These messages and the calculated opinion for that time interval can be used to compute opinion in the following time interval. This process can be repeated ad infinitum to calculate a final time trend independent of actual message measurements.

As discussed in Chapter 2, this has already been done for the case where information favorable to an idea is broadcast in proportion to the number of believers and where there is no opposition to the idea. In this case, ideodynamics predicts that the idea will increase in a logistic fashion until the entire population accepts the idea (Fan, 1985a) as has been found for the adoption of many innovations (Hamblin, Jacobsen and Miller, 1973). On the other hand, if proponents and opponents have the same powers of message emission, then their ratios should not change, regardless of what those ratios are, even though both groups may increase in size (Fan, 1985a).

In future studies, other models will be explored including those to explain how fads can come and go with great rapidity. Such models might require a boredom effect where the adopters of a fad diminish their message broadcast as the time proceeds. Similarly, there might be a social pressure effect due to people observing others with an opinion, fad or habit. In this case, the more the people with the trait, the greater would be the social pressure. The result would be social pressure infons which have already been incorporated into message generation models for habits like smoking (Fan, 1985b).

For habits, there might also be a recidivism effect due to people who have just changed a habit being momentarily euphoric at having made the change and then being driven back to the old habit by nostalgia. Part of this nostalgia might be biological reflecting a desire to return to the physiological state of an addiction. This recidivism effect could be entirely due to personal experiences in which case the ideodynamic equations would include personal experience infons due both to euphoria and nostalgia (see Fan, 1985b for equations).

It is also possible that people whose ideas are in the ascendancy will be more vociferous in their dissemination of favorable messages as has been proposed by Noelle-Neumann (1984) in *The Spiral of Silence*. Such a phenomenon might be modeled by persons being more willing to send favorable messages when they perceive that their position is gaining progressively more converts. Unfortunately, Noelle-Neumann (1984) does not propose how the spiral of silence ends so the model will probably will lead to the position in ascendancy gradually becoming the only acceptable position, a circumstance which would be inaccurate for social issues where controversy does not die completely.

For the study with the Democratic primary in this book, the most successful analysis used bandwagon words assuming that people will be swayed simply by news that a candidate's campaign was proceeding well or poorly. This adoption of favorable opinion when a bandwagon starts has been modeled mathematically by Brams and Riker (1972) and Straffin (1977). Their proposal that people preferentially join ascendant groups could be adopted to ideodynamics by assigning higher infon generation powers to subpopulations for which the bandwagon had started to roll.

Obviously, these examples are but a few of the wide variety of models in which message generation is dependent on prior opinion. Further work is therefore planned to explore these and other models.

Although calculations of messages from opinion have the advantage that they permit assessments of social response trajectories without the need to measure real messages, there is the corresponding weakness that there are no inclusions of the event driven messages which do in fact occur in a significant number of instances. Besides the examples just mentioned for Lebanon and defense spending, it might be interesting to consider the example of the habit of smoking. Here, models not permitting the introduction of unexpected infons would not have been able to account for the Surgeon General's report in the early 1960's on the health hazards of smoking.

Therefore, in further studies, it may be found that satisfactory opinion time trends can be projected by adding infons calculated from opinion to a minimum number of measured messages from unusual events.

In brief, this book marks a halfway point in a mathematical examination of persuasion, showing that this process can indeed be analyzed in the two separate steps of message generation and message impact. The fact that models of message generation have not yet been fully explored does not reflect a weakness of ideodynamics since, as noted above for the logistic equation, ideodynamics does provide a convenient framework for including models for information generation.

To return to the analogy with ballistic missiles, the purpose of this book was to examine the effect of messages once launched. To the extent that an understanding of war requires an understanding of the devastation due to weapons, an understanding of message impact also is useful for analyzing persuasion. A satisfactory method for analyzing the effects of message and weapons provides a solid foundation for considering message and missile launching, other key steps in processes of war and persuasion.

This book has demonstrated a consistent predictability of the public in the face of persuasive information. This finding has certain policy implications for democratic societies in which the main messages are from a trusted press. Since public opinion is heavily influenced by the press, opinion is not likely to be a direct check on the powers of individual groups of elites—like the government, or portions of the government. Instead, the main mechanism may be a number of elites successfully transmitting different sides of a story, thereby checking the powers of other elites. For its part, public pinion may just reflect the messages sent, whatever they may be.

SECTION A

Mathematics of Ideodynamics

The essence of the mathematics of ideodynamics has already been presented previously (Fan, 1984, 1985a,b). However, new insights were drawn from the studies in this book so an updated version of the model is presented below.

In ideodynamics, social changes for a single issue are characterized by senders transmitting persuasive messages which have impacts on receivers. Therefore, key elements in the analysis are: the issue within which change is occurring, the messages transmitted, and the structure of the population.

A.1 Structure of Ideas

The first structure to consider is the issue and its associated positions, also called ideas. Each issue—essentially a question—is denoted by $Q_a$ where Q refers to all possible issues and index a describes a particular issue. In this book, six issues were studied so index a can range from 1 to 6 for the issues. For example, a=1 might refer to the issue of whether there should be more, same or less defense spending. Within any issue $Q_a$, the public can hold one of several positions or ideas indexed by letter j. The individual ideas are denoted by $Q_{aj}$ with a referring to the issue and j to the idea within that issue. For defense spending, j=1,2,3 could correspond with the positions of more, same and less spending.

A.2 Structure of the Population

In the general case, $P_a$ refers to the population which is likely to receive information relevant to issue $Q_a$. For defense spending, it was assumed that the Not Sures and Don't Knows were a subpopulation which did not receive such information and hence stayed oblivious of the topic. In this case, $P_a$ referred to the remaining population actually holding opinions—approximately 90%. Ideodynamics, as described in this book, assumes that the population is constant in size and composition during the entire time period of any study. At any time t, $P_a$ is divided into two subpopulations, $P_{aA}(t)$ made up of people aware of the issue and $P_{aU}(t)$ comprised of persons unaware of the issue but able to receive pertinent information. The fraction of awares $P_{aA}(t)$ within $P_a$ is defined as $A_a(t)$ so the unawares $P_{aU}$, making up the balance, constitute $(1-A_a(t))$ of the total population $P_a$. Population constancy permits fractions of the public to be used interchangably with numbers of people.

Among the awares $P_{aA}$, it is convenient to define the population favoring or believing in position $Q_{aj}$ as $P_{aAj}$. The proportion of believers $P_{aAj}$ among the awares $P_{aA}$ is $B_{aAj}(t)$ so the fraction of $P_{aAj}$ within the total population $P_a$ is $A_a(t).B_{aAj}(t)$.

With this structure, the number of subpopulations is one more than the number of positions held by the awares with the unawares comprising the extra subgroup.

A.3 Structure of Messages

Each persuasive message is denoted $M_k$ where index k is an arbitrary but unique number referring to a particular message. Each message $M_k$ has three important properties carrying the same index k: a validity characteristic of the medium, an audience size, and a number of components called infons favoring different positions:

1. Validity $v_k$=reputation score for the medium used for transmitting message $M_k$. In the present studies, all AP messages were all assigned the constant validity of $k_{vAP}$ characteristic of the AP medium so that $$v_k = k_{vAP}. \quad (A.1)$$

Fortunately, this simple assumption gave good opinion calculations for all five examples.

2. Audience size $a_k(t)$=mathematical function of time t describing the audience size for message $M_k$ as time proceeds.

Since AP messages, among many others, are characterized by a high audience size when the message first arrives at the population, it is convenient to define two subsidiary message properties:

a. Time $t_k$=the time at which message $M_k$ first arrives at the population. For AP messages, it was assumed that $t_k$ was the date of the AP story. Although there are several hours delay before an AP message actually appears in the press, the date of the dispatch is probably not much different from the time of broadcast of television and radio news carrying equivalent information.

b. Initial audience size $a_k(t_k)$=the number of people exposed to infon message $M_k$ at time $t_k$ when the message first reaches the population. This audience size is obviously larger for mass media messages than one-on-one conversations. For this book, the initial audience size was assumed to be the same for all AP messages relevant to an issue. This initial audience size was designated as constant $k_{aAP}$ so, for AP messages, $$a_k(t_k) = k_{aAP}. \quad (A.2)$$

In contrast to AP infons, the audience sizes for some messages might actually increase after $t_k$. This might happen with a book, for example, where sales would increase before an eventual decrease.

For mass media messages such as those in the AP, the audience size is likely to decrease rapidly at the same rate for each message after the initial date. Therefore, $a_k(t)$ could be described by an exponential decrease with persistence time constant p so that $$a_k(t) = a_k(t_k) \cdot e^{-p(t-t_k)} \text{ for } t >= t_k = 0 \text{ for } t < t_k. \quad (A.3)$$

If mass media infons were all retransmitted by opinion leaders or other persons with approximately the same kinetics each time, then the analysis can be performed by incorporating the effect of the opinion leaders into the audience size function for the mass media infons (Chapter 2). The effect would be to prolong the audience size function $a_k(t)$. If a significant amount of time was required for the opinion leaders to begin the retransmission, then the audience size function could begin with a short lag after initial receipt of the message by the opinion leader and then be followed by an increase as the opinion leaders began to convey the new information before a final decline as the opinion leaders stop rebroadcasting the information. Therefore, there would be no need to include opinion leaders explicitly in the model if their effects can be absorbed into the audience size function.

3. Infons $I_{aijk}$=components of message $M_k$ from different sources and directness, indexed by i, and favoring different positions $Q_{aj}$. The indices are discussed in greater detail below:

a. Indices a and j refer to position $Q_{aj}$ within issue $Q_a$ and are the same in $I_{aiji}$ and $Q_{aj}$. Index j corresponds to the first infon dimension in Chapter 1.

b. Index i refers both to the directness of the message and to the source of an idea as deduced from the message itself. Odd indices i=1,3,5 . . . are used when the source indexed by i directly advocates position $Q_{aj}$ while even indices i=2,4,6 . . . are employed when support for $Q_{aj}$ is inferred due to information from the source indexed by i. The specification of odd and even indices corresponds to the second infon dimension (Chapter 1). Different index numbers are used when the population can and does distinguish among sources. These individual index numbers, aside from their oddness and evenness index the third infon dimension of Chapter 1. Index i can code for both dimensions 2 and 3 without any ambiguity since dimension 2 only has two possibilities and these can be represented by oddness and evenness. The result is a less cumbersome terminology. The same odd index can be used for direct support of $Q_{aj}$ when the population cannot or does not distinguish among sources. Similarly, the same even index is used for information indirectly favoring $Q_{aj}$ when the population does not take the source into account.

In this book, almost all infon scores were based on phrases explicitly espousing individual positions and were therefore of the direct variety (odd values of i). Also, the scoring typically did not depend on source. Thus statements by the President of the United States were given the same weight as quotes from the man on the street. The result for these cases was all infons being direct and having the same i=1.

The only exceptions were the waste and fraud infons indirectly favoring less defense spending, and the truck bombing infon supporting more troops for troops in Lebanon. This infon carried the even index i=2 since the population had to interpret the news to support more troops. Both the truck bombing and waste and fraud infons were in addition to other infons directly supporting these infons' positions.

Although the positions which infons can favor often coincide with the polled positions, as happened for the defense spending example, this need not necessarily be the case. For example, for the Democratic primary (Table B.3, Section B), the polled positions were: Pro-Mondale, Pro-Glenn, Pro-Others and No Opinion. However, the infons in the bandwagon analysis (Chapter 4) supported the six positions of: Pro-Mondale, Pro-Glenn, Pro-Others, Con-Mondale, Con-Glenn, and Con-Others.

Therefore, index j refers to all ideas $Q_{aj}$ under consideration including both those favored by corresponding subpopulations $P_{aj}$ and/or those supported by corresponding infons $I_{aijk}$. Polls might show no persons favoring some ideas $Q_{aj}$. For instance, there were no poll measurements for persons opposed to Mondale (Con-Mondale). Similarly, there were no infons associated with some polled positions. For example, no infons were scored as favoring No Opinion in the Democratic primary study. However, there will usually be a substantial number of positions which both people and infons will favor. To continue with the Democratic primary, Pro-Mondale was both a polled position and a position which some infons supported.

c. Index k=the same index k as that in message $M_k$ containing infon $I_{aijk}$. Thus k indexes the fourth dimension of Chapter 1.

In summary, infon $I_{aijk}$ refers to the infon from persuasive message $M_k$, with source and directness i, and supporting position $Q_{aj}$ of issue $Q_a$. With this structure, a persuasive message is analyzed as a collection of infons all acting on the population. There can be a number of different infons from different sources indexed by i all supporting the same position $Q_{aj}$.

A.4 Nomenclature Simplification

For the rest of this section, the nomenclature will be simplified corresponding to only one issue studied at a time as was true for each case in this book. The restriction to a single issue means that index a referring to the issue is always the same in any one analysis and can be dropped from all terms during calculations for that issue. Also, believers $P_{aAj}$ in position $Q_{aj}$ were necessarily aware of that position, so index A specifying awareness is redundant and is therefore dropped from $P_{aAj}$ and their associated percentages $B_{aAj}$. With the omissions of subscripts a and A, the subpopulations and their percentages are simply denoted as $P_j$ and $B_j$.

After removal of subscript a, the remaining subscripts for infons are i for infon source, j for infon position and k for the message carrying the infon.

A.5 Infon Properties

Since ideodynamics treats infons $I_{ijk}$ as components of message $M_k$, each infon also has a validity characteristic of the medium, an audience size and a content score:

1. Medium validity $v_{ijk}$ of infon $I_{ijk} = v_k$ for the parent message $M_k$. This equality holds regardless of the source indexed by i or the position favored $Q_j$ because the medium is the same for all infons of a message.

2. Audience size $a_{ijk}(t)$ of infon $I_{ijk} = a_k(t)$ regardless of i and j since all corresponding infons are portions of the same message $M_k$.

3. Content $c_{ijk}$ of infon $I_{ijk}$ = content score for the infon. This score gives the extent to which the infon favors position $Q_j$. In this book, AP infons were given content scores in terms of typical AP paragraphs. This provides a method for comparing the content strengths of different infons.

A.6 Infon. Persuasive Force

These infon properties are used to calculate functions $f_{ijk}$ describing the "immediate persuasive force" of infon $I_{ijk}$ at time t:

$$f_{ijk}(t) = c_{ijk} \cdot v_k \cdot a_k(t) \tag{A.4}$$

This function states that the population's exposure to an infon's persuasive power at time t is proportional to the infon's content and validity scores and to the audience size.

The exposure of the population to all persuasive infons $I_{ijk}$ is given by a "combined immediate persuasive force" function $F_{ij}$ assumed to be the sum of the persuasive force functions $f_{ijk}(t)$ for all infons received before time t. Therefore, $$F_{ij}(t) = '_k f_{ijk}(t) \tag{A.5}$$

for all k with $t_k < t$. This summation of individual functions with exponential time dependent decays was also used by Hibbs (1979, see his Equation 2) to explore the issue of unemployment versus inflation, a topic also studied in this book.

A.7 Information Influencing the Unawares

Only infons directly supporting idea $Q_j$ (odd index numbers i) should be able to raise the consciousness of those unaware of the issue. In contrast, indirect infons (even index numbers i) do not make a direct statement about the issue and will be ignored by the unawares. Since only $F_{ij}$ with odd numbers i act on the unawares, it is convenient to define function $F_j$ summarizing the total information in favor of idea $Q_j$ available to the unawares where $$F_j(t) = '_i F_{ij}(t) \tag{A.6}$$

for all odd i.

A.8 Information Influencing the Awares

The unawares should not be able to remember information which did not raise their consciousness. Those unawares who are able to remember would already have become aware. In contrast, the awares should be able to remember. Therefore, information will act on the awares and unawares with different time courses.

To model this effect of memory, consider an infon $I_{ijk}$ arriving at the population at time $t_k$. To compute the effect of this infon at a later time t, it is convenient to divide the time between $t_k$ and t into very small intervals. Consider one such interval between time t' and (t'+dt'). The chances that information will have been received by the awares at this time will be $f_{ijk}(t')$. If this information is lost from the consciousness of the the awares in an exponential fashion $e^{-m(t-t')}$ with memory constant m, then the persuasive force due to information remaining at time t will be the chances that the information was received at time t' times the probability that the information had not been forgotten, in other words $f_{ijk} \cdot e^{-m(t-t')}$. However, the number of awares may have been different at different times t' in the time interval from $t_k$ to time t. In this case, the more the awares at a given time t', the more would have been the amount of information received in that time interval t' to (t'+dt') and the greater would have been the persuasive force at time t. Therefore, the persuasive effect of information from that time interval is also proportional to the fraction of awares A(t') at time t' (see Section A.2 above). As a result, the residual persuasive influence at time t of information absorbed at time t' is $A(t') \cdot f_{ijk} \cdot e^{-m(t-t')}$. The total effect of all information at time t from infon $I_{ijk}$ is then the integral from the time of infon receipt by the population to the measurement time:

$$g_{ijk}(t) = \&\int_{t_k}^{t} A(t') \cdot f_{ijk}(t') \cdot e^{-m(t-t')} \, dt' \tag{A.7}$$

where $g_{ijk}(t)$ is the "remembered persuasive force" function describing the remaining information from infon $I_{ijk}$ available for action on the awares at time t.

In all the polls in this book, the percent of Not Sures, No Opinions, and Don't Knows were all typically less than 10% so that awareness could be considered to be essentially 100% in which case $A(t') - \sim 1$. This assignment followed by substitution of Equation A.2 in A.3, insertion of that result together with Equation A.1 in Equation A.4 and then further substitution in Equation A.6 yields $$g_{ijk}(t) = \& \; 1 \cdot \int_{t_k}^{t} c_{ijk} \cdot k_{vAP} \cdot k_{aAP} \cdot e^{-p(t'-t_k)} \cdot e^{-m(t-t')} \, dt'. \quad (A.8)$$

Explicit evaluation of this integral yields $$g_{ijk}(t) = \frac{c_{ijk} \cdot k_{vAP} \cdot k_{aAP}}{m - p} \cdot [e^{-p(t-t_k)} \cdot e^{-m(t-t_k)}]. \quad (A.9)$$

This function $g_{ijk}(t)$ will approach a single exponential decay when either $(m >> p)$ or $(p >> m)$. In the case of much larger m, the second exponential in Equation A.9 would quickly become negligible and would effectively mean that an infon is able to influence the population only a very short time after it is received. In other words, there would be very little memory of an infon for the purposes of opinion change. Should p be much greater than m, the first exponential in Equation A.9 would be negligible shortly after $t_k$. This would be equivalent to the infon appearing and disappearing almost instantaneously with most of an infons' effect begin due to continued persuasion from remembered infons. As m and p approach each other, the $g_{ijk}$ function has significant values at progressively longer times.

Function $G_{ij}(t)$ can be constructed to describe the "total remembered persuasive force" acting on the awares due to information from all previous infons $I_{ijk}$. As for Equation A.5, this function is the sum of the persuasive forces from the individual infons so that $$G_{ij}(t) = {}'_k g_{ijk}(t) \quad (A.10)$$

for all k with $t_k < t$.

Since the awares, unlike the unawares, are susceptible to infons with both odd and even indices i, the total information $G_j$ in favor of position $Q_j$ will be the sum of the G functions over all indices i. That is, $$G_j(t) = {}'_i G_{ij}(t) \quad (A.11)$$

for all i. Again, this equation has a form similar to Hibbs' (1979) Equation 2.

As noted in Chapter 1, Equation A.10, although successful for this book, ignored the hardening of the viewpoints of the various subpopulations due to reinforcing infons. In the concept of reinforcement, a subpopulation $P_r$ supporting position $Q_r$ will be reinforced by infons $I_{irk}$ favoring the same position $Q_r$. Therefore, the persuasive force of infons $I_{ijk}$ pulling subpopulation members away from position $Q_r$ and toward position $Q_j$ will no longer be $G_j$ but will be diminished. "Diminished persuasive force" functions $H_{jr}(t)$ can be constructed to account for this decreased effect. These functions $H_{jr}$ include the persuasive force of infons supporting position $Q_j$ being diminished by reinforcing infons favoring position $Q_r$.

One function which would have the right properties would be $$H_{jr}(t) = G_j(t)/(d_{jr} G_r(t) + 1) \quad (A.12)$$

where $d_{jr}$ is a diminution constant describing the decrease in the persuasive forces of infons $I_{ijk}$ due to the reinforcing effects of infons $I_{irk}$. If $d_{jr}$ is very small small, there is no reinforcement and $H_{jr} = G_j$. As $d_{jr}$ increases, the reinforcing powers of infons $I_{irk}$ also grow. According to Equation A.12, the greater the reinforcing power $G_r$, the lower would be the conversion force due to $G_j$.

Corrected persuasive force functions $H_{jr}$ can be further modified to take into account people becoming saturated due to continued and frequent repetitions of the same infons favoring position $Q_j$:

$$H_{jr}(t) = G_j(t)/(d_{jr} G_r(t) + d_{jj} G_j(t) + 1). \quad (A.13)$$

As for $d_{jr}$, $d_{jj}$ is a constant for the saturation effect due to overrepetition of infons $I_{ijk}$. The addition of the $d_{jj} \cdot G_j$ term in the denominator again means that there is little saturation due to more infons $I_{ijk}$ if $d_{jj}$ is small. On the other hand, it is easy to saturate if $d_{jj}$ is large.

A.9 Effect of Information on the Population

Ideodynamics permits any number of positions $Q_j$. For example, one position may be aware but uncommitted. Some of the Don't Knows measured in opinion polls may have been of this type while others may have been unaware. In all the studies in this book except that for the Democratic primary, it was assumed that all the Don't Knows were unaware and stayed unaware throughout the polling period. For the bandwagon analysis for the Democratic primary, it was assumed that the No Opinions were actually aware but uncommitted. The actual situation may have been somewhere in between. However, the total percentages of the population were typically less than 10% so the calculations are not strongly dependent on assumptions for the Don't Knows.

A general differential equation can be written to describe the time dependent changes in the number of people $A(t) \cdot B_j(t)$ belonging to subpopulation $P_j$:

$$\frac{d[A(t) \cdot B_j(t)]}{dt} = {}'_{j',r} k_{2j'rj} \cdot H_{j'r}(t) \cdot A(t) \cdot B_r(t) - \quad (A.14)$$

$$\; {}'_{j',r} k_{2jjr'} \cdot H_{jr'}(t) \cdot A(t) \cdot B_j(t) + {}'_{j'} k_{1jj'} \cdot F_{j'}(t) \cdot (1 - A(t)) -$$

$$u \cdot A(t) \cdot B_j(t).$$

In the terms on the right, the first double sum over j' and r gives the gain in subgroup $P_j$ due to recruitment from other subpopulations $P_r$, while the second double sum over j' and r gives the loss of members from $P_j$ due to information favoring other positions. The single sum over j' gives the gain in subgroup $P_j$ due to recruitment from the unawares, and the last term reflects loss from $P_j$ to unawareness due to forgetting. The detailed explanation of these terms is as follows:

Recruitment from other subpopulations —first double sum in Equation A.14. Members of a particular subpopulations $P_r$ can be persuaded by persuasive force functions $H_{j'r}$ to join subgroup $P_j$. Resistance to change due to reinforcing infons $I_{irk}$ and saturation with infons $I_{ij'k}$ has already been incorporated into $H_{j'r}$ (Equation A.13). The number persuaded at time t is proportional to the pool of potential converts $P_r$. The size of this pool from Section A.2 is $A(t) \cdot B_r(t)$. The number converted is also proportional to the persuasive force function $H_{j'r}$ describing the effectiveness of infons $I_{ij'k}$ in the face of reinforcing infons $I_{irk}$. The constant of proportionality is $k_{2j'r}$, the "persuasibility" constant with subscript 2 indicating that the constant is a persuasibility constant.

The summation is over all possible j' and r with values of $k_{2j'rj}$=constant if persuasive force function $H_{j'r}$ can actually persuade members of subpopulation $P_r$ to change their opinions away from position $Q_r$ and join subpopulation $P_j$ favoring idea $Q_j$. The $k_{2j'rj}$ all have the same positive value denoted by $k_2$ for all permitted conversions for any one issue. This is consistent with Chapter 1 postulating that the persuasibility constant measures the closeness of the issue to the core beliefs of the population. However, the $k_2$ can change from issue to issue.

Constant $k_{2j'rj}$ can be postulated to be positive for any combination of indices. For instance, $k_{2j'rj}=k_2$ is possible for two different j' but the same r and J. This would mean that two types of persuasive forces can persuade members of the same target population $P_r$ to join the destination population $P_j$. An example would be information favoring both more and same defense spending persuading people favoring less spending to support same spending. In contrast, $k_{2j'rj}=0$ if a transition is not permitted. For example, a persuasive force function favoring less defense spending should usually not persuade people favoring less spending to favor more spending. The entries in the array of all $k_{2j'rj}$ therefore has entries of either $k_2$ or 0. The details of the array correspond to the postulated "population conversion models for the awares" (see FIGS. 5.2, 5.18, 5.29, 5.30, 5.35, 5.39, and 5.45 of Chapter 5 for examples).

Loss of believers—second double sum in Equation A.14. This sum merely reflects the fact that the population stays constant in size. If people are persuaded by persuasive force $H_{j'j}$ to leave population $P_j$ to join population $P_r$ with $k_{2jjr}=k_2$, then there will not only be a gain in population $P_r$ but also a loss from population $P_j$. This loss results in the second sum in Equation A.14 having a negative sign. The magnitude of the loss is the same as the gain by population $P_r$ so the terms in the first two sums of the equation have the same form.

Conversions of unawares to awareness—single sum in Equation A.14. These conversions are based on the argument that the unawares cannot remember information so they learn about the issue through infon persuasive force functions $F_{j'}(t)$ (Equation A.6). The rate at which the unawares $P_U$ move to hold position $Q_j$ due to $F_{j'}(t)$ will be proportional both to the number of people $(1-A(t))$ in $P_U$ and to $F_{j'}$ with an "attentiveness" constant of proportionality $k_{1j'j}$. Subscript 1 denotes an artentireness constant (Chapter 1). Constant $k_{1j'j}$ has the same structure as constant $k_{2j'rj}$. However, since the only target population under consideration is the unawares $P_U$ there is no need to specify the target population in the constant. It is sufficient to specify the index j' for the persuasive force $F_{j'}$ and index j for the destination population $P_j$. As with $k_{2j'rj}$, $k_{1j'j}$ either has a constant value denoted by $k_1$ or a value of zero depending on a chosen "population conversion model for the unawares." The sum in Equation A.14 is over all j'. If there is no contribution from a function $F_{j'}$, the consequence would be $k_{1j'j}=0$ for the corresponding attentiveness constant. For instance, if the model proposes that all functions $F_{j'}$ first move the unawares into a population $P_j$ of aware but uncommitted, $k_{1j'j}=k_1$ only for this one value of j. All other $k_{1j'j}=0$.

Forgetting of a position—last term of Equation A.14. In the reverse process, it is assumed that any aware can forget the issue and become unaware. The unlearning of the issue is characterized by constant u with the rate of conversion of awares favoring position $Q_j$ to unawareness being $u.A(t).B_j(t)$. In this expression, the chances of forgetting are the same for all individuals so the total loss from awares favoring idea $Q_j$ is proportional to the size of the corresponding subpopulation $A(t).B_j(t)$.

As argued for Equation A.7, the Don't Knows in this book were usually less than 10% so that $A(t) - \sim 1$. Then Equation A.14 becomes $$\frac{dB_j(t)}{dt} = \sum_{j',r} [k_{2j'rj} \cdot H_{j'r}(t) \cdot B_r(t) - k_{2jjr} \cdot H_{jj'}(t) \cdot B_j(t)]. \quad (A.15)$$

with negligible recruitment of persons from the unawares and essentially no forgetting of the issue.

If @t is a small time interval, then integration of equation A.15 from $t-@t$ to t yields $$B_j(t) = B_j(t - @t) + \qquad (A.16)$$

$$\int_{t-@t}^{t} \left( \sum_{j',r} [k_{2j'rj} \cdot H_{j'r}(t) \cdot B_r(t) - k_{2jjr} \cdot H_{jj'}(t) \cdot B_j(t)] \right) dt.$$

If the H and B functions do not change substantially during the time interval $t-@t$ to t then Equation A.16 can be approximated by $$B_j(t)=B_j(t-@t)+(\sum_{j',r}[k_{2j'rj}.H_{j'r}(t).B_r(t-@t)-k_{2jjr}\cdot H_{jj'}(t).B_j(t-@t)]).@t \quad (A.17)$$

This deterministic equation has no stochastic terms because it will be shown (Chapter 5, FIGS. 5.10 and 5.23) that calculations of $B_j$ several time intervals @t after the beginning of the computation are relatively independent of initial values for the various $B_j$.

A.10 Modifications for AP Infons Assuming No Unawares

For all examples in this book it was assumed that the AP was representative of mass media messages without pretending that this wire service included all mass media communications. Furthermore, the analysis used only random samples rather than all AP dispatches identified as appropriate to the issue being studied. Therefore, the equations needed to be modified to account for all the facts that only some of the relevant dispatches were examined and that some relevant messages may not have been identified by the methods used to find the pertinent communications.

This book (see Chapter 5) demonstrates that functions $g_{ijk}$ for all AP infons gave good projections for all six examples using an exponential decay with a half-life of approximately one day. With such a short half-life, it is likely that the persistence constant p is the dominant term with forgetting begin extremely rapid such that m>>p so that the second exponential in Equation A.8 can be neglected giving $$g_{ijk}(t)=k_{AP}.c_{ijk}.e^{-p(t-tk)} \quad (A.18)$$

where $$k_{AP}=k_{vAP}.k_{aAP}/(m-p). \quad (A.19)$$

During the total time for which opinion calculations were made, let T=total number of AP dispatches identified as potentially relevant, $T_I$=number of irrelevant AP dispatches identified erroneously using the search command passed to the Nexis data base, $T_M$=number of pertinent AP dispatches missed during the identification process, R=number of dispatches actually retrieved, $R_I$=number of irrelevant dispatches among the number retrieved, $R_M$=number of pertinent but missed dispatches, $S=R-R_I$=number of dispatches among the retrieved which were shown to be relevant during the final scoring process, and $G'_j$=persuasive force function calculated from the random subset of all relevant infons. Recall that $G_j$ is defined as the persuasive force function if all relevant infons and not a random subset is used.

If it can be assumed that dispatches in the $T_M$ group which were not identified as relevant had the same infon persuasive forces as those in the identified group T, then $$G'_j = [S/(T-T_I+T_M)] \cdot G_j \qquad (A.20)$$

since the G' is a fraction of G corresponding to the truly relevant number of dispatches S divided by the number of dispatches from which the sample should have been drawn, namely the relevant dispatches actually identified $(T-T_I)$ together with the ones which were missed during the search $(T_M)$.

If the retrieval is random, then the fraction of irrelevant dispatches should be the same among the retrieved stories and the identified dispatches from which the random set was drawn so that $$R_I/R = T_I/T. \qquad (A.21)$$

From Equations A.20, A.21 and the relationship $S=R-R_I$ (see definitions), the result is $$G_j = (T/R) \cdot ([S+(R/T) \cdot T_M]/S) \cdot G'_j. \qquad (A.22)$$

In other words, the G function needed for the ideodynamic equations can be replaced by the G' functions calculated from a random subset of the retrieved messages if the G' is multiplied by (T/R) the ratio of the total dispatches to those retrieved for the analysis whenever $T_M=0$ meaning that the procedures used for the message identification did not miss any important messages. Thus the assumption of no missing messages means that Equation A.22 becomes $$G_j = (T/R) \cdot G'_j. \qquad (A.23)$$

Besides sampling mass media infons from AP dispatches alone and then retrieving only a random set of stories identified as relevant, it was further assumed that $d_{jr}=d_{jj}=0$ for all $H_{jr}$ so that $H_{jr}=G_j$ from Equation A.13. This assumption was used because it gave good calculations for all the cases in this book (see Chapter 5). Therefore, in applications to a random sample of relevant messages, $$H_{jr} = (T/R) \cdot G'_j. \qquad (A.24)$$

It is further convenient to define a "modified persuasibility constant" $k'_2$ of the form $$k'_2 = k_2 \cdot k_{AP} = k_2 \cdot k_{vAP} \cdot k_{aAP}/(m-p) \qquad (A.25)$$

using Equation A.19.

Substitution of Equations A.9, A.18, A.24, and A.25 in Equation A.17 gives $$B_j(t) = B_j(t - @t) + (T/R) \cdot @t \cdot \qquad (A.26)$$

$$\left( \sum_{j',r} \cdot G''_{j'}(t) \cdot [k'_{2j'rj} \cdot B_r(t - @t) - k'_{2jjr} \cdot B_j(t - @t)] \right)$$

for all j' and r where $G''_{j'}$ are "skeleton persuasive force" functions of form $$G''_{j'}(t) = \sum_{i,k} c_{ij'k} \cdot e^{-p(t-t_k)}. \qquad (A.27)$$

The summation is over all i and for k with $t_k < t$. For consistency with Equation A.26, Equation A.27 uses index j' instead of index j employed in earlier persuasive force functions.

Empirically measured scores for $c_{ij'k}$ are denoted $s_{ij''k}$. Scores $s_{ij''k}$ carry the same index i for the source of the information and k for the message for which the score was obtained. However, index j'' for the position which a score favors might not always coincide with index j' for the position of the infon $I_{ij'k}$. The reason is the difficulty in assigning some scores to a particular position. For instance, an exhortation to cut an increase in defense spending might be interpreted by some people as still favoring more defense spending, although less of an increase, while others might feel that defense spending should not be increased but held the same. Therefore, this exhortation might be scored as favoring same spending but might actually support both more and same spending. If the average score favoring same defense spending reflects a significant component favoring more spending, then there should be a mechanism to permit the score favoring same spending to contribute to persuasive forces for both same and more spending.

This is done by introducing "refining weight" constants $w_{ij'j''}$. These weights specify the contribution of a score $s_{ij'k}$ to content scores for infons $I_{ij''k}$ favoring positions $Q_{j''}$. Weights $w_{ij'j''}$ permit a measured score to contribute to the content score of more than one infon using the following equation:

$$c_{ij'k} = \sum_{j''} w_{ij'j''} \cdot s_{ij''k}. \qquad (A.28)$$

The summation here is over all positions indexed by j'' which the scores can favor. In fact, some of these positions may not even coincide with the positions $Q_{j'}$ of the infons used in the analysis. For example, Chapter 5 considers scores favoring waste and fraud by defense contractors to contribute to infons favoring less defense spending.

In the most straightforward case, however, every score measured to favor position $Q_{j''}$ would also contribute only to the content score of an infon supporting the same position $Q_{j'}$. In this case, $w_{ij'j''}$ would only be positive when j'=j'', and positions of infons indexed by j' would coincide with the positions of the scores indexed by j''.

Substitution of Equation A.28 in Equation A.27 yields $$G''_j(t) = \sum_{i,j'',k} w_{ijj''} \cdot s_{ij''k} \cdot e^{-p(t-t_k)}. \quad (A.29)$$

for all i and j'' and for all k with $t_k < t$.

For AP stories, opinion Calculations can be made using Equations A.26 and A.29. Functions $G''_j(t)$ can be calculated at any desired time from a table of $w_{ijj''}$ formulated by the analyst, from $t_k$ for the collected AP stories, and human or machine coded $s_{ij''k}$ scores. In this book, the computer assisted computations of $s_{ij''k}$ scores are described in Chapter 4. Calculated values for functions $G''_j(t)$ are inserted into Equation A.26 for computations of opinion time trends. The $k'_{2j''rj}$ values and constant p are specified by the analyst. T/R is the reciprocal of the fraction of the AP dispatches retrieved for detailed analysis among all identified as relevant to the issue. The computations can begin with an initial set of $B_j(t-@t)$ corresponding to the first available public opinion poll. Calculations for public opinion are then made by increasing time t by intervals of @t specified by the analyst. The values of $B_j(t-@t)$ for these subsequent calculations are the $B_j(t)$ values from the calculation one @t earlier.

Examination of Equations A.26 and A.29 shows that all contributions to $B_j(t)$ include a $k'_{2j''rj}$ or $k'_{2j''jr}$ term multiplied by a $w_{ijj''}$ term. Therefore, the modified persuasability constant is always multiplied by a refining weight. Since the refining weight can have any value, it is possible that the modified persuasability constants actually did not have the same value as postulated for Equations A.14 and A.26. It may be possible, as was observed for troops in Lebanon and aid to the Contra rebels (see Chapter 5), that the public may be more difficult to convince for some positions of an issue. In this case, the $k'_{2j''rj}$ in the same analysis could be different for different positions with the $w_{ijj''}$ incorporating those differences in addition to those due to scoring ambiguities. However, in all the analyses of this book, all refining weights were quite similar with the largest ratio between the most disparate weights being less than 3.0. On the other hand, the modified persuasability constants had 50-fold differences. Therefore, it is indeed convenient to think of an issue as being characterized by a global persuasability constant which can vary widely from issue to issue (see Chapter 1). The refining weights then reflect the remaining minor differences in the persuasability constant and/or the effectiveness of statements from different sources supporting different positions.

Since the persuasability constant $k_2$—and hence the modified persuasability constant $k'_2$—can vary from issue to issue (see Equation A.26), it was necessary find the optimal value for this constant. It was also important to optimize the persistence constant and the refining weights $w_{ijj''}$. All optimizations were performed for each polled topic by minimizing the differences between the calculated $B_j(t)$ and the $B_j(t)$ from published polls.

The method was a least squares optimization where a number of possible values for the variable parameters were chosen by the analyst and computer simulations were made using Equation A.26. For each set of values, a public opinion time trend was computed over the entire time interval of the polls, deviations were measured between the actual poll points and the calculated opinion curves for all points of view. There were as many opinion projection curves as positions polled. The deviations between measured and projected poll percentages were computed for all curves, squared and averaged to give the mean squared deviation (MSD). Optimizations were performed by plotting various trial constants against this MSD to find the value with the minimum MSD. These plots show the sensitivity of the fit to values of the optimized constants. If the MSD plots are relatively flat for increasing values of the parameter, then the calculations are relatively insensitive to changes in the constant in the region of the minimum MSD.

Sometimes, the square root was taken of the MSD to give the root mean squared deviation (RMSD). This RMSD can be compared directly with the standard error calculated by taking the square root of the poll percentage times 100 minus the poll percentage divided by the sample size. If the poll points deviate randomly from the calculated opinion, the differences between the calculated opinion and calculated poll values should follow a normal distribution with the standard deviation being equal to the RMSD.

Unfortunately, it is not permissible to perform the usual $r^2$ regressions—without making assumptions which are difficult to justify rigorously—between opinion poll values and opinions calculated from Equations A.26 and A.29. This is because opinions at earlier times are dependent on opinions at later times. Since the independence conditions needed for the regressions are not met, the more descriptive MSD and RMSD were used for statistical comparisons. These calculations also provided a convenient set of numbers for optimizing the parameters of the model.

A.11 Comparison with Uniform Distribution

One of the most fundamental questions is whether the poll estimates are any better than those obtained by picking poll points at random. The straightforward test in this book used Monte Carlo simulations.

At each poll time, a set of random poll points all adding to 100% was calculated from a set if random numbers. Then squared deviations were calculated between each of the measured poll points and its corresponding value drawn at random. These squared deviations were then averaged to give the precise equivalent to the MSD computed using optimal constants in the ideodynamic equations. Therefore every Monte Carlo simulation based on random numbers also yielded the exact analog of the MSD calculated from AP dispatches.

A thousand of these simulations were performed for each set of opinion projections yielding 1000 MSD's based on randomly calculated poll points. The fraction of these MSD's which were less than the MSD's calculated by ideodynamics gave the probability that the ideodynamic estimates could be obtained by chance alone.

A.12 Modification for AP Infons Assuming Non-negligible Unawares

In Section A.10 above, the assumption was made that there were essentially no unawares. If this group cannot be neglected, then opinion calculations are made using Equation A.14. If both sides of Equation A.14 are summed over all j the result is $$\frac{dA(t)}{dt} = \left[ \sum_{j,j'} {}^{\cdot} k_{1jj'} \cdot F_{j'}(t) \cdot (1 - A(t)) \right] - u \cdot A(t) \quad (A.30)$$

since the sum of over all $B_j(t) = 1$ by the definition of $B_j(t)$. Also, the terms in the two double sums of Equation A.14 cancel each after summation over j. Like the approximation of the solution of Equation A.15 by Equation A.17, the solution of Equation A.30 can be approximated by $$A(t) = A(t - @t) + \quad (A.31)$$

$$\left( \left[ \sum_{j,j'} {}^{\cdot} k_{1jj'} \cdot F_{j'}(t) \cdot (1 - A(t)) \right] - u \cdot A(t) \right) \cdot @t.$$

So long as functions $F_{j'}(t)$ can be computed, this equation can be solved if constant u, an initial value for A(t), and all $k_{1jj'}$ are also provided. From Equations A.1, A.2, A.3, A.4, A.6, and A.28, $$F_{j'}(t) = \sum_{i,j'',k} {}^{\cdot} k_{vAP} \cdot k_{aAP} \cdot w_{ijj''} \cdot s_{ij''k} \cdot e^{-p(t-t_k)} \quad (A.32)$$

for all k with $t < t_k$ and for all odd i. Since $k_{1jj} = k_1$ or 0 (see discussion following Equation A.14), and since $k_{1jj}$ in Equation A.31 is always multiplied by $k_{vAP}$ and $k_{aAP}$, it is convenient to define a "modified artentireness" constant $$k'_1 = k_1 \cdot k_{vAP} \cdot k_{aAP}. \quad (A.33)$$

Then, Equations A.31 and A.33, together with analogs to Equations A.20–A.23, yield $$A(t) = A(t - @t) + \quad (A.34)$$

$$\left( \left[ (T/R) \cdot \sum_{j,j'} {}^{\cdot} k'_{1jj'} \cdot F_{j'}(t) \cdot (1 - A(t)) \right] - u \cdot A(t) \right) \cdot @t.$$

for all j and j' where $$F_{j'}(t) = \sum_{i,j'',k} {}^{\cdot} w_{ijj''} \cdot s_{ij''k} \cdot e^{-p(t-t_k)} \quad (A.35)$$

for all odd i, all j'', and k with $t < t_k$.

With Equations A.34 and A.35 and postulated values of $k'_{1jj'}$—in addition to the values of Section A.10 above, it is possible to calculate A(t) at intervals of @t if an initial value of A(t), corresponding to those who had not yet heard of the issue, is available from a poll. Then, with the postulated values of $k'_{1jj'}$ and calculated A(t), it is possible to calculate the fraction of the total population favoring position $Q_j$ by approximating the solution of Equation A.14 by $$A(t) \cdot B_j(t) = A(t) \cdot B_j(t - @t) + (T/R) \cdot @t \cdot \quad (A.36)$$

-continued $$\left( \sum_{j',r} {}^{\cdot} G''_{j'}(t) \cdot [k'_{2j'j} \cdot A(t) \cdot B_r(t - @t) - k'_{2jj'r} \cdot A(t) \cdot B_j(t - @t)] \right) + (T/R) \cdot @t \cdot$$

$$\left[ \sum_{j'} {}^{\cdot} k'_{1jj} \cdot F_{j'}(t) \cdot (1 - A(t)) \right] - u \cdot A(t) \cdot B_j(t).$$

A.13 Extensions to Very Long Times

As noted in Section A.2 above, the assumption was that the population was constant during the time period of the calculation. In other words, birth death, and migration into and out of the population were ignored. These assumptions are likely to be valid for the periods under a year used for the Lebanon and Democratic primary examples (see Chapter 5). However, as times increased to over 9 years for the case of defense spending, this assumption may start to break down. To account for death, it is possible to introduce another term like that at the end of Equation A.14. To account for birth, it is necessary to add additional terms to Equation A.14 adding members to the population of unawares. Then their conversion to awareness can follow the discussion in Section A.12 above. Furthermore, in the absence of population constancy, all the equations of this chapter will also need to be modified so that all computations are in terms of absolute number and not percentages.

There is another place where the model may need to be changed. The constants in Equation 14 and its derivative equations may slowly change with time as society changes. For instance, the reputation of the medium may slowly drift. Therefore, for truly long term studies, the constants may have to be converted into time dependent functions reflecting the accumulated experience of the population.

A.14 Models with No Dependence on Subpopulations

Unlike ideodynamics, some models do not calculate opinion percentages based on a subdivided population. Instead, only forces on the population as a whole are taken into account. Ideodynamics can also be used to calculate opinion based solely on persuasive forces by making the assumption that opinion change is sufficiently slow so that $dB_j/dt - \sim 0$. In this case, Equation A.15 converts to $$\sum_{j',r} {}^{\cdot} [k_{2j'j} \cdot H_{j'}(t) \cdot B_r(t) - k_{2jj'r} \cdot H_{j'}(t) \cdot B_j(t)] = 0. \quad (A.37)$$

With $dB_j/dt - \sim 0$, all the $B_j$ are constants and calculable given only the persuasive forces $H_{j'}$ and the persuasibility constant $k_{j'}$. Equation A.37 is actually a system of simultaneous equations, one for each position with subscript j. With j equations, there is a unique solution for each of the $B_j$. Given no rapid change in $B_j$, the H functions which drive the change must also be reasonably constant at calculation time t.

Section B

Data for Calculating Opinion Change

The data used for projecting public opinion were of two types: (1) time series of public opinion polls from published data, and (2) AP dispatches relevant to the polled topics retrieved from the Nexis electronic data base sold by Mead Data Central, 9393 Springboro Pike, P.O. Box 933, Dayton, Ohio, 45401. This data base contained all AP dispatches since Jan. 1, 1977. Polls and AP dispatches were obtained for five issues.

All retrievals were restricted to text within 50 words both before and after one of the keywords used in the original search. The 50 word limit eliminated irrelevant sections of the dispatches and was chosen because the words at the beginnings and ends of the retrieved regions typically showed transitions to other topics. Articles concentrating on the issue typically had the key search words within 100 words of each other (50 words after one search word and 50 words before another). These articles were automatically retrieved in entirety.

All AP searches began before the first poll point in order to account for the residual effects of prior messages. The search was made for all dispatches up to six months before the first point in the poll series unless the six month period extended before the beginning of the data base on Jan. 1, 1977. In that case, the search began with this date. All searches stopped at the end of the polling period.

B.1 Defense Spending—1977–1984

Four variant Doll series were found from 1977–1984 (Table B.1) for the issue of whether more, same or less should be spent on defense. Although earlier polls existed, they were not studied because the Nexis data base only contained AP dispatches back to 1977.

In all polls, the vast majority of the population had definite opinions and were divided into three groups: those favoring more, same or less defense spending. There was also a group of Don't Knows or Not Sures, typically in the range of 5–10%. This subpopulation was subtracted from the total and the poll data was renormalized among all those with an opinion.

For ideodynamics, this step effectively assumed that the small number of persons with no opinion stayed in that category. Even if this assumption was not entirely valid, the numbers were sufficiently small that the results would not have been much affected.

Fortunately, the same time trend was seen for all four polls after the Don't Knows were removed (FIG. 2.1). For this figure, no adjustments were made beyond the removal of those with no opinion. Given the agreement between the different poll series, the data were pooled.

Relevant information in the Nexis data base was identified by searching the full texts of all dispatches using combinations of key words chosen by the investigator.

For defense spending, the search was for (DEFENSE or MILITARY or ARMS) within 5 words of (BUDGET! or EXPENDITURE or SPEND! or FUND!) from Jan. 1, 1977 to Apr. 1, 1984. The ! permitted the trailing characters to be anything so that both budgeted and budgetary would have been found with budget!.

The search command yielded 9314 dispatches with Nexis numbering the dispatches in reverse chronological order from 1 being the most recent to 9314 being the earliest. From a random 692 of these dispatches, text was retrieved if it was within 50 words of one of the seven key search words given in the previous paragraph. If two key words occured within 100 words of each other, the entire intervening text was collected. The total retrieval was 820,000 characters of text.

A sizable number dispatches were not about American defense spending. As soon as this became clear, the retrievals were stopped.

The analyses using the 692 AP dispatches from 1977–1984 and the poll data in Table B.1 were extended in two ways. First, additional poll data were collected from the Roper Center at the University of Connecticut (see Table B.6 below for more details) from January 1977 to April 1986. A time series of 62 separate polls could be obtained by pooling these additional polls those in Table B.1. Besides polls from the National Opinion Research Center, NBC News, and the Roper organization, pooled polls also contained results from ABC News, CBS News, and the Gallup and Harris and organizations.

The same commands used for identifying the 9413 dispatches from 1977–1984 were used again to locate 10,451 stories from Jan. 1, 1981 to Apr. 12, 1986. Of these 1067 were retrieved randomly for extending the study to 1986.

To determine the importance of stories on waste and fraud on opinion on defense spending, the Nexis data base was further searched for (DEFENSE or MILITARY or ARMS) within 5 words of (WASTE or FRAUD or CORRUPTION) from Jan. 1, 1977 to Apr. 12, 1986 yielding 878 dispatches of which 512 were retrieved at random for text within 50 words of one of the search words.

B.2 Troops in Lebanon—1983–1984

A poll single series provided opinion for whether more, same or less troops should be sent to Lebanon in 1983–1984 (Table. B.2). As for defense spending, the No Opinions were in the 5–10% range and were subtracted from the total. The other opinions were renormalized to 100% and the resulting values were used for the remainder of the calculations.

Pertinent AP dispatches were again retrieved from the Nexis data base, this asking for (LEBAN! and ((AMERICA! or U.S. or UNITED STATES) preceding by two words of less the words (TROOP or MARINE or FORCE))) from Mar. 26, 1983 to Jan. 17, 1984. The search began six months before the first poll point (Mar. 26, 1983) and ended with the last poll date.

The search yielded 1517 dispatches among which 467 were retrieved at random for 1,570,000 characters of text. As for defense spending, the retrieval was for text within 50 words of one of the search words.

B.3 Democratic Primary—1983–1984

The polls for candidate preference before the Iowa caucusses were from ABC News (Table B.3) and ran from Jun. 19, 1983 to Feb. 15, 1984. During this time, the major candidates were John Glenn and Walter Mondale. There were other candidates, but none of their percentages ever exceeded 15% so those percentages were all pooled.

AP dispatches were retrieved if they contained the name of at least one of the candidates tallied in the polls. The search was for (RUBIN preceding ASKEW by two words or less) or (ALAN preceding CRANSTON within two words or less) or (JOHN preceding GLENN by two words or less) or (GARY preceing HART by two words or less) or (ERNEST preceing HOLLINGS by two words or less) or (JESSE preceding JACKSON by two words or less) or (GEORGE preceing MCGOVERN by two words or less) or (WALTER preceding MONDALE by two words or less) from Dec. 19, 1982 to Feb. 15, 1984. As for troops in Lebanon, the search began 6 months prior to the first poll date.

Although the last names would probably been sufficient for relatively rare names like Cranston and Mondale, it was necessary to include the first names due to more common names of which Jackson would have been the most ambiguous. Therefore, the search used the condition that the first name of the every presidential candidate preceed the last name by no more than two words. With this condition, a middle initial could be present in the names some of the time and missing in others.

The search yielded 2435 dispatches of which 425 (1,100,000 characters) were retrieved at random for text within 50 words of a search word.

B.4 Economic Climate—1980-1984

The polls for public opinion on the economic climate were taken by ABC News (Table B.4) and covered a three year period from March 1981 to January 1984. The no opinion category was very low at all times, never exceeding 3% so this fraction was subtracted and the other percentages were renormalized to 100% for the calculations.

AP dispatches in the Nexis data base were searched for (ECONOM! within 25 words of (CONDITION! or HEALTH or PROSPECT! or FUTURE or FORECAST! or OUTLOOK! or PROJECT!)) from Sep. 6, 1980 to Jan. 17, 1984. This search also began six months before the first poll date.

A total of 12,393 dispatches were identified of which 461 (730,000 characters) were retrieved at random for text within 50 words of a search word.

B.5 Unemployment versis Inflation—1977-1980

Polls from NBC News asked about the relative importance of unemployment and inflation (Table B.5). The 3% or less of the population who were not sure were subtracted and the remaining percentates were renormalized.

AP dispatches on this topic were identified searching for (UNEMPLOY! within 25 words of INFLATION) from Jan. 1, 1977 to Aug. 23, 1980. The search began with the beginning of the data base in January 1977 about three months before the first poll date.

The search identified 1591 AP dispatches of which most (1582 with 2,300,000 characters) were randomly retrieved for text within 50 words of a search word.

B.6. Contra Aid—1983-1986

Polls on the topic of whether aid should be sent to the Contras fighting the government of Nicaragua were obtained from the four organizations listed in Table B.6. Despite significant wording differences from poll to poll, there was very little change in opinion during the entire polling period, so all polls were pooled. The criteria for choosing the polls was that they ask about American opinion on either aid with no qualifiers or on both military and non-military aid. No published polls found before the last poll in Table B.6 were excluded if they met these criteria and were in the POLL data base at the Roper Center. The CBS-New York Times poll was obtained independently from CBS News and was the only additional poll found meeting the criteria given above.

For all tables, the polling date was assumed to be the midpoint between the beginning and the end of the polling period. Where no date was given, the midpoint of the polling month was used.

Table B.1

Polls on the desirability of increasing defense spending. The data were from four different variants of polls on defense spending compiled with the aid of B. I. Page, R. Y. Shapiro and their colleagues at the National Opinion Research Center. The symbols were the ones used in the FIG. 2.1 and refered to the poll variant plotted. When only the month was available, the poll date was assigned to be the middle of the month.

Poll questions:

POLL VARIANT NBC1: Source: NBC News, 30 Rockefeller Plaza, New York, N.Y. 10020. Question: Do you think that the defense budget for next year should be increased, decreased or should it be kept the same as it is now? Responses: (1) Increased, (2) Kept the same as now, (3) Decreased, (4) Not sure.

POLL VARIANT NBC2: Source: NBC News. Question: Do you think the federal government's spending next year on defense and the military should be increased, decreased, or kept about the same? Responses: (1) Increased, (2) Kept about the same, (3) Decreased, (4) Not sure.

POLL VARIANT GSS: Source: General Social Survey, National Opinion Research Center, 6030 Ellis Ave., Chicago, Ill. 60637. Question: We are faced with many problems in this country, none of which can be solved easily or inexpensively. I'm going to name some of these problems, and for each one I'd like you to tell me whether you think we're spending too much money on it, too little money, or about the right amount. The military, armaments and defense. Responses: (1) Too little, (2) About right, (3) Too much, (4) Don't know.

POLL VARIANT ROPER: Source: Roper Center for Public Opinion Resarch, University of Connecticut. Question and responses: Identical to those for variant GSS above.

Table B.2

ABC News Poll on the stationing of American troops in Lebanon. Results from ABC News Poll, 7 West 66th Street, New York, N.Y. 10023; Report 95 in 1984 compiled with the aid of B. I. Page, R. Y. Shapiro and their colleagues at the National Opinion Research Center. The question was: Would you say the U.S. should send more troops to Lebanon, leave the number about the same, or remove the troops that are there now? The responses were: Send More Troops; Leave Number the Same; Remove Troops There Now; No Opinion.

Table B.3

ABC News Poll on the Democratic Primary. Results from ABC News Poll compiled with the aid of B. I. Page, R. Y. Shapiro and their colleagues at the National Opinion Research Center. (see Table B.2). This question was asked to registered voters who identify themselves either as Democrats or as independents who lean toward the Democrats: Imagine your state holds a Democratic primary and these are the candidates: Reubin Askew, Alan Cranston, John Glenn, Gary Hart, Ernest Hollings, Jesse Jackson, George McGovern and Walter Mondale. Whether you are a Democrat or not, for whom would you vote: Askew, Cranston, Glenn, Hart, Hollings, Jackson, McGovern or Mondale? (slight variation of wording starting Sep. 26, 1983). The responses for Mondale, Glenn, and No Opinion were tabulated separately. All other opinions were pooled and included volunteered responses for other minor candidates and for those who said they would not vote. This last catergory was 1–2% in all polls.

Table B.4

ABC News Poll on the Economic Climate. Results from ABC News Poll compiled with the aid of B. I. Page, R. Y. Shapiro and their colleagues at the National Opinion Research Center. (see Table B.2) The question was: Do you think the nation's economy is: Getting better; Getting worse; Staying the same; No opinion.

Table B.5

NBC News Poll on the Importance of Unemployment vs. Inflation. Results from NBC News Poll compiled with the aid of B. I. Page, R. Y. Shapiro and their colleagues at the National Opinion Research Center. (see Table B.1). The question was: In your opinion which is the more important problem facing the country today—finding jobs for people who are unemployed or holding down inflation? The responses were: Finding jobs; Both equal; Holding down inflation; Not sure.

Table B.6

Polls on the desirability of sending Contra aid. Results from the polling organizations indicated. All data from the Roper Center for Public Opinion Research, P.O. Box 440, Storrs, Conn. 06268 and CBS News, 524 W. 57th St., New York, N.Y. 10019. The question wordings by question are:

1. (President Reagan has taken a number of steps in Central America to meet what he says is the mounting supply of arms from Russia and Cuba going to left-wing rebel forces in El Salvador and to the Sandinista government in Nicaragua.) Let me ask you if you favor or oppose arming and supporting the rebels in Nicaragua who are trying to overthrow the Sandinista government in that country? Favor; Oppose; Not sure.
2. Do you favor or oppose the U.S. arming and supporting the rebels in Nicaragua who are trying to overthrow the Sandinista government in that country? Favor; Oppose; Not sure.
3. (Now let me read you some statements about President Reagan's handling of foreign affairs. For each, tell me if you agree or disagree.) (Interviewer- Rotate Question Order) ... It is wrong for the CIA (Central Intelligence Agency) to help finance the anti-Sandinista forces in Nicaragua? Agree; Disagree; Not sure.
4. Do you favor or oppose ... The U.S. (United States) arming and supporting the rebels in Nicaragua, who are trying to overthrow the Sandinista government in that country? Favor; Oppose; Not sure.
5. Should the United States be giving assistance to the guerrilla forces now opposing the Marxist government in Nicaragua? Yes; No; Don't know.
6. President Reagan recently asked Congress to authorize $100 million in U.S. aid to the rebels seeking to overthrow the communist government in Nicaragua, including $70 million for military purposes and $30 million for non-military purposes, such as food and medical supplies. Do you think the Congress should or should not authorize this new aid package? Should authorize (includes 2% volunteering should authorize non-military only); Shouldn't authorize; No opinion.
7. The House of Representatives has refused Reagan's request for 100 million dollars in military and other aid to the contra rebels in Nicaragua. Do you approve or disapprove of that action by the House? Approve; Disapprove; Don't know/No opinion.
8. Do you favor or oppose the U.S. sending $100 million in military and non- military aid to the Contra rebels in Nicaragua? Favor; Oppose; Not sure.
9. Do you think the U.S. government should give $100 in military and other aid to the Contras trying to overthrow the government in Nicaragua? Yes, should; No, shouldn't; No opinion.

TABLE B. 1

Polls on the desirability of increasing defense spending.

| Symbol & poll source | Date | (1) | (2) | (3) | (4) |
|---|---|---|---|---|---|
| GSS | 03/ /77 | 23.6 | 45.4 | 22.9 | 8.1 |
| ~ ROPER | 12/07/77 | 23 | 40 | 24 | 13 |
| GSS | 03/ /78 | 27.0 | 43.6 | 21.8 | 7.6 |
| NBC1 | 10/17/78 | 28 | 45 | 21 | 6 |
| ~ ROPER | 12/06/78 | 31 | 35 | 23 | 11 |
| NBC1 | 12/12/78 | 24 | 47 | 22 | 7 |
| ~ ROPER | 02/05/79 | 41 | 35 | 16 | 9 |
| NBC1 | 09/ /79 | 38 | 36 | 16 | 10 |
| NBC1 | 12/12/79 | 51 | 31 | 9 | 9 |
| NBC1 | 01/18/80 | 63 | 21 | 8 | 8 |
| NBC1 | 01/30/80 | 69 | 19 | 5 | 7 |
| GSS | 03/ /80 | 56.3 | 25.7 | 11.5 | 6.5 |
| NBC2 | 01/22/81 | 65 | 23 | 6 | 6 |
| NBC2 | 02/ /81 | 63 | 25 | 8 | 4 |
| NBC2 | 11/17/81 | 34 | 47 | 14 | 5 |
| ~ ROPER | 12/09/81 | 29 | 38 | 27 | 7 |
| GSS | 03/ /82 | 29.4 | 35.8 | 30.1 | 4.7 |
| NBC2 | 03/30/82 | 24 | 47 | 25 | 4 |
| ~ ROPER | 12/08/82 | 19 | 37 | 38 | 6 |
| GSS | 03/ /83 | 24.1 | 37.8 | 32.5 | 5.6 |
| NBC2 | 01/ /84 | 23 | 46 | 26 | 5 |
| GSS | 03/ /84 | 17.3 | 41.2 | 38.1 | 3.5 |

TABLE B. 2

ABC News Poll on the stationing of American troops in Lebanon.

| Date | Send More | Leave Same | Remove | No Opinion |
|---|---|---|---|---|
| 09/26/83 | 7 | 48 | 40 | 5 |
| 10/23/83 | 21 | 21 | 48 | 10 |
| 10/25/83 | 31 | 26 | 39 | 5 |
| 10/27/83 | 17 | 36 | 42 | 5 |
| 11/07/83 | 13 | 41 | 39 | 7 |
| 12/13/83 | 9 | 38 | 48 | 5 |
| 01/03/84 | 5 | 30 | 59 | 6 |
| 01/04/84 | 8 | 29 | 57 | 6 |
| 01/17/84 | 7 | 31 | 58 | 4 |

TABLE B. 3

ABC News Poll on the Democratic Primary

| Date | Mondale | Glenn | Others | No Opinion |
|---|---|---|---|---|
| 06/19/83 | 42 | 28 | 24 | 6 |
| 08/01/83 | 43 | 28 | 23 | 6 |
| 09/26/83 | 36 | 26 | 26 | 11 |
| 11/07/83 | 47 | 21 | 19 | 9 |
| 12/13/83 | 44 | 23 | 24 | 7 |
| 01/15/84 | 51 | 11 | 19 | 18 |
| 01/17/84 | 45 | 22 | 27 | 5 |
| 02/15/84 | 55 | 13 | 21 | 9 |

TABLE B. 4

| ABC News Poll on the Economic Climate | | | | |
|---|---|---|---|---|
| Date | Better | Same | Worse | No Opinion |
| 03/06/81 | 9 | 36 | 54 | 2 |
| 05/20/81 | 14 | 36 | 49 | 1 |
| 09/20/81 | 12 | 44 | 42 | 2 |
| 10/18/81 | 17 | 41 | 40 | 2 |
| 11/22/81 | 11 | 22 | 55 | 1 |
| 12/12/82 | 12 | 32 | 54 | 2 |
| 01/30/82 | 17 | 31 | 50 | 2 |
| 03/08/82 | 13 | 27 | 59 | 1 |
| 04/25/82 | 21 | 30 | 47 | 2 |
| 08/17/82 | 17 | 31 | 50 | 2 |
| 09/13/82 | 21 | 33 | 45 | 1 |
| 10/11/82 | 21 | 28 | 48 | 3 |
| 12/18/82 | 20 | 26 | 52 | 1 |
| 01/22/83 | 18 | 36 | 46 | 1 |
| 03/02/83 | 39 | 39 | 21 | 1 |
| 04/12/83 | 37 | 40 | 21 | 2 |
| 05/15/83 | 43 | 39 | 17 | 1 |
| 06/19/83 | 36 | 42 | 20 | 2 |
| 08/01/83 | 50 | 30 | 19 | 0 |
| 09/26/83 | 44 | 35 | 20 | 1 |
| 11/07/83 | 44 | 36 | 20 | 1 |
| 12/13/83 | 46 | 31 | 20 | 2 |
| 01/17/84 | 49 | 31 | 19 | 1 |

TABLE B. 5

| NBC News Poll on the Imiportance of Unemployment vs. Inflation | | | | |
|---|---|---|---|---|
| Date | Unemployment | Equal | Inflation | Not Sure |
| 03/22/77 | 43 | 18 | 37 | 2 |
| 04/26/77 | 41 | 14 | 43 | 2 |
| 08/03/77 | 50 | 11 | 36 | 3 |
| 03/22/78 | 39 | 10 | 49 | 2 |
| 05/02/78 | 32 | 9 | 56 | 3 |
| 06/28/78 | 33 | 10 | 55 | 2 |
| 08/08/78 | 28 | 11 | 59 | 2 |
| 09/20/78 | 27 | 9 | 61 | 3 |
| 11/14/78 | 22 | 8 | 69 | 1 |
| 12/12/78 | 22 | 9 | 68 | 1 |
| 03/20/79 | 23 | 11 | 64 | 2 |
| 09/11/79 | 21 | 10 | 67 | 2 |
| 05/29/80 | 30 | 15 | 52 | 3 |
| 07/09/80 | 30 | 15 | 53 | 2 |
| 08/06/80 | 35 | 14 | 48 | 3 |
| 08/23/80 | 26 | 20 | 53 | 1 |

TABLE B. 6

| Polls on the desirability of sending Contra aid. | | | | |
|---|---|---|---|---|
| Poll Number & Source | Date | Favor | Oppose | Don't Know |
| 1 HARRIS | 08/20/83 | 66 | 23 | 11 |
| 2 HARRIS | 09/12/83 | 60 | 24 | 16 |
| 3 HARRIS | 07/10/84 | 55 | 32 | 13 |
| 4 HARRIS | 03/04/85 | 53 | 36 | 11 |
| 5 GALLUP | 08/28/85 | 58 | 29 | 13 |
| 6 GALLUP | 03/07/86 | 52 | 37 | 11 |
| 7 ABC | 03/22/86 | 60 | 35 | 4 |
| 8 HARRIS | 04/07/86 | 62 | 33 | 5 |
| 9 CBS | 04/08/86 | 62 | 25 | 13 |

SECTION C

Summaries of Text Analyses

C.1 Strategy for Content Analysis by Successive Filtrations

Text was first processed through a series of "filter" program runs to remove irrelevant material. Finally the remaining, fairly homogeneous text was scored for its support of each of the polled positions. The outline of these steps is provided in Chapter 3. This section summarizes the dictionaries and rules used for the six analyses in this book. All dispatches were given infon content scores corresponding to the positions for which poll data were available (data in Section B). To illustrate, a single dispatch is followed in detail through all the analytic steps for the defense spending example.

C.2 Text Analysis for Defense Spending—Including Detailed Example

1. Filtration to select for Dispatches on American Defense Spending

The first step was a filtration to discard all dispatches not directly relevant to American defense spending. The entire text was marked for words referring to America (denoted by {A}), defense (denoted by {D}), and spending (denoted by {S}). Articles with all three word classes were retained for further analysis unless they also had the word "aid" or "fund" which led to the story being rejected as discussed in Chapter 3, Section 3.4-1.

The following actual dispatch, dated Feb. 19, 1983, was kept since it had many America, defense and spending words and neither of the prohibited words "aid" or "fund:"

SECTION: Washington Dateline
LENGTH: 576 words
BYLINE: By MAUREEN SANTINI, Associated Press Writer
DATELINE: WASHINGTON
KEYWORD: {A}Reagan-{D}Defense President {A}Reagan, invoking the menace of Adolf Hitler, asked {A}Congress on Saturday to suppress the urge to reduce his "minimal" 1984 {D}military {S}budget.

In his weekly radio broadcast from the White {A} House, the president said his $238.6 billion {D}defense {S}spending proposal for fiscal year 1984, which begins Oct. 1, was necessary "unless we're willing to gamble with our immediate security and pass on to future generations the legacy of neglect we inherited.

"That kind of neglect would only weaken peace and stability in the world, both now and in the years ahead."

{A}Reagan said," Now, I know this is a hard time to call for increased {D}defense {S}spending. It isn't easy to ask {A}American families who are already making sacrifices in the recession . . .

"On the other hand, it's always very easy and very tempting politically to come up with arguments for neglecting {D}defense {S}spending in time of peace," the President said.

"One of the great tragedies of this century was that it was only after the balance of power was allowed to erode and a ruthless adversary, Adolf Hitler, deliberately weighed the risks and decided to strike that the importance of a strong {D}defense was realized too late."

Though {A}Reagan called for an overall freeze on domestic {S}spending in his 1984 {S}budget, the {D}defense portion increased by 14 percent. And that was after the president cut $8 billion from the Pentagon {S}request before submitting it to {A}Congress.

{A}Reagan said he and his administration had "agonized" over the current {D}defense {S}budget by trimming {S}requests and cutting non-essential programs.

"The {D}defense {S}budget we finally presented is a minimal {S}budget to protect our country's vital interests and meet our commitments," he said.

The president said it was "far better to prevent a crisis than to have to face it unprepared at the last moment.

That's why we have an overriding moral obligation to invest now, this year, in this {S}budget, in restoring {A}America's strength to keep the peace and preserve our freedom."

He said the Soviet Union outspends the {A}United States on . . . fits and starts," he said, "we will never convince the Soviets that it's in their interests to behave with restraint and negotiate genuine {D}arms reductions. We will also burden the {A}American taxpayer time and again with the high {S}cost of crash rearmament.

"Sooner or later, the bills fall due."

{A}Senate Minority Leader Robert C. Byrd of West Virginia gave the Democratic response to Reagan's comments and took issue with the president's contention that cutting the administration {D}defense {S}budget {S}request would expose the country to danger.

"For example, we do not need two new manned {D}bombers—one of which will be obsolete almost immediately after it is built," Byrd said, referring to the B-1 {D}bomber under construction and the advanced Stealth plane expected to emerge from development late in this decade.

Arguing that the national {D}defense depends on a strong economy, Byrd stressed the need for greater . . .

Three adjacent dots in the text indicated that the remainder of a sentence was not retrieved due to the text being further than 50 words from one of the seven search words: defense military, arms, spend!, expenditure, fund!, and budget! (see Section B).

After this filtration, the total number of characters of text dropped from 820,000 to 600,000. The average number of words per dispatch increased from 148 to 199. The dispatch number dropped more dramatically (from 692 to 377) than the number of characters of text because very little was retrieved from irrelevant dispatches. The collection was stopped as soon as a story was seen to be not pertinent during the retrieval from the Nexis data base. The increase in average word count per dispatch was a natural consequence of discarding dispatches from which very few words were collected.

2. Filtration to select for paragraphs on defense spending.

The second text analysis step selected only paragraphs directly discussing defense spending. The condition was that a defense word (denoted by {D}) be close to a spending word (denoted by {S}). The paragraphs from the dispatch given above were scored using these rules. The decision for each paragraph is given directly below the paragraph:

President Reagan, invoking the menace of Adolf Hitler, asked Congress on Saturday to suppress the urge to {S}reduce his "minimal" 1984 {D}military {S}budget.
ABOVE PARAGRAPH WAS KEPT.

In his weekly radio broadcast from the White House, the president said his $238.6 billion {D}defense {S}spending proposal for fiscal year 1984, which begins Oct. 1, was necessary "unless we're willing to gamble with our immediate security and pass on to future Generations the legacy of neglect we inherited.
ABOVE PARAGRAPH WAS KEPT.

"That kind of neglect would only weaken peace and stability in the world, both now and in the years ahead."
ABOVE PARAGRAPH WAS DISCARDED.

Reagan said, "Now, I know this is a hard time to call for {S}increased {D}defense {S}spending. It isn't easy to ask American families who are already making sacrifices in the recession . . .
ABOVE PARAGRAPH WAS KEPT.

"On the other hand, it's always very easy and very tempting politically to come up with arguments for neglecting {D}defense {S}spending in time of peace," the president said.
ABOVE PARAGRAPH WAS KEPT.

"One of the great tragedies of this century was that it was only after the {S}balance of power was allowed to erode and a ruthless adversary, Adolf Hitler, deliberately weighed the risks and decided to strike that the importance of a strong {D}defense was realized too late."
ABOVE PARAGRAPH WAS DISCARDED.

Though Reagan called for an overall freeze on domestic {S}spending in his 1984 {S}budget, the {D}defense portion {S}increased by 14 {S}percent. And that was after the president{S} cut $8 billion from the {D}Pentagon {S}request before submitting it to Congress.
ABOVE PARAGRAPH WAS KEPT.

Reagan said he and his administration had "agonized" over the current {D}defense {S}budget by trimming {S}requests and {S}cutting non-essential programs.
ABOVE PARAGRAPH WAS KEPT.

"The {D}defense {S}budget we finally presented is a minimal {S}budget to protect our country's vital interests and meet our commitments," he said.
ABOVE PARAGRAPH WAS KEPT.

The president said it was far better to prevent a crisis than to have to face it unprepared at the last moment. "That's why we have an overriding moral obligation to invest now, this year in this {S}budget, in restoring america's {S}strength to keep the peace and preserve our freedom."
ABOVE PARAGRAPH WAS DISCARDED.

He said the soviet union outspends the united states on . . .
ABOVE PARAGRAPH WAS DISCARDED.

. . . fits and starts, "he said. "We will never convince the soviets that it's in their interests to behave with restraint and negotiate genuine{D} arms {S}reductions. We will also burden the American taxpayer time and again with the high{S} cost of crash rearmament.
ABOVE PARAGRAPH WAS KEPT.

"Sooner or later, the bills fall due."
ABOVE PARAGRAPH WAS DISCARDED.

Senate Minority Leader Robert C. Byrd of West Virginia gave the Democratic response to Reagan's comments and took issue with the president's contention that {S}cutting the administration {D}defense {S}budget {S}request would expose the country to danger.
ABOVE PARAGRAPH WAS KEPT.

"For example, we do not need two new manned {D}bombers, one of which will be obsolete almost immediately after it is built," Byrd said, referring to the B-1 {D}bomber under construction and the advanced stealth {S}plane expected to emerge from development late in this decade."
ABOVE PARAGRAPH WAS DISCARDED.

Arguing that the national {D}defense depends on a strong economy, Byrd stressed the need for greater . . .
ABOVE PARAGRAPH WAS DISCARDED This sample dispatch was chosen because it illustrated most of the features of the text analysis. In consequence, this story was one of the most complex found and was somewhat atypical in containing a substantial amount of information indirectly relevant to the topic defense spending. More frequently, the discarded text was on a topic other than defense spending. In a press conferences, for instance, the shift in topic could be quite abrupt.

Nevertheless, the relevant thoughts in the discarded text, even in the above example, were almost always also found in the retained text. For example, the first discarded paragraph was an expansion on the point in the previous, retained paragraph rather than being a new idea. Also, the next to the last discarded paragraph only illustrated the point in the previous, retained paragraph.

Although a small amount of relevant information may have been lost by discarding the paragraphs with pertinent information which was indirect, the gain was the immense simplification of the subsequent analysis with the total text from all dispatches being reduced from 600,000 characters to 220,000.

3. Numerical scoring for three positions on defense spending.

The paragraphs retained from the second filtration described above were then scored for favoring more, same or less defense spending. Since the previous filtration had already guaranteed that a defense word was close to a spending word, the scoring only depended on a defense word (denoted by {D}) being close to modifiers implying these three positions. The modifiers fell into the three classes favoring more (denoted by {M}), same (denoted by {S}), and less (denoted by {S}) with a less word close to a more word being equivalent to a same word and with a less word close to another less word also being equivalent to a same word. In some combinations, word order and proximity were both also important. In addition, the prefix "non" (denoted by {n}) preceding a defense word meant that the defense word was not considered to be relevant to the military.

All paragraphs had a total score of 1.0 with each cluster of modifier words close to a defense word contributing to the final score. If a paragraph only had one such cluster, the entire paragraph score of 1.0 was assigned to the appropriate position. When there was more than one cluster, the score of 1.0 was divided into equal fractions with each cluster receiving one part.

This scoring procedure is illustrated using the retained paragraphs of the dispatch considered above. The score for each paragraph is given immediately following the paragraph. The scores were for whether the paragraph favored more, same and/or less defense spending. The indented text following the scores explains way the computer arrived at the decisions.

President Reagan, invoking the menace of Adolf Hitler, asked Congress on Saturday to {L}suppress the urge to {L}reduce his "minimal" 1984 {D}military budget.
SCORE FAVORING: More=0.00 Same=1.00 Less=0.00
The "suppression" of a "reduction" implied favoring the same level for the "military" budget. The three words were treated as a cluster because they were close to each other.

In his weekly radio broadcast from the White House, the president said his $238.6 billion {D}defense spending proposal for fiscal year 1984, which begins Oct. 1, was {M}necessary unless we're willing to gamble with our immediate security and pass on to future generations the legacy of {M}neglect we inherited.
SCORE FAVORING: More=0.00 Same=0.00 Less=0.00
No score here. "Necessary" and "neglect" which implied more spending were too far away from "defense."

Reagan said, "Now, I know this is a hard time to call for {M}increased {D}defense spending. It {L}isn't easy to ask American families who are already making sacrifices in the recession . . .
SCORE FAVORING: More=1.00 Same=0.00 Less=0.00
The operative word combination was "increased" "defense." The word "isn't" only changed the sense of words like "increased" if the increases was ahead of the isn't.

"On the other hand, it's always very easy and very tempting politically to come {M}up with arguments for {M}neglecting {D}defense spending in time of peace," the president said.
SCORE FAVORING: More=1.00 Same=0.00 Less=0.00
The scored combination was "up" . . . "neglecting" "defense". "Up" and "neglect" were scored together as meaning more should be spent. The inclusion of words like "neglect" and "inadequate" in the dictionary did permit the public to reason and thereby take indirect information into account. These words were included because they were usually found in the context of arguments that defense spending should have been increased if it was neglected or inadequate.

Though Reagan called for an overall {S}freeze on domestic spending in his 1984 budget, the {D}defense portion {M}increased by 14 percent. And that was after the president {L}cut $8 billion from the {D}Pentagon request before submitting it to Congress.
SCORE FAVORING: More=0.50 Same=0.00 Less=0.50
This paragraph was scored as making two different statements one favoring more defense spending ("defense" "increased") and one favoring less ("cut" "pentagon"). Therefore, the paragraph score of 1.0 was divided in two. "Freeze" was too far away from "defense" to have a connotation for defense, as was consistent with the actual meaning of the paragraph.

Reagan said he and his administration had "agonized" over the current {D}defense budget by {L}trimming requests and {L}cutting {n}non-essential programs.
SCORE FAVORING: More=0.00 Same=1.00 Less=0.00
The reasonable score favoring unchanged military spending was serendipitous. This score was due to "trimming" and "cutting" being equivalent to the concept of same spending. This combination close to "defense" gave the score favoring same spending. The "non" did not have a function here. If the word defense occurred in place of the word essential, then the concept of defense would have been nullified indicating that the topic was not about defense.

"The {D}defense budget we finally presented is a minimal budget to protect our country's vital interests and meet our commitments," he said.
SCORE FAVORING: More=0.00 Same=0.00 Less=0.00
This paragraph had no score since "defense" was close to no modifier words. In fact, when this paragraph was read by itself, it was consistent with any of the positions. The actual information favoring one position or another was elsewhere in the text.

... fits and starts," he said. We will never convince the Soviets that it's in their interests to behave with restraint and negotiate genuine arms {L}reductions. We will also burden the American taxpayer time and again with the {M}high cost of crash rearmament.
SCORE FAVORING: More=0.00 Same=0.00 Less=0.00

This paragraph also had no score since there were not words directly connoting defense. It could be argued that it favored more defense spending indirectly. However, the statement was probably weaker than those above actually speaking directly to the issue.

Senate Minority Leader Robert C. Byrd of West Virginia gave the Democratic response to Reagan's comments and took issue with the president's contention that {L}cutting the administration {D}defense budget request would expose the country to {L}danger.
SCORE FAVORING: More=0.00 Same=0.00 Less=1.00

The score of favoring less spending came from "cutting" "defense." "Danger" was too far from "defense" to be scored. The score was probably correct although a sounder basis for the conclusion would have included: took issue ... cutting ... defense ... danger.

The final score for this dispatch was 2.5 paragraphs favoring more, 2.0 favoring same and 1.5 favoring less spending.

This sample dispatch was one of the most complex retrieved. Six of the nine paragraphs were scored for supporting one of the three positions. For comparison, the average number of relevant paragraphs was only 1.7 among all dispatches with at least one paragraph with a positive score.

Since the average AP paragraph had approximately 30 words, the final scoring came from approximately 50 words although approximately 80 words were examined in each scored dispatch.

The difference between the 50 and 80 words meant that 30–40% of the paragraphs had no score. This was true for 3 of the 9 paragraphs in the dispatch just examined.

The scoring for defense spending came from paragraphs representing 5–10% of the words in the average dispatch with 400–900 words. Only 20% of the dispatches had fewer words and 10% had more.

Being fairly long, this dispatch also illustrated most of the scoring features. In fact, the problems were more severe for this text than for most others. The more typical dispatches had smaller numbers of relevant paragraphs and usually made their points about defense spending quite directly before proceeding to other topics. There tended to be fewer crosscurrents to complicate the scoring.

The most appropriate base for considering the scoring was the 377 dispatches retained after the first filtration step. The others were not about defense spending or were about non-American forces. Of these 377, 72% were used in the final scoring.

4. Numerical scoring for two positions on Defense Spending

As an alternative to the evaluation just described, the text was also scored to favor only two positions-more or less defense spending. To do so, the concept of same spending was eliminated. As a result, some modifier words like "maintain" and "keep" were omitted from the dictionary. These words were previously interpreted to favor the concept of same spending. Other words, like "freeze" and "frozen" were moved from the same spending class to the modifier class connoting less spending. Now, a less word preceding a more word was assigned to favor less instead of same spending (e.g. "cut ... increase"). Similarly, two nearby less words (e.g. "cut ... reduction") were also assigned to favor more instead of same.

Other dictionary changes included the deletion of a few words favoring more (bolster) and less (alternate, weaken, without) spending. The words nuclear and arms were added to the list of words referring to defense. Thus "nuclear arms reduction talks" was interpreted to support less defense spending while this phrase was simply ignored in the previous scoring.

Using this alternate dictionary and its associated rules, the text scored in Section C.3-3 above was rescored. Those paragraphs with changed final scores are listed below together with indented comments:

President Reagan, invoking the menace of Adolf Hitler, asked Congress on Saturday to {L}suppress the urge to {L}reduce his "minimal" 1984 {D}military budget.
SCORE FAVORING: More=1.00 Less=0.00

The "suppress" ... "reduce" was interpreted previously to favor same spending instead of more spending.

Reagan said he and his administration had "agonized" over the current {D}defense budget by {L}trimming requests and {L}cutting {n}non-essential programs.
SCORE FAVORING: More=1.00 Less=0.00

The "trimming" ... "cutting" was misscored previously to favor same spending and was misscored this time to favor more spending. Again, the wrong score was not entirely inconsistent with the sense of the paragraph.

... fits and starts," he said. "We will never convince the Soviets that it's in their interests to behave with restraint and negotiate genuine{D} arms {L}reductions. We will also burden the American taxpayer time and again with the {M}high cost of crash rearmament."
SCORE FAVORING: More=0.00 Less=1.00

Previously, this paragraph had a zero score since "arms" was not in the dictionary in order to omit reference to arms reduction. Here, "arms" "reduction" was interpreted to suggest that defense spending, likewise, should be diminished.

With these modifications, the new score was 4.5 paragraphs favoring more spending and 2.5 favoring less. The text recoveries during the scoring are presented in Table C.1.

5. Text analysis for defense waste and fraud.

a. Filtration to remove dispatches not on American defense spending

The first step discarded dispatches if they were not about the American waste and fraud. The U.S. was usually not the focus when there was a mention of a non-American region in the heading portion prepared by the AP and listed before the body of a dispatch. The heading contained these designators: dateline, headline, keyword and section (see example in Section C.3-1 above). Therefore, the filtration command was simply to look for one of these designators followed closely by a word referring to foreign part of the world. Dispatches referring to defense against waste and fraud for non-defense topics were also not retained for further study if the stories mentioned other key words such as hazardous and toxic referring to non-military waste.

b. Filtration to select paragraphs on defense waste and fraud.

This filtration was accomplished by looking for word combinations referring to both the defense industry and to waste. Some combinations were simple, like "overcharge" . . . "weapons." Other combinations were more complex, like "defense" . . . "contractor" . . . "cut corners."

c. Numerical Scoring for stories on defense waste and fraud.

Any word combination suggesting defense waste such as those in the previous paragraph led to the AP paragraph containing the combination to be scored as favoring less defense spending. The recovery data for this waste and fraud analysis is given in Table C.2.

C.3 Text Analysis for Troops in Lebanon

1. Filtration to select for paragraphs on American troops in Lebanon.

The first filtration selected paragraphs containing words referring to America, troops, and Lebanon. At this step, a mention of policy or a synonym was considered to be equivalent to troops since policy often referred to troops. Paragraphs were discarded if they had words referring to non-American troops (e.g. Arab, Christian, Druse, Syrian, Israeli), a non-Lebanon region of the world (e.g. Grenada), or had words referring to non-military activities (e.g. economy). In this analysis, paragraphs were considered to be about America or Lebanon after a previous mention of words indicating these geographic areas unless there was a word (e.g. Christian, Syrian, France) indicating either non-American troops, a non-Lebanese location (.e.g. Israel). Also, pronouns such as "they" and "them" were taken to refer to troops if there was a mention of troops in the previous paragraph.

2. Filtration to select remove paragraphs on military action and Christmas entertainment.

This step removed all text on actual combat and all paragraphs on entertainer Bob Hope's Christmas visit to Lebanon.

3. Numerical scoring for dispatches on troops in Lebanon.

The final scoring step used the major criterion that a word referring to troops or policy should be near modifiers word favoring more, same or less although some words—like stay and withdraw—were able by themselves to favor keeping or removing troops. Therefore, the paragraphs had infon content scores favoring more, same or less troops. The recovery data for the analyses are given in Table C.3.

C.4 Text Analysis for the Democratic Primary

1. Analysis using bandwagon words a. Filtration for paragraphs about candidates. First, paragraphs were selected and kept only if they had at least one of the names of the Democratic candidates appearing in the ABC News Poll of Table B.3.

b. Scoring using bandwagon words. Then the text was scored for being either favorable or detrimental to John Glenn, Walter Mondale, or Others (Rubin Askew, Alan Cranston, Gary Hart, Ernest Hollings, Jesse Jackson, or George Mcgovern). These scores depended on modifier words implying success or failure being close to a candidate name. The scores belonged to 6 positions, 3 favorable to Mondale, Glenn, and Others, and 3 disadvantageous to these candidates. The recovery data are in Table C.4.

2. Analysis using Name Count

The paragraphs in the original retrievals were scored without any previous filtration steps. Every paragraph was still given a total score of 1.0. If only one candidate was mentioned in the paragraph, then the score in favor of that candidate was 1.0. If several candidates were discussed, then that score of 1.0 was shared among the candidates. This type of scoring obviously did not generate any scores unfavorable to a candidate. Therefore, only three types of paragraph scores were obtained, those mentioning Mondale, Glenn and others (recovery data in Table C.4).

C.5 Text Analysis for the Economic Climate

1. Filtration to eliminate dispatches on non-American economies.

The first step discarded dispatches if they were not about the United States. The procedure was very similar to that in Section C.2-5a above, looking for non-U.S. words in the the dispatch heading region.

2. Filtration to select paragraphs discussing the economy.

The next filtration step selected paragraphs with at least one word referring to some aspect of the economy. The reference did not have to be to the economy as whole but could include components such as "agriculture." Also permitted were words like "rally" describing economic performance.

3. Numerical Scoring

In the final step, infon content scores were assigned from single words suggesting better, same or worse in the context of economic conditions. Therefore, the dictionary had qualifiers like "best", "confusion" and "bad" divided into classes favoring better, same and worse. Additional dictionary words included those (e.g. "not" and "difficult") which could alter the sense of the qualifier words. Since the previous filtration had already guaranteed that each paragraph had to make reference to an aspect of the economy, the score could be determined by single words suggesting better, same or worse. The recovery data for all steps are given in Table C.5.

C.7 Text Analysis for Unemployment versus Inflation

1. Filtration to eliminate dispatches on non-American economies.

This step to remove dispatches on foreign countries was like the first filtration for dispatches on defense waste and fraud (Section C.2-5a) and the economic climate (previous section).

2. Numerical scoring

The scoring was for: unemployment more important, equal importance, or inflation more important. The main criterion was that inflation or unemployment or a synonym should be close to a modifier words indicating that the problem was important. A significant number of paragraphs spoke of both problems being important. In recognition of this fact, the score was for equal importance if a modifier word made inflation important and if an unemployment word followed shortly after as in the phrase "we must combat both inflation and unemployment." Similarly, if a paragraph had one word cluster supporting the importance of each of the two topics, the problems were considered to be equally crucial (recovery data in Table C.6).

C.7 Text Analysis for Contra Aid

1. Filtration to select paragraphs on Contra aid.

Paragraphs kept in this filtration step required that there be simultaneous mention of a word implying Nicaragua, the United States, and funding. For this filtration step it did not matter if the reference to Nicaragua was to the Contras opposing the government or to the government side. A mention of Nicaragua meant that the next paragraph also was about Nicaragua unless there was discussion of another Central American country like El Salvador or Honduras.

2. Numerical scoring by Fan.

The paragraphs surviving the filtration were scored by the author by looking for modifier words close to word combinations discussing both the Contras and funding. Combinations of modifier words were examined for whether they favored or opposed Contra aid. An example of a word cluster favoring Contra aid would be "approve" ... "Contra" ... "aid." If there were conditional words like "if" in the paragraph, the paragraph was considered to favor both positions equally. Therefore, the final scores were for paragraphs either supporting or opposing Contra aid.

3. Numerical scoring by Simone French, Peter Miene, and Janet Swim.

The paragraphs scored by Fan were scored independently by these three graduate research assistants working as a team. Their scoring method was quite different from that of Fan looking at word combinations favoring or opposing aid without requiring that these words be close to words discussing Contra aid. French et al included many indirect pieces of information to imply a position on Contra aid. For instance, the word cluster "administration" ... "propaganda" by itself was scored as opposing Contra aid. This could safely be done because the paragraphs were already scored as being relevant to Contra aid by the filtration.

The recovery data for both scoring methods are given in Table C.7.

Table C.1

Summary of Text Analysis for Defense Spending. The upper portion gives the recoveries of the text and paragraphs at different stages of the text analysis. The Nexis search identified 9314 dispatches of which 692 were retrieved at random. For the calculation, words are assumed to be approximately 8 characters long. The lower portion gives data for each position scored after the final step in the upper portion of the table. The data for Any position refers to all positions combined.

Table C.2

Summary of Text Analysis for Defense Waste and Fraud: Scoring of all mentions of waste and fraud as favoring less defense spending. See Table C.1 for explanation. The Nexis search identified 878 dispatches of which 487 were retrieved at random.

Table C.3

Summary of Text Analysis for Troops in Lebanon: Scoring for more, same and less troops. See Table C.1 for explanation. The Nexis search identified 1517 dispatches of which 467 were retrieved at random.

Table C.4

Summary of Text Analysis for Democratic Primary: Scoring for bandwagon words. See Table C.1 for explanation. The Nexis search identified 2435 dispatches of which 425 were retrieved at random.

Table C.5

Summary of Text Analysis for Economic Climate: Scoring for better, same and worse. See Table C.1 for explanation. The Nexis search identified 12,393 dispatches of which 461 were retrieved at random.

Table C.6

Summary of Text Analysis for Unemployment versus Inflation: Scoring for unemployment, equal and inflation more important. See Table C.1 for explanation. The Nexis search identified 1591 dispatches of which 1582 were retrieved at random.

Table C.7

Summary of Text Analysis for Contra Aid: Scoring for infons favoring and opposing aid. See Table C.1 for explanation. The Nexis search identified 1156 dispatches of which 969 were retrieved at random.

TABLE C. 1

Summary of Text Analysis for Defense Spending.

| Step in Analysis | Characters of text No. | Characters of text % Orig. | Dispatches No. | Dispatches % Orig. | 8 Char. Words per Dispatch |
|---|---|---|---|---|---|
| Nexis Retrieval | 820,000 | 100 | 692 | 100 | 148 |
| First Filter | 600,000 | 73 | 377 | 54 | 199 |
| Second Filter | 220,000 | 27 | 340 | 49 | 81 |
| Scoring Runs: | | | | | |
| Scored to Favor More, Same, Less | | | 272 | 39 | |
| Scored to Favor More and Less only | | | 280 | 40 | |

| Position favoring | Average paragraphs in dispatches with at least one paragraph favoring this position | Total dispatches with a least one paragraph favoring this position |
|---|---|---|
| Scored to Favor More, Same, Less: | | |
| More | 1.3 | 177 |
| Same | 1.1 | 66 |
| Less | 1.2 | 132 |
| Any position | 1.7 | 272 |
| Score to Favor More and Less Only: | | |
| More | 1.3 | 197 |
| Less | 1.3 | 167 |
| Any position | 1.7 | 280 |

TABLE C. 2

Summary of Text Analysis for Defense Waste and Fraud: Scoring of all mentions of waste and fraud as favoring less defense spending.

| Stop in Analysis | Characters of text | | Dispatches | | 8 Char. Words per Dispatch |
|---|---|---|---|---|---|
| | No. | % Orig. | No. | % Orig. | |
| Nexis Retrieval | 660,000 | 100 | 512 | 100 | 160 |
| First Filter | 350,000 | 54 | 279 | 54 | 167 |
| Second Filter | 83,000 | 13 | 159 | 31 | 69 |
| Scored to Mention Waste and Fraud | | | 147 | 29 | |

| Position favoring | Average paragraphs in dispatches with at least one paragraph favoring this position | Total dispatches with at least one paragraph favoring this position |
|---|---|---|
| Less due to waste and fraud | 1.3 | 147 |

TABLE C.3

Summary of Text Analysis for Troops in Lebanon: Scoring for more, same and less troops.

| Step in Analysis | Characters of text | | Dispatches | | 8 Char. Words per Dispatch |
|---|---|---|---|---|---|
| | No. | % Orig. | No. | % Orig. | |
| Nexis Retrieval | 1,570,000 | 100 | 467 | 100 | 420 |
| First Filter | 490,000 | 31 | 393 | 89 | 156 |
| Second Filter | 240,000 | 15 | 352 | 80 | 85 |
| Scored to Favor More, Same and Less | | | 238 | 54 | |

| Position favoring | Average paragraphs in dispatches with at least one paragraph favoring this position | Total dispatches with at least one paragraph favoring this position |
|---|---|---|
| More | 0.6 | 36 |
| Same | 1.6 | 197 |
| Less | 1.4 | 172 |
| Any position | 2.4 | 238 |

TABLE C. 4

Summary of Text Analysis for Democratic Primary: Scoring for bandwagon words.

| Step in Analysis | Characters of text | | Dispatches | | 8 Char. Words per Dispatch |
|---|---|---|---|---|---|
| | No. | % Orig. | No. | % Orig. | |
| Nexis Retrieval | 1,100,000 | 100 | 425 | 100 | 310 |
| Bandwagon Analysis: | | | | | |
| First Filter | 610,000 | 100 | 425 | 100 | 199 |
| Scoring Run | | | 159 | 37 | |
| Name Count analysis: | | | 425 | 100 | |

| Position | Average paragraphs in dispatches with at least one paragraph favoring this position | Total dispatches with at least one paragraph favoring this position |
|---|---|---|
| Bandwagon Analysis: | | |
| Pro Mondale | 1.6 | 85 |
| Pro Glenn | 1.2 | 29 |
| Pro Others | 1.4 | 56 |
| Con Mondale | 1.1 | 16 |
| Con Glenn | 1.9 | 12 |
| Con Others | 1.1 | 33 |
| Any position | 2.0 | 158 |
| Name Count Analysis: | | |
| Mention Mondale | 2.6 | 240 |
| Mention Glenn | 2.0 | 187 |
| Mention Others | 4.2 | 326 |
| Any position | 5.6 | 425 |

TABLE C. 5

Summary of Text Analysis for Economic Climate: Scoring for better, same and worse.

| Step in Analysis | Characters of text | | Dispatches | | 8 Char. Words per Dispatch |
|---|---|---|---|---|---|
| | No. | % Orig. | No. | % Orig. | |
| Nexis Retrieval | 730,000 | 100 | 461 | 100 | 197 |
| First Filter | 590,000 | 81 | 367 | 80 | 201 |
| Second Filter | 420,000 | 58 | 366 | 79 | 144 |
| Scored to Favor Better, Same and Worse | | | 306 | 66 | |

| Position favoring | Average paragraphs in dispatches with at least one paragraph favoring this position | Total dispatches with at least one paragraph favoring this position |
|---|---|---|
| Better | 2.0 | 245 |
| Same | 0.7 | 10 |
| Worse | 1.8 | 222 |
| Any position | 3.0 | 306 |

TABLE C. 6

Summary of Text Analysis for Unemployment versus Inflation:
Scoring for unemployment, equal and inflation more important.

| Step in Analysis | Characters of text No. | Characters of text % Orig. | Dispatches No. | Dispatches % Orig. | 8 Char. Words per Dispatch |
|---|---|---|---|---|---|
| Nexis Retrieval | 2,300,000 | 100 | 1582 | 100 | 177 |
| First Filter | 1,800,000 | 79 | 1183 | 75 | 189 |
| Scored to Favor Unemployment Important, Equal Importance, and Inflation Important | | | 695 | 44 | |

| Position favoring importance of | Average paragraphs in dispatches with at least one paragraph favoring this position | Total dispatches with at least one paragraph favoring this position |
|---|---|---|
| Unemployment | 1.4 | 281 |
| Equal | 1.1 | 243 |
| Inflation | 1.4 | 442 |
| Any position | 1.7 | 695 |

TABLE C. 7

Summary of Text Analysis for Contra Aid: Scoring for infons
favoring and opposing aid.

| Step in Analysis | Characters of text No. | Characters of text % Orig. | Dispatches No. | Dispatches % Orig. | 8 Char. Words per Dispatch |
|---|---|---|---|---|---|
| Nexis Retrieval | 2,000,000 | 100 | 969 | 100 | 258 |
| First Filter | 1,300,000 | 63 | 920 | 95 | 164 |
| Scored to Favor and Oppose Aid: | | | | | |
| by Fan | | | 770 | 84 | |
| by Swim et al | | | 906 | 98 | |

| Position | Average paragraphs in dispatches with at least one paragraph favoring this position | Total dispatches with at least one paragraph favoring this position |
|---|---|---|
| Fan Analysis: | | |
| Favor Aid | 1.2 | 585 |
| Oppose Aid | 1.3 | 620 |
| Either Position | 2.0 | 770 |
| Swim et al Analysis: | | |
| Favor Aid | 1.7 | 770 |
| Oppose Aid | 2.2 | 837 |
| Either Position | 3.4 | 906 |

SECTION D

Details of Actual Public Opinion Projections

The basic method for computing public opinion from AP infons was outlined in Section A (Section A.10) and involved: (1) constructing "skeleton persuasive force" functions G" from the persistance constant, infon content scores and infon emission times, (2) formulating a "population conversion model" describing the opinion conversions due to persuasive messages, and (3) using functions G", the population conversion model, the "modified persuasibility constants" and an initial set of poll values to compute public opinion. The calculations for the infon content scores have already been presented in Section C. This Section describes the calculations of the persuasive forces driving opinion changes and the subsequent projections of public opinion.

D.1 Computations of Persuasive Forces

The equations for the calculations are those given in Section A. The assumptions specific to computations for AP dispatches are given in Section A.10.

First, all the infons favoring a position were pooled and their dates of transmission and content scores were used for computing skeleton persuasive force functions $G''_f(t)$ using postulated values for the persistence constant and Equation A.27 of Section A. Unless otherwise stated, this persistence constant was assigned a one day half-life for all infons.

D.2 Population Conversion Models

These models, all presented as figures in Chapter 4 (e.g. FIG. 4.2), specify the indices over which the summations are performed in Equation A.26. Every model has one subpopulation corresponding to each of the poll positions. The subpopulation names always begin with B (for "believers" in a position). The other elements in the models are the persuasive force functions (or the skeleton persuasive force functions G" since these two types of functions differ only by a constant of proportionality). The model describes the opinion changes resulting from the actions of individual peruasive force functions.

D.3 Opinion Projections

After formulation of population conversion models like those in FIG. 1.2, opinion computations were made from Equation A.26. The computations began with the time and opinion percentages at the first measured poll point. Then calculations were made for opinion one @t later using the opinion projection equations for all the subpopulations. The result was opinion predictions for all positions at the new time. These values where then used for further calculations after another @t. The process was repeated until the time of the last poll point.

Along the way, estimates were obtained for all the intermediate poll points for all the poll positions.

For these calculations, the @t was usually chosen to be a few hours. This @t was known since it was chosen by the investigator. The T/R ratio was also known since that was only the reciprocal of the fraction of AP dispatches studied among the total identified. The unknowns required in projection equations are:

1. The persistence constant. For each of the six examples, this constant was optimized by calculating the mean squared deviations (MSD) (see Section A, section A.10) between the calculated opinion and opinion as measured in polls. The optimum persistence constant was the one giving the lowest MSD. Since a one day half-life was a good concensus value for this constant (Chapter 4), this value was used for all plotted projections.

2. The modified persuasibility constant $k'_{2j}$ assuming the same $k'_{2j}$ for all positions. Formally, it was conceivable this constant could be different for each position for which there were infons (Section A). However, in initial calculations, it was assumed that all positions had the same $k'_{2j}$. The best value for this common $k'_{2j}$ was found by minimization of the MSD.

3. Refining weights for infons favoring different positions. Once the best common $k'_{2j}$ was assigned, the projections were examined to see if expected opinion for any one position was consistently too high or too low. If so, then a minimum MSD calculation was performed to see if a $k'_{2j}$ different from the common $k'_{2j}$ gave a lower MSD. If a significantly lower MSD was observed, then the altered $k'_{2j}$ was used for the projections. However, this difference was hoe reported as a new $k'_{2j}$ but rather as a refining weight defined as the ratio between the newly chosen constant and the common $k'_{2j}$ optimized in Point 2 above. This refining weight specified the relative persuasiveness of the different groups of infons. Therefore, all modified persuasibility constants were given as the product of the constant assigned in Point 2 above and a corresponding refining weights.

Whenever any of the constants discussed above was optimized, all other constants were retested to see if they still gave the best value. If not, all were reoptimized until the best combination of constants was obtained. The only exception was for Contra aid where a one day persistence half-life was used since this was the best concensus constant for all issues.

Although the invention has been described here in its preferred form, it shall be understood that changes may be made in detail in structure without departing from the spirit and scope of the invention as set forth in the claims appended hereto.

I claim:

1. A system for determining the presence within a text message of one or more predetermined ideas wherein the text of said message is in digital form and includes components in a human language, said system comprising:
   a) means for searching said message for a plurality of predetermined scoring words and identifying words in said message which match with said scoring words;
   b) means for determining the sequence within said message of matching scoring words and the distance between certain ones of said matching scoring words; and
   c) means for identifying which said ideas are present in said message according to one or more predetermined rules, each of said rules specifying a relationship between one or more of said matching scoring words.

2. A system according to claim 1 further including means for assigning numerical scores for said message according to said one or more predetermined rules.

3. A system according to claim 1 further including communication means for electronically connecting to an electronic data base containing text stored in digital form and for obtaining said text.

4. A system according to claim 1, wherein said system further includes:
   d) means for dividing the text of said message into specified blocks of text, wherein said blocks can include all or a subset of the text of said message;
   e) means for making summary representations of each said block of text wherein each important concept conveyed by said message is reduced to a single concept symbol, and wherein each important concept is identified from:
      1) one or more specified words within said block of text;
      2) a quantity of text between said one or more specified words within said block of text;
      3) the sequence within said message of said one or more specified words; and
   f) means for altering specified blocks of text.

5. The system according to claim 4 further wherein said system further includes means for determining, based on said summary representations, scores for each said message representing the presence and absence of text favoring said ideas.

6. The system according to claim 4 wherein said means for making summary representations further includes:
   b)(1) a dictionary containing a limited number of words likely to be contained in the text of said specified blocks of text;
   b)(2) a set of concept symbols corresponding to the concepts to be used in evaluating the presence of said ideas within said specified blocks of text;
   b)(3) means for assigning each word in said dictionary to one of said concept symbols;
   b)(4) means for scanning the text of said specified block of text using pattern matching for the occurrence of matching words wherein matching words are those also found in said dictionary;
   b)(5) a set of transformation rules for identifying said important concepts within said text wherein an important concept is identified from:
      (i) one or more specified words within said specified block of text,
      (ii) a quantity of text between said one or more specified words within said specified block of text, and
   b)(6) means for transforming said summary representations to obtain a reduced summary representations wherein said important concepts conveyed by said text, relevant to said ideas, are each reduced to a single concept symbol.

7. The system according to claim 6 wherein each said reduced summary representation is in the form of a text equivalent listing comprising:
   b)(6)(i) a symbol representing a beginning of said specified block of text wherein said symbol has the same form as that of said concept symbols;

b)(6)(ii) a distance symbol representing a quantity of text between the beginning of said specified block of text and its next nearest neighbor wherein said next nearest neighbor is a said matching word, or the end of said block of text;

b)(6)(iii) the concept symbol corresponding to each said matching word in said specified block of text;

b)(6)(iv) a distance symbol corresponding to said distance between each said matching word and its next nearest neighbor or said end of said specified block of text; and b)(6)(v) sequence information specifying the sequence of said beginning, each said matching word, and said end of said specified block of text.

8. The system according to claim 6 wherein said means for transforming said summary representations to obtain said reduced summary representations further includes:

b)(6)(i) means for performing evaluations of pairs of said concept symbols in said text equivalent of said specified block of text wherein said evaluations are based on said symbols, said sequence information, and said distance symbols in said text equivalent listing; and b)(6)(ii) means for performing transformations on said text equivalent listing to reduce said text equivalent listing to important concept symbols wherein said transformations are based on said evaluations of pairs of said concept symbols.

9. The system according to claim 8 wherein said means for performing transformations further includes, based on relationships defined in said transformation rules:

b)(6)(ii)(A) means for inserting a specified distance symbol and a specified concept symbol into said specified text equivalent listing; and b)(6)(ii)(B) means for modifying said sequence information of said specified text equivalent listing.

10. The system according to claim 8 wherein said means for performing transformations further includes, based on relationships defined in said transformation rules:

b)(6)(ii)(A) means for deleting a specified concept symbol and a specified distance symbol from a specified text equivalent listing; and b)(6)(ii)(B) means for modifying said sequence information of said text equivalent.

11. The system according to claim 4 wherein said means for making summary representations includes:

b)(1) means for altering said summary representations based on a said specified block of text and specified input rules, wherein said input rules specify one or more concept symbols to insert and the method for insertion there into; and b)(2) means for altering said specified block of text, based on other blocks of text and specified input rules, wherein said input rules specify one or more words to insert and locations within said individual text blocks for their insertion.

12. The system according to claim 11 further including means for insertion of one or more specified words into the text of said message at locations specified by said input rules and based on said summary representation, wherein said one or more specified words are quantities of text defined in said input rules.

13. The system according to claim 11 further including means for deletions of above specified words from the text of said message at locations specified by said input rules and based on said summary representation, wherein said specified words are quantities of text defined in said input rules.

14. The system according to claim 11 further including means for replacement of one or more specified words in the text of said message by one or more specified replacement words at locations specified by input rules, based on said summary representation, wherein said one or more specified words and said one or more replacement words are quantities of text defined in said input rules.

15. A system for reducing a text message into its essential message components and identifying the presence within said message of one or more predetermined ideas wherein the text of said message is stored in digital form and includes components in a human language, said system comprising: computer means including:

a) a listing of predetermined concept categories and a dictionary of predetermined identifying words wherein each of said identifying words is a text representation corresponding to one of said concept categories, and wherein said concept categories represent a predetermined concept;

b) a set of predetermined text analysis rules wherein said text analysis rules define relationships between one or more concept categories;

c) means for dividing the text of said message into specified blocks of text, wherein said blocks can include all or a subset of the text of said message;

d) means for searching each said block of text for a first plurality of words in said message which match with said predetermined identifying words, such instance of a plurality being a set of matching words;

e) means for determining the sequence of said matching words in said block of text and the distance between pairs of said matching words wherein distance is a numeric representation of the quantity of text between the said pair of matching words in said text;

f) means for analyzing said matching words, said sequence of matching words, and said distances between pairs of matching words to select blocks of text in said message according to one or more of said text analysis rules, wherein said text analysis rules define a relationship between one or more matching words that identifies said blocks of text as relevant to a said idea;

g) means for searching each said relevant block of text in said message for a plurality of words which match with said predetermined identifying words;

h) means for determining the sequence within said block of text of matching identifying words and the distance between each pair of matching identifying words; and i) means for determining within each relevant block of text using said predetermined text analysis rules, the quantities of text favoring each of said ideas.

16. A system according to claim 15 wherein said computer means further includes means for assigning numerical scores for each relevant block of text according to said predetermined text analysis rules, each of said rules further specifying a relationship between said concept categories each corresponding to one said matching identifying word and identifying which said ideas the block of text favors.

17. A system according to claim 16 wherein said computer means further includes means for assigning a numerical score to said message according to the numerical scores for the relevant blocks of text found therein.

18. A system according to claim 15 further including communication means for electronically connecting said computer means to an electronic data base containing text stored in digital form and for transferring said text to said computer means.

19. The system according to claim 15 wherein said computer means further includes:
   j) means for making summary representations of said specified blocks of text wherein each important concept conveyed by said block of text is reduced to a single concept symbol, and wherein each important concept is identified from:
      (i) one or more specified words within said specified block of text;
      (ii) a quantity of text between said one or more specified words within said block of text; and
      (iii) the sequence within said specified block of text of said one or more specified words; and
   k) means for altering specified blocks of text.

20. The system of claim 19 further including means for determining, based on said summary representations:
   1) which blocks of text to use to determine said numerical scores for each said message; and
   2) numerical scores for each said message.

21. The system according to claim 19 wherein said means for making said summary representations from said specified blocks of text further includes:
   a)(1) means for altering said summary representations based on said specified blocks of text and specified input rules, wherein said input rules specify one or more concept symbols to insert and the method for insertion there into; and
   a)(2) means for altering individual said specified blocks of text, based on other blocks of text and specified input rules, wherein said input rules specify one or more words to insert and locations within said individual text blocks for their insertion.

22. The system according to claim 21 further including means for insertion of one or more specified words into the text of said message at locations specified by said input rules and based on said summary representation, wherein said one or more specified words are quantities of text defined in said input rules.

23. The system according to claim 21 further including means for deletions of above specified words from the text of said message at locations specified by said input rules and based on said summary representation, wherein said specified words are quantities of text defined in said input rules.

24. The system according to claim 21 further including means for replacing one or more specified words in the text of said message by one or more specified replacement words at locations specified by input rules, based on said summary representation, wherein said one or more specified words and said one or more replacement words are quantities of text defined in said input rules.

25. The system according to claim 19 wherein said means for making summary representations of said specified blocks of text further includes:
   j)(1) a dictionary containing a limited number of words likely to be contained in the text of said specified blocks of text;
   j)(2) a set of concept symbols corresponding to the concepts to be used in evaluating presence of said ideas within said specified blocks of text;
   j)(3) means for assigning each word in said dictionary to one of said concept symbols;
   j)(4) means for scanning the text of said specified block of text using pattern matching for the occurrence of matching words wherein matching words are those also found in said dictionary;
   j)(5) a set of transformation rules for identifying said important concepts within said text wherein an important concept is identified from:
      (i) one or more specified words within said specified block of text,
      (ii) a quantity of text between said one or more specified words within said specified block of text, and
   j)(6) means for transforming said summary representations to obtain a reduced summary representations wherein said important concepts conveyed by said text, relevant to said ideas, are each reduced to a single concept symbol.

26. The system according to claim 25 wherein each said reduced summary representation is in the form of a text equivalent listing comprising:
   j)(6)(i) a symbol representing a beginning of said specified block of text wherein said symbol has the same form as that of said concept symbols;
   j)(6)(ii) a distance symbol representing a quantity of text between the beginning of said specified block of text and its next nearest neighbor wherein said next nearest neighbor is a said matching word, or the end of said block of text;
   j)(6)(iii) the concept symbol corresponding to each said matching word in said specified block of text;
   j)(6)(iv) a distance symbol corresponding to said distance between each said matching word and its next nearest neighbor or said end of said specified block of text; and
   j)(6)(v) sequence information specifying the sequence of said beginning, each said matching word, and said end of said specified block of text.

27. The system according to claim 25 wherein said means for transforming said summary representations to obtain said reduced summary representations further includes:
   j)(6)(i) means for performing evaluations of pairs of said concept symbols in said text equivalent of said specified block of text wherein said evaluations are based on said symbols, said sequence information, and said distance symbols in said text equivalent listing; and
   j)(6)(ii) means for performing transformations on said text equivalent listing to reduce said text equivalent listing to important concept symbols wherein said transformations are based on said evaluations of pairs of said concept symbols.

28. The system according to claim 27 wherein said means for transforming further includes, based on relationships defined in said transformation rules:
   j)(6)(i) means for inserting a specified distance symbol and a specified concept symbol into said specified text equivalent; and
   j)(6)(ii) means for modifying said sequence information of said specified text equivalent.

29. The system according to claim 27 wherein said means for transforming further includes, based on relationships defined in said transformation rules:

j)(6)(i) means for deleting a specified concept symbol and a specified distance symbol from a specified text equivalent; and j)(6)(ii) means for modifying said sequence information of said text equivalent.

30. The system according to claim 19 wherein said computer means further includes:

(l) means for altering said summary representations based on said specified blocks of text and specified input rules, wherein said input rules specify one or more concept symbols to insert and the method for insertion there into; and (m) means for altering individual said specified blocks of text, based on other blocks of text and specified input rules, wherein said input rules specify one or more words to insert and locations within said individual text blocks for their insertion.

31. The system according to claim 30 further including means for insertion of one or more specified words into the text of said message at locations specified by said input rules and based on said summary representation, wherein said one or more specified words are quantities of text defined in said input rules.

32. The system according to claim 30 further including means for deletions of above specified words from the text of said message at locations specified by said input rules and based on said summary representation, wherein said specified words are quantities of text defined in said input rules.

33. The system according to claim 30 further including means for the replacement of one or more specified words in the text of said message by one or more specified replacement words at locations specified by input rules, based on said summary representation, wherein said one or more specified words and said one or more replacement words are quantities of text defined in said input rules.

34. A system for determining the presence within a text message of one or more predetermined ideas wherein the text of said message is in digital form and includes components in a human language, said system comprising:

a) means for searching said message for a plurality of predetermined scoring words and identifying words in said message which match with said scoring words;

b) means for determining the sequence within said message of matching scoring words and the distance between certain ones of said matching scoring words; and c) means for identifying which said ideas are present in said message according to one or more predetermined rules, each of said rules specifying a relationship between one or more of said matching scoring words;

said means further including:

d) means for dividing the text of said message into specified blocks of text, wherein said blocks can include all or a subset of the text of said message;

e) means for making summary representations of each said block of text wherein each important concept conveyed by said message is reduced to a single concept symbol, and wherein each important concept is identified from:

1) one or more specified words within said block of text;

2) a quantity of text between said one or more specified words within said block of text;

3) the sequence within said message of said one or more specified words; and f) means for altering specified blocks of text.

35. A system for determining the presence within a text message of one or more predetermined ideas wherein the text of said message is in digital form and includes components in a human language, said system comprising:

a) means for searching said message for a plurality of predetermined scoring words and identifying words in said message which match with said scoring words;

b) means for determining the sequence within said message of matching scoring words and the distance between certain ones of said matching scoring words;

c) means for transforming said message to make a summary representation thereof;

d) means for identifying which said ideas are present in said message according to one or more predetermined rules, each of said rules specifying a relationship between one or more of said matching scoring words.

36. The system according to claim 35 wherein said transformation reduces said message to a concept symbol.

37. A system for reducing a text message into its essential message components and identifying the presence within said message of one or more predetermined ideas wherein the text of said message is stored in digital form and includes components in a human language, said system comprising: computer means including:

a) a listing of predetermined concept categories and a dictionary of predetermined identifying words wherein each of said identifying words is a text representation corresponding to one of said concept categories, and wherein each said concept category represents a predetermined concept;

b) a set of predetermined text analysis rules wherein said text analysis rules define relationships between one or more concept categories;

c) means for dividing the text of said message into specified blocks of text, wherein said blocks can include all or a subset of the text of said message;

d) means for searching each said block of text for a first plurality of words in said message which match with said predetermined identifying words, such instance of a plurality being a set of matching words;

e) means for determining the sequence of said matching words in said block of text and the distance between pairs of said matching words wherein distance is a numeric representation of the quantity of text between the said pair of matching words in said text;

f) means for analyzing said matching words, said sequence of matching words, and said distances between pairs of matching words to select blocks of text in said message according to one or more of said text analysis rules, wherein said text analysis rules define a relationship between one or more matching words and identify relevant blocks of text as relevant to said ideas;

g) means for searching each said relevant block of text in said message for a plurality of words which match with said predetermined identifying words;

h) means for determining the sequence within said block of text of matching identifying words and the distance between each pair of matching identifying words;

i) means for transforming said block of text to make a summary representation thereof;

j) means for determining within said relevant block of text using said predetermined text analysis rules, the quantities of text favoring each of said ideas.

38. The system according to claim 37 wherein said transformation reduces each block of text to a concept symbol.

* * * * *

UNITED STATES PATENT AND TRADEMARK OFFICE
CERTIFICATE OF CORRECTION

PATENT NO. : 5,371,673
DATED : December 6, 1994
INVENTOR(S) : David P. Fan It is certified that error appears in the above-identified patent and that said Letters Patent is hereby corrected as shown below:

Column 1, line 30, after "number" insert --of--.

Column 7, line 3, delete "In a addition" and insert therefor --In addition--.

Column 8, line 25, delete "being" and insert therefor --begin--.

Column 11, line 35, after "it" insert --in--.

Column 12, line 6, delete "the the" and insert therefor --the--.

Column 18, line 8, delete "s" and insert therefor --S--.

Column 18, line 35, delete "strings" and insert therefor --string--.

Column 20, line 30, delete "and".

Column 21, line 55, delete "of".

Column 22, Table 5, line 43, delete "(j" = 3)" [first occurence] and insert therefor --(j" = 2)--.

Column 24, line 61, delete "those constants those giving" and insert therefor --those constants giving--.

Column 26, lines 24-25, delete "Appendix A of"--.

Column 26, line 34, delete "(see of Fan, 1987)" and insert therefor --(see Fan, 1987)--.

Column 26, line 38, delete "In, it" and insert therefor --It--.

Column 26, line 49, delete "in of Fan" and insert therefor --in Fan--.

Column 26, line 68, delete "see of Fan" and insert therefor --see Fan--.

Column 30, line 64, delete "also be assumed" and insert therefor --also be assumed--.

UNITED STATES PATENT AND TRADEMARK OFFICE
CERTIFICATE OF CORRECTION

PATENT NO. : 5,371,673
DATED : December 6, 1994
INVENTOR(S) : David P. Fan

It is certified that error appears in the above-indentified patent and that said Letters Patent is hereby corrected as shown below:

Column 30, line 66, after "assumed to" insert -- be--.
Column 182, line 18, delete "j((6)" and insert therefor --j)(6)--.

Signed and Sealed this

Eleventh Day of February, 1997

Attest:

BRUCE LEHMAN

Attesting Officer    Commissioner of Patents and Trademarks